(12) United States Patent
Ishibashi et al.

(10) Patent No.: US 8,005,226 B2
(45) Date of Patent: Aug. 23, 2011

(54) INFORMATION SENDING SYSTEM, INFORMATION SENDING DEVICE, INFORMATION RECEIVING DEVICE, INFORMATION DISTRIBUTION SYSTEM, INFORMATION RECEIVING SYSTEM, INFORMATION SENDING METHOD, INFORMATION RECEIVING METHOD, INFORMATION DISTRIBUTION METHOD, APPARATUS, SENDING METHOD OF INFORMATION RECEIVING DEVICE, PLAYBACK METHOD OF APPARATUS, METHOD OF USING CONTENTS AND PROGRAM STORING MEDIUM

(75) Inventors: Yoshihito Ishibashi, Tokyo (JP); Tateo Oishi, Saitama (JP); Shinako Matsuyama, Tokyo (JP); Tomoyuki Asano, Kanagawa (JP); Akihiro Muto, Tokyo (JP); Jun Kitahara, Chiba (JP)

(73) Assignee: Sony Corporation, Tokyo (JP)

( * ) Notice: Subject to any disclaimer, the term of this patent is extended or adjusted under 35 U.S.C. 154(b) by 114 days.

(21) Appl. No.: 11/385,830

(22) Filed: Mar. 22, 2006

(65) Prior Publication Data

US 2006/0168451 A1   Jul. 27, 2006

Related U.S. Application Data

(63) Continuation of application No. 09/830,392, filed as application No. PCT/JP00/05742 on Aug. 25, 2000, now Pat. No. 7,099,479.

(30) Foreign Application Priority Data

| Aug. 27, 1999 | (JP) | 11-242294 |
| Aug. 27, 1999 | (JP) | 11-242295 |
| Aug. 27, 1999 | (JP) | 11-242296 |
| Aug. 27, 1999 | (JP) | 11-283326 |

(51) Int. Cl.
*H04L 9/00* (2006.01)

(52) U.S. Cl. .................................................. 380/278

(58) Field of Classification Search .................. 713/189, 713/31; 380/228, 238, 277, 278, 203, 281
See application file for complete search history.

(56) References Cited

U.S. PATENT DOCUMENTS 4,694,491 A * 9/1987 Horne et al. .................. 380/239
(Continued)

FOREIGN PATENT DOCUMENTS

BR  P1 9502531-6   5/1996
(Continued)

OTHER PUBLICATIONS

Akashi et al., *FleaMarket*, Information Distribution by Fleamarket System, vol. 95, No. 2, Oct. 25, 1995.
(Continued)

*Primary Examiner* — Beemnet W Dada
(74) *Attorney, Agent, or Firm* — Finnegan, Henderson, Farabow, Garrett & Dunner LLP

(57) ABSTRACT

Content data encrypted with a content key, the content key encrypted with an individual key specific to an information sending device, and the individual key encrypted with a distribution key that is updated in a predetermined cycle, and supplied are sent to an information receiving device, and the information receiving device decrypts the individual key with the distribution key, decrypts the content key with the individual key, and decrypts the content data with the content key. Thus, the information sending device does not have the distribution key, and accordingly piracy of content data can be prevented with a simple configuration. Also, the information receiving device sends the content key and a playback command to other apparatuses. Thus, other apparatuses can play back contents using the playback command and the content key. Furthermore, the information sending device decrypts the content key with the distribution key before being updated, and stores the same. Thus, contents purchased by an advance order can be actually purchased regardless of expiration dates of the distribution key. Furthermore, usage right is passed from a first information receiving device to a second information receiving device different in registration information at the tome of using contents. Thus, contents can be used among information receiving devices different from each other in registration information.

11 Claims, 96 Drawing Sheets

U.S. PATENT DOCUMENTS

| | | | |
|---|---|---|---|
| 4,887,296 A * | 12/1989 | Horne | 380/239 |
| 5,237,610 A | 8/1993 | Gammie et al. | |
| 5,313,524 A | 5/1994 | Van Hulle et al. | |
| 5,673,316 A | 9/1997 | Auerbach et al. | |
| 5,699,426 A | 12/1997 | Tsukamoto et al. | |
| 5,701,343 A | 12/1997 | Takashima et al. | |
| 5,740,246 A | 4/1998 | Saito | |
| 5,910,987 A | 6/1999 | Ginter et al. | |
| 5,915,019 A | 6/1999 | Ginter et al. | |
| 5,917,912 A | 6/1999 | Ginter et al. | |
| 5,949,876 A | 9/1999 | Ginter et al. | |
| 5,982,891 A | 11/1999 | Ginter et al. | |
| 6,005,938 A * | 12/1999 | Banker et al. | 380/239 |
| 6,047,103 A | 4/2000 | Yamauchi et al. | |
| 6,073,122 A * | 6/2000 | Wool | 705/51 |
| 6,097,816 A | 8/2000 | Momiki et al. | |
| 6,226,618 B1 * | 5/2001 | Downs et al. | 705/1 |
| 6,289,455 B1 | 9/2001 | Kocher et al. | |
| 6,320,829 B1 | 11/2001 | Matsumoto et al. | |
| 6,373,948 B1 | 4/2002 | Wool | |
| 6,385,317 B1 | 5/2002 | Rix et al. | |
| 6,424,714 B1 * | 7/2002 | Wasilewski et al. | 380/200 |
| 6,577,734 B1 | 6/2003 | Etzel et al. | |
| 6,654,883 B1 | 11/2003 | Tatebayashi | |
| 6,690,795 B1 * | 2/2004 | Richards | 380/203 |
| 6,714,649 B1 * | 3/2004 | Masuda et al. | 380/44 |
| 6,834,111 B1 | 12/2004 | Nishimura et al. | |

FOREIGN PATENT DOCUMENTS

| | | |
|---|---|---|
| CA | 2149989 | 11/1995 |
| CN | 1126339 A | 7/1996 |
| CN | 1242899 A | 1/2000 |
| EP | 0 542 345 B1 | 5/1993 |
| EP | 0 684 721 B1 | 11/1995 |
| EP | 0 715 242 A1 | 6/1996 |
| EP | 0 789 361 A2 | 8/1997 |
| EP | 0 798 892 A2 | 10/1997 |
| EP | 0 800 312 A1 | 10/1997 |
| EP | 0 933 901 | 8/1999 |
| JP | 4-297145 | 10/1992 |
| JP | 6-180974 | 6/1994 |
| JP | 7-154770 | 6/1995 |
| JP | 8-46948 | 2/1996 |
| JP | 8-160855 | 6/1996 |
| JP | 8-160856 | 6/1996 |
| JP | 10-40100 | 2/1998 |
| JP | 10-79174 | 3/1998 |
| JP | 10-161937 | 6/1998 |
| JP | 10-512074 | 11/1998 |
| JP | 11-85504 | 3/1999 |
| JP | 2000-217071 | 8/2000 |
| JP | 2000-217072 | 8/2000 |
| JP | 2000-228662 | 8/2000 |
| KR | 187876 | 6/1996 |
| KR | 98004075 | 3/1998 |
| KR | 98700776 | 3/1998 |
| WO | WO 96/27155 | 9/1996 |
| WO | WO 97/14249 | 4/1997 |
| WO | WO 99/09718 | 2/1999 |

OTHER PUBLICATIONS

Namba, S., *Information Security in Broadcasting*, NHK Science & Technical Research Laboratories, vol. 89, No. 356, Dec. 18, 1989.

* cited by examiner

FIG. 7

| GROUP ID | ID | CONNECTION TO SERVICE CENTER | SETTLEMENT PROCESSING | PURCHASE PROCESSING | PROXY PAYER | PROXY PURCHASER | REGISTRATION |
|---|---|---|---|---|---|---|---|
| GpID1 | ID1 | POSSIBLE | POSSIBLE | POSSIBLE | — | — | POSSIBLE |
|  | ID2 | POSSIBLE | NOT POSSIBLE | POSSIBLE | ID1 | — | POSSIBLE |
|  | ID3 | POSSIBLE | NOT POSSIBLE | POSSIBLE | ID1 | — | NOT POSSIBLE |
|  | ID4 | NOT POSSIBLE | NOT POSSIBLE | NOT POSSIBLE | — | ID1 | POSSIBLE |
|  | ID5 | NOT POSSIBLE | NOT POSSIBLE | NOT POSSIBLE | — | ID2 | NOT POSSIBLE |
| GpID2 | ID6 | POSSIBLE | POSSIBLE | POSSIBLE | — | — | NOT POSSIBLE |
|  | ID7 | POSSIBLE | NOT POSSIBLE | POSSIBLE | ID6 | — | NOT POSSIBLE |
|  | ID8 | POSSIBLE | NOT POSSIBLE | POSSIBLE | ID6 | — | POSSIBLE |
|  | ID9 | NOT POSSIBLE | NOT POSSIBLE | NOT POSSIBLE | — | ID6,7,8 | POSSIBLE |
|  | ID10 | POSSIBLE | NOT POSSIBLE | NOT POSSIBLE | — | ID6,7,8 | POSSIBLE |
| GpID3 | ID11 | POSSIBLE | POSSIBLE | POSSIBLE | — | — | NOT POSSIBLE |
|  | ID12 | POSSIBLE | NOT POSSIBLE | POSSIBLE | ID11 | — | NOT POSSIBLE |
|  | ID13 | POSSIBLE | NOT POSSIBLE | POSSIBLE | ID11 | — | POSSIBLE |
|  | ID14 | NOT POSSIBLE | NOT POSSIBLE | NOT POSSIBLE | — | ID11,12,13 | NOT POSSIBLE |
|  | ID15 | NOT POSSIBLE | NOT POSSIBLE | NOT POSSIBLE | — | ID11 | POSSIBLE |

(A)

| GROUP ID | ID | CONNECTION TO SERVICE CENTER | SETTLEMENT PROCESSING | SETTLEMENT ID | PURCHASE PROCESSING | PROXY PAYER | PROXY PURCHASER | REGISTRATION | SIGNATURE |
|---|---|---|---|---|---|---|---|---|---|
| GpID1 | ID1 | POSSIBLE | POSSIBLE | SETTLEMENT ID 1 | POSSIBLE | — | — | POSSIBLE | |
| | ID2 | POSSIBLE | NOT POSSIBLE | — | POSSIBLE | ID1 | — | POSSIBLE | SIGNATURE |
| | ID3 | POSSIBLE | NOT POSSIBLE | — | POSSIBLE | ID1 | — | NOT POSSIBLE | |
| | ID4 | NOT POSSIBLE | NOT POSSIBLE | — | NOT POSSIBLE | — | ID1 | POSSIBLE | |
| | ID5 | NOT POSSIBLE | NOT POSSIBLE | — | NOT POSSIBLE | — | ID2 | NOT POSSIBLE | |

(B)

| GROUP ID | ID | CONNECTION TO SERVICE CENTER | SETTLEMENT PROCESSING | SETTLEMENT ID | PURCHASE PROCESSING | PROXY PAYER | PROXY PURCHASER | REGISTRATION | SIGNATURE |
|---|---|---|---|---|---|---|---|---|---|
| GpID2 | ID6 | POSSIBLE | POSSIBLE | SETTLEMENT ID 2 | POSSIBLE | — | — | POSSIBLE | |
| | ID7 | POSSIBLE | NOT POSSIBLE | — | POSSIBLE | ID6 | — | POSSIBLE | SIGNATURE |
| | ID8 | POSSIBLE | NOT POSSIBLE | — | POSSIBLE | ID6 | — | NOT POSSIBLE | |
| | ID9 | NOT POSSIBLE | NOT POSSIBLE | — | NOT POSSIBLE | — | ID6,7,8 | POSSIBLE | |
| | ID10 | NOT POSSIBLE | NOT POSSIBLE | — | NOT POSSIBLE | — | ID6,7,8 | NOT POSSIBLE | |

FIG. 8

(ENCRYPTION)

S20: ASSUME THAT p IS A CHARACTERISTIC NUMBER, a AND b ARE COEFFICIENTS OF THE ELLIPTIC CURVE, THE ELLIPTIC CURVE IS $y^2 = x^3 + ax + b$, G IS A BASE POINT ON THE CURVE, r IS A NUMBER OF THE G PLACE, $M_X$ AND $M_Y$ ARE MESSAGES, AND G AND $K_SG$ ARE PUBLIC KEYS

S21: u OF $0 < u < r$ IS GENERATED WITH A RANDOM NUMBER GENERATOR

S22: $V = uK_SG = (X_V, Y_V)$ IS CALCULATED

S23: $X_0 = X_V \times M_X \bmod p$ IS CALCULATED

S24: $Y_0 = Y_V \times M_Y \bmod p$ IS CALCULATED

S25: uG IS CALCULATED

S26: UG, $(X_0, Y_0)$ IS DEFINED FOR AN ENCRYPTED TEXT

FIG. 12

(DECRYPTION)

ASSUME THAT p IS A CHARACTERISTIC NUMBER, a AND b ARE COEFFICIENTS OF THE ELLIPTIC CURVE, THE ELLIPTIC CURVE IS $y^2 = x^3 + ax + b$, G IS A BASE POINT ON THE CURVE, r IS A NUMBER OF THE G PLACE, uG AND $(X_0, Y_0)$ ARE ENCRYPTED TEXTS, AND $K_S G$ IS A PUBLIC KEY —— S30

$K_S uG = (X_v, Y_v)$ IS CALCULATED —— S31

$X_1 = X_0/X_v \bmod p$ IS CALCULATED —— S32

$Y_1 = Y_0/Y_v \bmod p$ IS CALCULATED —— S33

A DECRYPTED TEXT $(X_1, Y_1) = (M_X, M_Y)$ IS OBTAINED —— S34

FIG. 13

| | |
|---|---|
| | TYPE OF DATA |
| | TYPE OF HANDLING POLICY (SINGLE) |
| | EXPIRATION DATE OF HANDLING POLICY |
| | ID OF CONTENTS |
| | ID OF CONTENT PROVIDER |
| | ID OF HANDLING POLICY |
| | VERSION OF HANDLING POLICY |
| | AREA CODE |
| | USAGE POSSIBLE APPARATUS CONDITION |
| | USAGE POSSIBLE USER CONDITION |
| | ID OF SERVICE PROVIDER |
| | GENERATION MANAGEMENT INFORMATION |
| | THE NUMBER OF RULES |
| | ADDRESS INFORMATION OF RULES |
| RULE 1 | RULE NUMBER (RULE #) |
| | USAGE RIGHT CONTENT NUMBER (TYPE) |
| | PARAMETER |
| | MINIMUM SELLING-PRICE |
| | AMOUNT OF BENEFITS OF CONTENT PROVIDER |
| | RATE OF BENEFITS OF SERVICE PROVIDER |
| | DATA SIZE |
| | SENDING INFORMATION |
| ⋮ | ⋮ |
| RULE N | RULE NUMBER (RULE #) |
| | USAGE RIGHT CONTENT NUMBER (TYPE) |
| | PARAMETER |
| | MINIMUM SELLING-PRICE |
| | AMOUNT OF BENEFITS OF CONTENT PROVIDER |
| | RATE OF BENEFITS OF SERVICE PROVIDER |
| | DATA SIZE |
| | SENDING INFORMATION |
| | (PRESENCE OR ABSENCE OF VERIFICATION OF SIGNATURE) |
| | PUBLIC KEY CERTIFICATE |
| | SIGNATURE |

FIG. 33

| | |
|---|---|
| TYPE OF DATA | |
| TYPE OF HANDLING POLICY (ALBUM) | |
| EXPIRATION DATE OF HANDLING POLICY | |
| ID OF ALBUM | |
| VERSION OF HANDLING POLICY | |
| ID OF CONTENT PROVIDER | |
| ID OF HANDLING POLICY | |
| AREA CODE | |
| USAGE POSSIBLE APPARATUS CONDITION | |
| USAGE POSSIBLE USER CONDITION | |
| ID OF SERVICE PROVIDER | |
| NUMBER OF HANDLING POLICIES OF SINGLE CONTENTS | |
| ADDRESS INFORMATION OF HANDLING POLICY OF SINGLE CONTENTS | |
| SINGLE | HANDLING POLICY 1 |
| | ⋮ |
| | HANDLING POLICY N |
| GENERATION MANAGEMENT INFORMATION | |
| NUMBER OF RULES | |
| ADDRESS INFORMATION OF RULES | |
| RULE 1 | RULE NUMBER (RULE #) |
| | USAGE RIGHT CONTENT NUMBER (TYPE) |
| | PARAMETER |
| | MINIMUM SELLING-PRICE |
| | AMOUNT OF BENEFITS OF CONTENT PROVIDER |
| | RATE OF BENEFITS OF SERVICE PROVIDER |
| | DATA SIZE |
| | SENDING INFORMATION |
| ⋮ | ⋮ |
| RULE N | RULE NUMBER (RULE #) |
| | USAGE RIGHT CONTENT NUMBER (TYPE) |
| | PARAMETER |
| | MINIMUM SELLING-PRICE |
| | AMOUNT OF BENEFITS OF CONTENT PROVIDER |
| | RATE OF BENEFITS OF SERVICE PROVIDER |
| | DATA SIZE |
| | SENDING INFORMATION |
| (PRESENCE OR ABSENCE OF DETECTION OF SIGNATURE) | |
| PUBLIC KEY CERTIFICATE | |
| SIGNATURE | |

FIG. 34

| |
|---|
| TYPE OF DATA |
| TYPE OF HANDLING POLICY (SINGLE) |
| EXPIRATION DATE OF HANDLING POLICY |
| ID OF CONTENTS |
| ID OF CONTENT PROVIDER |
| ID OF HANDLING POLICY |
| VERSION OF HANDLING POLICY |
| AREA CODE |
| USAGE POSSIBLE APPARATUS CONDITION |
| USAGE POSSIBLE USER CONDITION |
| ID OF SERVICE PROVIDER |
| GENERATION MANAGEMENT INFORMATION |
| THE NUMBER OF RULES |
| ADDRESS INFORMATION OF RULES |
| RULE 1: RULE NUMBER (RULE #) / USAGE RIGHT CONTENT NUMBER (TYPE) / PARAMETER / MINIMUM SELLING-PRICE / DATA SIZE / SENDING INFORMATION |
| ⋮ |
| RULE N: RULE NUMBER (RULE #) / USAGE RIGHT CONTENT NUMBER (TYPE) / PARAMETER / MINIMUM SELLING-PRICE / DATA SIZE / SENDING INFORMATION |
| (PRESENCE OR ABSENCE OF DETECTION OF SIGNATURE) |
| PUBLIC KEY CERTIFICATE |
| SIGNATURE |

FIG. 35

| |
|---|
| TYPE OF DATA |
| TYPE OF HANDLING POLICY (ALBUM) |
| EXPIRATION DATE OF HANDLING POLICY |
| ID OF ALBUM |
| VERSION OF HANDLING POLICY |
| ID OF CONTENT PROVIDER |
| ID OF HANDLING POLICY |
| AREA CODE |
| USAGE POSSIBLE APPARATUS CONDITION |
| USAGE POSSIBLE USER CONDITION |
| ID OF SERVICE PROVIDER |
| NUMBER OF HANDLING POLICIES OF SINGLE CONTENTS |
| ADDRESS INFORMATION OF HANDLING POLICY OF SINGLE CONTENTS |
| SINGLE: HANDLING POLICY 1 ⋮ HANDLING POLICY N |
| GENERATION MANAGEMENT INFORMATION |
| NUMBER OF RULES |
| ADDRESS INFORMATION OF RULES |
| RULE 1: RULE NUMBER (RULE #) / USAGE RIGHT CONTENT NUMBER (TYPE) / PARAMETER / MINIMUM SELLING-PRICE / DATA SIZE / SENDING INFORMATION |
| ⋮ |
| RULE N: RULE NUMBER (RULE #) / USAGE RIGHT CONTENT NUMBER (TYPE) / PARAMETER / MINIMUM SELLING-PRICE / DATA SIZE / SENDING INFORMATION |
| (PRESENCE OR ABSENCE OF DETECTION OF SIGNATURE) |
| PUBLIC KEY CERTIFICATE |
| SIGNATURE |

FIG. 36

| |
|---|
| TYPE OF DATA |
| TYPE OF PRICE INFORMATION (SINGLE) |
| EXPIRATION DATE OF PRICE INFORMATION |
| ID OF CONTENTS |
| ID OF SERVICE PROVIDER |
| ID OF PRICE INFORMATION |
| VERSION OF PRICE INFORMATION |
| AREA CODE |
| USAGE POSSIBLE APPARATUS CONDITION |
| USAGE POSSIBLE USER CONDITION |
| ID OF CONTENT PROVIDER |
| ID OF HANDLING POLICY |
| NUMBER OF RULES |
| ADDRESS INFORMATION OF RULES |
| RULE 1: RULE NUMBER (RULE#) / AMOUNT OF BENEFITS OF SERVICE PROVIDER / RATE OF BENEFITS OF SERVICE PROVIDER / PRICE / DATA SIZE / SENDING INFORMATION |
| ⋮ |
| RULE N: RULE NUMBER (RULE#) / AMOUNT OF BENEFITS OF SERVICE PROVIDER / RATE OF BENEFITS OF SERVICE PROVIDER / PRICE / DATA SIZE / SENDING INFORMATION |
| (PRESENCE OR ABSENCE OF DETECTION OF SIGNATURE) |
| PUBLIC KEY CERTIFICATE |
| SIGNATURE |

FIG. 37

| | |
|---|---|
| | TYPE OF DATA |
| | TYPE OF PRICE INFORMATION (ALBUM) |
| | EXPIRATION DATE OF PRICE INFORMATION |
| | ID OF ALBUM |
| | ID OF SERVICE PROVIDER |
| | ID OF PRICE INFORMATION |
| | VERSION OF PRICE INFORMATION |
| | AREA CODE |
| | USAGE POSSIBLE APPARATUS CONDITION |
| | USAGE POSSIBLE USER CONDITION |
| | ID OF CONTENT PROVIDER |
| | ID OF HANDLING POLICY |
| | NUMBER OF PRICE INFORMATION OF SINGLE CONTENTS |
| | ADDRESS INFORMATION OF PRICE INFORMATION OF SINGLE CONTENTS |
| SINGLE | PRICE INFORMATION 1 |
| | ⋮ |
| | PRICE INFORMATION N |
| | NUMBER OF RULES |
| | ADDRESS INFORMATION OF RULES |
| RULE 1 | RULE NUMBER (RULE#) |
| | AMOUNT OF BENEFITS OF SERVICE PROVIDER |
| | RATE OF BENEFITS OF SERVICE PROVIDER |
| | PRICE |
| | DATA SIZE |
| | SENDING INFORMATION |
| ⋮ | ⋮ |
| RULE N | RULE NUMBER (RULE#) |
| | AMOUNT OF BENEFITS OF SERVICE PROVIDER |
| | RATE OF BENEFITS OF SERVICE PROVIDER |
| | PRICE |
| | DATA SIZE |
| | SENDING INFORMATION |
| | (PRESENCE OR ABSENCE OF DETECTION OF SIGNATURE) |
| | PUBLIC KEY CERTIFICATE |
| | SIGNATURE |

FIG. 38

| |
|---|
| TYPE OF DATA |
| TYPE OF PRICE INFORMATION (SINGLE) |
| EXPIRATION DATE OF PRICE INFORMATION |
| ID OF CONTENTS |
| ID OF SERVICE PROVIDER |
| ID OF PRICE INFORMATION |
| VERSION OF PRICE INFORMATION |
| AREA CODE |
| USAGE POSSIBLE APPARATUS CONDITION |
| USAGE POSSIBLE USER CONDITION |
| ID OF CONTENT PROVIDER |
| ID OF HANDLING POLICY |
| NUMBER OF RULES |
| ADDRESS INFORMATION OF RULES |
| RULE 1: RULE NUMBER (RULE#) / PRICE / DATA SIZE / SENDING INFORMATION |
| ⋮ |
| RULE N: RULE NUMBER (RULE#) / PRICE / DATA SIZE / SENDING INFORMATION |
| (PRESENCE OR ABSENCE OF DETECTION OF SIGNATURE) |
| PUBLIC KEY CERTIFICATE |
| SIGNATURE |

FIG. 39

| |
|---|
| TYPE OF DATA |
| TYPE OF PRICE INFORMATION (ALBUM) |
| EXPIRATION DATE OF PRICE INFORMATION |
| ID OF ALBUM |
| ID OF SERVICE PROVIDER |
| ID OF PRICE INFORMATION |
| VERSION OF PRICE INFORMATION |
| AREA CODE |
| USAGE POSSIBLE APPARATUS CONDITION |
| USAGE POSSIBLE USER CONDITION |
| ID OF CONTENT PROVIDER |
| ID OF HANDLING POLICY |
| NUMBER OF PRICE INFORMATION OF SINGLE CONTENTS |
| ADDRESS INFORMATION OF PRICE INFORMATION OF SINGLE CONTENTS |
| SINGLE — PRICE INFORMATION 1 |
| ⋮ |
| SINGLE — PRICE INFORMATION N |
| NUMBER OF RULES |
| ADDRESS INFORMATION OF RULES |
| RULE 1 — RULE NUMBER (RULE#) |
| RULE 1 — PRICE |
| RULE 1 — DATA SIZE |
| RULE 1 — SENDING INFORMATION |
| ⋮ |
| RULE N — RULE NUMBER (RULE#) |
| RULE N — PRICE |
| RULE N — DATA SIZE |
| RULE N — SENDING INFORMATION |
| (PRESENCE OR ABSENCE OF DETECTION OF SIGNATURE) |
| PUBLIC KEY CERTIFICATE |
| SIGNATURE |

FIG. 40

| |
|---|
| TYPE OF DATA |
| TYPE OF LICENSE CONDITION INFORMATION |
| EXPIRATION DATE OF LICENSE CONDITION INFORMATION |
| ID OF CONTENTS |
| ID OF ALBUM |
| ID OF CIPHER PROCESSING PORTION |
| ID OF USER |
| ID OF CONTENT PROVIDER |
| ID OF HANDLING POLICY |
| VERSION OF HANDLING POLICY |
| ID OF SERVICE PROVIDER |
| ID OF PRICE INFORMATION |
| VERSION OF PRICE INFORMATION |
| ID OF LICENSE CONDITION INFORMATION |
| RULE NUMBER OF PLAYBACK RIGHT (USAGE RIGHT) |
| USAGE RIGHT CONTENT NUMBER |
| REMAINING NUMBER OF TIMES OF PLAYBACK |
| EXPIRATION DATE OF PLAYBACK RIGHT |
| RULE NUMBER OF REPLICATION RIGHT (USAGE RIGHT) |
| USAGE RIGHT CONTENT NUMBER |
| REMAINING NUMBER OF TIMES OF REPLICATION |
| GENERATION MANAGEMENT INFORMATION |
| ID OF CIPHER PROCESSING PORTION POSSESSING PLAYBACK RIGHT |

FIG. 41

| |
|---|
| TYPE OF DATA |
| ID OF CIPHER PROCESSING PORTION |
| ID OF USER |
| ID OF CONTENTS |
| ID OF CONTENT PROVIDER |
| ID OF HANDLING POLICY |
| VERSION OF HANDLING POLICY |
| ID OF SERVICE PROVIDER |
| ID OF PRICE INFORMATION |
| VERSION OF PRICE INFORMATION |
| ID OF LICENSE CONDITION INFORMATION |
| RULE NUMBER (RULE #) |
| AMOUNT / RATE OF BENEFITS OF CONTENT PROVIDER |
| AMOUNT / RATE OF BENEFITS OF SERVICE PROVIDER |
| GENERATION MANAGEMENT INFORMATION |
| DATA SIZE OF SENDING INFORMATION DEFINED BY CONTENT PROVIDER |
| SENDING INFORMATION DEFINED BY CONTENT PROVIDER |
| DATA SIZE OF SENDING INFORMATION DEFINED BY SERVICE PROVIDER |
| SENDING INFORMATION DEFINED BY SERVICE PROVIDER |
| ID OF SUPPLIER |

FIG. 42

| |
|---|
| TYPE OF DATA |
| ID OF CIPHER PROCESSING PORTION |
| ID OF USER |
| ID OF CONTENTS |
| ID OF CONTENT PROVIDER |
| ID OF HANDLING POLICY |
| VERSION OF HANDLING POLICY |
| ID OF SERVICE PROVIDER |
| ID OF PRICE INFORMATION |
| VERSION OF PRICE INFORMATION |
| ID OF LICENSE CONDITION INFORMATION |
| RULE NUMBER (RULE #) |
| GENERATION MANAGEMENT INFORMATION |
| DATA SIZE OF SENDING INFORMATION DEFINED BY CONTENT PROVIDER |
| SENDING INFORMATION DEFINED BY CONTENT PROVIDER |
| DATA SIZE OF SENDING INFORMATION DEFINED BY SERVICE PROVIDER |
| SENDING INFORMATION DEFINED BY SERVICE PROVIDER |
| ID OF SUPPLIER |

FIG. 43

| USAGE RIGHT CONTENT NUMBER | RIGHT | USAGE RIGHT CONTENT | | |
|---|---|---|---|---|
| | | LIMIT ON PERIOD | LIMIT ON THE NUMBER OF TIMES | LIMIT ON REPLICATION |
| (1) | PLAYBACK RIGHT | NOT IMPOSED | NOT IMPOSED | — |
| (2) | | IMPOSED | NOT IMPOSED | — |
| (3) | | IMPOSED | NOT IMPOSED | — |
| (4) | REPLICATION RIGHT | NOT IMPOSED | IMPOSED | NOT IMPOSED |
| (5) | | NOT IMPOSED | NOT IMPOSED | NOT IMPOSED |
| (6) | | NOT IMPOSED | IMPOSED | NOT IMPOSED |
| (7) | | NOT IMPOSED | NOT IMPOSED | SCMS |
| (8) | | NOT IMPOSED | IMPOSED | SCMS |
| (9)~(15) | SPARES | | | |
| (16) | RIGHT TO CHANGE RIGHT CONTENTS | — | — | — |
| (17) | REPURCHASE RIGHT | — | — | — |
| (18) | ADDITIONAL PURCHASE RIGHT | — | — | — |
| (19) | MANAGEMENT TRANSFER RIGHT | — | — | — |

FIG. 44

(A) | EXPIRATION DATE OF PLAYBACK RIGHT |

(B) | EXPIRATION DATE OF PLAYBACK RIGHT |

(C)
| EXPIRATION DATE OF PLAYBACK RIGHT |
| NUMBER OF DAYS AND TIME |

(D)
| EXPIRATION DATE OF PLAYBACK RIGHT |
| NUMBER OF TIMES OF PLAYBACK |

(E) | EXPIRATION DATE OF REPLICATION RIGHT |

(F)
| EXPIRATION DATE OF REPLICATION DATE |
| NUMBER OF TIMES OF REPLICATION |

(G) | EXPIRATION DATE OF REPLICATION |

(H)
| EXPIRATION DATE OF REPLICATION |
| NUMBER OF TIMES OF REPLICATION |

(I)
| EXPIRATION DATE OF RIGHT TO CHANGE RIGHT CONTENTS |
| FORMER RULE NUMBER |
| NEW RULE NUMBER |

(J)
| EXPIRATION DATE OF REPURCHASE RIGHT |
| FORMER RULE NUMBER |
| NEW RULE NUMBER |
| MAXIMUM REDISTRIBUTED GENERATION INFORMATION |

(K)
| EXPIRATION DATE OF ADDITIONAL PURCHASE RIGHT |
| MINIMUM NUMBER OF POSSESSED CONTENTS |
| MAXIMUM NUMBER OF POSSESSED CONTENTS |

(L) | EXPIRATION DATE OF MANAGEMENT TRANSFER RIGHT |

(M)
| EXPIRATION DATE OF CONTENT PURCHASE RIGHT |
| ID OF FORMER CONTENTS |
| FORMER RULE NUMBER |
| NEW RULE NUMBER |

FIG. 45

| |
|---|
| TYPE OF DATA |
| TYPE OF CONTENTS (SINGLE) |
| EXPIRATION DATE OF CONTENTS |
| CATEGORY OF CONTENTS |
| ID OF CONTENTS |
| ID OF CONTENT PROVIDER |
| CRYPTOSYSTEM OF CONTENTS |
| DATA LENGTH OF ENCRYPTED CONTENTS |
| ENCRYPTED CONTENTS |
| PUBLIC KEY CERTIFICATE |
| SIGNATURE |

FIG. 46

| |
|---|
| TYPE OF DATA |
| TYPE OF CONTENTS (ALBUM) |
| EXPIRATION DATE OF CONTENTS |
| ID OF ALBUM |
| ID OF CONTENT PROVIDER |
| NUMBER OF SINGLE CONTENTS |
| ADDRESS INFORMATION OF SINGLE CONTENTS |
| SINGLE — CONTENTS 1 <br> ⋮ <br> CONTENTS N |
| PUBLIC KEY CERTIFICATE |
| SIGNATURE |

FIG. 47

| |
|---|
| TYPE OF DATA |
| TYPE OF KEY DATA (SINGLE) |
| EXPIRATION DATE OF KEY |
| ID OF CONTENTS |
| ID OF CONTENT PROVIDER |
| KEY VERSION |
| CRYPTOSYSTEM OF CONTENT KEY |
| ENCRYPTED CONTENT KEY |
| CRYPTOSYSTEM OF INDIVIDUAL KEY |
| ENCRYPTED INDIVIDUAL KEY |
| PUBLIC KEY CERTIFICATE |
| SIGNATURE |

FIG. 48

| |
|---|
| TYPE OF DATA |
| TYPE OF KEY DATA (ALBUM) |
| EXPIRATION DATE OF KEY |
| ID OF ALBUM |
| CONTENT PROVIDER ID |
| VERSION OF KEY |
| NUMBER OF KEY DATA FOR SINGLE CONTENTS |
| ADDRESS INFORMATION OF KEY DATA FOR SINGLE CONTENTS |
| SINGLE: KEY DATA 1 ... KEY DATA N |
| PUBLIC KEY CERTIFICATE |
| SIGNATURE |

FIG. 50

| | |
|---|---|
| RULE N | RULE NUMBER |
| | USAGE CONTENT RIGHT NUMBER |
| | PARAMETER |
| | MINIMUM PRICE |
| | EARNINGS (RATE OF BENEFITS) |
| RULE 1 | RULE NUMBER #1 |
| | USAGE RIGHT CONTENT NUMBER #1 |
| | ABSENT |
| | ¥350 |
| | 30% |
| RULE 2 | RULE NUMBER #2 |
| | USAGE RIGHT CONTENT NUMBER #2 |
| | ONE HOUR |
| | ¥100 |
| | 30% |
| RULE 3 | RULE NUMBER #3 |
| | USAGE RIGHT CONTENT NUMBER #6 |
| | ONE TIME |
| | ¥30 |
| | 30% |
| RULE 4 | RULE NUMBER #4 |
| | USAGE RIGHT CONTENT NUMBER #13 |
| | #2/#1 |
| | ¥200 |
| | 20% |
| RULE 5 | RULE NUMBER #5 |
| | USAGE RIGHT CONTENT NUMBER #14 |
| | #1/#1 |
| | ¥250 |
| | 20% |

FIG. 76

| | |
|---|---|
| RULE N | RULE NUMBER |
| | PARAMETER |
| | PRICE |
| RULE 1 | RULE NUMBER #1 |
| | 30% |
| | ¥500 |
| RULE 2 | RULE NUMBER #2 |
| | 40% |
| | ¥100 |
| RULE 3 | RULE NUMBER #3 |
| | 40% |
| | ¥100 |
| RULE 4 | RULE NUMBER #4 |
| | 10% |
| | ¥200 |
| RULE 5 | RULE NUMBER #5 |
| | 20% |
| | ¥350 |

FIG. 77

| RULE 1 | # 1 |
| --- | --- |
| | # 1 |
| | ABSENT |
| | ¥350 |
| | 30% |
| RULE 2 | # 2 |
| | # 2 |
| | ONE HOUR |
| | ¥100 |
| | 30% |
| RULE 3 | # 3 |
| | # 13 |
| | # 2 / # 1 |
| | ¥200 |
| | 20% |

ONE PART OF RULE PART
OF HANDLING POLICY

| RULE 1 | # 1 |
| --- | --- |
| | 30% |
| | ¥500 |
| RULE 2 | # 2 |
| | 40% |
| | ¥100 |
| RULE 3 | # 3 |
| | 10% |
| | ¥200 |

ONE PART OF RULE PART
OF PRICE INFORMATION

PRESENT

| RULE | RULE NUMBER |
| --- | --- |
| | USAGE RIGHT CONTENT NUMBER |
| | PARAMETER |
| RULE | # 2 |
| | # 2 |
| | THIRTY MINUTES / TWO HOURS |

RULE PART OF LICENSE
CONDITION INFORMATION

→

AFTER CHANGE

| RULE | RULE NUMBER |
| --- | --- |
| | USAGE RIGHT CONTENT NUMBER |
| | PARAMETER |
| RULE | # 1 |
| | # 1 |
| | ABSENT |

RULE PART OF LICENSE
CONDITION INFORMATION

FIG. 78

INFORMATION SENDING SYSTEM, INFORMATION SENDING DEVICE, INFORMATION RECEIVING DEVICE, INFORMATION DISTRIBUTION SYSTEM, INFORMATION RECEIVING SYSTEM, INFORMATION SENDING METHOD, INFORMATION RECEIVING METHOD, INFORMATION DISTRIBUTION METHOD, APPARATUS, SENDING METHOD OF INFORMATION RECEIVING DEVICE, PLAYBACK METHOD OF APPARATUS, METHOD OF USING CONTENTS AND PROGRAM STORING MEDIUM

This is a continuation of application Ser. No. 09/830,392, filed on Jun. 18, 2001, now U.S. Pat. No. 7,099,479 the contents of which are incorporated herein by reference, application Ser. No. 09/830,392 is the U.S. National Stage of International Application No. PCT/JP00/05742, filed on Aug. 25, 2000.

TECHNICAL FIELD

The present invention relates to an information sending system, an information sending device, an information receiving device, an information distribution system, an information receiving system, an information sending method, an information receiving method, an information distribution method, an apparatus, a sending method of the information receiving device, a playback method of the apparatus, a method of using contents and a program storing medium, and is suitably applied to, for example, an information sending system allowing an owner or a seller of contents to distribute contents safely to a user of the contents.

BACKGROUND ART

There are systems in which information (contents) such as music is encrypted and is sent to an information processing device of a user with whom a predetermined contract has been signed, and the user decrypts contents with the information processing device to use the contents.

For example, cases where two content sending devices and a content receiving device are provided as shown in FIG. 96 will be described.

A first content sending device 600 has a data encrypting portion 601, a data encrypting portion 602, a content key generating portion 603 and a tamper resistant memory 604. Furthermore, the tamper resistant memory cited herein may be one that cannot be easily read out by a third party, and does not require a particular limitation in terms of hardware (for example, it may be a hard disk placed in an entrance-controlled room, a hard disk of a password-controlled personal computer, or the like). A distribution key $K_d$ required for encrypting a content key $K_{co}$ is supplied in advance to the tamper memory 604 from an electronic distribution service center (not shown) and is stored therein.

For generating data to be passed to the content receiving device 620, the content sending device 600 uses the content key generating portion 603 to generate the content key $K_{co1}$, and uses this key to encrypt contents at the content encrypting portion 601. Also, the content key $K_{co1}$ is encrypted at the data encrypting portion 602 using the distribution key $K_d$. The encrypted contents and content key $K_{co1}$ are sent to the content receiving device 620.

In this connection, as in the case of the content sending device 600, a second content sending device 610 has a data encrypting portion 611, a data encrypting portion 612, a content key generating portion 613 and a tamper resistant memory 614, generates the content key $K_{co2}$ at the content key generating portion 613, and encrypts contents by the data encrypting portion 611 using this key. Also, the data encrypting portion 612 encrypts the content key $K_{co2}$ using the distribution key $K_d$ supplied from the electronic distribution service center (not shown). In this way, the second content sending device 610 sends the encrypted contents and the encrypted content key $K_{co2}$ to the content receiving device 620.

The content receiving device 620 has a sending and receiving portion 621, a host controller 622, a cipher processing portion 623, a memory 624, a data decrypting portion 625, a data decrypting portion 626 and a tamper resistant memory 627. Furthermore, since any number of users use contents and it is impossible to understand how content users manipulate an apparatus, the tamper resistant memory cited herein needs to have internal data protected in terms of hardware, and thus the cipher processing portion 623 is a semiconductor chip having a structure that is hardly accessed from the outside, and has a multi-layer structure, and its internal tamper resistant memory is sandwiched between dummy layers such as aluminum layers, and also the range of operating voltage and/or frequency is narrow, and so on, thus characteristically making it difficult to read out data illegally from the outside. And, in the tamper resistant memory 627, the distribution key $K_d$ supplied in advance from the electronic distribution service center (not shown) is stored.

In this connection, the tamper resistant memories 604, 614 of the content sending devices, 600, 610 are memories that can be accessed from the outside, but constraints are added to methods of making an access to those memories. It may be a password or room entrance-control. On the other hand, in the tamper resistant memory 627 of the content receiving device 620, the memory itself has a structure that is not accessed illegally from the outside, methods of reading internal data from the outside using normal accessing means are limited, or there are no such methods at all. Furthermore, for the tamper resistant memory 627, its internal data cannot be read at all from the outside, but there may be a accessing method in which only the change of data can be performed from the outside if previous key data and the like are used. Also, in the cipher processing portion 623, predetermined data can be read out by making an access to the memory, while the internal memory cannot be read out from the outside.

The contents and the content keys $K_{co1}$ and $K_{co2}$ sent from the content sender 600 or 610 are received at the sending and receiving portion 621, and are delivered to the host controller 622. The host controller 622 stores these data in the memory on a temporary basis, and passes the content key $K_{co}$ and the contents to the cipher processing portion 623 in case of using the contents. The cipher processing portion 623 which receives them performs decryption using the distribution key $K_d$ stored in advance in the tamper resistant memory 627 at the data decrypting portion 625, and then decrypts contents at the data decrypting portion 626 using the content key $K_{co}$, and uses the contents. At this time, accounting may be involved.

However, in the conventional information processing system shown in FIG. 96, the content sending devices 600 and 610 use the same distribution key $K_d$, thus raising a problem that content information can be pirated by each other. As one method for solving this problem, the method in which the piracy of content information among sending devices is avoided by using a different distribution key $K_d$ for each content sending device is conceivable. In this case, however, there is a disadvantage that the content receiving device needs to retain all the distribution keys $K_d$, thus making a configuration and receiving method of the content receiving device more complicated.

Also, an information receiving device that does not have content usage right, among information receiving devices that receive contents, can hardly use the contents.

Furthermore, information needed for using the distribution key $K_d$ and the other contents distributed from the information sending device is updated in predetermined timing, and information receiving devices that do not have a new key $K_d$ and other information hardly use the contents.

Furthermore, in the case where registration information for using contents is different among a plurality of information receiving devices that use the contents, it is difficult to exchange content data between information receiving devices different from each other in such registration information.

DISCLOSURE OF THE INVENTION

The present invention has been made considering the above respects, and proposes an information sending system, an information distribution system, an information sending device, an information receiving device, an information sending method, an information receiving method and a program storing medium that are capable of preventing piracy of contents with a simple configuration.

In the present invention, for solving such problems, the information sending device encrypts content data with a predetermined content key, encrypts the above described content key with an individual key specific to the information sending device, and sends the content data encrypted with the content key, the content key encrypted with the individual key and an encrypted individual key supplied from the outside, which is constituted by encrypting the individual key with a predetermined distribution key, to the information receiving device, and the information receiving device decrypts the individual key with the distribution key given in advance, decrypts the content key with such decrypted individual key, and decrypts the content data with such decrypted content key.

Thus, a plurality of information sending devices use their specific individual keys respectively, and does not have the distribution key, thereby making it possible to prevent illegal use of content data, that is, piracy between information sending devices. And, the information receiving device can decrypt contents from a plurality of information sending devices by having only one kind of distribution key.

Also, the present invention has been made considering the above respects, and proposes an information distribution system, an information distribution method, an information receiving device, an apparatus, a sending method of the information receiving device, a playback method of the apparatus and a program storing medium in which even an information receiving device that does not have content usage right, among information receiving devices that use contents, can use the contents.

In the present invention, for solving such problems, the information receiving device having content usage right has the content key for decrypting the content data distributed from the information sending device, generates a playback command for another apparatus that does not have content data usage right, and sends again the generated playback command and the content key to another apparatus.

Thus, even in another apparatus that does not retain content playback right, the contents can be played using the playback command and the content key received from the information sending device which retains the contents.

Furthermore, the present invention has been made considering the above, and proposes an information distribution system, an information distribution method, an information receiving device, an information receiving method and a program storing medium in which contents can be used even after the expiration date of the information needed for using the distribution key and the other contents distributed from the information sending device.

In the present invention, for solving such problems, the information sending device encrypts the content key with the individual key specific to the information sending device, and sends at least the content key encrypted with the individual key and the encrypted individual key supplied from the outside, which is constituted by encrypting the individual key with the distribution key that is updated in a predetermined cycle, to the information receiving device, and the information receiving device decrypts the individual key with the distribution key given in advance before the distribution key is updated, decrypts the content key with such decrypted individual key, and saves such decrypted content key.

Therefore, by performing decryption of the content key by purchase reservation before the expiration date of the distribution key, the information receiving device can decrypt contents after such distribution key is updated, thus making it possible to really purchase the reserved contents even after the expiration date of the distribution key.

Furthermore, the present invention has been made considering the above respects, and proposes an information receiving system, a method of using contents and a program storing medium, which make it possible to pass content data among receiving devices that are different from each other in registration information for using contents.

In the present invention, for solving such problems, registration information is passed among a plurality of information receiving devices that are different from each other in registration information for using content data, thereby mutually determining whether or not the content data can be used among the plurality of information receiving devices, and a first information receiving device having content data usage right among the plurality of information receiving devices passes the usage right to a second information receiving device with which it is determined that the content data can be used.

Thus, among groups different from each other in registration information for using content data, it is made possible to use contents at the second information receiving device to which the usage right is passed from the first information receiving device, whereby the content data can be passed even among information receiving devices different from each other in registration information, and thus the ease-of-use by the user may be further improved.

BRIEF DESCRIPTION OF THE DRAWINGS

FIG. 7 is a schematic diagram showing data contents of a user registration database.

FIG. 8 is a schematic diagram showing registration information for each group.

FIG. 12 is a flow chart showing an elliptic curve encryption method.

FIG. 13 is a flow chart showing decryption processing of the elliptic curve encryption.

FIG. 33 is a schematic diagram showing a handling policy of single contents.

FIG. 34 is a schematic diagram showing the handling policy of album contents.

FIG. 35 is a schematic diagram showing another example of the handling policy of single contents.

FIG. 36 is a schematic diagram showing another example of the handling policy of album contents.

FIG. 37 is a schematic diagram showing price information of single contents.

FIG. 38 is a schematic diagram showing price information of album contents.

FIG. 39 is a schematic diagram showing another example of price information of single contents.

FIG. 40 is a schematic diagram showing another example of price information of album contents.

FIG. 41 is a schematic diagram showing license condition information.

FIG. 42 is a schematic diagram showing accounting information.

FIG. 43 is a schematic diagram showing another example of the accounting information.

FIG. 44 is a schematic diagram showing a list of usage right contents.

FIG. 45 is a schematic diagram showing the usage right.

FIG. 46 is a schematic diagram showing single contents.

FIG. 47 is a schematic diagram showing album contents.

FIG. 48 is a schematic diagram showing key data for single contents.

FIG. 50 is a schematic diagram showing key data for album contents.

FIG. 76 is a schematic diagram showing contents of rule part of the handling policy.

FIG. 77 is a schematic diagram showing contents of rule part of price information.

FIG. 78 is a schematic diagram showing an example of changing right contents.

BEST MODE FOR CARRYING OUT THE INVENTION

In the following, one embodiment of the present invention will be described in detail with reference to the drawings.

(1) Information Distribution System

Figure 1:
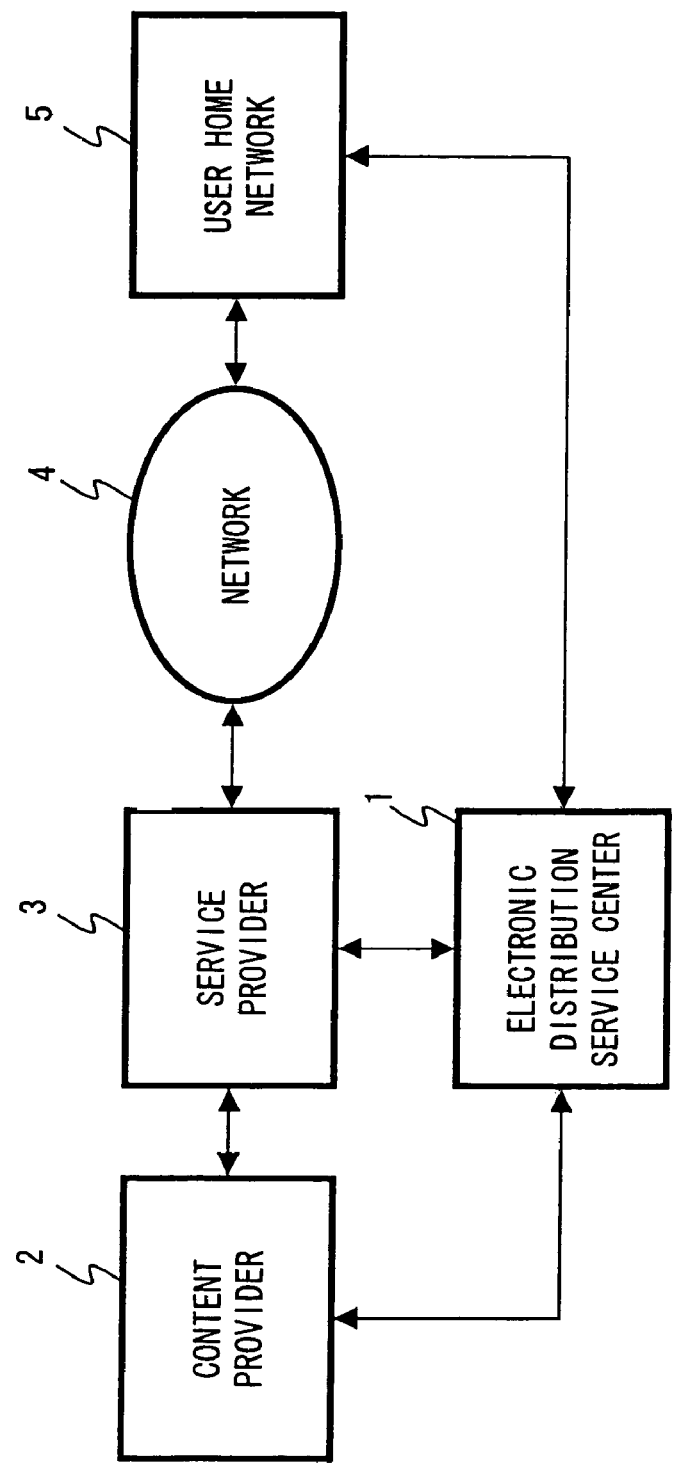
FIG. 1 is a block diagram showing an entire configuration of an electronic music distribution system according to the present invention.

FIG. 1 explains an EMD (Electronic Music Distribution) system 10 applying the present invention. Contents distributed to a user through this system is digital data with information itself having a value, and in the case of this example, one content corresponds to music data of one song. For contents, one content is provided as one unit (single), or multiple contents are provided as one unit (album) to the user. The user purchases contents (in fact, purchases right to use a content key $K_{co}$), and uses the contents that is provided (in fact, decrypts the contents using the content key $K_{co}$ and uses the same). Furthermore, of course, the invention is applicable not just to the sale of music data, but also to the sale of all the contents such as images and game programs.

An electronic distribution service center (END Service Center) 1 sends to content provider 2 an individual key $K_i$ and a public key certificate of the content provider 2, sends to a service provider 3 the public key certificate of the service provider 3, sends a distribution key $K_d$ and registration information to a user home network 5, receives accounting information and the like appropriate to the use of contents and the registration information from the user home network 5, settles a charge for use based on the accounting information, and performs processing of distributing benefits to the content provider 2, the service provider 3 and the electronic distribution service center 1 themselves.

The content provider 2 has digitized contents, inserts an electronic water mark into the contents for demonstrating that it is its own contents, compresses and encrypts the contents, generates a handling policy for the contents, and adds signature data to send the same to the service provider 3.

The service provider 3 adds price information to the contents supplied from the content provider 2, and adds the signature data thereto to send the same to the user home network 5 via a network 4 constituted by a dedicated cable network, an internet or satellite communication.

The user home network 5 obtains the contents sent from the service provider 3 with the price information added thereto, purchases content usage right, and carries out purchase processing. The usage right that is purchased may be, for example, playback usage right or replication right. And, the accounting information generated through purchase processing is stored in a tamper resistant memory in a cipher processing portion of the apparatus retained by the user, and is sent to the electronic distribution service center 1 when the user home network 5 obtains the distribution $K_d$ from the electronic distribution service center 1.

Figure 2:
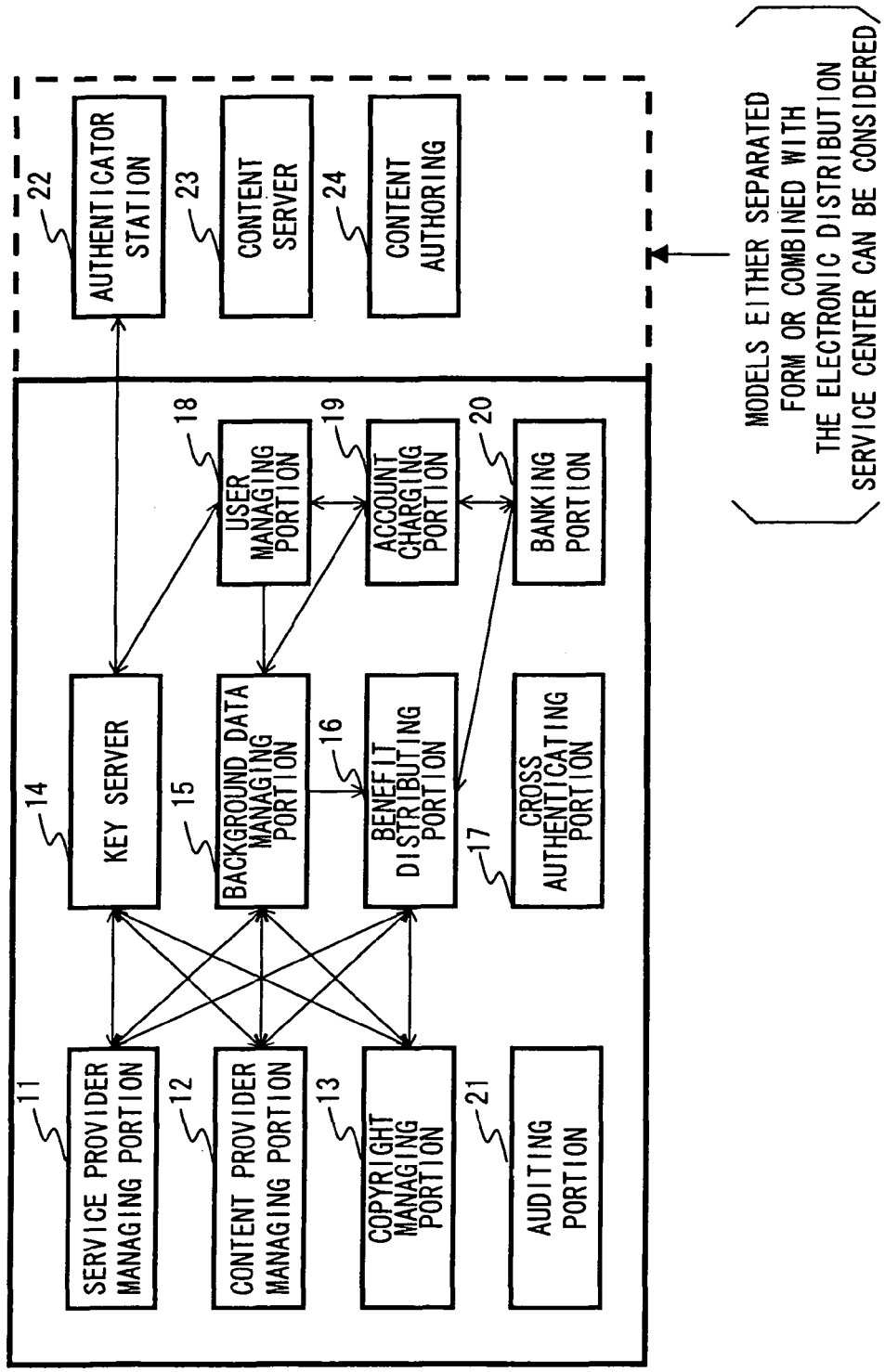
FIG. 2 is a block diagram showing a configuration of an electronic distribution service center.

FIG. 2 is a block diagram showing a configuration of a function of the electronic distribution service center 1. A service provider managing portion 11 supplies the public key certificate of the service provider 3 and information of benefit distribution to the service provider 3, and receives information (price information) added to contents as required. Content provider managing portion 12 sends the individual key $K_i$, the individual key $K_i$ encrypted with the distribution key $K_d$, and the public key certificate of the content provider 2 and supplies the information of benefit distribution to the content provider 2, and receives information (handling policy) added to contents as required. A copyright managing portion 13 sends information showing a record of content usage of the user home network 5 to a group managing copyrights, for example JASRAC (Japanese Society for Rights of Authors, Composers and Publishers). A key server 14 performs generation, maintenance and management of the key for use in the entire system and for example, the individual key $K_i$ different for each content provider is generated and the individual key $K_i$ encrypted with the distribution key $K_d$ is also generated together therewith, and these are supplied to the content provider 2 via the content provider managing portion 12 and the individual key $K_i$ encrypted with the distribution key $K_d$ is also supplied to an authenticator station 22 as required, and the distribution key $K_d$ is supplied to the user home network 5 via a user managing portion 18. Also, all of the public key/secret key of the electronic distribution service center 1 and the public key/secrete key specific to the apparatus retained by the user are generated and managed, and the public key is sent to the authenticator station 22 and is used for creating the public key certificate. Also, there may be cases where a save key $K_{save}$ appropriate to an apparatus specific ID that is unique to a cipher processing portion 92 described later may be generated and retained.

Figure 3:
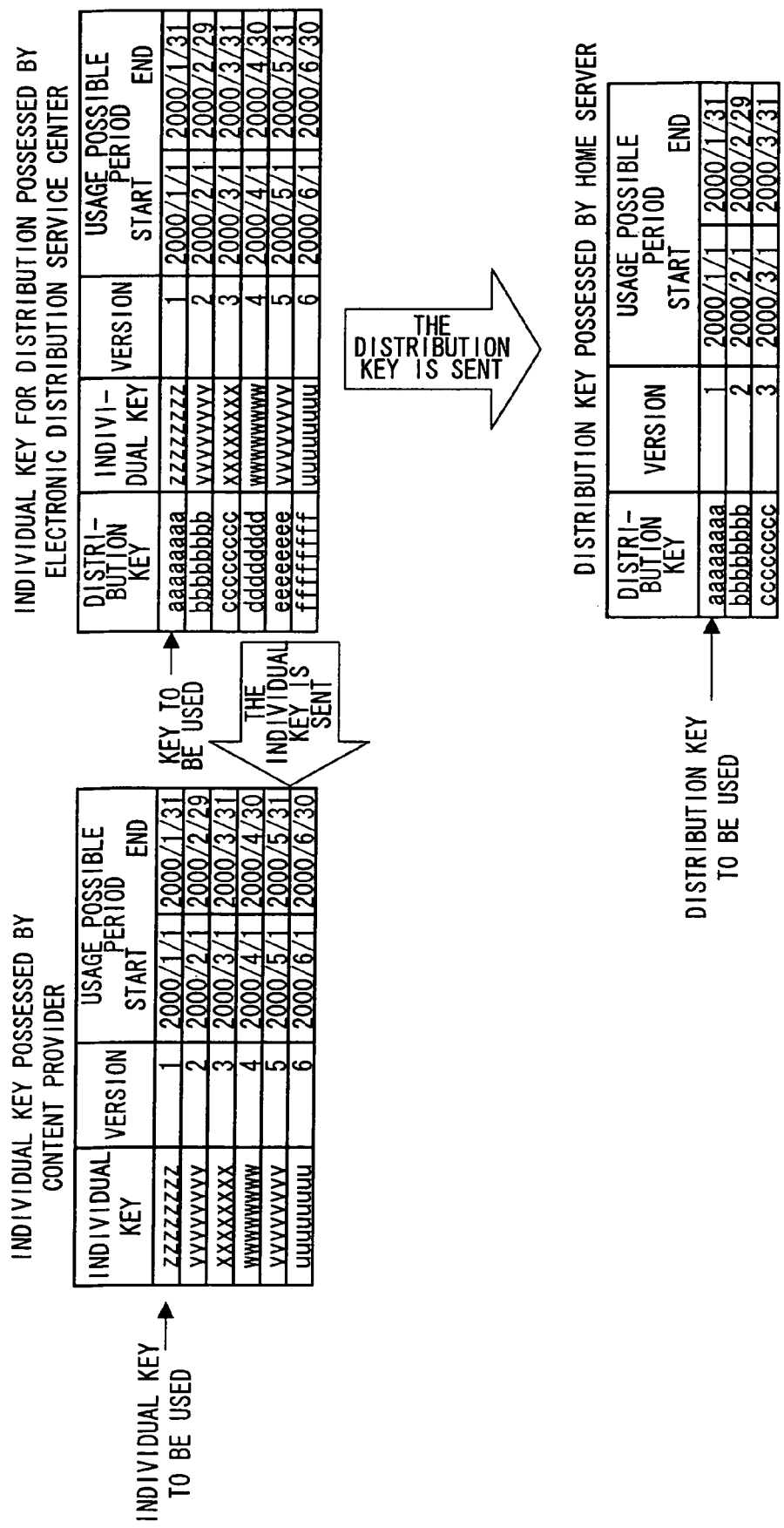
FIG. 3 is a schematic diagram showing an example of a periodic update of a key.

An example of periodic send of the key from the electronic distribution service center 1 to a home server 51 (described later) constituting the content provider 2 and the user home network 5 will be described referring to FIG. 3 to FIG. 6. FIG. 3 shows the distribution key $K_d$ and individual key $K_i$ that the electronic distribution service center 1 has, the individual key $K_i$ that the content provider 2 has, and the distribution key $K_d$ that the home server 51 has, in January, 2000, of which contents start to be provided by the content provider 2 and of which contents start to be used by the home server 51 constituting the user home network 5. Furthermore, although omitted in the following, the content provider 2 shall also retain the individual key $K_i$ encrypted with the distribution key $K_d$ corresponding to the individual key $K_i$.

In the example of FIG. 3, the distribution key $K_d$ and the individual key $K_i$ can be used from the first day to the last day of a calendar month and for example, the distribution key $K_d$ being version 1 having a value of "a a a a a a a a" that is the random number of a predetermined bit number and the individual key $K_i$ being version 1 having a value of "z z z z z z z z" can be used Jan. 1, 2000 to Jan. 31, 2000 (That is, the content key $K_{co}$ encrypting the contents which the service provider 3 distributes to the user home network 5 in the period of Jan. 1, 2000 to Jan. 31, 2000 is encrypted with the individual key $K_i$ being version 1, and the individual key $K_i$ being version 1 is encrypted with the distribution key $K_d$ being version 1), and the distribution key $K_d$ being version 2 having a value of "b b b b b b b" that is the random number of a predetermined bit number and the individual key $K_i$ being version 2 having a value of "y y y y y y y" can be used from Feb. 1, 2000 to Feb. 29, 2000 (That is, the content key $K_{co}$ encrypting the contents which the service provider 3 distributes to the user home network 5 in that period is encrypted with the individual key $K_i$ being version 2, and the individual key $K_i$ being version 2 is encrypted with the distribution key $K_d$ being version 2). In a similar way, the distribution key $K_d$ and the individual key $K_i$ being version 3 can be used in March, 2000, the distribution key $K_d$ and the individual key $K_i$ being version 4 can be used in April, 2000, the distribution key $K_d$ and the individual key $K_i$ being version 5 can be used in May, 2000, and the distribution key $K_d$ and the individual key $K_i$ being version 6 can be used in June, 2000.

Before the content provider 2 starts to provide contents, the electronic distribution service center 1 sends to the content provider 2 the six individual keys $K_i$ of version 1 to version 6 that can be used from January to June, 2000 and those that are encrypted with the distribution keys $K_d$ of same versions respectively, and the content provider 2 receives and stores the six individual keys $K_i$, and the individual keys encrypted with the distribution keys $K_d$. The reason why the individual key $K_i$ and the individual key $K_i$ encrypted with the distribution key $K_d$ for June are stored is that the content provider 2 needs a predetermined period to prepare for encrypting contents and the content key $K_{co}$ and so on before providing the contents.

Also, before the home server 51 starts to use contents, the electronic distribution service center 1 sends the three available distribution keys $K_d$ being version 1 to version 3 to the home server 51 from January, 2000 to March, 2000, and the home server 51 receives and stores the three distribution keys $K_d$. The distribution key $K_d$ for March is stored for the purpose of avoiding the situation where contents cannot be purchased despite the contracted period over which the contents can be purchased, due to the trouble that the home server 51 cannot be connected to the electronic distribution service center 1 because of the congested line and so on, and also for the purpose of reducing the frequency of connection to the electronic distribution service center 1, and curbing simultaneous accesses by individual apparatuses to the electronic service center 1, thus reducing the load on the electronic distribution service center 1.

In the period of Jan. 1, 2000 to Jan. 31, 2000, the distribution key $K_d$ and the individual key $K_i$ being version 1 are used at the electronic distribution service center 1, the content provider 2 and the home server 51 constituting the user home network 5.

Figure 4:
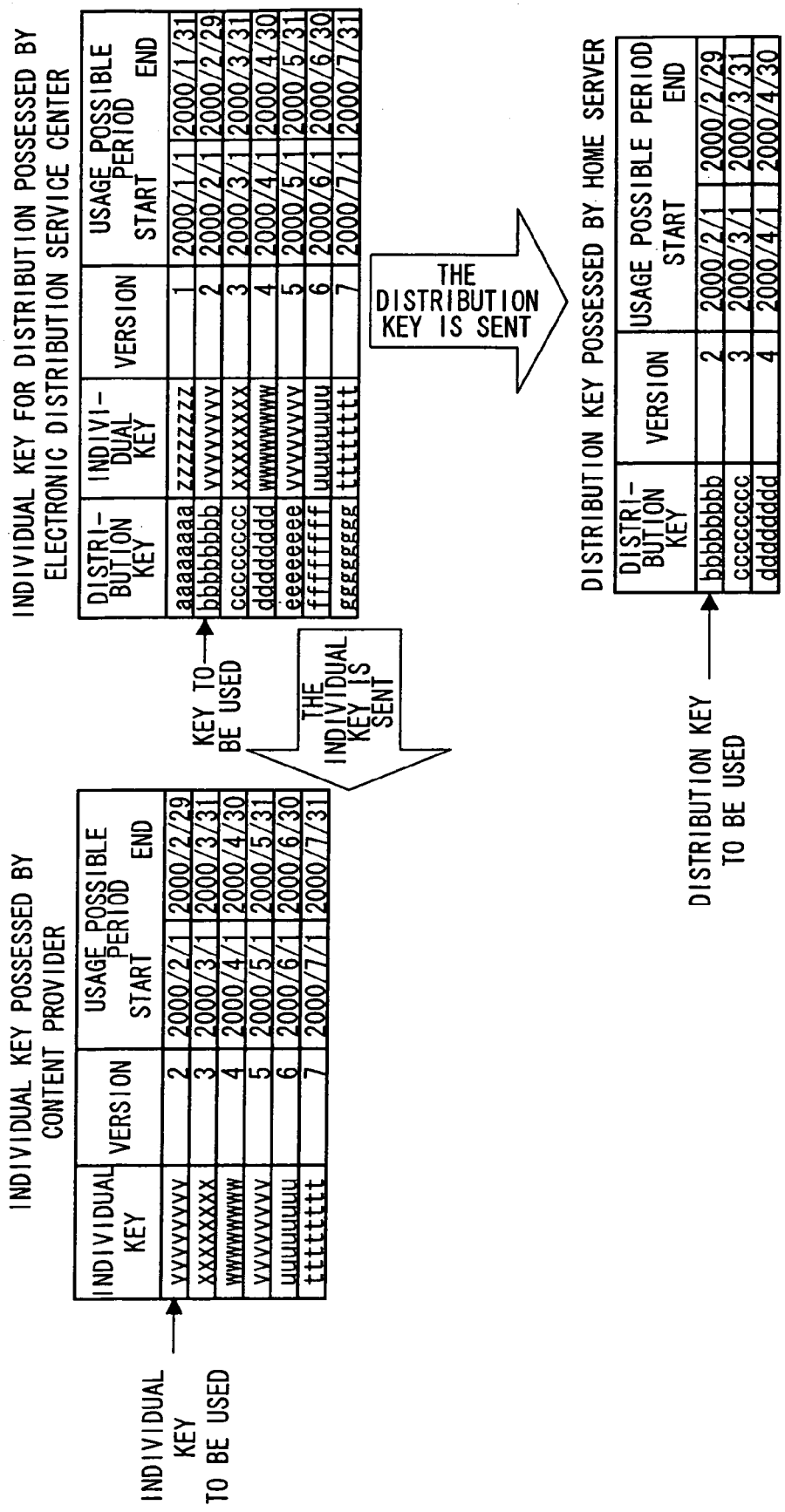
FIG. 4 is a schematic diagram showing an example of a periodic update of the key.

Sending of the distribution key $K_d$ and the individual key $K_i$ by the electronic distribution service center 1 to the content provider 2 and the home server 51 in Feb. 1, 2000 will be described with reference to FIG. 4. The electronic distribution service center 1 sends to the content provider 2 the six individual keys $K_i$ of version 2 to version 7 that can be used from February, 2000 to July, 2000 and those that are encrypted with the distribution keys $K_d$ of same versions respectively, and the content provider 2 receives the six individual keys $K_i$, and the individual keys $K_i$ encrypted with the distribution keys $K_d$, overwrites the individual keys $K_i$ and individual keys $K_i$ encrypted with the distribution keys $K_d$, which have been stored before the reception, and stores the new individual keys $K_i$ and individual keys $K_i$ encrypted with distribution keys $K_d$. The electronic distribution service center 1 sends to the home server 51 the three available distribution keys $K_d$ being version 2 to version 4 from February, 2000 to April, 2000, and the home server 51 receives the three distribution keys $K_d$, overwrites the distribution keys $K_d$ stored before the reception, and stores the new distribution keys $K_d$. The electronic distribution service center 1 directly stores the distribution keys $K_d$ and the individual keys $K_i$ being version 1 to 7. This is for the purpose of making it possible to use the distribution key $K_d$ used in the past when an unexpected trouble occurs or when a fraud occurs or is discovered.

In the period of Feb. 1, 2000 to Feb. 29, 2000, the distribution key $K_d$ and the individual key $K_i$ being version 2 are used at the electronic distribution service center 1, the content provider 2 and the home server 51 constituting the user home network 5.

Figure 5:
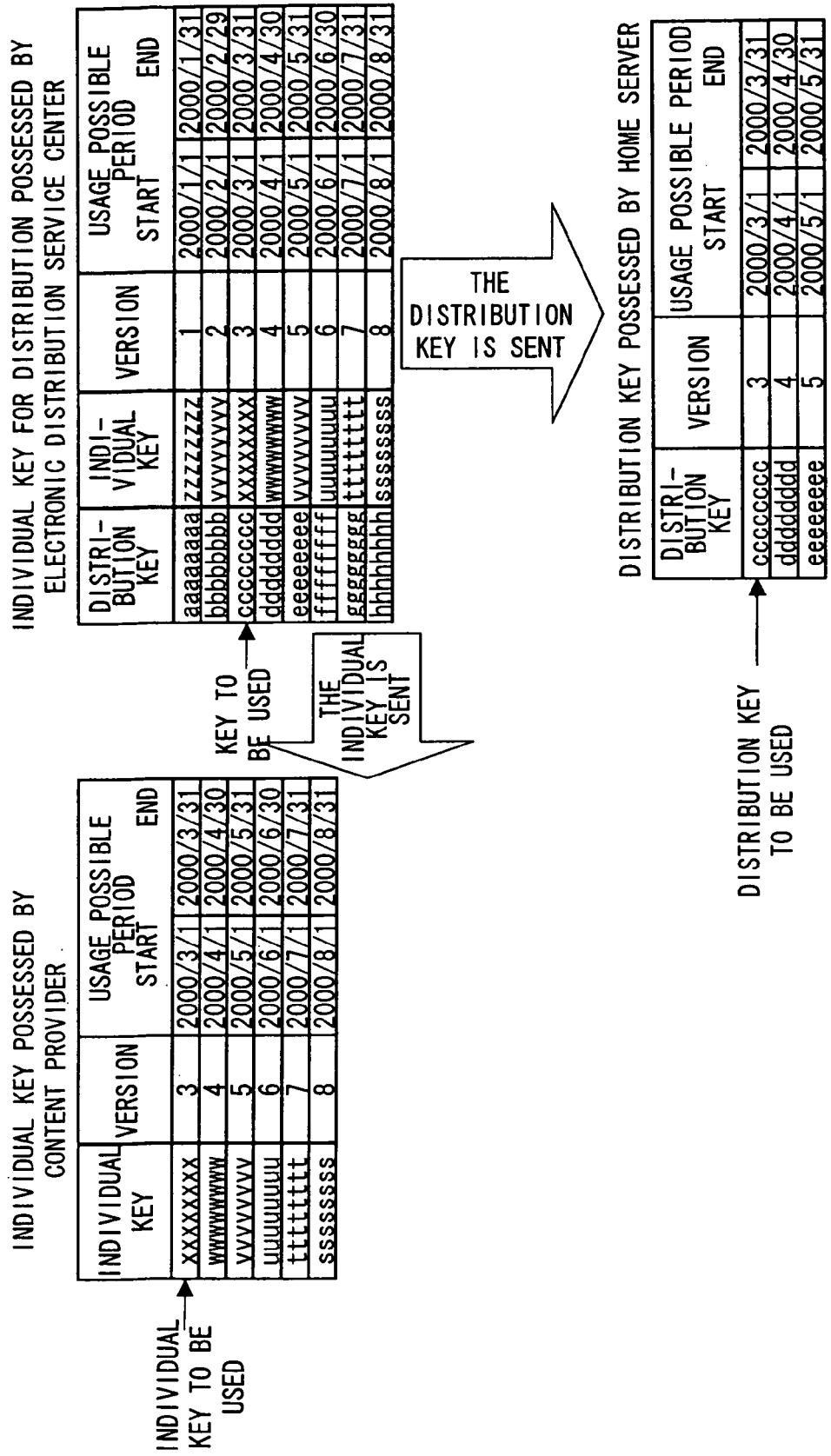
FIG. 5 is a schematic diagram showing an example of a periodic update of the key.

Sending of the distribution key $K_d$ and the individual key $K_i$ by the electronic distribution service center 1 to the content provider 2 and the home server 51 in Mar. 1, 2000 will be described with reference to FIG. 5. The electronic distribution service center 1 sends to the content provider 2 the six individual keys $K_i$ of version 3 to version 8 that can be used from March, 2000 to August, 2000 and those that are encrypted with the distribution keys $K_d$ of same versions respectively, and the content provider 2 receives the six individual keys $K_i$, and the individual keys $K_i$ encrypted with the distribution keys $K_d$, overwrites the individual keys $K_i$ and individual keys $K_i$ encrypted with the distribution keys $K_d$, which have been stored before the reception, and stores the new individual keys $K_i$ and individual keys $K_i$ encrypted with distribution keys $K_d$. The electronic distribution service center 1 sends to the home server 51 the three available distribution keys $K_d$ being version 3 to version 5 from March, 2000 to May, 2000, and the home server 51 receives the three distribution keys $K_d$, overwrites the distribution keys $K_d$ stored before the reception, and stores the new distribution keys $K_d$. The electronic distribution service center 1 directly stores the distribution keys $K_d$ and the individual keys $K_i$ being version 1 to 8. This is for the purpose of making it possible to use the distribution key $K_d$ used in the past when an unexpected trouble occurs or when a fraud occurs or is discovered.

In the period of Mar. 1, 2000 to Mar. 31, 2000, the distribution key $K_d$ and the individual key $K_i$ being version 3 are used at the electronic distribution service center 1, the content provider 2 and the home server 51 constituting the user home network 5.

Figure 6:
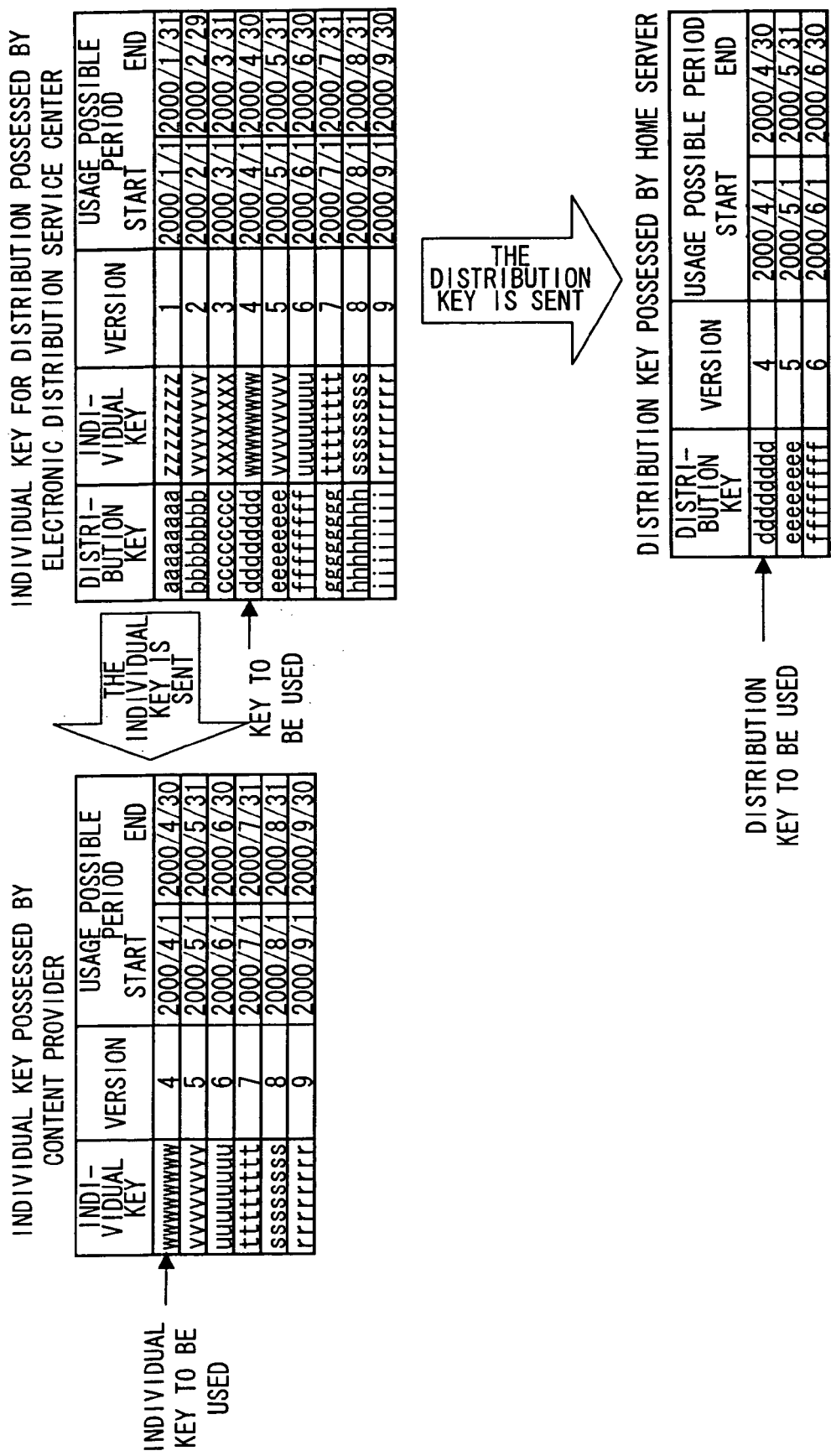
FIG. 6 is a schematic diagram showing an example of a periodic update of the key.

Sending of the distribution key $K_d$ and the individual key $K_i$ by the electronic distribution service center 1 to the content provider 2 and the home server 51 in Apr. 1, 2000 will be described with reference to FIG. 6. The electronic distribution service center 1 sends to the content provider 2 the six individual keys $K_i$ of version 4 to version 9 that can be used from April, 2000 to September, 2000 and those that are encrypted with the distribution keys $K_d$ of same versions respectively, and the content provider 2 receives the six individual keys $K_i$, and the individual keys $K_i$ encrypted with the distribution keys $K_d$, overwrites the individual keys $K_i$ and individual keys $K_i$ encrypted with the distribution keys $K_d$, which have been stored before the reception, and stores the new individual keys $K_i$ and individual keys $K_i$ encrypted with distribution keys $K_d$. The electronic distribution service center 1 sends to the home server 51 the three available distribution keys $K_d$ being version 4 to version 6 from April, 2000 to June, 2000, and the home server 51 receives the three distribution keys $K_d$, overwrites the distribution keys $K_d$ stored before the reception, and stores the new distribution keys $K_d$. The electronic distribution service center 1 directly stores the distribution keys $K_d$ and the individual keys $K_i$ being version 1 to 9. This is for the purpose of making it possible to use the distribution key $K_d$ used in the past when an unexpected trouble occurs or when a fraud occurs or is discovered.

In the period of Apr. 1, 2000 to Apr. 30, 2000, the distribution key $K_d$ and the individual key $K_i$ being version 4 are used at the electronic distribution service center 1, the content provider 2 and the home server 51 constituting the user home network 5.

In this way, by distributing in advance the distribution key $K_d$ and the individual key $K_i$ for the later month, the user can purchase contents anyway, and can receive the key by making an access to the center at an appropriate time, even if he or she has made no access to the center for one or two months.

A background data managing portion 15 of the electronic distribution service center 1 (FIG. 2) retains and manages accounting information that is information showing the usage record of the contents collected by the user managing portion 18, price information corresponding to the contents as required (any one or both of price information sent from the service provider 3 and price information that is added to the accounting information and sent by the user), the handling policy corresponding to the contents as required (one or both of the handling policy sent from the content provider 2 and the handling policy that is added to the accounting information and sent by the user), and outputs data when the service provider managing portion 11, the content provider managing portion 12 or the like uses the price information and usage history. Furthermore, there may be cases where the price information and the handling policy are not sent from the service provider 3 and the content provider 2 if required data is already written in the accounting information. A benefit distributing portion 16 calculates the benefits of the electronic distribution service center 1, the content provider 2 and the service provider 3, based on the accounting information, and the price information and the handling policy as required supplied from the background data managing portion 15. There may be cases where the information is supplied to a banking portion 20 and benefit distribution is performed through the banking portion 20, but there may also be cases where the benefit distribution is not performed, and only the information is sent to the service provider managing portion 11, the content provider managing portion 12 and the copyright managing portion 13, money of sales itself is put in the service provider, and the service provider 3 distributes the benefits to each benefit recipient. A cross authenticating portion 17 executes cross authentication described later with predetermined apparatus of the content provider 2, the service provider 3 and the user home network 5.

The user managing portion 18 has a user registration database, and when registration is requested from the apparatus of the user home network 5, it retrieves the user registration database, and creates registration information of registering the apparatus or refusing to register the apparatus or the like, in accordance with recorded contents of the database. When the user home network 5 is constituted by a plurality of apparatuses having functions that can be connected to the electronic distribution service center 1, the user managing portion 18 defines an apparatus for which settlement is made in the registration information and registers the settlement ID, and further defines processing operations of purchasing contents, defines the range of apparatuses constituting the user home network and defines information on suspension of transactions, and sends the same to the predetermined apparatus (settlement-capable apparatus) of the user home network 5.

An example of the user registration database shown in FIG. 7 illustrates a registration state for each network group built in the user home network 5, and in each group are recorded a group ID representing the ID of the group, and IDs specific to apparatuses constituting the home network 5, and information of whether or not connection to the electronic distribution service center 1 is possible, whether or not settlement processing is possible, whether or not the contents can be purchased, which apparatus performs settlement processing, which apparatus requests the purchase of contents, whether or not registration is possible and the like corresponding to the IDs (That is, for each apparatus having the ID).

The group ID recorded in the user registration database is assigned for each user home network, and settlement and update of information are performed in this group unit. Therefore, in principle, a representative apparatus in the group performs on its own communication, settlement processing and update of information with the electronic distribution service center 1, and other in the group do not perform transactions directly with the electronic distribution service center 1. The IDs recorded in the user registration database are used for identifying an apparatus with the ID assigned individually for each apparatus.

Information of whether or not connection to the electronic distribution service center 1 recorded in the user registration database is possible shows whether or not the apparatus can be physically connected to the electronic distribution service center 1, and even an apparatus recorded as connectable one is not connected to the electronic distribution service center 1 in principle, unless it is considered to be capable of settlement processing (However, it may be connected to the electronic distribution service center 1 as a proxy on a temporary basis if the representative apparatus in the group becomes unable to perform settlement processing operations for some reason). Also, the apparatus recorded as an apparatus that is not connectable outputs accounting information and the like to the electronic distribution service center 1 via the apparatus capable of settlement processing in the user home network 5.

The information of whether or not settlement processing is possible, which is recorded in the user registration database, shows whether or not the apparatus is capable of settlement processing. When the user home network 5 is constituted by a plurality of apparatuses capable of purchasing content usage right and so on, one apparatuses of them that is capable of settlement processing sends to the electronic distribution service center 1 the accounting information, and the price information and the handling policy, as required, of all the apparatuses registered in the electronic distribution service center 1 of the user home network 5, and receives the distribution key $K_d$ and the registration information from the electronic distribution service center 1 in response to completion of the settlement processing. In this way, processing at the electronic distribution service center 1 is alleviated, compared to performing processing for each apparatuses.

The information of whether or not purchase processing is possible, which is recorded in the user registration database, represents whether or not the apparatus is capable of purchasing content usage right. The apparatus that is not capable of purchasing the right has proxy purchase of usage right (which means that the apparatus has usage right purchased by another apparatus and receives all the right. The supplier retains no right), redistribution (a system in which content usage right that has been already purchased is purchased again in the same contents of usage right or the different contents of usage right. At this time, the supplier retains no right. Redistribution is mainly intended to give discounts. Only groups using the same settlement ID can receive benefits of discounts. Because for processing in the group belonging to the same settlement ID, a burden of processing on the electronic distribution service center 1 is reduced, and thus the discount can be received for it), or management transfer (Although content playback right, particularly an open-ended playback right can be transferred, at a playback right sender, which apparatuses is a playback right receiver is managed, and management transfer cannot be performed again if the playback right is not given back, and at the playback right receiver, which apparatuses is the playback right sender is managed, and management transfer cannot be performed at all, and the playback right can only be given back to the playback right sender which has given the playback right) performed by another apparatus capable of purchasing the right to obtain the content usage right.

Now, using methods/usage right of contents and methods of purchasing contents will be briefly described. For content using methods, there are two methods, a method in which those who manage and retain content usage right on their own use the contents, and a method in which they execute usage right retained by another apparatus to use the contents at their own apparatuses. Content usage rights include open-ended playback right (The period and the number of times for playing back contents are not limited, and contents are played back in the case of music contents, but contents are run in the case of game programs and the like), playback right with limit on time (The period over which the contents can be played is limited), playback right with limit on the number of times (The number of times for playing the contents is limited), open-ended replication right (The period and the number of times for replicating the contents are not limited), replication right with limit on the number of times (The number of times for replicating the contents is limited) (The replication right includes replication right without copy management information, replication right with copy management information (SCMS) and the like, and in addition, replication right for dedicated media and the like) (Also, there may be replication right with limit on time), and management transfer right. And, methods of purchasing usage right include, in addition to normal purchase to purchase these usage rights directly, change of the usage right contents to change the contents of usage right already purchased to other contents, redistribution to purchase usage right separately based on the right already purchased by another apparatus, proxy purchase to have usage right purchased by another apparatus as a proxy, and album purchase to purchase and manage a plurality of content usage rights together.

Information described by the proxy settler recorded in the user registration database shows the ID of the apparatus that sends to the electronic distribution service center 1 as a proxy the accounting information generated when content usage right is purchased.

Information described by proxy purchasers recorded in the user registration database shows the ID of the apparatus that purchases usage right as a proxy for the apparatus that is not capable of purchasing usage right. However, in the case where all apparatuses in the group that are capable of purchase processing are proxy purchasers, record is not necessarily made.

Information of whether or not registration is possible, which is recorded in the user registration database is updated based on the information about payments in arrears, fraud and the like, which is supplied from accounting entities (such as banks) or credit card companies. For the request for registration of an apparatus having an ID recorded as registration impossible, the user managing portion 18 refuses its registration, and after that, the apparatus of which registration is refused can neither purchase contents of this system nor perform send and reception of data with other apparatuses in the user home network 5. Also, in some cases, use of purchased contents may be limited (However, there may be cases where the apparatus is registered again after it is brought in the electronic distribution service center 1 and the like and is checked). Also, in addition to "registration possible" and "registration impossible", there may be state of "unfinished settlement" and "temporary halt".

Also, the user managing portion 18 is supplied with accounting information, registration information, and price information and handling policy as required from the apparatus of the user home network 5, outputs the accounting information, the price information and the handling policy to the background data managing portion 15, and supplies the distribution key $K_d$ and the registration information to the apparatus of the user home network 5. Timing with which they are supplied will be described later.

Now, registration information will be described using FIG. 8. The registration information in FIG. 8 has settlement IDS and signatures added thereto, in addition to the information of the user registration database, and only information of the same settlement group included therein. The settlement ID represents an ID in the user registration database (such as bank account numbers and credit card numbers) of the user, which an account charging portion 19 and the banking portion 20 use when performing settlement. Generation of signatures will be described later.

Referring to FIG. 2 again, the account charging portion 19 calculates bills to the user based on the accounting information, and the price information and the handling policy as required, supplied from the background data managing portion 15, and supplies the result thereof to the banking portion 20. It also provides the settlement information to the user via the user managing portion 18 as required. The banking portion 20 communicate with an external bank and the like not shown in the figure based on the amount of money dispatched to the user, the content provider 2 and the service provider 3, and the amount of usage charges to be collected, and carries out settlement processing. Furthermore, there may be cases where the banking portion 20 has all the money of sales sent to the service provider 3, and the service provider 3 distributes benefits based on money distribution information sent via the benefit distributing portion 16. An auditing portion 21 audits the correctness of the accounting information, the price information and the handling policy supplied from the apparatus of the user home network 5, based on the handling policy supplied from the content provider 2 and the price information supplied from the service provider 3.

Also, processing by the auditing portion 21 include processing of auditing the consistency of the amount of money added from the user home network 5 with the total amount of money subjected to benefit distribution or the amount of money sent to the service provider 3, and processing of making a audit on whether or not, for example, content provider ID and a service provider ID that cannot exist and unconceivable earnings, prices and the like are included in data in the accounting information supplied from the apparatus of the user home network 5.

The authenticating portion 22 generates a certificate of the public key supplied from the key server 14 and sends the certificate to the content provider 2 and the service provider 3, and also generates the public key certificate that is stored in a large capacity storing portion 68 (described later) of the home server 51 and a small capacity storing portion 75 (described later) of the stationary apparatus 52 when the user apparatus is manufactured. In the case where the content provider 2 does not perform authoring of contents, as an alternation for it, there are a content server 23 and content authoring 24 retaining contents.

Figure 9:
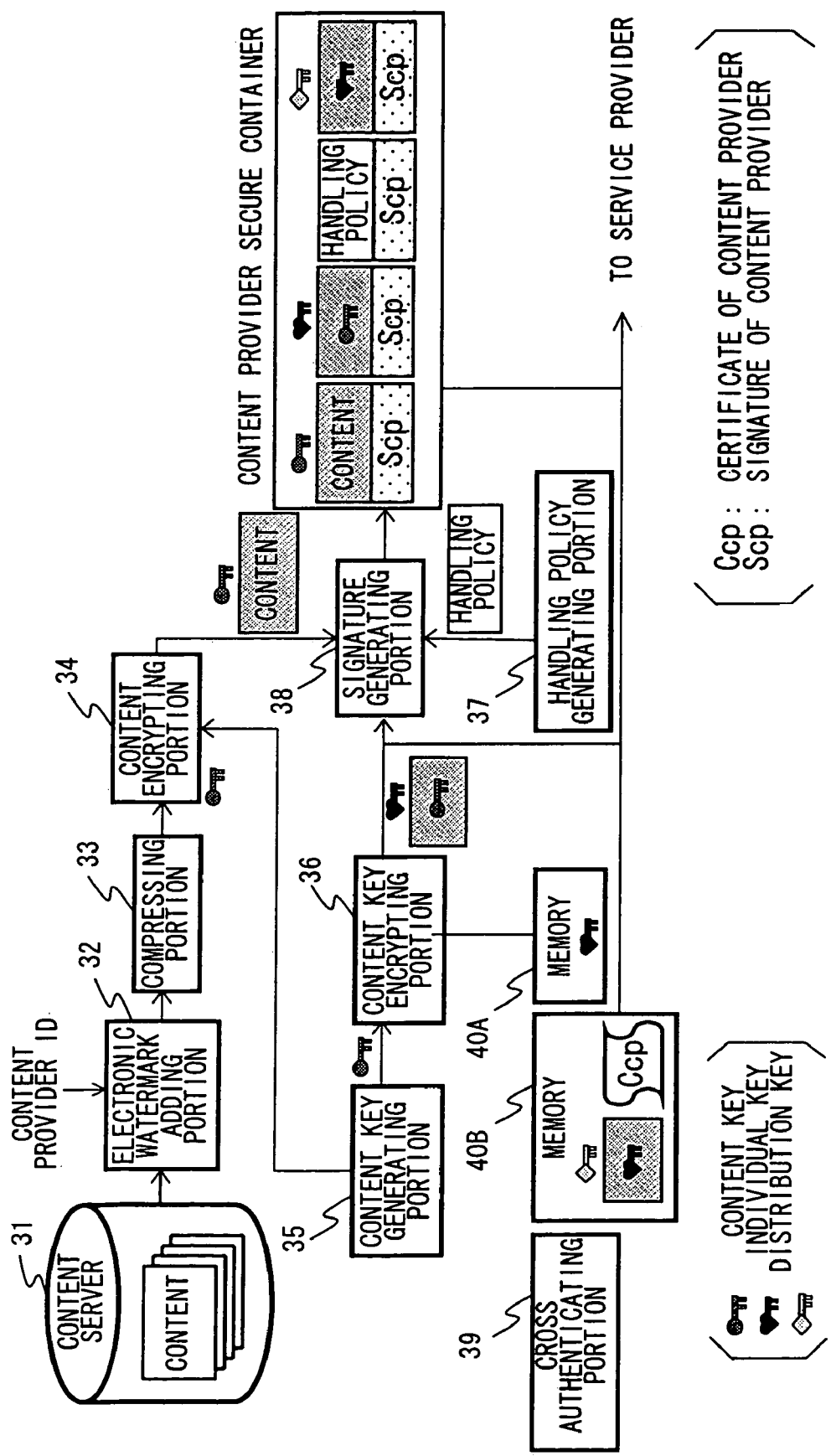
FIG. 9 is a block diagram showing a configuration of a content provider.

FIG. 9 is a block diagram showing a configuration of functions of the content provider 2. A content server 31 stores contents to be supplied to the user and supplies the contents to an electronic watermark adding portion 32. The electronic watermark adding portion 32 inserts content provider ID representing its property into the contents supplied from the content server 31 in the form of electronic watermark, and supplies the same to a compressing portion 33. The compressing portion 33 compresses the contents supplied from the electronic watermark adding portion 32 by a system such as ATRAC (Adaptive Transform Acoustic Coding) (Trademark), and supplies contents to a content encrypting portion 34. In this connection, for compression systems, MP3, AAC or the like may be used in place of ATRAC. The content encrypting portion 34 encrypts the contents compressed at the compressing portion 33 by a common key encryption system such as DES (Data Encryption Standard), using a key (hereinafter, this key is referred to as contents key $K_{co}$) supplied from a content key generating portion 35, and outputs the result thereof to a signature generating portion 38.

The content key generating portion 35 generates a random number of a predetermined bit number to be the content key $K_{co}$, and supplies to the content encrypting portion 34 and a content key encrypting portion 36 the random number from which bit strings called weak keys unsuitable for encryption (for example, $K_{co}$=1E1E1E1E0E0E0E0E and 1EE01EE00EF00EF0) are removed. When a cipher algorithm free from such unsuitable bit strings is used, processing of removing unsuitable bit strings is not required. The content key encrypting portion 36 encrypts the key $K_{co}$ by the common key encryption system, using the individual key $K_i$ supplied from the electronic distribution service center 1, and outputs the result thereof to the signature generating portion 38. In this connection, the encryption system is not limited to DES, and for example, a public key cryptosystem such as RSA (Rivest, Shamir, Adleman) may be used.

DES is an encryption system that processes unencrypted 64 bits as one block using a common key of 56 bits. The process of DES is composed of a portion by which the unencrypted text is stirred and converted into encrypted text (data stirring portion) and a portion by which a key used in the data stirring portion (extended key) is generated from the common key (key processing portion). Since all the algorithms of DES are published, fundamental processing of the data stirring portion will be briefly described, here.

First, the unencrypted 64 bits are divided into H0 of upper 32 bits and L0 of lower 32 bits. The output of an F function having the L0 of lower 32 bits stirred is calculated with an extended key $K_i$ of 48 bits supplied from the key processing portion and the L0 of lower 32 bits as inputs. The F function is constituted by two kinds of fundamental conversions, "letter conversion" for replacing numeric values by a predetermined rule and "inversion" for changing bit positions by a predetermined rule. Next, the H0 of upper 32 bits and the output of the F function are subjected to exclusive disjunction, and the result thereof shall be L1. The L0 shall be H1.

The above described process is repeated sixteen times, based on the H0 of upper 32 bits and the L0 of lower 32 bits, and the obtained resulting H16 of upper 32 bits and L16 of lower 32 bits are outputted as encrypted texts. Decryption is achieved by following the aforesaid procedure inversely, using the common key used for the encryption.

Furthermore, this embodiment illustrates DES as a common key cipher, but any one of FEAL (Fast Encryption Algorithm), IDEA (International Data Encryption Algorithm and E2 proposed by NTT (Trademark) and AES (Advanced Encryption Standard) that is an American next encryption standard and the like may be adopted.

A handling policy generating portion 37 generates a content handling policy, and outputs the handling policy to the signature generating portion 38 in response to the contents to be encrypted. Furthermore, the handling policy generating portion 37 may supply the generated handling policy to the electronic distribution service center 1 via communicating means not shown in the figure, and the data thereof is retained and managed. The signature generating portion 38 adds electronic signatures to the encrypted contents, the encrypted content key $K_{co}$, the encrypted individual key $K_i$ and the handling policy, and sends the same together with a certificate $C_{cp}$ of the content provider 2 to the service provider 3 (Hereinafter, the encrypted contents, the encrypted content key $K_{co}$, the encrypted individual key $K_i$ and the handling policy to which the electronic signatures are added respectively using the secret key of the content provider 3 are referred to as content provider secure container). Furthermore, instead of adding a signature to individual data separately, one signature may be added to the entire data.

A cross authenticating portion 39 performs cross authentication with the electronic distribution service center 1, and also performs cross authentication with the service provider 3 as required prior to the sending of the content provider secure container to the service provider 3. Since a memory 40A retains the individual key $K_i$ that must be retained in secrecy by the content provider 2, it is desired that the memory 40A is a tamper resistant memory which is not vulnerable to readout of data by a third party, but no particular limitation in terms of hardware is required (for example, it may be a hard disk placed in an entrance-controlled room, a hard disk of a password-controlled personal computer, or the like). Also, since a memory 40B only stores the individual key $K_i$ encrypted with the distribution key $K_d$ and the public key certificate of the content provider 2, it may be any memory such as a normal memory (Because of the published information, it requires no secrecy). Furthermore, the memory 40A and the memory 40B may be integrated into one memory.

The signature is data that is attached to data or a certificate described later to check tampering and authenticate an author, and is created by determining a hash value with a hash function based on the data to be sent and using with this the secret key of the public key cipher.

The hash function and the signature will be described. The hash function is a function that uses predetermined data to be sent as input, compresses it into data of a predetermined bit length, and outputs the data as a hash value. The hash function has characteristics that prediction of input from the hash value (output) is difficult, and many bits of the hash value are changed when 1 bit of the data inputted to the hash function is changed, and it is difficult to locate input data having the same hash value. As the hash function, MD (Message Digest) 4, MD5, SHA (Secure Hash Algorithm)-1 are used.

The signature generating portion 38 of the sending device (content provider 2) that sends data and signatures, for example, generates the signature using an elliptic curve cipher that is a public key cryptosystem. This processing will be described using FIG. 10 (EC-DSA (Elliptic Curve Digital Signature Algorithm), IEEE P1363/D). In Step S1, M is defined as a massage, p as a characteristic number, a and b as coefficients of the elliptic curve (Elliptic curve: $y^2=x^3+ax+b$), G as a base point on the elliptic curve, r as a number of the G place, and K as a secret key ($0<K_a<r$). In Step S2, the random number u is generated with a random number generation unit so that the random number u is $0<u<r$. In Step S3, a coordinate with the base point multiplied by u is calculated. Furthermore, addition and doubling on the elliptic curve are defined as follows.

$P=(X_0, Y_0), Q=(X_1, Y_1), R=(X_2, Y_2)=P+Q$, wherein:

when P γ Q $X_2=\lambda^2-X_0-X_1$ $Y_2=\lambda(X_0-X_2)-Y_0$ $\lambda=(Y_1-Y_0)/(X_1-X_0)$ when P=Q $X_2=\lambda^2-2X_0$ $Y_2=\lambda(X_0-X_2)-Y_0$ $\lambda=(3X_0^2+a)/2Y_0$.

Using these equations, point G multiplies by u is calculated (A slow but most understandable operation method is as follows. G, 2G, 4G ∃ ∃ are calculated, u is subjected to binary development to add thereto $(2^i) \times G$ corresponding to the place where 1 stands (i is a bit position counted from the LSB of u)). $C=X_V$ mod r is calculated in Step S4, and whether or not this value is 0 is determined in Step S5 and advancement to Step S6 is made if not 0, where the hash vale of the massage M is calculated to determine f=SHA-1 (M). Next, $d=[(f+cK_s)/u]$ mod r is calculated in Step S7, and whether or not d is 0 is determined in Step S8. If d is not 0, c and d are signature data. If assuming that r is of 160 bit length, the signature data is of 320 bit length.

In Step S5, if c is 0, a return to Step S2 is made to generate a new random number again. In a similar way, if d is 0 in Step S8, a return to Step S2 is made to generate a random number again.

The receiving device (user home network 5) that has received the signature and data verifies the signature using, for example, the elliptic curve cipher that is the public key cryptosystem. This processing will be described using FIG. 11. In Step S10, M is defined as a massage, p as a characteristic number, a and b as coefficients of the elliptic curve (Elliptic curve: $y^2=x^3+ax+b$), G as a base point on the elliptic curve, r as a number of the G place, and G and Ks G as secret keys ($0<K_s<r$) (by the receiving device). In Step S11, whether or not the signature data c and d satisfy $0<c$ and $d<r$ is checked. If they are satisfied, the hash value of the massage M is calculated in Step S12 to determine f=SHA-1 (M). Next, h=1/d mod r is calculated in Step S13, and $h_1$=fh and $h_2$=ch mod r are calculated in Step S14. In Step S15, $P=(X_p, Y_p)=h_1 G+h_2 K_s G$ is calculated using $h_1$ and $h_2$ that has been already calculated. A signature verification performer knows the public key G and $K_s G$, thus being able to carry out this calculation as in the case of Step S3. Then, whether or not P is an infinite remote point is determined, and if not an infinite remote point, advancement to Step S17 is made (in fact, determination for the infinite remote point can be done in Step S15. That is, when addition of P=(X, Y) and Q=(X, −Y) is performed, the aforesaid λ can not be calculated, which shows that R is an infinite remote point) $X_p$ mod r is calculated in Step S17 and is compared with the signature data c. If this value matches the signature data, advancement to Step S18 is made to determine that the signature is correct.

In the case where it is determined that the signature is correct, it is understood that the received data is not tampered and is the data sent from the sending device retaining the secret key corresponding to the public key.

If the signature data c and d do not satisfy $0<c$ and $d<r$ in Step S11, advancement to Step S19 is made. Also, if P is an infinite remote point in Step S16, advancement to Step S19 is made. Furthermore, if the value of $X_p$ mod r does not match the signature data c in Step S17, advancement to Step S19 is also made. In Step S19, it is determined that the signature is incorrect.

In the case where it is determined that the signature is incorrect, it is understood that the received data is tampered and is not data sent from the sending device retaining the secret key corresponding to the public key.

Furthermore, in this embodiment, SHA-1 is used as a hash function, but any function of MD4, MD 5 and the like may be used. Also, generation and verification of the signature may be performed using the RSA cipher (ANSI X9. 31-1).

Now, encryption/decryption of the public key cryptosystem will be described. In contrast to the common key cryptosystem in which the same key (common key) is used in both encryption and decryption, in the public key cryptosystem, the key for use in encryption is different from that for use in decryption. In the case where the public key cryptosystem is used, even if one of the keys is published, the other can be kept secret, and the key that may be published is referred to as a public key and the other that is kept secret is referred to as a secret key.

The elliptic curve encryption that is typical of public key cryptosystems will be described. In FIG. 12, $M_x$ and $M_y$ are defined as a message, p as a characteristic number, a and b as coefficients of the elliptic curve (Elliptic curve: $y^2=x^3+ax+b$), G as a base point on the elliptic curve, r as a number of the G place, and G and $K_s$ G as secret keys ($0<K_s<r$) in Step S 20. In Step S21, a random number u is generated so that the random number u is $0<u<r$. In step S22, a coordinate V with the public key $K_s G$ multiplied by u is calculated. Furthermore, since scalar multiplication on the elliptic curve uses a same method as that described for the signature generation, explanation about it is omitted here. In Step S23, the X coordinate of V is multiplied by $M_x$ and the remainder is determined with p to define it as $X_0$. In Step S24, the Y coordinate of V is multiplied by $M_y$ and the remainder is determined with p to define it as $Y_0$. Furthermore, if the length of the message is smaller than the bit number of p, $M_y$ uses a random number, and $M_y$ is discarded at the decrypting portion. uG is calculated in Step S25, and the encrypted text uG ($X_0$, $Y_0$) is obtained in Step S26.

Now, decryption of the public key cryptosystem will be described using FIG. 13. In Step S30, uG and ($X_0$, $Y_0$) are defined as encrypted text data, p as a characteristic number, a and b as coefficients of the elliptic curve (Elliptic curve: $y^2=x^3+ax+b$), G as a base point on the elliptic curve, r as a number of the G place, and $K_s$ as a secret key ($0<K_s<r$). In Step S31, the encrypted data uG is multiplied by the secret key $K_s$. In Step S32, the X coordinate of ($X_0$, $Y_0$) is taken out of the encrypted data, and $X_1=X_0/X_v$ mod p is calculated. In Step S33, $Y_1=Y_0/Y_v$ mod p is calculated. And, in Step S34, $X_1$ is defined $M_x$ and $Y_i$ is defined as $M_y$ to take out the massage. At this time, if $M_y$ is not defined as the message, $Y_1$ is discarded.

In this way, in the public key cryptosystem, the secret key is defined as $K_s$ and the public key is defined as G, $K_s$ G, thereby allowing the key for use in encryption and the key for use in decryption to be different from each other.

Also, as for another example of the public key cryptosystem, RSA encryption (Rivest, Shamir, Adleman) is known.

Figure 14:
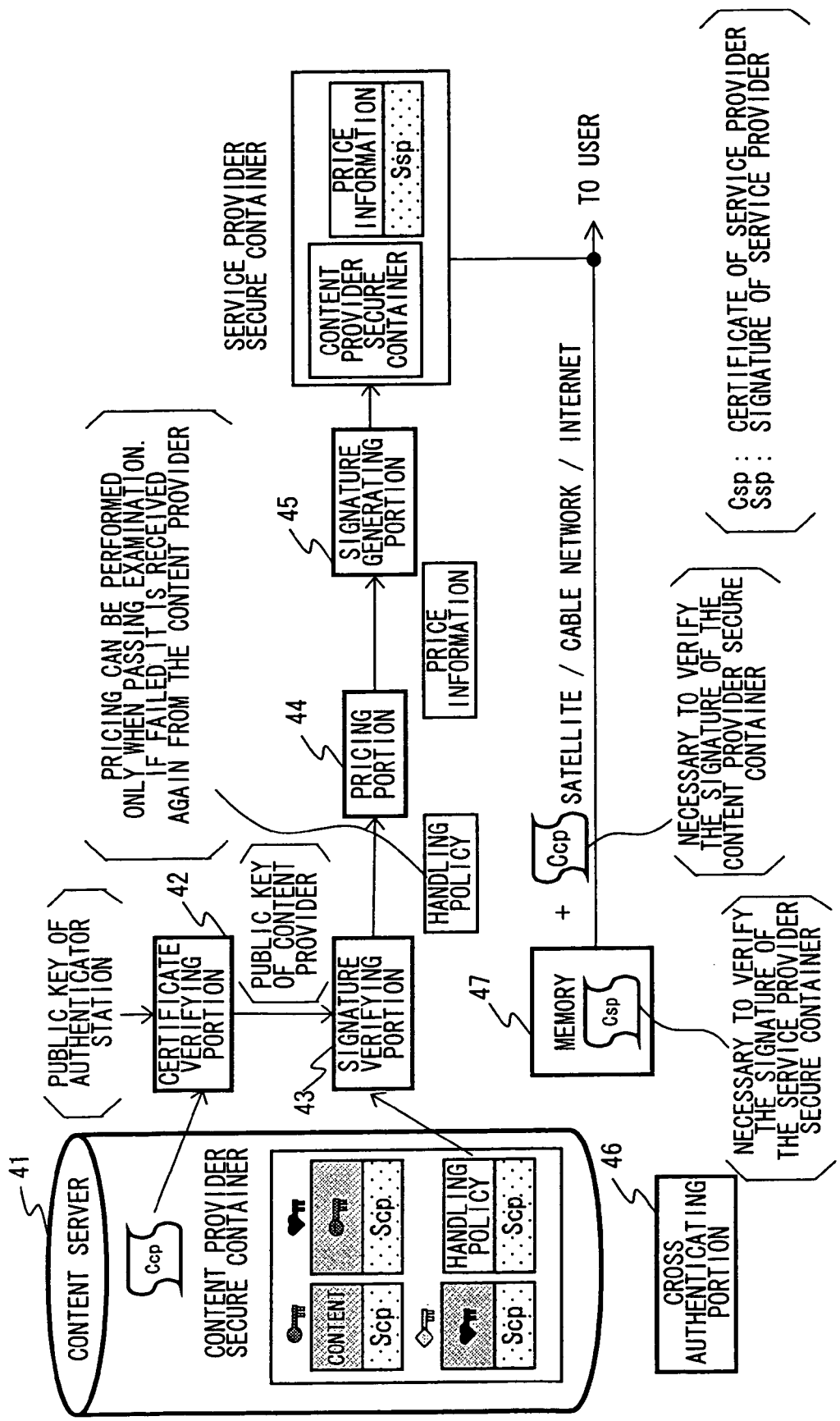
FIG. 14 is a block diagram showing a configuration of a service provider.

FIG. 14 is a block diagram showing a configuration of the function of the service provider 3. A content server 41 stores the public key certificate of the content provider 2 and the encrypted contents supplied from the content provider 2. For the public key certificate of the content provider 2, the signature in the certificate is verified at a certificate checking portion 42 with the public key of the authenticator station 22, and if the verification is successful, the public key of the content provider 2 is supplied to a signature verifying portion 43. At the signature verifying portion 43, the signature of the content provider 2 for the handling policy stored in the content server 41 is verified, using the public key of the content provider 2 which has just verified, and if the verification is successful, the handling policy is supplied to a pricing portion 44. At the pricing portion 44, price information is created from the handling policy, and is supplied to a signature generating portion 45. At the signature generating portion 45, the signature for the price information is generated, using the secret key of the service provider 3 retained in the tamper resistant memory not shown in the figure (similar to 40A in the content provider 2) (Hereinafter, the content provider secure container and price information to which electronic signatures are added using the secret key of the service provider 3 is referred to as a service provider secure container). Furthermore, in stead of adding signatures to the price information, one signature may be generated for the entire content provider secure container and price information. And, the service provider secure container, the public key certificate of the content provider 2 and the public key certificate of the service provider 3 are supplied to the user home network 5 via the network 4 (FIG. 1). A cross authenticating portion 46 performs cross authentication with the electronic distribution service center 1, and also performs cross authentication with the content provider as required, and with the user home network 5 if possible via the internet, cable communication and the like.

Figure 15:
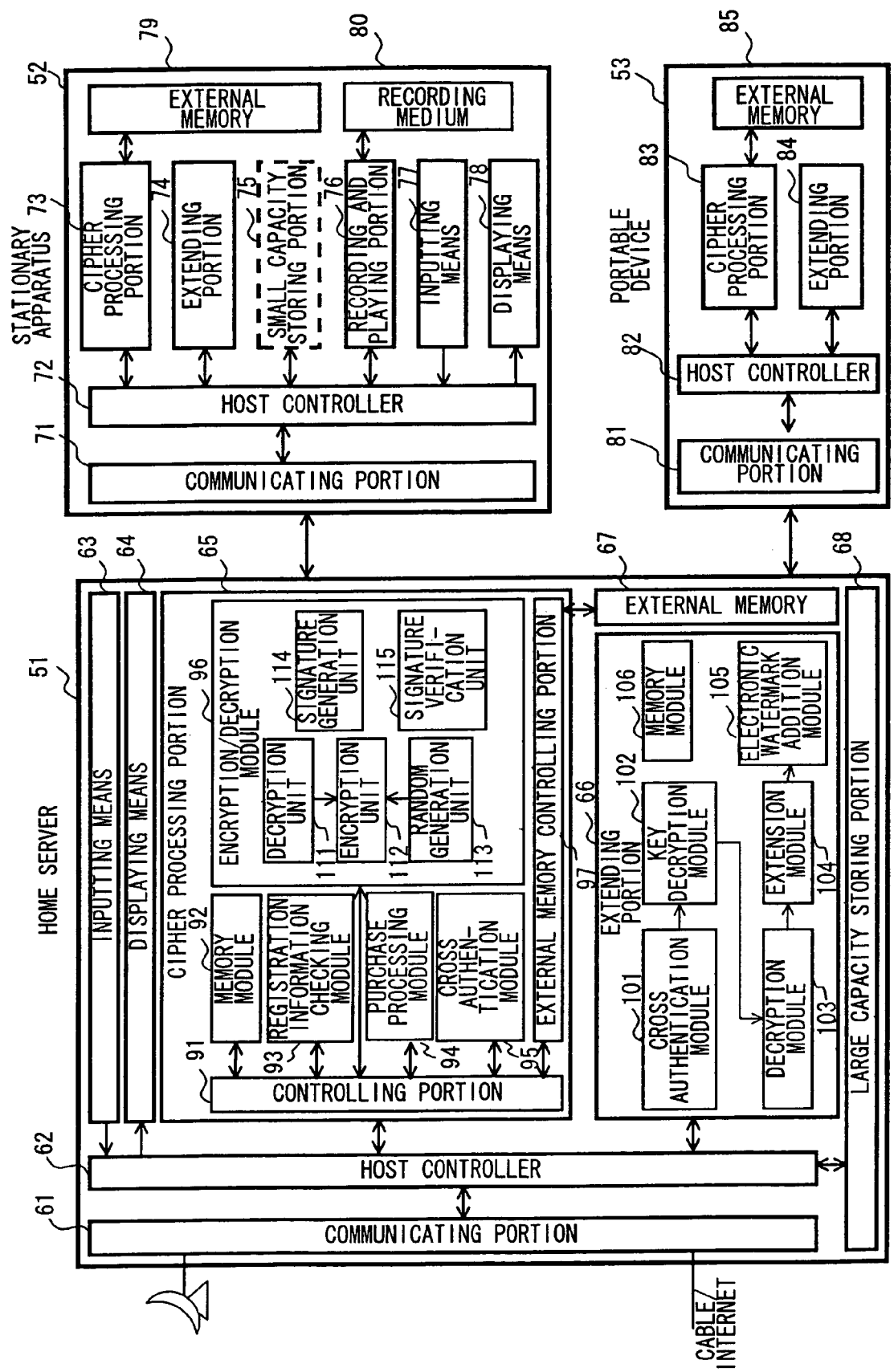
FIG. 15 is a block diagram showing a configuration of a user home network.

FIG. 15 is a block diagram showing a configuration of the user network 5. The home server 51 receives a secure container containing contents from the service provider 3 via the network 4, purchases content usage right, and executes the right to perform decryption, extension, playback and replication of contents.

A communicating portion 61 communicates with the service provider 3 or the electronic distribution service center 1 via the network 4, and receives or sends predetermined information. A host controller 62 receives a signal from inputting means 63, displays a predetermined message and the like on displaying means 64, performs processing such as the purchase of content usage right using a cipher processing portion 65, supplies the encrypted contents read out from a large capacity storing portion 68 to an extending portion 66, and stores the encrypted contents and the like in the large capacity storing portion 68. The inputting means 63 sends a signal from a remote controller and input data from an input button to the host controller 62. The displaying means 64, which is constituted by a display device such as a liquid crystal display, gives instructions to the user and displays information. The inputting means 63 and the displaying means 64 becomes a touch panel-type liquid crystal display as required, and may be integrated into one device. The cipher processing portion 65 performs cross authentication with the cipher processing portion of the service provider 3, the electronic distribution service center 1 or other apparatuses to purchase content usage right, and performs encryption/decryption of predetermined data, manages an external memory retaining the content key $K_{co}$ and license condition information, and stores the distribution key $K_d$, accounting information and the like. The extending portion 66 performs cross authentication with the cipher processing portion 65 to receive the content key $K_{co}$, decrypts the encrypted contents supplied from the host controller 62, using this content key $K_{co}$, extends the contents with a predetermined system such as ATRAC, and inserts a predetermined electronic watermark into the contents. The external memory 67 is constituted by a nonvolatile memory such as a flash memory and a volatile memory with backup power, and stores the content key $K_{co}$ encrypted with the save key $K_{save}$ and license condition information. The large capacity storing portion 68 is a storage device such as a HDD and an optical memory disk, and stores the content provider secure container and the service provider secure container (the encrypted contents, the content key $K_{co}$ encrypted with the individual key $K_i$, the individual key $K_i$ encrypted with the distribution key $K_d$, the handling policy, price information and their signatures), the public key certificate, registration information and the like.

The cipher processing portion 65 performing cross authentication with the electronic distribution service center 1, purchasing content usage right and generating accounting information, carrying out decryption/encryption of predetermined data, managing the external memory retaining the content key $K_{co}$ and license condition information, and storing the distribution key $K_d$, accounting information and the like is constituted by a controlling portion 91, a memory module 92, a registration information checking module 93, a purchase processing module 94, a cross authentication module 95, an encryption/decryption module 96, and an external memory controlling portion 97. This cipher processing portion 65 is composed of a cipher processing only IC of single chip, and has a multiple layer structure, and the memory cell therein is sandwiched between dummy layers such as aluminum layer, and also the range of the operating voltage or frequency is narrow, and so on, thus making it difficult to read out data illegally from the outside, as a property (tamper resistance).

The controlling portion 91 controls each module in accordance with a command from the host controller 62, and sends the result from each module to the host controller 62. The memory module 92 stores accounting information supplied from the purchase processing module 94 and data such as the distribution key $K_d$, and supplies data such as the distribution key $K_d$ when other function blocks carry out predetermined processing. The registration information checking module 93 checks registration information supplied from the host controller 62, and determines whether or not cross authentication with another apparatus in the user home network 5 is performed, whether or not accounting information is passed, and whether or not redistribution of the contents is performed. The purchase processing module 94 newly generates license condition information from the handling policy and price information contained in the secure container received from the service provider 3 (and in some cases, license condition information already stored) and outputs the license condition information to the external memory controlling portion 97 or the controlling portion 91, and generates accounting information and outputs the same to the memory module 92. The cross authentication module 95 carries out cross authentication with the electronic distribution service center 1, and the cipher processing portion and the extending portion 66 of other apparatuses in the home network 5, and generates a temporary key $K_{temp}$ (session key) and supplies the same to the encryption/decryption module 96, as required.

The decryption/encryption module 96 is constituted by a decryption unit 111, an encryption unit 112, a random number generation unit 113, a signature generation unit 114 and a signature verification unit 115. The decryption unit 111 decrypts the individual key $K_i$ encrypted with the distribution key $K_d$, and decrypts the content key $K_{co}$ encrypted with the individual key $K_i$, and decrypts various kinds of data encrypted with the temporary key $K_{temp}$. The encryption unit 112 encrypts the decrypted content key $K_{co}$ with the save key $K_{save}$ retained in the memory module 92 and outputs the same to the external memory controlling portion 97 via the controlling portion 91, and encrypts various kinds of data with the temporary key $K_{temp}$. The random number generation unit 113 generates a random number of a predetermined digit and supplies the random number to the cross authentication module 95 and the signature generation unit 114. The signature generation unit 114 calculates the hash value of the message supplied from the controlling portion 91, and generates signature data using the random number supplied from the random generation unit 113 and outputs the signature data to the controlling portion 91. The signature verification unit 115 determines whether or not the signature is correct from the message and signature data supplied from the controlling portion, and outputs the result thereof to the controlling portion 91. Furthermore, a method for generating/verifying a signature is similar to those described in terms of FIG. 10 and FIG. 11.

Figure 16:
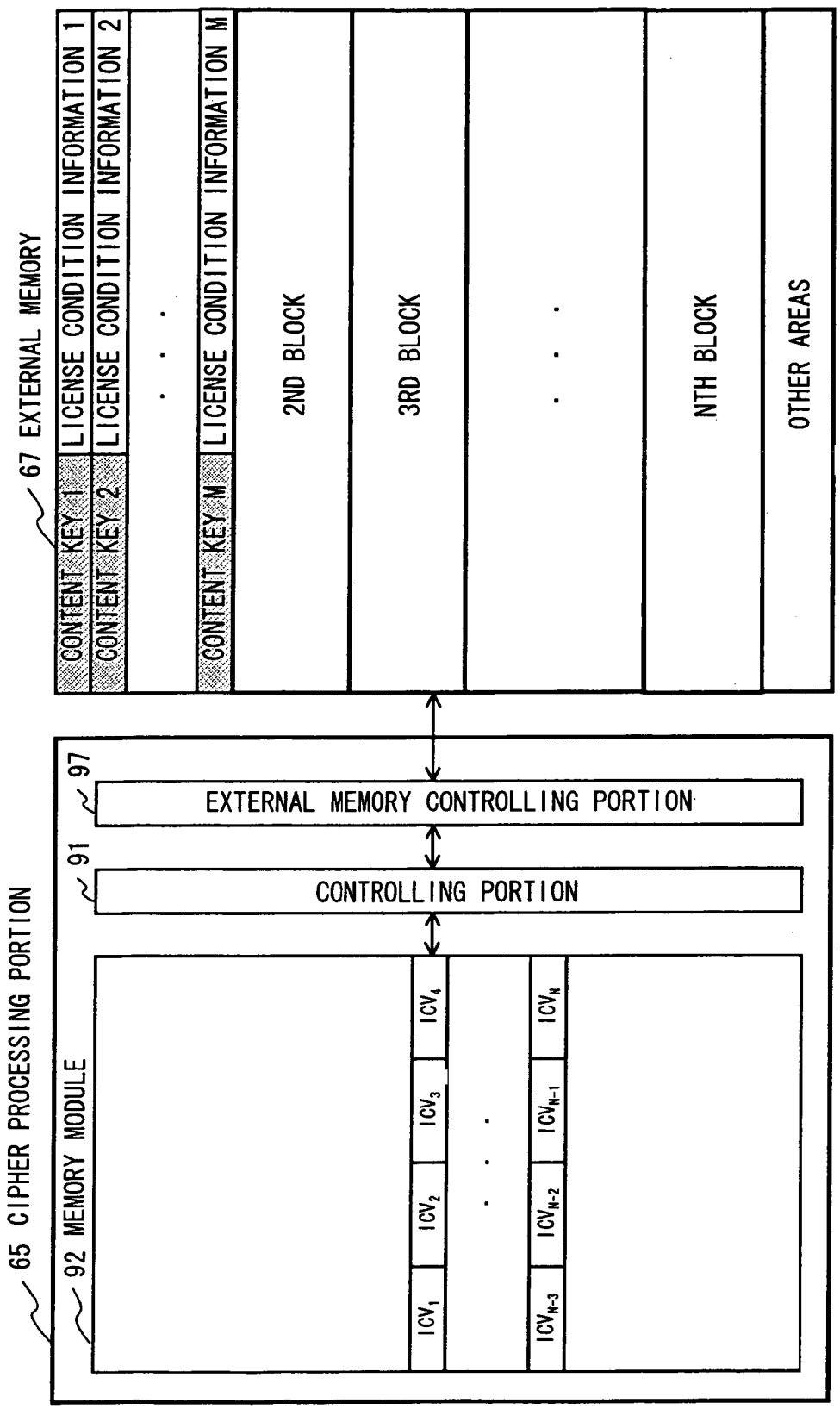
FIG. 16 is a schematic diagram available for explanation of operations of an external memory controlling portion.

The external memory controlling portion 97 controls the external memory 67 to perform read and write of data, and carries out data verification as to whether or not the data in the external memory is tampered. FIG. 16 is a block diagram for explaining operations of the external memory controlling portion 97. In FIG. 16, N tamper preventing hash values (Integrity Check Values) are stored in the memory module 92. The external memory 67 is divided into N blocks of data areas, and M pairs of content keys $K_{co}$ and license condition information can be written in each data area. Also, in the external memory 67, other areas that can be freely used are prepared. The tamper preventing hash value ICV is a hash value for all the data in the external memory 67 corresponding thereto. Procedures of reading and writing of the external memory will be described later, using flowcharts.

The extending portion 66 (FIG. 15) decrypting and extending contents and adding a predetermined electronic watermark thereto is constituted by a cross authentication module, a key decryption module 102, a decryption module 103, an extension module 104, an electronic watermark adding module 105 and a memory module 106. The cross authentication module 101 performs cross authentication with the cipher processing portion 65, and outputs the temporary key $K_{temp}$ to the key decryption module 102. The key decryption module 102 decrypts with the temporary key $K_{temp}$ the content key $K_{co}$ which is read from the external memory 67 and encrypted with the temporary key $K_{temp}$, and outputs the content key $K_{co}$ to the decryption module 103. The decryption module 103 decrypts the contents recorded in the large capacity storing portion 68 with the content key $K_{co}$, and outputs the same to the extension module 104. The extension module 104 further extends the decrypted contents with a system such as ATRAC, and outputs the contents to the electronic watermark adding module 105. The electronic watermark adding module 105 inserts the individual ID of the cipher processing portion subjected to purchase processing into the contents, using an electronic watermark technique, outputs the same to a speaker not shown in the figure, and has music played back.

In the storage module 106 is stored key data that is needed for cross authentication with the cipher processing portion 65. Furthermore, it is desired that the extending portion 66 has tamper resistance.

The external memory 67 stores license condition information which is generated when the right is purchased at the purchase processing module 94 and the content key $K_{co}$ encrypted with the save key $K_{save}$. The large capacity storing portion 68 records the secure container, the public key certificate, registration information and the like supplied from the service provider.

The stationary apparatus 52 recording and playing back the contents supplied from the service provider 3 in a recording medium 80 such as an inserted optical disk and semiconductor memory are constituted by a communicating portion 71, a host controller 72, a cipher processing portion 73, an extending portion 74, a small capacity storing portion 75, a recording and playing portion 76, inputting means 77, displaying means 78, an external memory 79 and the recording medium 80. The communicating portion 71 has same functions as those of the communicating portion 61, and explanations thereof are thus omitted. The host controller 72 has same functions as those of the host controller 62, and explanations thereof are thus omitted. The cipher processing portion 73 has same functions as those of the cipher processing portion 65, and explanations thereof are thus omitted. The extending portion 74 has same functions as those of the extending portion 66, and explanations thereof are thus omitted. Although having same functions as those of the large capacity storing portion 68, the small capacity storing portion 75 does not store the contents themselves, but stores only the public key certificate and registration information. The recording and playing portion 76 is provided therein with the recording medium 80 such as the optical disk and the semiconductor memory, records contents in the recording medium 80, and outputs the read contents to the extending portion. The inputting means 77 has same functions as those of the inputting means 63, and explanations thereof are thus omitted. The displaying means 78 has same functions as those of the displaying means 64, and explanations thereof are thus omitted. The external memory 79 has same functions as those of the external memory 67, and explanations thereof are thus omitted. The recording medium 80 is, for example, a MD (Mini Disk: Trademark) or an electronic distribution-only storing medium (memory stick using a semiconductor memory: Trademark).

A portable device 53, a device that the user carries and uses for playing back music with enjoyment, is constituted by a communication portion 81, a host controller 82, a cipher processing portion 83, an extending portion 84 and an external memory 85. The communicating portion 81 has same functions as those of the communicating portion 61, and explanations thereof are thus omitted. The host controller 82 has same functions as those of the host controller 62, and explanations thereof are thus omitted. The cipher processing portion 83 has same functions as those of the cipher processing portion 65, and explanations thereof are thus omitted. The extending portion 84 has same functions as those of the extending portion 66, and explanations thereof are thus omitted. The external memory 85 has same functions as those of the external memory 67, and explanations thereof are thus omitted. However, these memories are not limited only to semiconductor memories, but may any of HDDs, rewritable optical disks and the like.

Figure 17:
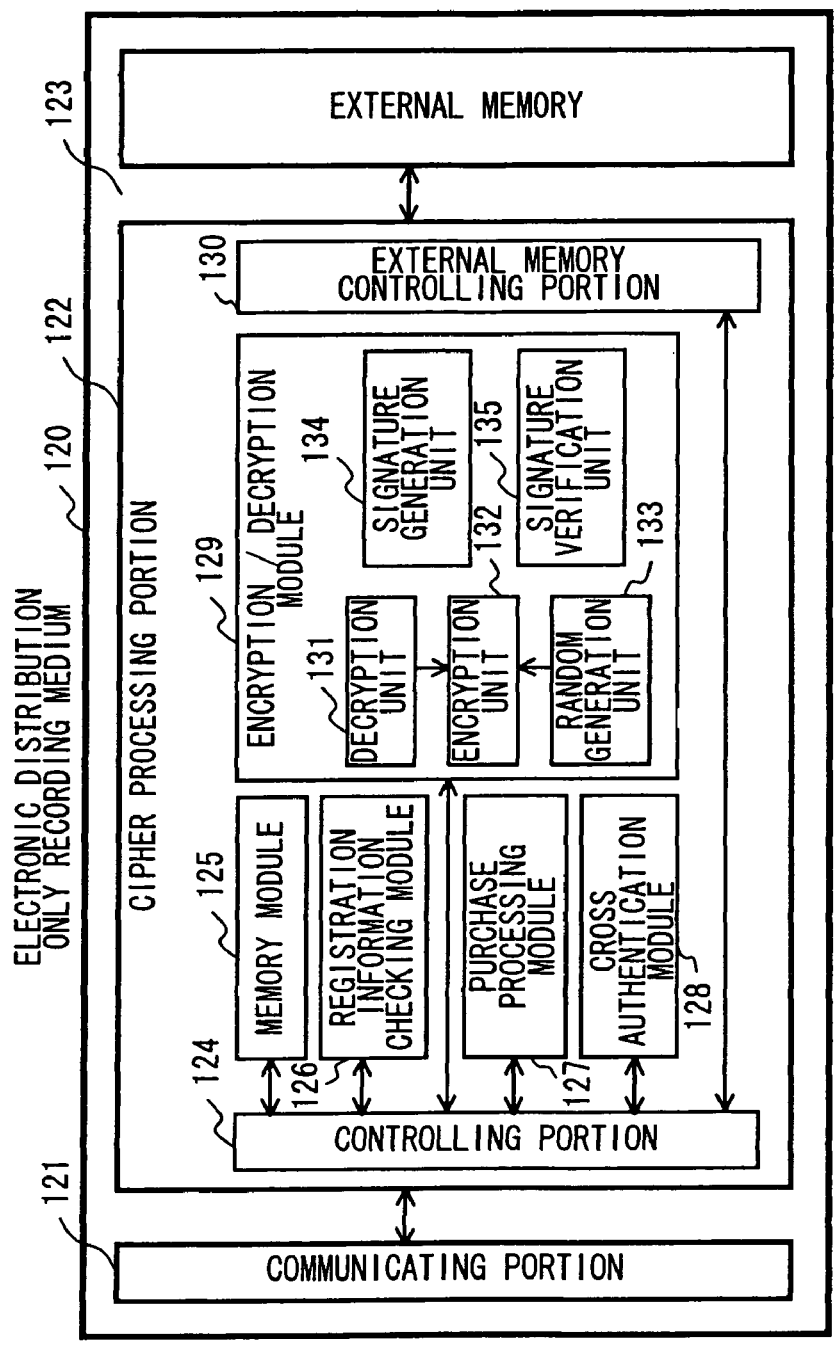
FIG. 17 is a block diagram showing a configuration of an electronic distribution-only recording medium.

FIG. 17 is a block diagram of an electronic distribution-only recording medium. A recording medium 120 storing electronically distributed contents is constituted by a communicating portion 121, a cipher processing portion 122 and an external memory 123. The communicating portion 121 sends data to and receives data from the recording and playing portion 76 of the stationary apparatus 52 (FIG. 15). The cipher processing portion 122 performing cross authentication with the stationary apparatus 52, receiving content usage right, decrypting/encrypting predetermined data, managing the external memory that retains the content key $K_{co}$, license condition information and the like, and further storing the save key $K_{save}$ and the like has a configuration having same functions as those of the cipher processing portion 65, and explanations thereof are thus omitted. The external memory 123 stores the content key $K_{co}$ encrypted with the save key $K_{save}$, the contents encrypted with the content key $K_{co}$ and license condition information defining conditions for using the contents, and the handling policy and price information as required.

The electronic distribution-only recording medium 120 is different in usage from the recording medium described with the stationary apparatus 52. The normal recording medium 80 is a substitute for the large capacity storing portion 68 of the home server 51 while the electronic distribution-only medium 120 is not different from a portable device that does not have an extending portion. An apparatus such as the stationary apparatus 52 having the extending portion 74 is thus needed for playing back contents, but in terms of functions such as receipt of contents and management of contents, processing as in the case of the home server 51 and the portable device 53 can be performed. Due to these differences, the contents recorded in the normal medium 80 can not be played back by apparatuses other than those that have recorded the contents, but the contents recorded in the electronic distribution-only recording medium 120 can be played back by apparatuses other than those that have recorded the contents. That is, since the normal recording medium 80 includes therein only the contents encrypted with the content key $K_{co}$, contents can not be played back with apparatuses other than those having (recording) the content key $K_{co}$. On the other hand, in the electronic distribution-only recording medium 120, not only the contents encrypted with the content key $K_{co}$ but also the content key $K_{co}$ which is encrypted with the save key $K_{save}$ specific to the electronic distribution-only recording medium 120 is retained, thus enabling other apparatuses to play back the contents.

That is, cross authentication between a cross authentication module 128 of the cipher processing portion 122 and a cross authentication module (not shown) of the cipher processing portion 73 of the stationary apparatus 52 is performed, followed by decrypting the content key $K_{co}$ with a save key $K_{save}$ specific to the dedicated recording medium, encrypting the content key $K_{co}$ with the shared temporary key $K_{temp}$, and sending the same to the cipher processing portion 73 to perform playing.

Figure 18:
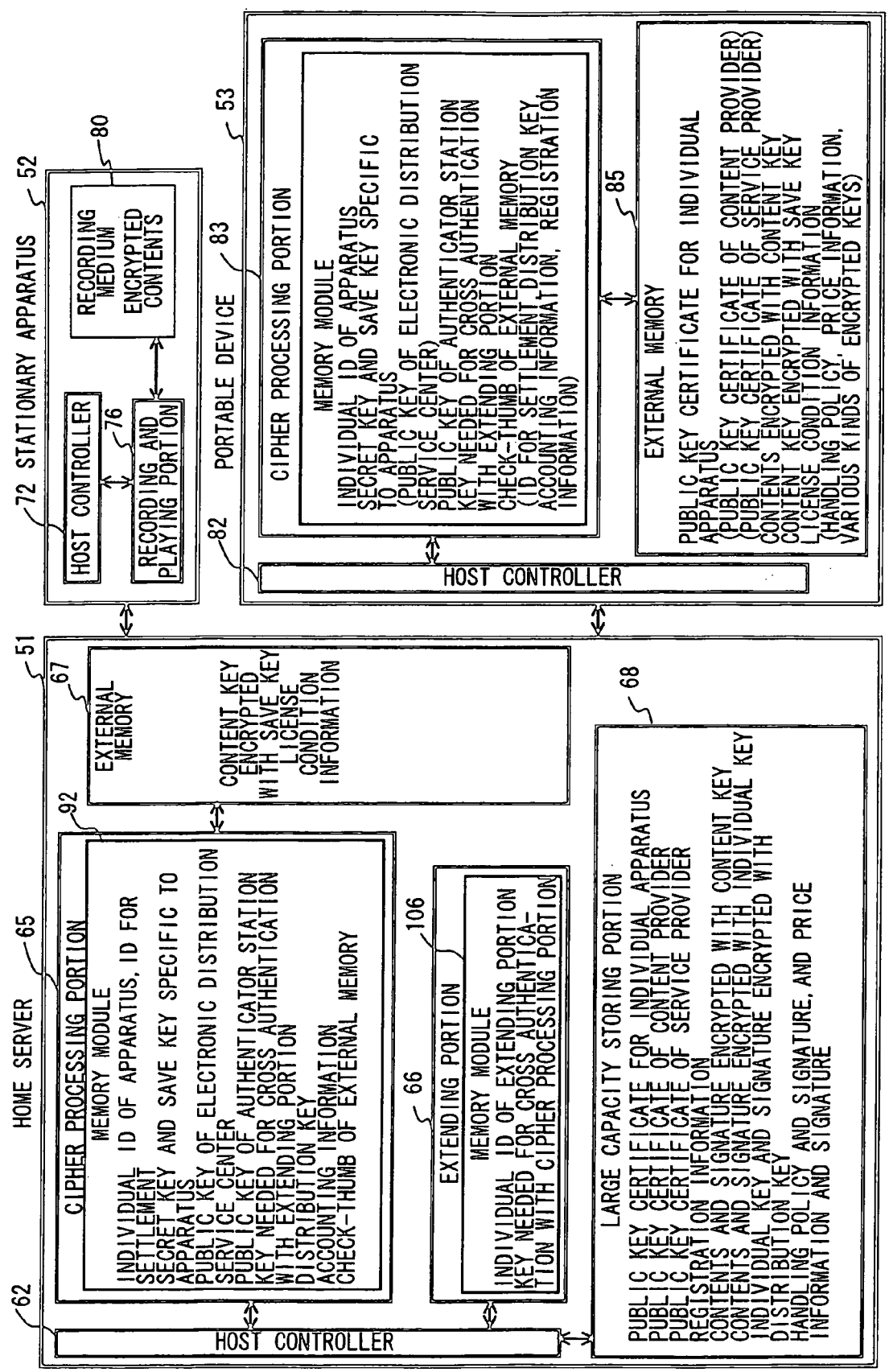
FIG. 18 is a block diagram showing data contents possessed by each apparatus.

FIG. 18 is a block diagram showing a data storage state in each apparatus. In the home server 51, individual IDs for identifying apparatuses (same as those for identifying the cipher processing portion), IDs for settlement that are used when accounting is performed (for which individual IDs may be substituted as required, and which may be unnecessary because of being included in registration information), secret keys different for each apparatus, the save key $K_{save}$, the public key of the electronic distribution service center 1 that is used when performing cross authentication with the electronic distribution service center 1 (which is unnecessary if there is the public key certificate of the electronic distribution service center 1), the public key of the authenticator station 22 for verifying the public key certificate, and the common key which is used when performing cross authentication with the extending portion 66 in the memory module 92 in the cipher processing portion 65. These data are data that are stored in advance when apparatuses are manufactured. In contrast, the distribution key $K_d$ distributed periodically from the electronic distribution service center 1, accounting information written when purchase processing is performed, the content key $K_{co}$ retained in the external memory 67, and the hash value for checking tamper of license condition information are data that are stored after use of the apparatus is started, and these data are also stored in the memory module 92. In the memory module 106 in the extending portion 66, individual IDs for identifying the extending portion and the common key which is used when cross authentication is performed with the cipher processing portion 65 are stored in advance when the apparatus is manufactured. Furthermore, for making the cipher processing portion 65 and the extending portion 66 correspond with each other on an one-to-one basis, each memory module may have each other's ID (Cross authentication is performed with the common key, and eventually exchange can be performed only with the corresponding cipher processing portion and extending portion. However, the process may be cross authentication of public key cryptosystem. The key stored at this time is not the common key, but secret key specific to the extending portion 66).

In the external memory 67 are stored the content key $K_{co}$ encrypted with the save key $K_{save}$ that is used when the contents are decrypted, and the license condition information showing conditions when the content key $K_{co}$ is used. Also, in the large capacity storing portion 68 are stored the certificate of the public key corresponding to the secret key different for each apparatus in the memory module 92 (public key certificate of the apparatus), registration information, the content provider secure container (the contents encrypted with the content key $K_{co}$ and the signature thereof, the content key $K_{co}$ encrypted with the individual key $K_i$ and the signature thereof, the individual key $K_i$ encrypted with the distribution key $K_d$ and the signature thereof, and the handling policy and the signature thereof), the service provider secure container (price information and the signature thereof), the public key certificate of the content provider 2 and the public key certificate of the service provider 3.

The portable device 53 is provided with the cipher processing portion 83 same as the cipher processing portion 65 retained by the home server 51, and the external memory 85 same as the external memory 67 (Those with same internal data are omitted. For example, the extending portion). However, the internally retained data are slightly different as shown in the figure. As for data retained by the memory module in the cipher processing portion 83 are stored individual IDs for identifying apparatuses, the secret key different for each apparatus, the save key $K_{save}$, the public key of the electronic distribution service center 1, which is used when performing cross authentication with the electronic distribution service center 1 (However, it is not necessary to have all procedures with the electronic distribution service center 1 performed by the home server 51 as a proxy), the public key of the authenticator station 22 for verifying the public key certificate, and the common key for performing cross authentication with the extending portion 84. These data are data that are stored in advance when apparatuses are manufactured. Also, the content key $K_{co}$ retained in the external memory 85 and the hash value for checking tamper of license condition information, and the ID for settlement as required, the distribution key $K_d$ and (part of) registration information (In the case where purchase processing is not performed, the ID for settlement and the distribution $K_d$ are not required) are data that are stored after use of the apparatus is started, and these data are also stored (In the case where purchase processing is performed, accounting information is also stored). In the external memory 85 are stored the public key certificate corresponding to the secret key different for each apparatus, which exists in the cipher processing portion 83, the contents encrypted with the content key $K_{co}$ and the signature thereof (In addition, the content key $K_{co}$ encrypted with the individual key $K_i$ and the signature thereof as required, the individual key $K_i$ encrypted with the distribution key $K_d$ and the signature thereof, the handling policy and the signature thereof as required, and price information and the signature thereof may also be stored), the content key $K_{co}$ encrypted with the save key $K_{save}$ that is used when the contents are decrypted, and license condition information showing conditions when the contents are used. Also, the public key certificate of the content provider 2 and the public key certificate of the service provider 3 are also stored as required.

The stationary apparatus 52 is provided with the recording medium 80, in addition to the configuration of the home server 51. The recording medium 80 may be a normal MD and CD-R, or may be an electronic distribution-only recording medium. In the case of the former, data to be recorded are decrypted contents with a copy prohibition signal added thereto but of course, encrypted contents may also be contained (The content key $K_{co}$ encrypted with the save key $K_{save}$ may also be stored together. At this time, the apparatus capable of playing back contents is only the apparatus storing the contents. For the save key $K_{save}$ is different for each apparatus).

Figure 19:
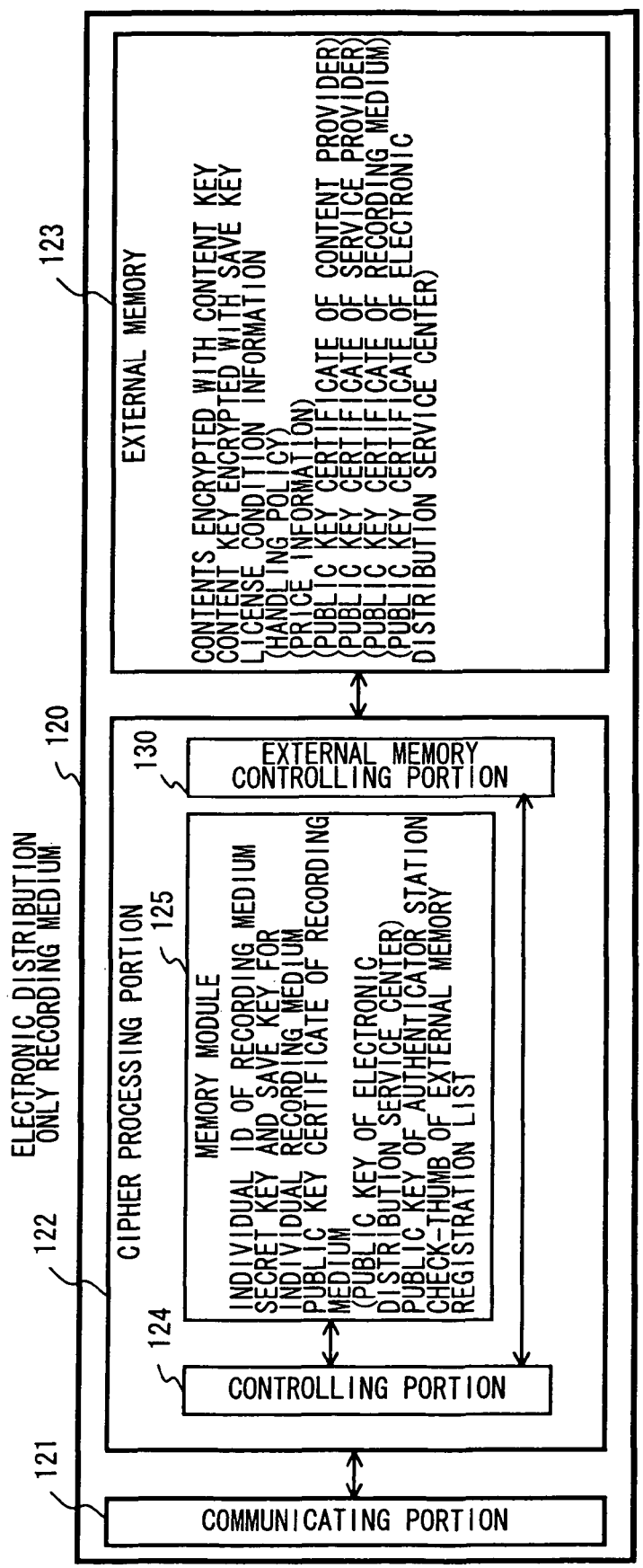
FIG. 19 is a block diagram showing data contents retained by the recording medium.

Also, FIG. 19 can be considered as the recording medium. In the electronic distribution-only recording medium 120, individual IDs of the recording medium, the secret key different for each recording medium, the certificate of the public key corresponding to this secret key (which may be stored in the external memory 123), the save key $K_{save}$ used for encrypting the content key $K_{co}$ (generally, different for recording medium), the public key of the electronic distribution service center 1 (needless if exchange with the center is not performed, or there exist the public key certificate of the electronic distribution service center 1 in the external memory 123), the public key of the authenticator station, the hash value for checking tamper of the external memory 123 and (part of) registration information are stored in a memory module 125 existing in the cipher processing portion 122. In the external memory 123, contents encrypted with the content key $K_{co}$ (and the signature thereof), the content key $K_{co}$ encrypted with the save key $K_{save}$ and license condition information are stored, and the handling policy (and the signature thereof), price information (and the signature thereof), the public key certificate of the content provider 2 and the public key certificate of the service provider 3 are stored as required.

Figure 20:
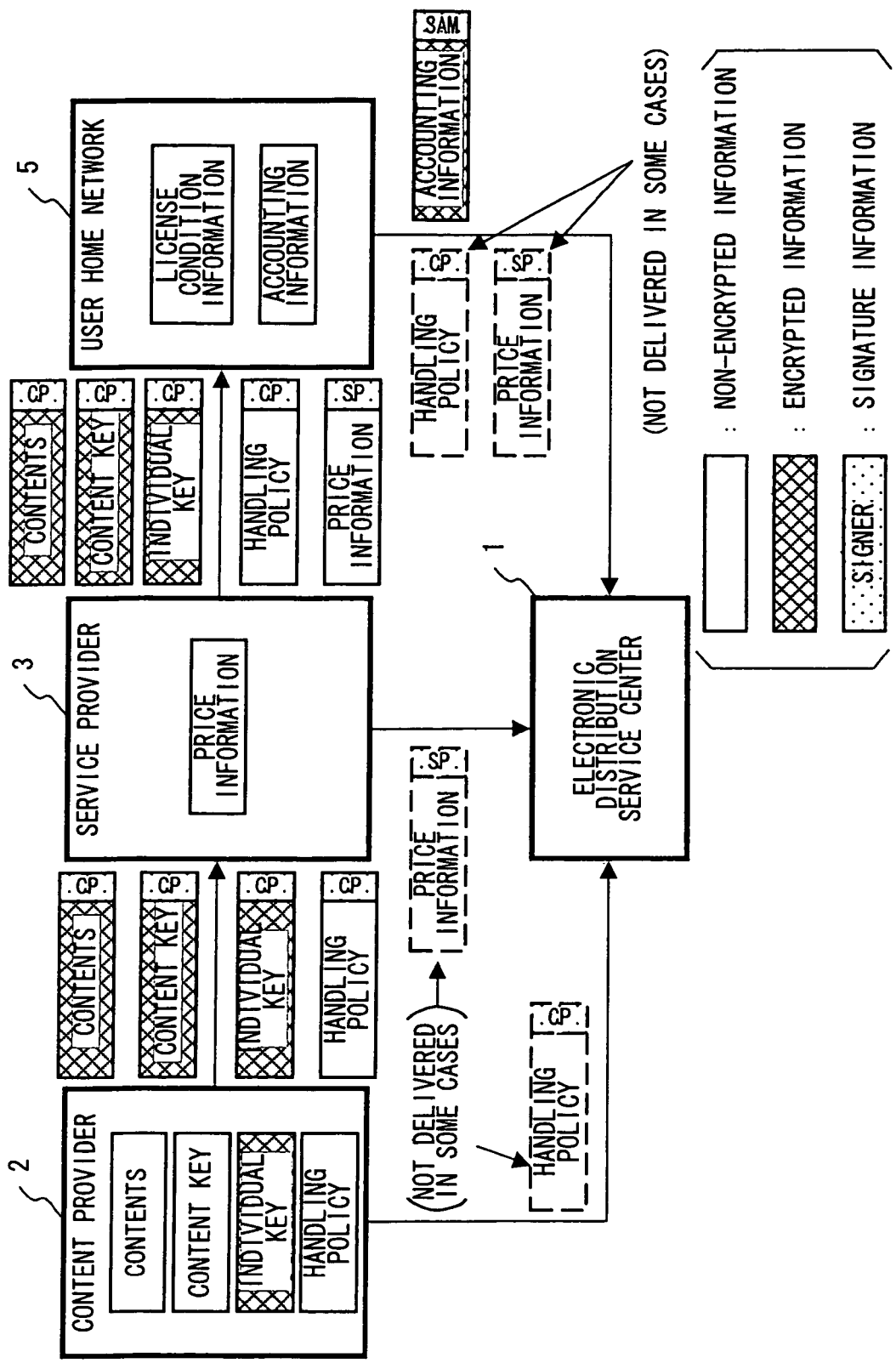
FIG. 20 is a schematic block diagram showing the flow of data of the entire system.
Figure 21:
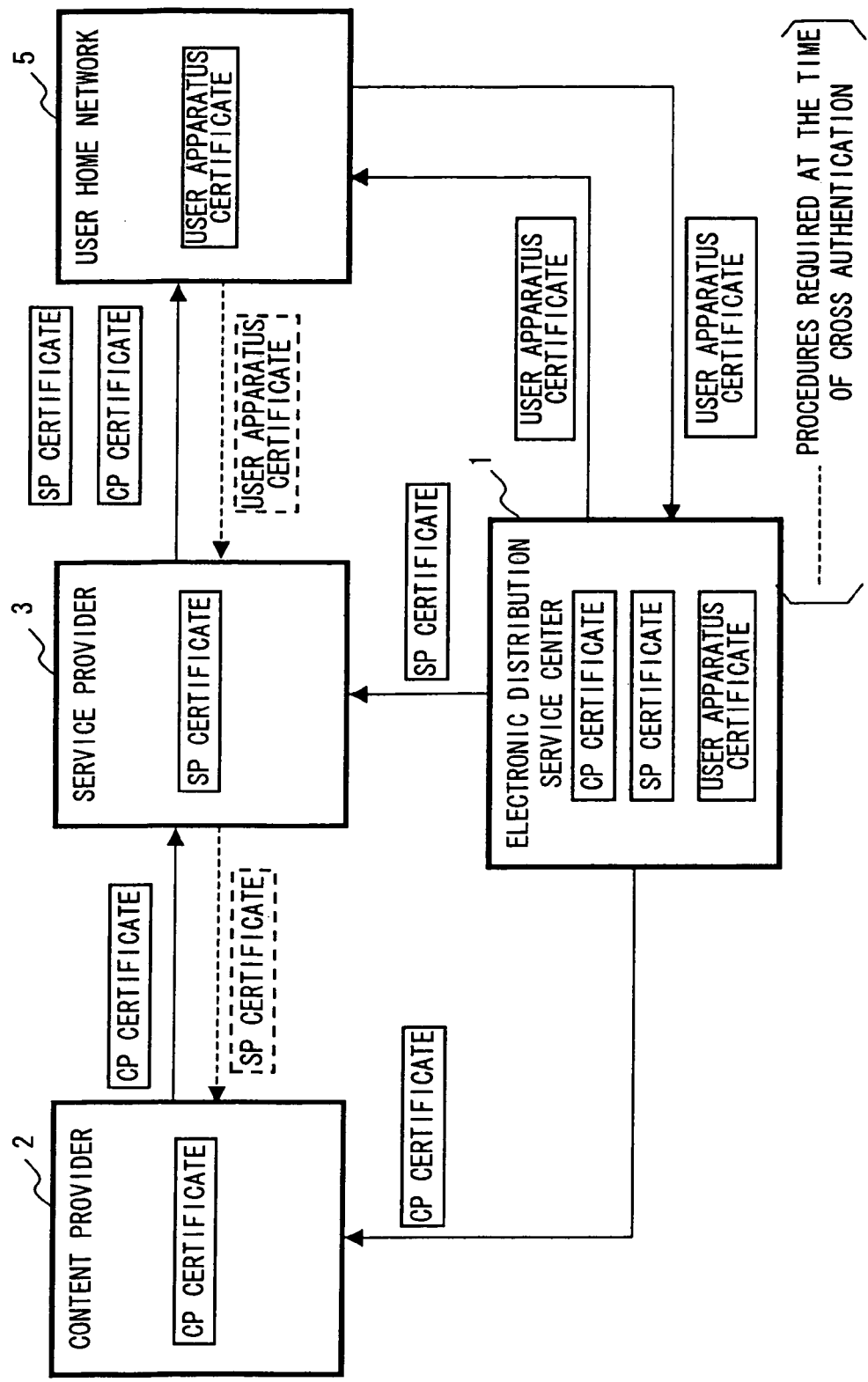
FIG. 21 is a schematic block diagram showing the flow of public key certificates.

FIG. 20 and FIG. 21 explain information sent and received among the electronic distribution service center 1, the content provider 2, the service provider 3 and the user home network 5. The content provider 2 adds the public key certificate of the content provider 2 (described later in detail) to the content provider secure container (described later in detail) and sends the same to the service provider 3. Also, the content provider 2 sends the handling policy and the signature thereof, and the certificate of the content provider 2 to the electronic distribution service center 1 as required.

The service provider 3 verifies the public key certificate of the content provider 2, obtains the public key of the content provider 2, and verifies the received signature of the content provider secure container (There may be cases where only the handling policy is verified). After the signature is verified successfully, the handling policy is taken from the content provider secure container, price information is generated on the basis of this handling policy, and the price information is provided with the signature to define the same as the service provider secure container (described later in detail). The content provider secure container, the service provider secure container, the public key certificate of the content provider 2 and the public key certificate of the service provider 3 (described later in detail) are sent to the user home network 5. Also, the service provider 3 sends the price information and the signature as required thereof and the public key certificate of the service provider 3 to the electronic distribution service center 1.

The user home network 5 verifies the received secure container, and then performs purchase processing based on the handling policy and price information included in the secure container, generates accounting information and stores the same in the memory module in the encrypting processing portion, generates license condition information, decrypts the content key $K_{co}$ and re-encrypts the same with the save key $K_{save}$, and stores the license condition information and the re-encrypted content key $K_{co}$ in the external memory 67. And, in accordance with the license condition information, the content key $K_{co}$ is decrypted with the save key $K_{save}$ and the contents are decrypted with this key for use. The accounting information is encrypted with the temporary key $K_{temp}$ in predetermined timing, and is provided with the signature, and is sent to the electronic distribution service center 1 together with the handling policy and price information as necessary.

The electronic distribution service center 1 calculates a usage charge based on the accounting information and the price information, and calculates benefits of the electronic distribution service center 1, the content provider 2 and the service provider 3, respectively. The electronic distribution service center 1 further compares the handling policy received from the content provider 2, the price information and as required, the handling policy received from the service provider 3, and the handling policy and as required, the price information received from the user home network 5 and performs monitoring as to whether or not a fraud such as tampering with the handling policy or illegal price addition has occurred in the service provider 3 or the user home network 5, and so on.

Furthermore, the electronic distribution service center 1 sends the public key certificate of the content provider to the content provider 2, and sends the public key certificate of the service provider to the service provider 3. Also, for embedding in each apparatus the public key certificate created in accordance with each apparatus during factory shipment, data with respect to the public key certificate of each apparatus is delivered to the factory.

Figure 22:
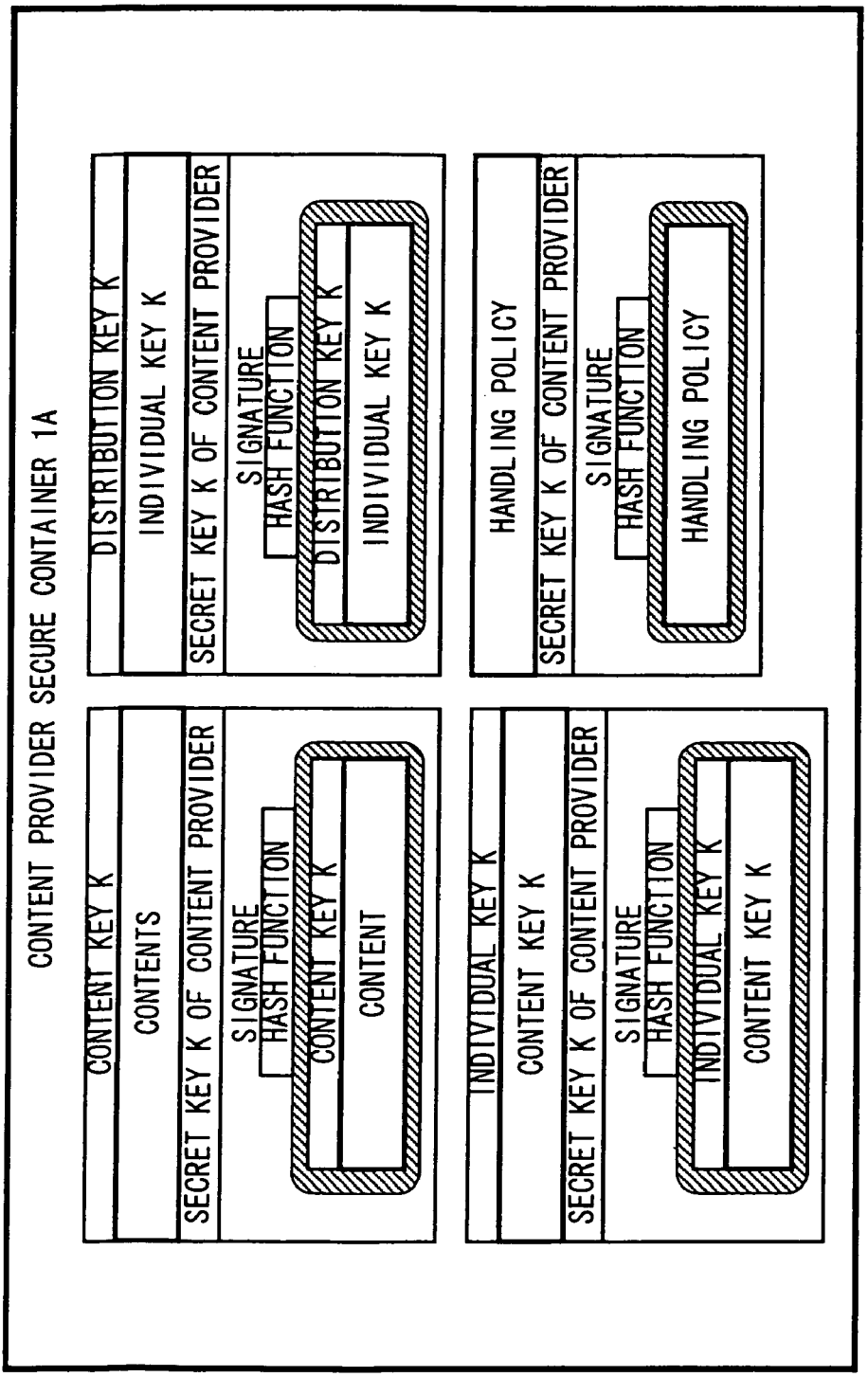
FIG. 22 is a schematic diagram showing content provider secure container.

FIG. 22 explains the content provider secure container. The content provider secure container 1A includes therein contents encrypted with the content key $K_{co}$ and the signature thereof, the content key $K_{co}$ encrypted with the individual key $K_i$ and the signature thereof, the individual key $K_i$ encrypted with the distribution key $K_d$ and the signature thereof, and the handling policy and the signature thereof. The signature is data generated by using the secret key $K_{scp}$ of the content provider 2 with the hash value generated by applying the hash function to each data. Furthermore, in the case of FIG. 22, signatures are generated and added separately for key data (the content key $K_{co}$ encrypted with the individual key $K_i$, the individual key $K_i$ encrypted with the distribution key $K_d$), but one signature may be generated and added for a collection of each data (the content key $K_c$ encrypted with the individual key $K_i$, the individual key $K_i$ encrypted with the distribution key $K_d$). In this way, the key data that are always used integrally are integrated into one, to which one signature is added, thereby making it possible to verify the signature at a time.

Figure 23:
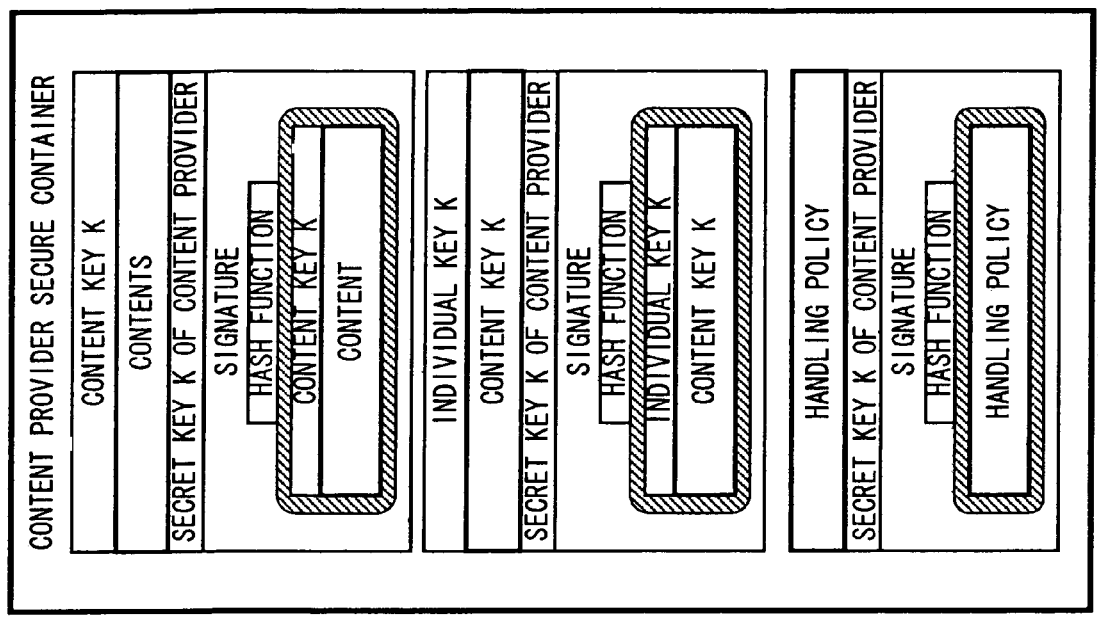
FIG. 23 is a schematic diagram showing the content provider secure container.

FIG. 23 explains another example of the content provider secure container. The content provider secure container 1B includes therein contents encrypted with the content key $K_{co}$ and signature thereof, the content key $K_{co}$ encrypted with the individual key $K_i$ and the signature thereof, and the handling policy and the signature thereof.

Figure 24:
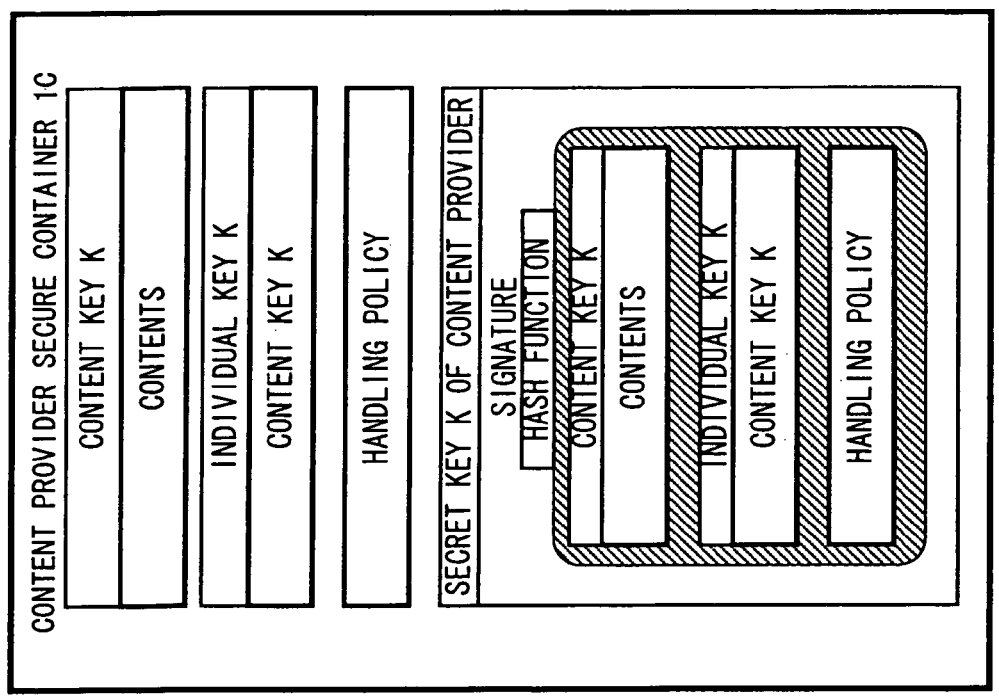
FIG. 24 is a schematic diagram showing the content provider secure container.

FIG. 24 explains another example of the content provider secure container. The content provider secure container 1C includes the rein contents encrypted with the content key $K_{co}$, the content key $K_{co}$ encrypted with the individual key $K_i$, the individual key $K_i$ encrypted with the distribution key $K_d$, the handling policy and the signature. The signature is data that is generated by using the secret key $K_{scp}$ of the content provider 2 with the hash value generated by applying the hash function to the contents encrypted with the content key $K_{co}$, the content key $K_{co}$ encrypted with the individual key $K_i$, the individual key $K_i$ encrypted with the distribution key $K_d$, and the handling policy.

Figure 25:
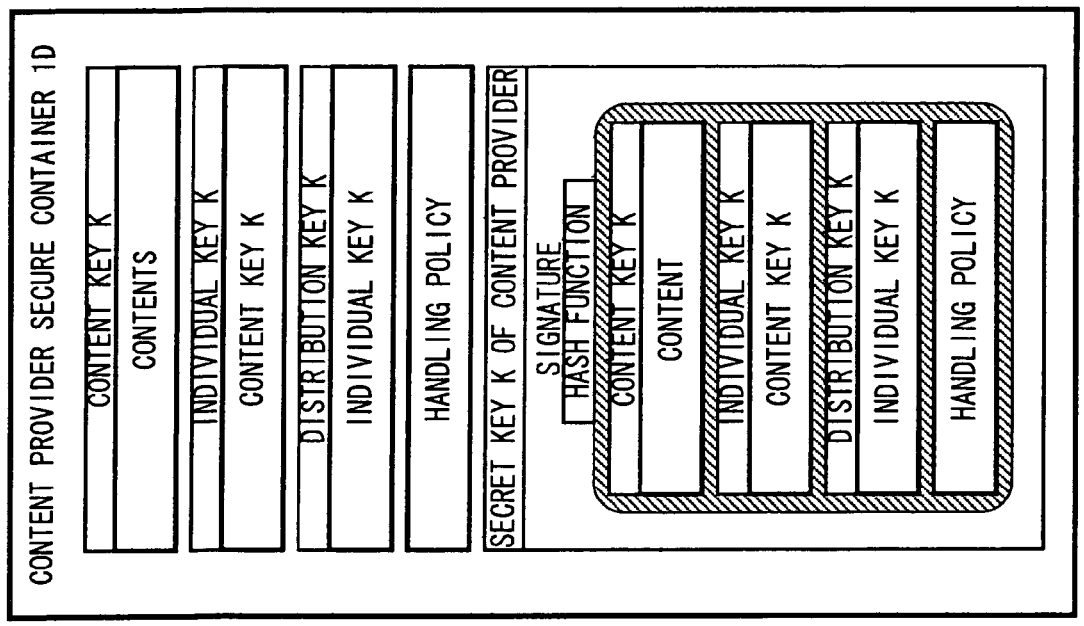
FIG. 25 is a schematic diagram showing the content provider secure container.

FIG. 25 explains another example of the content provider secure container. The content provider secure container 1D includes therein contents encrypted with the content key $K_{co}$, the content key $K_{co}$ encrypted with the individual key $K_i$, the handling policy and the signature. The signature is data generated by using the secret key $K_{scp}$ of the content provider 2 with the hash value generated by applying the hash function to the contents encrypted with the content key $K_{co}$, the content key $K_{co}$ encrypted with the individual key $K_i$, and the handling policy.

Figure 26:
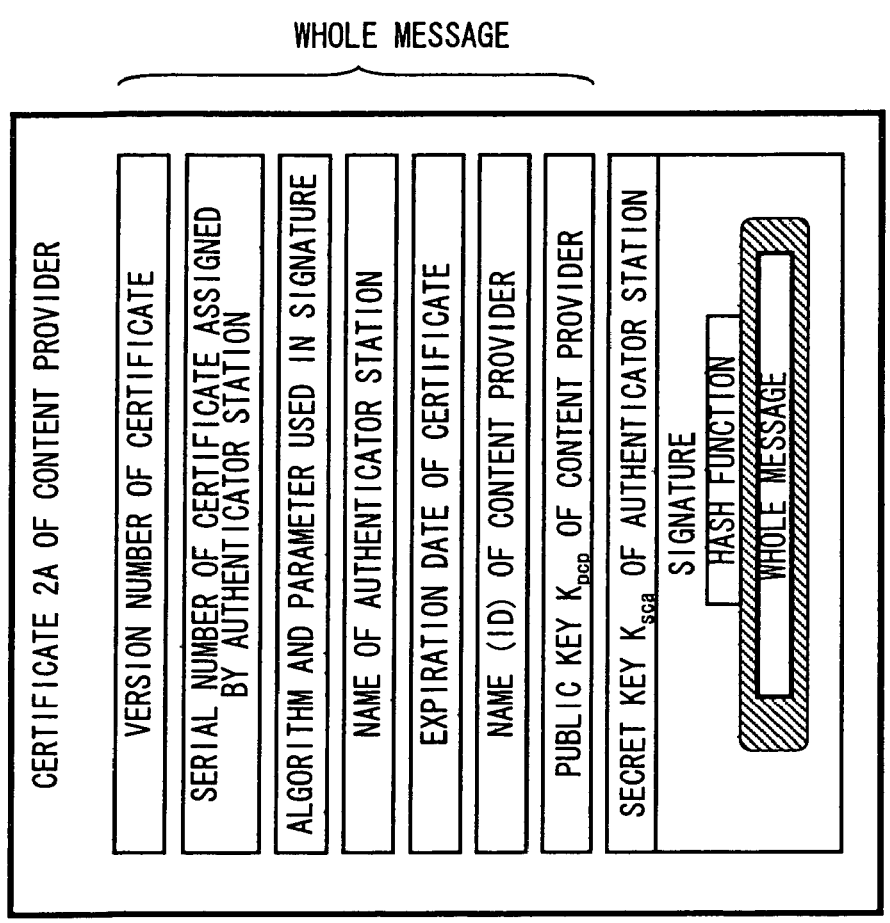
FIG. 26 is a schematic diagram showing the public key certificate of the content provider.

FIG. 26 explains the public key certificate of the content provider 2. The public key certificate 2A of the content provider 2 includes a version number of the public key certificate, a serial number of the public key certificate that the authenticator station assigns to the content provider 2, an algorithm and a parameter used for the signature, the name of the authenticator station, an expiration date of the public key certificate, the name of the content provider 2, a public key $K_{pcp}$ of the content provider 2, and the signature. The signature is data generated by using the secret key $K_{sca}$ of the authenticator station with the hash value generated by applying the hash function to the version number of the public key certificate, the serial number of the public key certificate that the authenticator station assigns to the content provider 2, the algorithm and the parameter used for the signature, the name of the authenticator station, the expiration date of the public key certificate, the name of the content provider 2, and the pubic key $K_{pcp}$ of the content provider 2.

Figure 27:
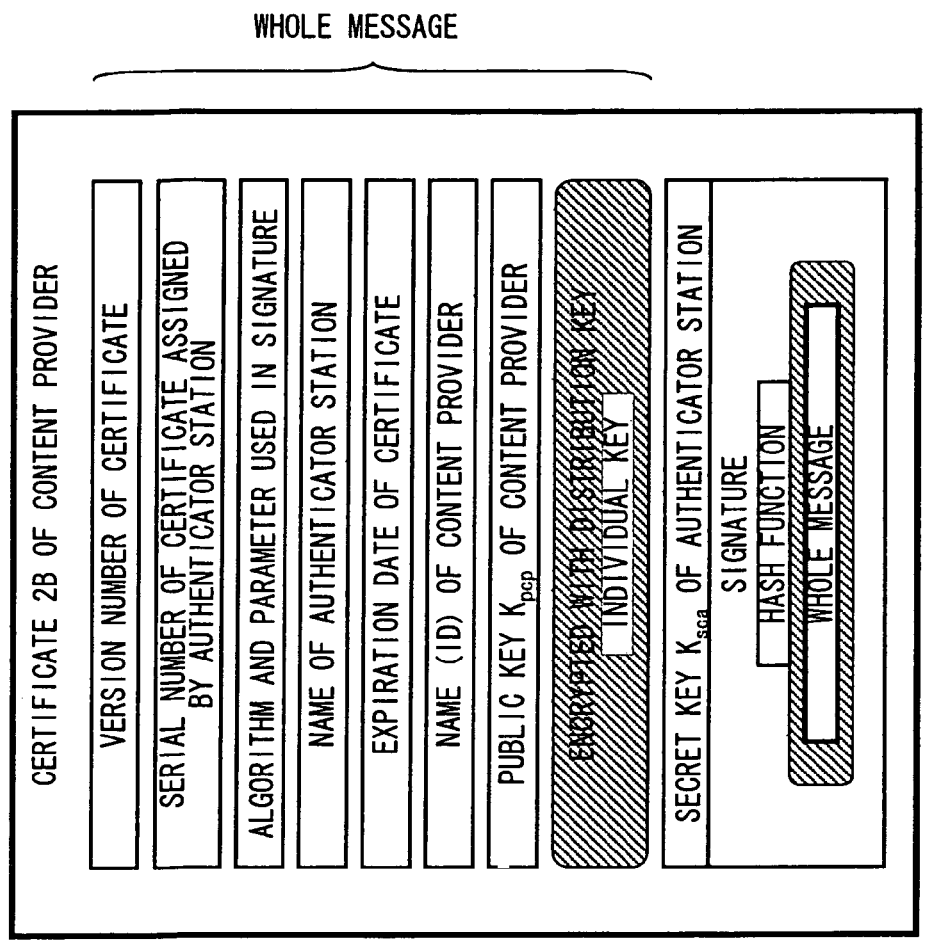
FIG. 27 is a schematic diagram showing the public key certificate of the content provider.

FIG. 27 explains another example of the public key certificate of the content provider 2. The public key certificate 2B of the content provider 2 includes the version number of the public key certificate, the serial number of the public key certificate that the authenticator station assigns to the content provider 2, the algorithm and the parameter used for the signature, the name of the authenticator station, the expiration date of the public key certificate, the name of the content provider 2, the public key $K_{pcp}$ of the content provider 2, the individual key $K_i$ encrypted with the distribution key $K_d$, and the signature. The signature is data generated by using the secret key $K_{sca}$ of the authenticator station with the hash value generated by applying the hash function to the version number of the public key certificate, the serial number of the public key certificate that the authenticator station assigns to the content provider 2, the algorithm and the parameter used for the signature, the name of the authenticator station, the expiration date of the public key certificate, the name of the content provider 2, the public key $K_{pcp}$ of the content provider 2, and the individual key $K_i$ encrypted with the distribution key $K_d$.

Figure 28:
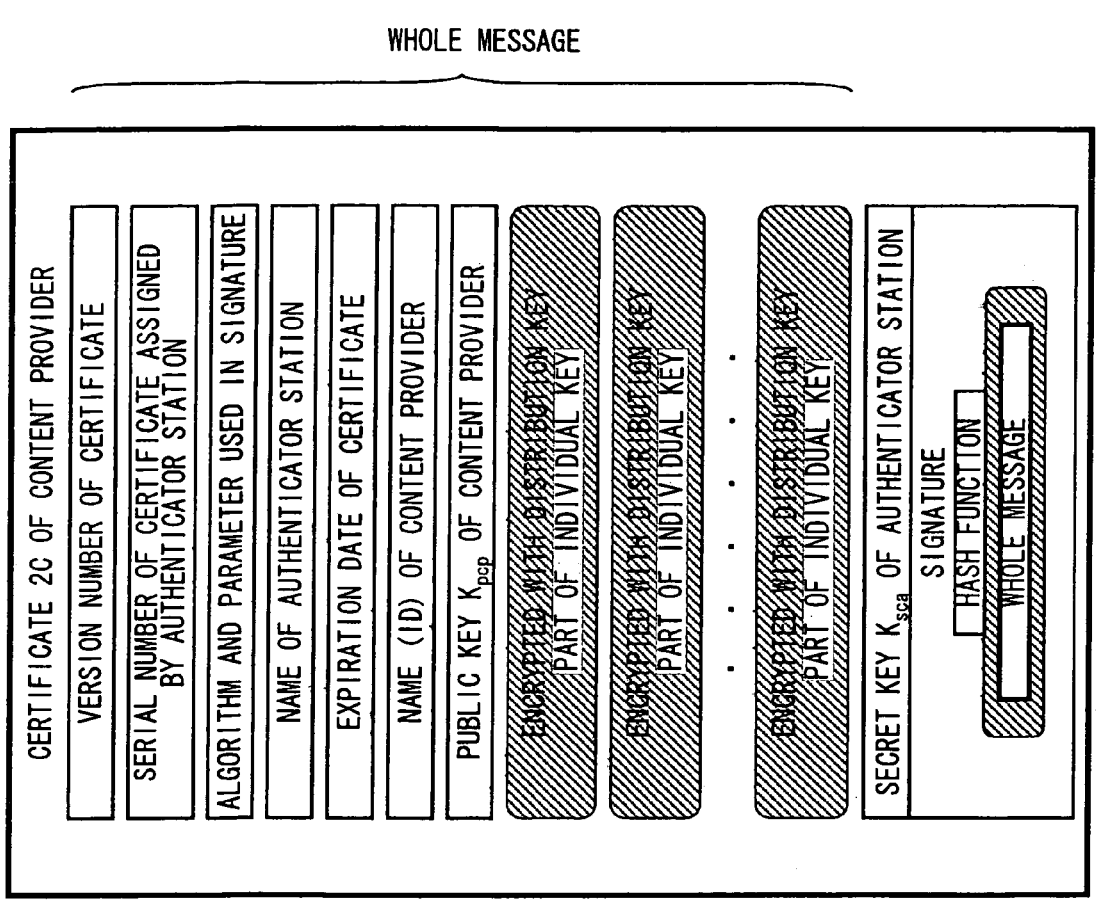
FIG. 28 is a schematic diagram showing the public key certificate of the content provider.

FIG. 28 explains still another example of the public key certificate of the content provider 2. The public key certificate 2C of the content provider 2 includes the version number of the public key certificate, the serial number of the public key certificate that the authenticator station assigns to the content provider 2, the algorithm and the parameter used for the signature, the name of the authenticator station, the expiration date of the public key certificate, the name of the content provider 2, the public key $K_{pcp}$ of the content provider 2, a predetermined kind of data with part of the individual key $K_i$ encrypted with the distribution key $K_d$, and the signature. The signature is data generated by using the secret key $K_{sca}$ of the authenticator station with the hash value generated by the applying the hash function to the version number of the public key certificate, the serial number of the public key certificate that the authenticator station assigns to the content provider 2, the algorithm and the parameter used for the signature, the name of the authenticator station, the expiration date of the public key certificate, the name of the content provider 2, the public key $K_{pcp}$ of the content provider 2, a predetermined kind of data with part of the individual key K1 encrypted with the distribution key $K_d$.

Figure 29:
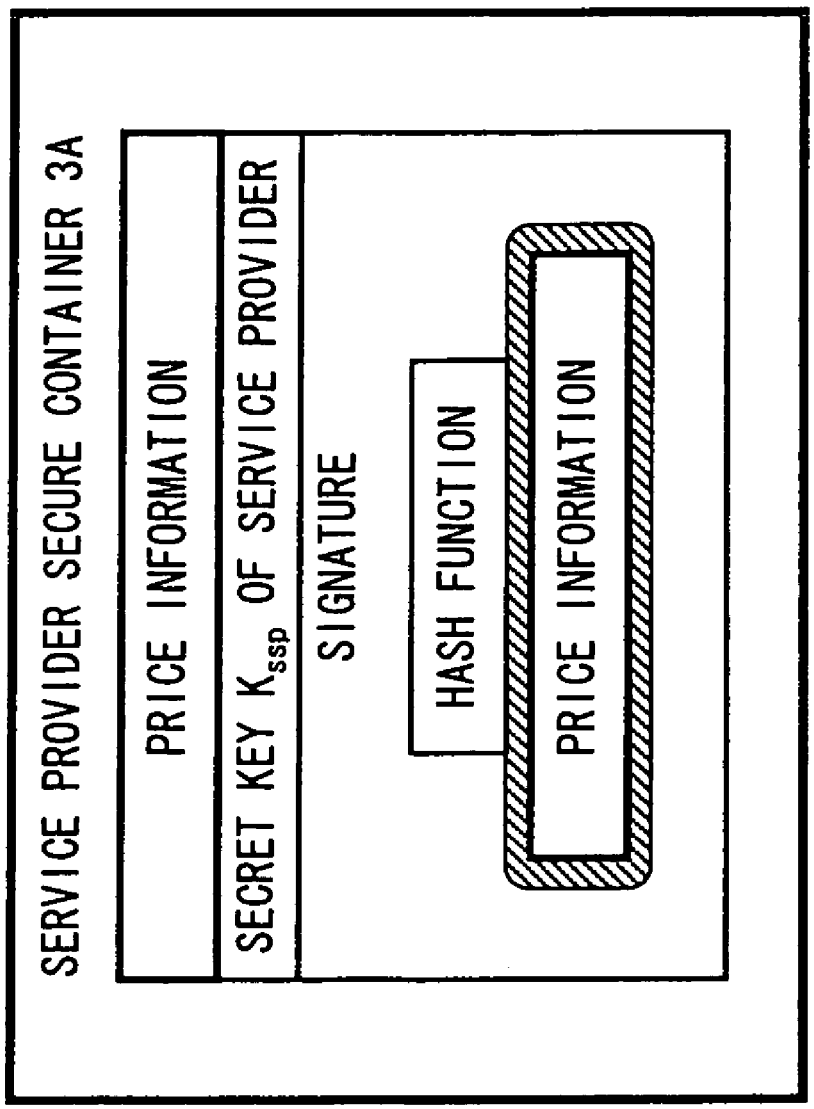
FIG. 29 is a schematic diagram showing a service provider secure container.

FIG. 29 explains the service provider secure container. The service provider secure container 3A consists of price information and the signature. The signature is data generated by using the secret key $K_{ssp}$ of the service provider 3 with the hash value generated by applying the hash function to the price information as required.

Figure 30:
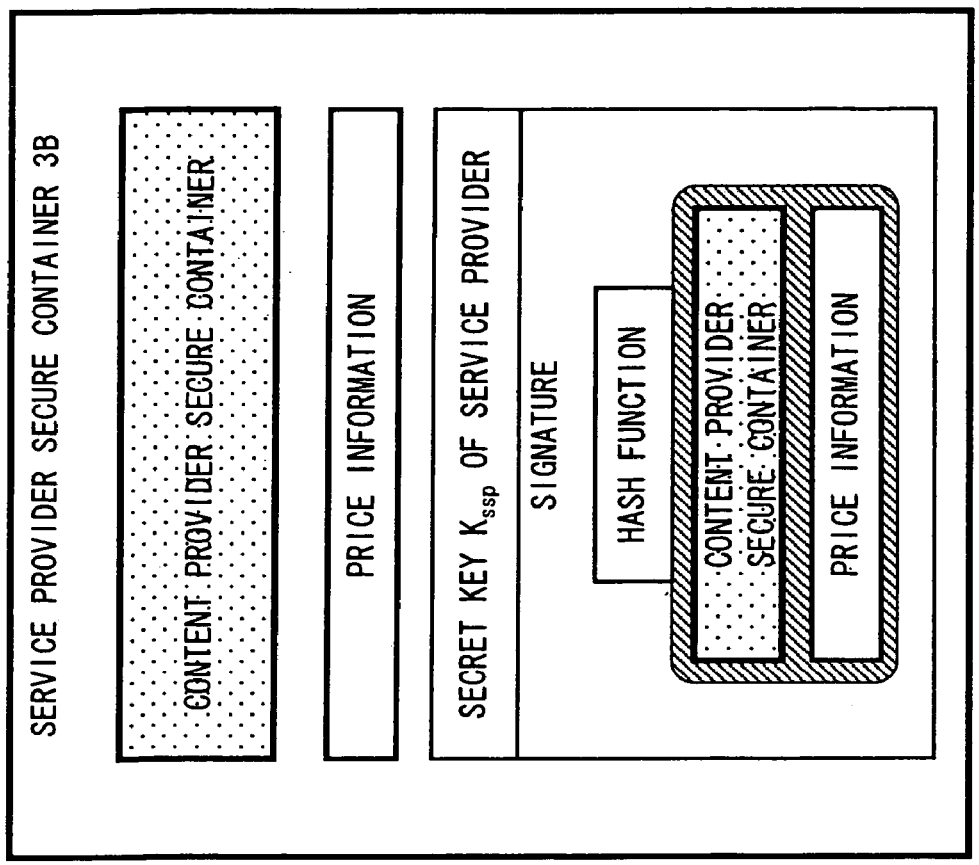
FIG. 30 is a schematic diagram showing the service provider secure container.

FIG. 30 explains another example of the service provider secure container. The service provider secure container 3B includes the content provider secure container, price information and the signature. The signature is data generated by using the secret key $K_{ssp}$ of the service provider 3 with the hash value generated by applying the hash function to the content provider secure container and the price information.

Figure 31:
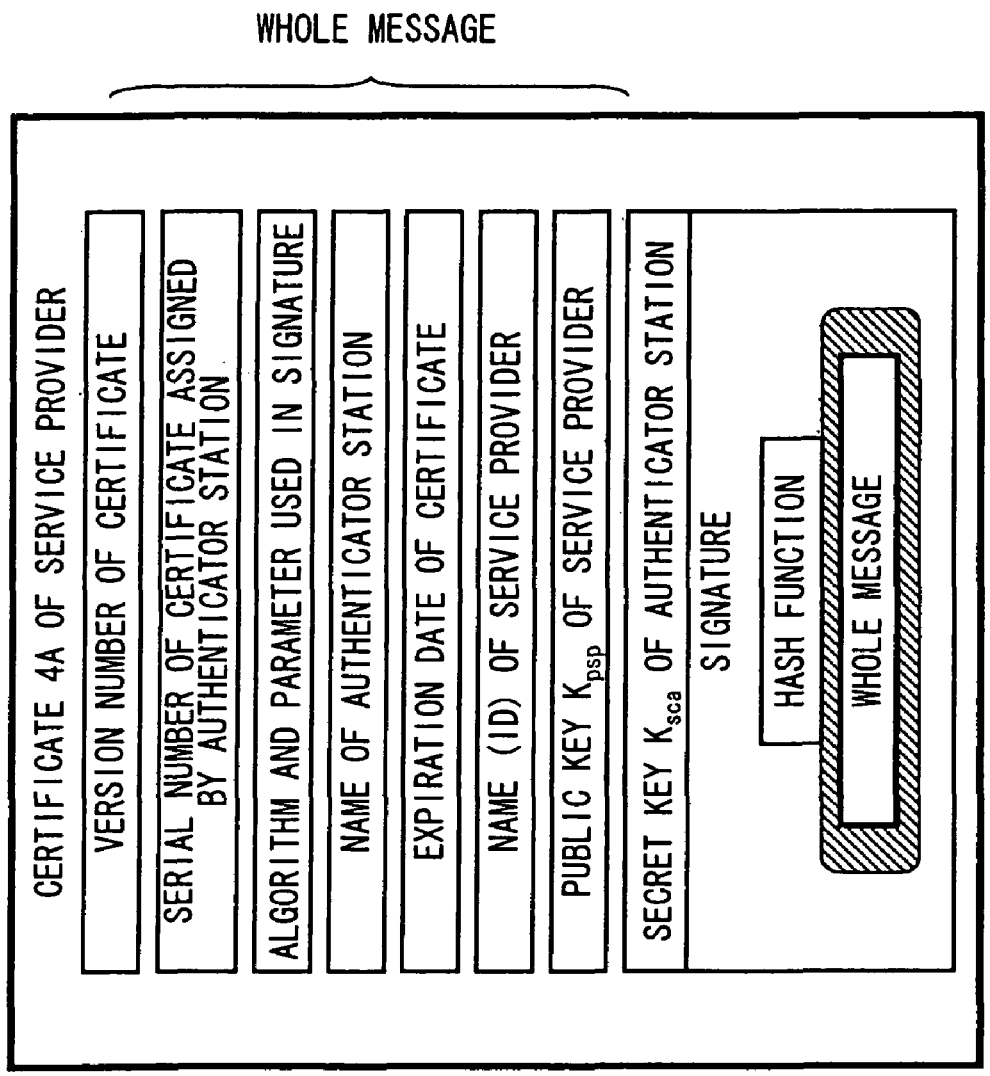
FIG. 31 is a schematic diagram showing the public key certificate of the service provider.

FIG. 31 explains the public key certificate of the service provider 3. The public key certificate 4A of the service provider 3 includes the version number of the public key certificate, the serial number of the public key certificate that the authenticator station assigns to the service provider 3, the algorithm and the parameter used for the signature, the name of the authenticator station, the expiration data of the public key certificate, the name of the service provider 3, the public key $K_{psp}$ of the service provider 3, and the signature. The signature is data generated by using the secret key $K_{sca}$ of the authenticator station with the hash value generated by applying the hash function to the version number of the public key certificate, the serial number of the public key certificate that the authenticator station assigns to the service provider 3, the algorithm and the parameter used for the signature, the name of the authenticator station, the expiration data of the public key certificate, the name of the service provider 3, and the public key $K_{psp}$ of the service provider 3.

Figure 32:
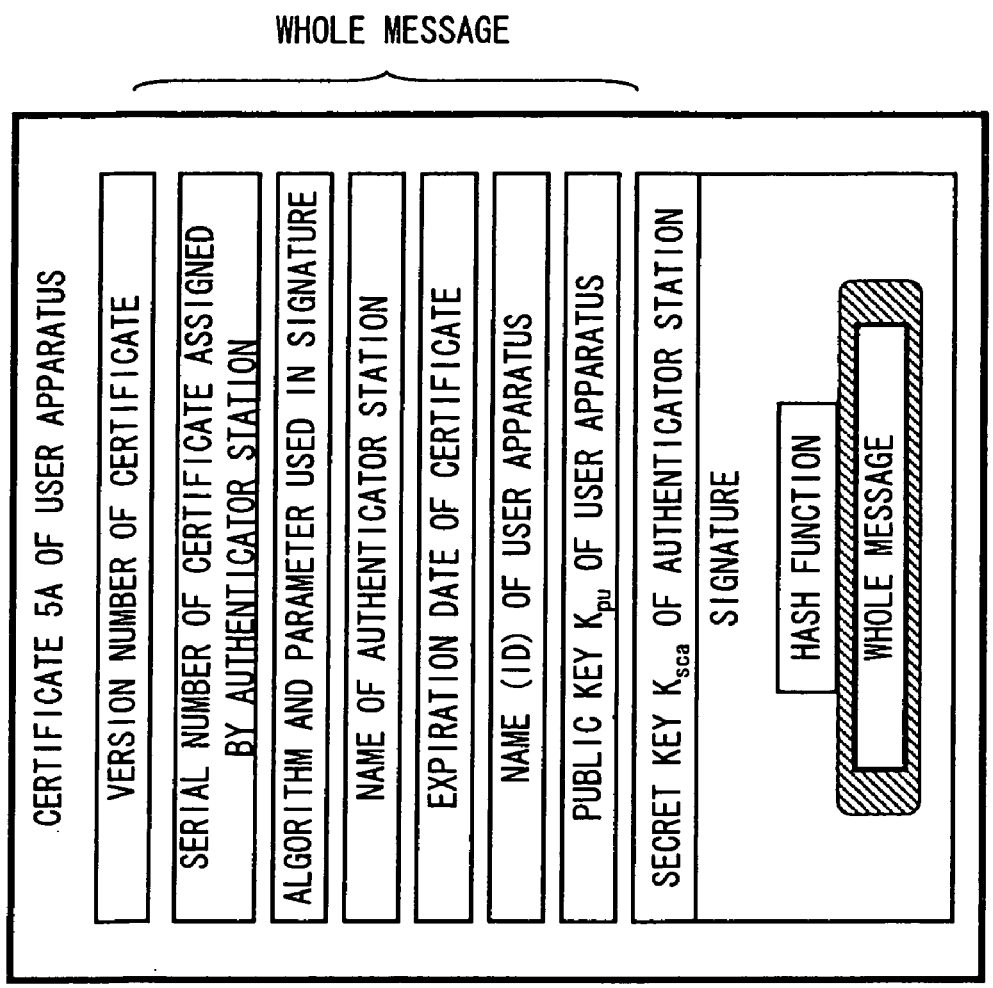
FIG. 32 is a schematic diagram showing the public key certificate of a user apparatus.

FIG. 32 explains the public key certificate of a User device. The public key certificate 5A of the User device includes the version number of the public key certificate, the serial number of the public key certificate that the authenticator station assigns to the User device (to be precise, the cipher processing portion (a dedicated IC chip)), the algorithm and the parameter used for the signature, the name of the authenticator station, the expiration date of the public key certificate, the name of the User device, the public key $K_{pu}$ of the User device, and the signature. The signature is data generated by using the secret key $K_{sca}$ of the authenticator station with the hash value generated by applying the hash function to the version number of the public key certificate, the serial number of the public key certificate that the authenticator station assigns to the User device, the algorithm and the parameter used for the signature, the name of the authenticator station, the expiration date of the public key certificate, the name of the User device, and the public key $K_{pu}$ of the User device.

FIG. 33 and FIG. 34 show data formats of the handling policy, the handling policy is generated by the content provider 2 for each of single contents and each of album contents, and the user home network 5 shows the contents of right that can be purchased.

In the data of the handling policy for the single contents (FIG. 33) are stored a data type, the type of the handling policy, the expiration date of the handling policy, the ID of the contents, the ID of the content provider, the ID of the handling policy, the version of the handling policy, an area code, usable apparatus conditions, usable User conditions, the ID of the service provider, generation management information, the number of rules including purchasable usage right indicated by the handling policy, address information indicating the position for storing the rule, the rule stored at the position indicated by the address information, the public key certificate, and the signature.

And, the rule is constituted by a rule number added as a reference number for each usage right, a usage right content number indicating the contents of usage right, its parameter, a minimum selling price, an amount of benefits of the content provider, a rate of benefits of such content provider, a data size, and sending information.

Also, in the data of the handling policy for the album contents (FIG. 34) are stored a data type, the type of the handling policy, the expiration date of the handling policy, the ID of the album, the version of the handling policy, the ID of the content provider, the ID of the handling policy, an area code, usable apparatus conditions, usable User conditions, the ID of the service provider, the number of handling policies of the single contents constituting the album, address information indicating the position for storing the handling policy of the single contents, data packets of the handling policy of the single contents stored at the position indicated by such address information, generation management information, the number of rules including purchasable usage right indicated by such handling policy, address information indicating the position for storing the rule, the rule stored at the position indicated by the address information, the public key certificate, and the signature.

And, as in the case of the rule of the handling policy of the single contents, the rule is constituted by a rule number added as a reference number for each usage right, a usage content number, a parameter, a minimum selling price, an amount of benefits of the content provider, a rate of benefits of such content provider, a data size, and sending information.

In the handling policy, the data type shows that the data is data of the handling policy, and the type of the handling policy shows that the handling policy is a handling policy of the single or album contents. The expiration of the handling policy indicates the time period over which the handling policy is used, by a date on which the time period ends, or by the number of consecutive days between the specified date when starting to use the handling policy and the date when the expiration date is reached. The ID of the contents and the ID of the album show the purchasable single contents and album contents indicated by the handling policy, and the ID of the content provider represents the ID of the content provider 2 that has defined the handling policy.

Also, the ID of the handling policy is for identifying the handling policy, and is used for identifying the handling policy, for example when a plurality of handling policies are defined for the same contents, and so on. The version of the handling policy shows the revision information of the handling policy revised in accordance with the period over which the handling policy is used. Thus, the handling policy is managed using the ID of the handling policy and the version of the handling policy.

The area code indicates areas where the handling policy can be used by coding them, and to the area code may be assigned a code indicating specific areas, which defines areas where the handling policy can be used, and a code allowing the handling policy to be used in all areas. The usable apparatus condition represents conditions of apparatuses capable of using the handling policy, and the usable User condition represents conditions of the user capable of using the handling policy.

The ID of the service provider represents the ID of the service provider 3 that uses the handling policy, the ID of the service provider comprises the ID of the specific service provider 3 defining the service provider 3 capable of using the handling policy, and the ID allowing the handling policy to be used by a plurality of (all) service providers.

Furthermore, the generation management information shows a maximum number of instances where the contents can be repurchased. The signature is added to the handling policy from which the signature is removed, that is entire range of from the data type to the public key certificate. The algorithm and the parameter used when the signature is created and the key for use in verification of the signature are included in the public key certificate.

Also, in the rule, the usage right content number is a number added for each usage right contents, and the parameter represents a parameter of the right contents. The minimum selling price represents a minimum selling price when the single and album contents are sold in accordance with the usage right contents, and the amount and rate of benefits of the content provider represent an amount of benefits and a rate of benefits to the selling price, which the content provider 2 can obtain when the single contents and album contents are purchased. The data size represents a data size of sending information, and such sending information is constituted by points to be added to the user from the purchase of usage right, defined by the content provider, mile information consisting of discounts appropriate to such points, and various kinds of information defined by the content provider 2 as necessary.

Here, in the handling policy of the album contents, a plurality of rules represents purchase patterns of the album contents. Also, in the handling policy of a plurality of single contents stored in the handling policy of the album contents, rules stored in the handling policy represent purchase patterns of single contents in the album, in which each corresponding single contents can be purchased separately as a single music out of the album, or the corresponding single contents can be purchased only as an album music (That is, it can be purchased only together with other contents as an album).

Thus, the handling policy of the album contents are defined so that either the album contents or the single contents sellable as single music can be selected and purchased, such that the album contents are purchased based on rules of the handling policy of the album contents, or the single contents are purchased as a single music based on rules of the handling policy of the single contents.

Also, in the handling policy of the album contents, the signature is added to the whole, whereby a tamper check for the handling policy of each single contents together with the handling policy of the album contents can be performed only by verifying the signature, without verifying the signature of the handling policy of the single contents stored in the handling policy of the album contents, thus making it possible to simplify verification of the signature.

In this connection, in the handling policy of the single and album contents can be stored presence or absence of verification of the signature representing whether or not verification of the signature for contents is carried out, as required. This is because the amount of data of the contents is relatively large and much time is needed for verifying the signature, and in the case where information about the presence or absence of the verification of the signature related to the handling policy is stored, the verification of the signature of the contents is performed in accordance with such information, or such verification is not carried out.

Also, in the handling policy of the album contents, the handling policy of a plurality of single contents constituting the album is stored, but the handling policy of these plurality of single contents is not necessarily stored.

Furthermore, in the handling policy of the single and album contents, since the amount and rate of benefits of the content provider may be managed together by the electronic distribution service center 1, the amount and rate of benefits of the content provider may be removed to make a configuration, as shown in FIG. 35 and FIG. 36.

FIG. 37 and FIG. 38 show data formats of price information, and the price information, which is generated for each handling policy of the single contents and each handling policy of the album contents given from the content provider 2 in the service provider 3, represents the prices of the single contents and album contents.

In the data of price information for the single contents (FIG. 37) are stored a data type, the type of price information, the expiration date of the price information, ID of the contents, ID of the service provider, ID of the price information, the version of the price information, an area code, usable apparatus conditions, usable User conditions, the ID of the content provider, the ID of the handling policy to which such price information is added, the number of rules including purchasable usage right indicated by such price information, address information indicating the position for storing the rule, the rule stored at the position indicated by the address information, the public key certificate, and the signature.

And, the rule is constituted by a rule number added as a reference number for each usage right, the amount of benefits of the service provider, the rate of benefits of the service provider, a price, a data size, and sending information.

Also, in the data of price information for the album contents (FIG. 38) are stored a data type, the type of price information, the expiration date of the price information, the ID of the album, the ID of the service provider, the ID of the price information, the version of the price information, an area code, usable apparatus conditions, usable User conditions, the ID of the content provider, the ID of the handling policy to which such price information is added, the number of price information of the single contents constituting the album, address information indicating the position for storing the price information of the single contents, a data packet of the price information of the single contents stored at the position indicated by such address information, the number of rules including purchasable usage right indicated by such price information, address information indicating the position for storing the rule, the rule stored at the position indicated by such address information, the public key certificate, and the signature.

And, the rule is constituted by a rule number added as a reference number for each usage right, the amount of benefits of the service provider, the rate of benefits of the service provider, a price, a data size, and sending information, as in the case of the rule of the price information for the single contents.

In the price information, the data type shows that the data is data of the price information, the type of the price information shows that such price information is price information of the single or album contents. The expiration of the price information indicates the time period over which the price information is used, by a date on which the time period ends, or by the number of consecutive days between the specified date when starting to use the price information and the date when the expiration date is reached. The ID of the contents and the ID of the album show the purchasable single contents and album contents indicated by the price information, and the ID of the service provider represents the ID of the service provider 3 that has created the price information.

Also, the ID of the price information is for identifying such price information, and is used for identifying the price information, for example when a plurality of price information is defined for the same contents, and so on. The version of the price information shows the revision information of price information revised in accordance with the period over which the price information is used. Thus, price information is managed using the ID of the price information and the version of the price information.

The area code indicates areas where the price information can be used by coding them, and to such a code may be assigned a code indicating specific areas, which defines areas where the price information can be used, and a code allowing the price information to be used in all areas. The usable apparatus condition represents conditions of apparatuses capable of using the price information, and the usable User condition represents conditions of the user capable of using the price information. The ID of the content provider represents ID of the content provider 2 that has defined the handling policy to which the price information is added. The ID of the handling policy is for identifying the handling policy to which the price information is added.

Furthermore, the signature is added to the handling policy from which the signature is removed, that is entire range of from the data type to the public key certificate. The algorithm and the parameter used when the signature is created and the key for use in verification of the signature are included in the public key certificate.

Also, as for the rule number, in the rule, the rule number of the rule indicated by the corresponding handling policy is used directly. The amount and rate of benefits of the service provider represent the amount of benefits and the rate of benefits to the price, which the service provider 3 can obtain when the single contents and album contents are purchased, and the price represents the selling price of the single contents and album contents defined by the service provider 3 based on the usage right contents and the corresponding minimum selling price. The data size represents a data size of sending information, and such sending information is constituted by points to be added to the user from the purchase of usage right, defined by the service provider 3, mile information consisting of discounts appropriate to such points, and various kinds of information defined by the service provider 3 as necessary.

Here, when generating price information, the service provider 3 can define all purchasable usage rights indicated by the corresponding handling policy as the purchasable usage right indicated by such price information, and also define usage right selected optionally from all purchasable usage rights indicated by the handling policy as the purchasable usage right indicated by the price information, and can select the usage right defined by the content provider 2.

Also, in the price information of the album contents, a plurality of rules define selling prices appropriate to purchase patterns of album contents. Also, the rule of the price information of single contents that can be sold as single music, of price information of a plurality of single contents stored in the price information of the album contents, defines selling prices of single contents that can be sold as such single music.

Thus, in the price information of the album contents, adaptation is made so that the selling price of the album and the selling price of the single contents that can be purchased as single music can be recognized with such single price information.

Also, in the price information of the album contents, the signature is added to the whole, whereby a tamper check for the price information of each single contents together with the price information of the album contents, and so on can be performed only by verifying the signature, without verifying one by one the signature of the single contents stored in this price information, thus making it possible to simplify the verification of the signature.

In this connection, in the price information of the single and the album, presence or absence of verification of the signature for the contents may be stored as in the case of the handling policy described in terms of FIG. 33 and FIG. 34. Also, in the price information of the album contents, the price information of plurality of single contents constituting the album is stored, but the price information of the plurality of single contents is not necessarily stored.

Furthermore, in the price information of the single and album contents, since the amount and rate of benefits of the service provider may be managed together by the electronic distribution service center 1, the amount and rate of benefits of the service provider may be removed to make a configuration, as shown in FIG. 39 and FIG. 40.

FIG. 41 shows a data format of license condition information, and such license condition information is created based on the handling policy of the purchased contents when the user purchases the contents, in the apparatus of the user home network 5, and represents the usage right contents selected by the user of usage right contents indicated by this handling policy.

In the data of the license condition information are stored a data type, the type of license condition information, the expiration date of the license condition information, the ID of the contents, the ID of the album, the ID of the cipher processing portion, the ID of the user, the ID of the content provider, the ID of the handling policy, the version of the handling policy, the ID of the service provider, the ID of price information, the version of the price information, the ID of the license condition information, a rule number added to playback right (usage right) as a reference number, a usage right content number, the number of remaining playbacks, the expiration date of the playback right, a rule number added to replication right (usage right) as a reference number, a usage right content number, the number of remaining replications, generation management information, and the ID of the cipher processing portion retaining the playback right.

In the license condition information, the data type shows that this data is data of the license condition information, and the type of the license condition information shows which license condition information of single contents or album contents such license condition information is. The expiration date of the license condition information shows the period over which such license condition information is used, by a date on which the time period ends, or by the number of consecutive days between the specified date when starting to use the license condition information and the date when the expiration date is reached.

The ID showing the purchased single contents for the ID of the contents, and for the ID of the album, the ID indicating the album is described only when the album is purchased. In fact, in the case where contents are purchased as a single, the ID indicating the purchased single contents is described only for the ID of the contents, and in the case where the contents are purchased as an album, the IDs of all single contents constituting the purchased album are described for the ID of the contents, and the ID indicating the purchased album is described for the ID of the album. Thus, if seeing the ID of the album, whether the purchased contents are a single or an album can be determined easily.

The ID of the cipher processing portion indicates the cipher processing portion of the apparatus in the user home network 5 that has performed purchase processing of content. The ID of the user indicates a plurality of users sharing the apparatus when a plurality of users shares the apparatus in the user home network 5 that has purchased the contents.

Also, the ID of the content provider represents the ID of the content provider 2 that has defined the handling policy used for creating license condition information, and the ID of the handling policy indicates the handling policy used for creating such license condition information. The version of the handling policy indicates revision information of the handling policy used for creating the license condition information. The ID of the service provider represents the ID of the service provider 3 that has created price information used for creating the license condition information. The ID of the price information indicates price information used for creating such license condition information. The version of the price information indicates revision information of the handling policy used for creating the license condition information. Thus, by the ID of the content provider, the ID of the handling policy, the version of the handling policy, the ID of the service provider, the ID of price information and the version of price information, the content provider 2 or the service provider 3 that has provided the content purchased by the user can be known.

The ID of license condition information is an ID that the cipher processing portion of the apparatus in the user home network 5 adds, and is used for identifying such license condition information. The rule number of playback right represents a reference number added to the playback right out of usage right, for which the rule number of the rule indicated by the corresponding handling policy and price information is used directly. The usage right contents represent the contents of playback right described later. The number of remaining playbacks represents the number of remaining playbacks out of the number of playbacks defined in advance for the purchased contents, and the expiration date of playback right indicates the period over which the purchased contents can be played back, with the date when the period ends, and so on.

Also, the rule number of replication right represents a reference number added to the replication right out of usage right, for which the rule number of the rule indicated by the corresponding handling policy and price information is used directly. The usage right contents represent the contents of replication right described later. The number of remaining replications represents the number of remaining replications out of the number of replications defined in advance for the purchased contents.

Furthermore, the generation management information indicates the number of instances where contents can be repurchased when the contents are repurchased. The ID of the cipher processing portion possessing playback right indicates the cipher processing portion possessing playback right at this point in time, and the ID of the cipher processing portion possessing the playback right is changed when management transfer is performed.

In this connection, in the license condition information, the expiration date may be defined for replication right, and in the case where the expiration date is defined, the period over which the purchased contents can be replicated is indicated with the date when the period ends, and so on.

FIG. 42 shows accounting information, and such accounting information is generated by the apparatus in the user home network 5, based on the handling policy and price information corresponding to the contents, when the contents are purchased.

In the data of accounting information are stored a data type, the ID of the cipher processing portion, the ID of the user, the ID of the contents, the ID of the content provider, the ID of the handling policy, the version of the handling policy, the ID of the service provider, the ID of price information, the version of the price information, the ID of the license condition information, a rule number, the amount and rate of benefits of the content provider 2, the amount and rate of benefits of the service provider, generation management information, a data size of sending information defined by the content provider, the sending information defined by the content provider, a data size of sending information defined by the service provider, the sending information defined by the service provider, and the ID of a supplier.

In the accounting information, the data type shows that the data is accounting information, and the ID of the cipher processing portion indicates the cipher processing portion of the apparatus that has carried out content purchase processing to generate such accounting information. The ID of the user indicates a plurality of users sharing the apparatus when the plurality of users shares the apparatus in the user home network 5 that has purchased the contents, the ID of the contents indicates the purchased contents (single contents or album contents).

Also, the ID of the content provider represents the ID of the content provider 2 that has defined the handling policy used for purchase processing (ID of the content provider included in this handling policy), the ID of the handling policy indicates the handling policy used for such purchase processing. The version of the handling policy indicates revision information of the handling policy used for purchase processing.

The ID of service provider represents the ID of the service provider 3 that has created the price information used for purchase processing (ID of the service provider included in this price information), and the ID of price information indicates the price information used for such purchase processing. The version of price information indicates revision information of the price information used for purchase processing.

The ID of license condition information represents the ID of the license condition information created at the time of purchase processing, and the rule number represents a rule number added as a reference number to purchased usage right. The amount and rate of benefits of content provider represent the amount and ratio to the sales of a dividend allocated to the content provider 2 from the purchase of the contents, and the amount and rate of benefits of the service provider represent the amount and ratio to the sales of a dividend allocated to the service provider 3 from the purchase of the contents.

Furthermore, the generation management information represents the generation of the purchased contents. Also, for the data size of sending information defined by the content provider and the sending information defined by the content provider are stored the data size indicated by the handling policy used for purchase processing, and the sending information itself, and for the data size of sending information defined by the service provider and the sending information defined by the service provider are stored the data size indicated by the price information used for purchase processing, and the sending information itself. And, the ID of the supplier indicates the apparatus of the supplier of the contents subjected to purchase processing, and this ID is accumulated each time repurchase of contents is performed.

In this connection, in the accounting information, since the amount and rate of benefits of the content provider, and the amount and rate of benefits of the service provider may be managed together by the electronic distribution service center 1, the amount and rate of benefits of the content provider and the amount and rate of benefits of the service provider may be removed to make a configuration, as shown in FIG. 43.

FIG. 44 shows contents of purchasable usage right, and such usage right, if broadly classified, includes playback right, replication right, right content changing right, repurchase right, additional purchase right and management transfer right.

The playback right includes open-ended playback right with no limit on the period and the number of times, playback right with limit on period in which there is limit on the playback period, playback right with limit on total time in which there is limit on total time of playback, and playback with limit on the number of times in which there is limit on the number of playbacks. The replication right includes open-ended replication right without copy management information, in which there is no limit on the period, no limit on the number of times, and no copy management information (for example, serial copy management: SCMS), replication right with limit on the number of times and without copy management information, in which there is limit on the number of replications but there is no copy management information, replication with copy management information in which there is no limit on the period and the number of times but copy management information is added and provided, and replication right with limit on the number of times and copy management information in which there is limit on the number of times and copy management information is added and provided. In this connection, the replication right includes, in addition, replication right with limit on the period in which there is limit on the period over which replication is possible (including replication right in which copy management information is added, and replication right in which such copy management information is not added), and replication right with limit on total time in which there is limit on total time of replication (namely, total time needed for playing back the replicated contents) (including replication right in which copy management information is added, and replication right in which such copy management information is not added), and so on.

Also, the right content changing right is a right to change the contents of usage right already purchased to other contents as described above, and the repurchase right is a right to purchase usage right separately based on the right purchased by another apparatus as described above. The additional purchase right is a right to purchase in addition to the contents already purchased separately other contents of the album including the contents to integrate them into an album, and the management transfer right is a right to transfer the purchased usage right to change the owner.

Now, specific examples of usage right contents as shown in FIG. 33 and the like. In fact, for the data of open-ended playback right, as shown in FIG. 45 (A), information of the expiration date of the playback right indicating the effective period of the playback right by the date on which the period ends, or by the number of consecutive days between the specified day when the effective period starts and the day when the period ends, and so on, is stored in the region of the usage right contents. For the data of playback right with limit on the period, as shown in FIG. 45 (B), information of the playback right indicating the effective period of the playback right by the date on which the period ends, or by the number of consecutive days between the specified day when the effective period starts and the day when the period ends, and so on, is stored in the region of the usage right contents.

For the data of playback right with limit on total time, as shown in FIG. 45 (C), information of the expiration date of the playback right indicating the effective period of the playback right by the date on which the period ends, or by the number of consecutive days between the specified day when the effective period starts and the day when the period ends, and so on, and information of the number of days and time indicating limit on the total time over which playback can be performed are stored in the region of the usage right contents. For the data of playback right with limit on the number of times, as shown in FIG. 45 (D), information of the expiration date of the playback right indicating the effective period of the playback right by the date on which the period ends, or by the number of consecutive days between the specified day when the effective period starts and the day when the period ends, and so on, and information of the number of playbacks indicating the number of instances where playback can be performed are stored in the region of the usage right contents.

Also, for the data of open-ended replication right without copy management information, as shown in FIG. 45 (E), information of the expiration date of the replication right indicating the effective period of the replication right by the date on which the period ends, or by the number of consecutive days between the specified day when the effective period starts and the day when the period ends, and so on, is stored in the region of the usage right contents. For the data of replication right with limit on the number of times and without copy management information, as shown in FIG. 45 (F), information of the expiration date of the replication right indicating the effective period of the replication right by the date on which the period ends, or by the number of consecutive days between the specified day when the effective period starts and the day when the period ends, and so on, and information of the number of replications indicating the number of instances where replication can be performed are stored in the region of the usage right contents.

For the data of replication with copy management information, as shown in FIG. 45 (G), information of the expiration date of the replication right indicating the effective period of the replication right by the date on which the period ends, or by the number of consecutive days between the specified day when the effective period starts and the day when the period ends, and so on, is stored in the region of the usage right contents. For the data of replication right with limit on the number of times and copy management information, as shown in FIG. 45 (H), information of the expiration date of the replication right indicating the effective period of the replication right by the date on which the period ends, or by the number of consecutive days between the specified day when the effective period starts and the day when the period ends, and so on, and information of the number of instances where replication can be performed are stored in the region of the usage right contents.

Furthermore, for the data of right content changing right, as shown in FIG. 45 (I), information of the expiration date of the right content changing right indicating the effective period of the right content changing right by the date on which the period ends, or by the number of consecutive days between the specified day when the effective period starts and the day when the period ends, and so on, a former rule number for retrieving the usage right contents before it is changed, and a new rule number for retrieving the usage right contents after it is changed are stored in the region of the usage right contents. In this connection, if solely considering the replication right with limit on the period, as the usage right contents, for: example, two or more kinds of contents exist for each usage right contents so that two or more kinds of replication rights with limit on the period depending on the definition of the period. Thus, since the usage right contents can be hardly managed with the usage right content number alone, in the right content changing right, the usage right contents are managed with the rule number added for each plurality of contents.

For the data of repurchase right, as shown in FIG. 45 (J), information of the expiration date of the repurchase right indicating the effective period of the repurchase right by the date on which the period ends, or by the number of consecutive days between the specified day when the effective period starts and the day when the period ends, and so on, a former rule number for retrieving the usage right contents before it is changed, a new rule number for retrieving the usage right contents after it is changed, and maximum distribution generation information indicating the maximum number of instances where repurchase can be performed are stored in the region of the usage right contents.

For the data of additional purchase right, as shown in FIG. 45 (K), information of the expiration date of the additional purchase right indicating the effective period of the additional purchase right by the date on which the period ends, or by the number of consecutive days between the specified day when the effective period starts and the day when the period ends, and so on, and the minimum number of possessed contents and the maximum number of possessed contents indicating the contents of the single already purchased, out of a plurality of single contents constituting the album contents, are stored in the region of the usage right contents.

For the data of management transfer right, as shown in FIG. 45 (L), information of the expiration date of the management transfer right indicating the effective period of the management transfer right by the date on which the period ends, or by the number of consecutive days between the specified day when the effective period starts and the day when the period ends, and so on, is stored in the region of the usage right contents.

In this connection, as the usage right contents, content purchase right to purchase contents in accordance with a predetermined order when data of games are divided into a plurality of contents may be defined, for example. And, for the data of content purchase right, as shown in FIG. 45 (M), information of the expiration date of the content purchase right indicating the effective period of the content purchase right by the date on which the period ends, or by the number of consecutive days between the specified day when the effective period starts and the day when the period ends, and so on, the ID of the contents already purchased, a former rule number for retrieving the contents of the usage right that has been already purchased, and a new rule number for retrieving the contents of the usage right contents that is newly purchased are stored in the region of the usage right contents. In this way, it is possible to have game programs having consecutive stories and so on purchased by the user, and upgrade the contents (game) themselves.

FIG. 46 shows a data format of the single contents, and in the data of the single contents are stored a data type, the type of contents, the expiration date of the contents, the category of the contents, the ID of the contents, the ID of the contents provider, the cryptosystem of the contents, the data length of the encrypted contents, the encrypted contents, the public key certificate and the signature.

In the single contents, the data type shows that the data is data of the contents, the type of contents shows that the contents are single. The expiration date of the contents indicates the period set for distribution by the date on which the period ends, or by the number of consecutive days between the specified day when distribution is started and the day when the period ends, and so on. The category of the contents shows which category the contents belong to, such as music data, program data, image data, and the ID of the contents is for identifying these single contents.

The ID of the content provider represents the ID of the content provider 2 possessing these single contents. The cryptosystem of contents represents a cryptosystem for use in encryption of contents (for example, DES). The signature is added to the data of the single contents from which the signature is removed, namely entire range of from the data type to the public key certificate. The algorithm and the parameter used when the signature is created, and the key for use in verification of the signature are included in the public key certificate.

Also, FIG. 47 shows a data format of the album contents, and in the data of the album contents are stored a data type, the type of contents, the expiration date of the contents, the ID of the album, the ID of the content provider, the number of single contents, address information of the single contents, the single contents, the public key certificate and the signature.

In this album contents, the data type shows that the data is data of the contents, and the type of the content shows that the contents are an album. The expiration date of the contents indicates the period set for distribution of the contents by the date on which the period ends, or by the number of consecutive days between the specified day when distribution is started and the day when the period ends, and so on, and the ID of the album is for identifying this album contents.

The ID of the content provider represents the ID of the content provider 2 possessing this album contents. The number of single contents represents the number of single contents constituting the album, the address information of the single contents indicates the position for storing the single contents constituting the album, and the single contents are a data packet of a plurality of single contents constituting this album, which is actually stored at the position indicated by the address information. Also, the signature is added to the entire data of the album contents from the data type to the public key certificate except for the signature. The algorithm and the parameter used when the signature is created, and the key for use in verification of the signature are included in the public key certificate.

And, in the album contents, the signature is added to the whole, whereby a tamper check for each single contents together with these album contents, and so on can be performed only by verifying the signature, without verifying one by one the signature of the single contents stored in this album contents, thus making it possible to simplify the verification of the signature.

FIG. 48 shows a data format of the key for the single contents, and in the key data for the single contents are a data type, the type of key data, the expiration date of the key, the ID of the contents, the ID of the content provider, the version of the key, the cryptosystem of the content key $K_{co}$, the encrypted content key $K_{co}$, the cryptosystem of the individual key $K_i$, the encrypted individual key $K_i$, the public key certificate, and the signature.

In the key data for the single contents, the data type shows that this data is data of the key, the type of key data shows that the key data is for the single contents. The expiration date of the key indicates the period of use of the key shown in the key data (content key $K_{co}$ and individual key $K_i$) by the date on which the period ends, or by the number of days between the specified day when using the key and the day when the period ends, and so on, and the ID of the contents indicates the single contents which is encrypted with the content key $K_{co}$. The ID of the content provider represents the ID of the content provider 2 that possesses the contents and has generated the content key $K_{co}$.

The version of the key indicates revision information of the key (content key $K_{co}$ and individual key $K_i$) revised in accordance with the period of use. The cryptosystem of the content key $K_{co}$ represents a cryptosystem in the case of encrypting the content key $K_{co}$ using the individual key $K_i$ (for example, DES), and the encrypted content key $K_{co}$ represents the content key $K_{co}$ encrypted by means of the cryptosystem using the individual key $K_i$. The cryptosystem of the individual key $K_i$ represents a cryptosystem in the case of encrypting the individual key $K_i$ using the distribution key $K_d$ (for example, Triple-DES-CBC), the encrypted individual key $K_i$ represents the individual key $K_i$ encrypted by means of the cryptosystem using the distribution key $K_d$. The signature is added to the data of the single contents from which the signature is removed, namely entire range of from the data type to the public key certificate. The algorithm and the parameter used when the signature is created, and the key for use in verification of the signature are included in the public key certificate.

Here, the distribution key $K_d$ and the individual key $K_i$ are distributed always in combination by key data for the single contents from the content provider 2. And, in the key data for the single contents, one signature is added to the entire data. Thus, at the apparatus receiving the key data for the single contents, there is no need to verify the signature separately for the encrypted content key $K_{co}$ and the encrypted individual key $K_i$, and verification of only one signature of the key data for the single contents results in verification of the signature for the encrypted content key $K_{co}$ and the encrypted individual key $K_i$, thus making it possible to simplify the verification of the signature for the encrypted content key $K_{co}$ and encrypted individual key $K_i$.

Figure 49:
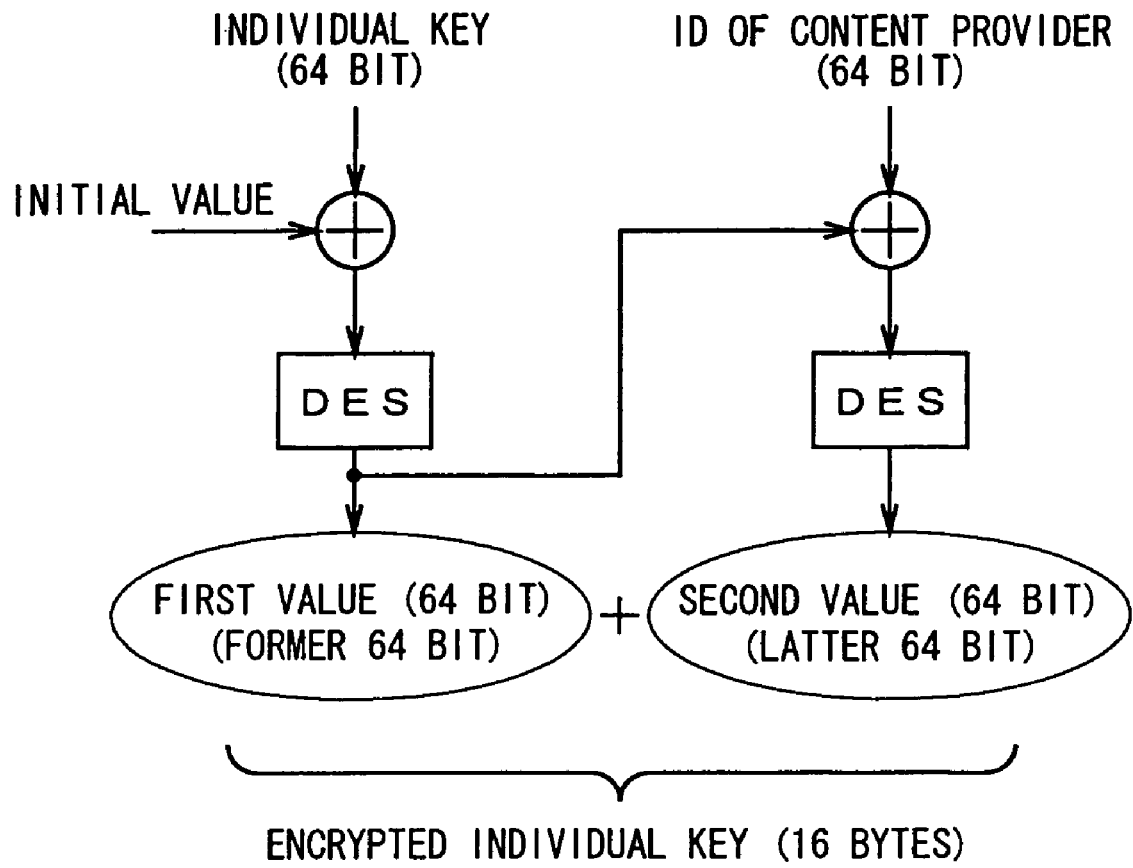
FIG. 49 is a block diagram available for explanation of encryption processing of an individual key.

In this connection, the individual key $K_i$ is encrypted together with the ID of the content provider encrypting the content key $K_{co}$ using the individual key $K_i$. In practice, a method in which the individual key $K_i$ is encrypted together with the ID of the content provider by means of a cryptosystem called a Triple-DES-CBC mode will be described using FIG. 49. That is, in such a cryptosystem, a predetermined initial value and the individual key $K_i$ (64 bits) are connected to each other and are then encrypted with the cryptosystem by the Triple-DES-CBC mode using the distribution key $K_d$, and a first value of 64 bits obtained as a result is connected to the ID of the content provider (64 bits) and is then encrypted again with the cryptosystem by the Triple-DES-CBC mode using the distribution key $K_d$, thus obtaining a second value of 64 bits. And, in such a cryptosystem, data of 16 bytes with the first value and the second value connected to each other is the encrypted individual key $K_i$ to be stored in the key data for the single contents (In this case, the first value is equal to the earlier 64 bit data of the encrypted individual key $K_i$ to be stored in the key data for the single contents, and the second value is the 64 bit data following the first value in the encrypted key $K_i$ to be stored in the key data for the single contents).

Also, FIG. 50 shows key data for the album contents, and in the key data for the album contents are stored a data type, the type of key data, the expiration date of the key, the ID of the album, the ID of the content provider, the version of the key, the number of data for the single contents for use in encryption of single contents constituting the album, address information indicating the position for storing the key data, a key data packet stored at the position indicated by the address information, the public key certificate and the signature.

In the key data of the album contents, the data type shows that this data is data of the key, and the type of key data shows that the key data is for the album contents. The expiration date of the key indicates the period of use of the key (content key $K_{co}$) shown in the key data by the date on which the period ends, or by the number of days between the specified day when starting to use the key and the day when the period ends, and so on, and the ID of the album indicates the album contents consisting of single contents that are encrypted with the content key $K_{co}$. The ID of the content provider represents the ID of the content provider 2 encrypting the album contents.

The version of the key indicates revision information of the revised key (content key $K_{co}$) in accordance with the period of use. The signature is added to the key data for the single contents from which the signature is removed, namely the entire range of from the data type to the public key certificate. The algorithm and the parameter used when the signature is created, and the key for use in verification of the signature are included in the public key certificate.

And, in the key data for the album contents, the signature is added to the whole, whereby a tamper check for key data for each single contents together with key data for the album contents can be performed only by verifying the signature, without verifying one by one the signature of the key data for a plurality of single contents stored in the key data for the album contents, thus making it possible to simplify the verification of the signature.

Figure 51:
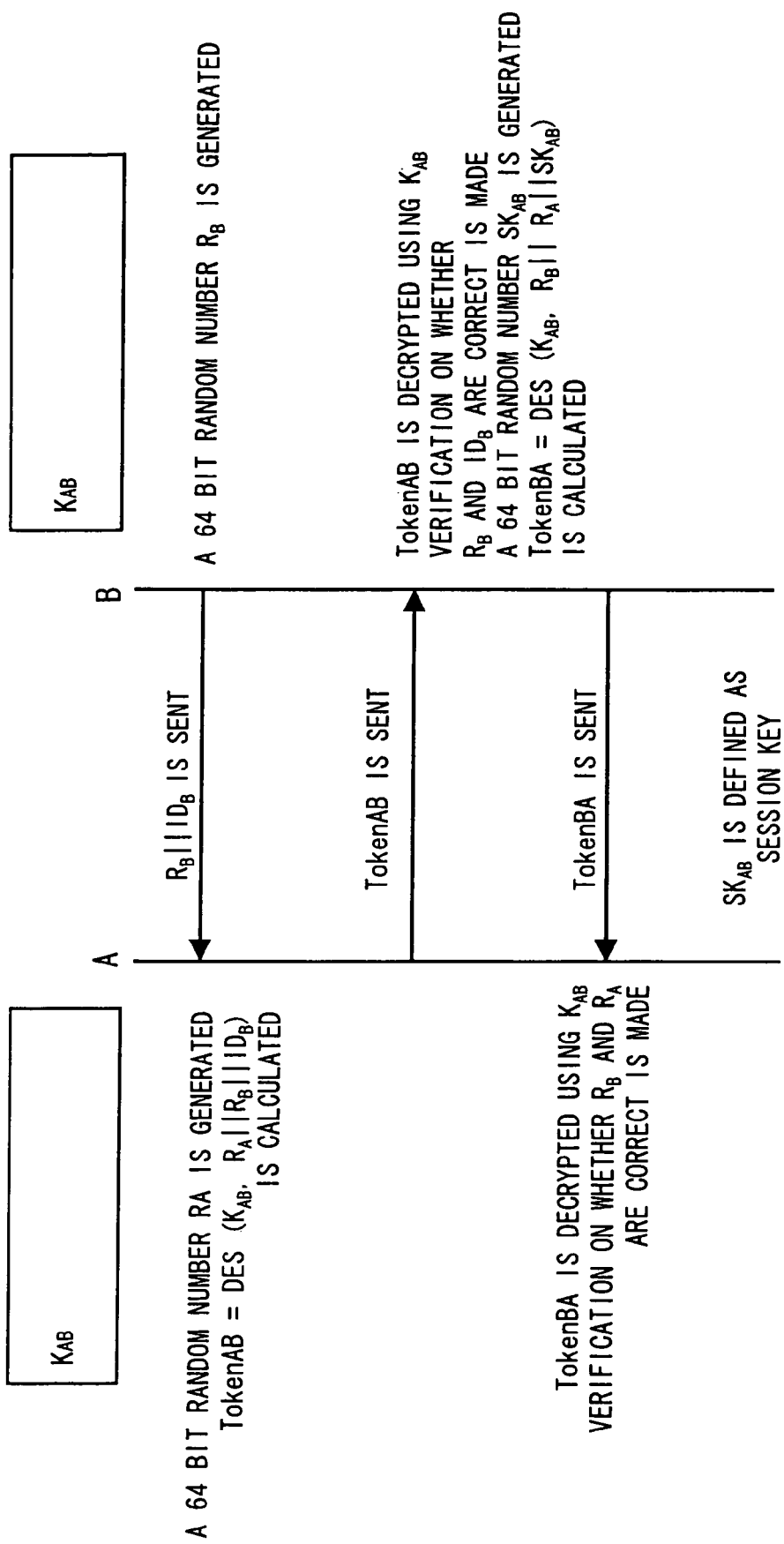
FIG. 51 is a timing chart showing processing of cross authentication using a symmetrical key technique.

FIG. 51 explains operations of cross authentication between the cipher processing portion 65 and the extending portion 66, using a common key cipher that is DES with a single common key. In FIG. 51, assuming that A is the extending portion 66 and B is the cipher processing portion 65, the cipher processing portion 65 generates a 64 bit random number $R_B$, and sends $R_B$ and $ID_B$ that is its own ID to the extending portion 66 via the host controller 62. The extending portion 66, which receives them, newly generates a 64 bit random number $R_A$, encrypts $R_A$, $R_B$ and $ID_B$ with the DES-CBC mode using the key $K_{AB}$, and sends back the same to the cipher processing portion 65 via the host controller 62.

The DES-CBC mode is a technique by which output and input being the last but one is subjected to exclusive disjunction, and is then encrypted. If applied to this example, the following equations hold, and outputs are X, Y and Z.

$$X = DES(K_{AB}, R_A + IV)\ IV = \text{initial value, +:exclusive disjunction}$$

$$Y = DES(K_{AB}, R_B + X)$$

$$Z = DES(K_{AB}, ID_B + Y)$$

In these equations, DES ($K_{AB}$, $R_A$+IV) represents data $R_A$+IV being encrypted with DES using the key $K_{AB}$, DES ($K_{AB}$, $R_B$+X) represents data $R_B$+X being encrypted with DES using the key $K_{AB}$, and DES ($K_{AB}$, $ID_B$+Y) represents data $ID_B$+Y being encrypted with DES using the key $K_{AB}$.

The cipher processing portion 65, which receives this, decrypts the received data with the key $K_{AB}$, and examines whether $R_B$ and $ID_B$ match those sent by the cipher processing portion 65. In the case of passing the examination, the extending portion 66 is authenticated as a correct one. Then, the session key (refers to the temporary key $K_{temp}$, and is generated with a random number) $SK_{AB}$ is generated, and $R_B$, $R_A$ and $SK_{AB}$ are encrypted with the DES-CBC mode using the key $K_{AB}$, and are sent to the extending portion 66 via the host controller 62. The extending portion 66, which receives this, decrypts the received data with the key $K_{AB}$, and examines whether $R_B$ and $R_A$ match those sent by the extending portion 66. In the case of passing this examination, the cipher processing portion 65 is authenticated as correct one, and the data $SK_{AB}$ is used as a session key in following communications. Furthermore, in the case where a fraud or mismatch is found when the received data is examined, processing is suspended considering that the cross authentication is unsuccessful.

Figure 10:
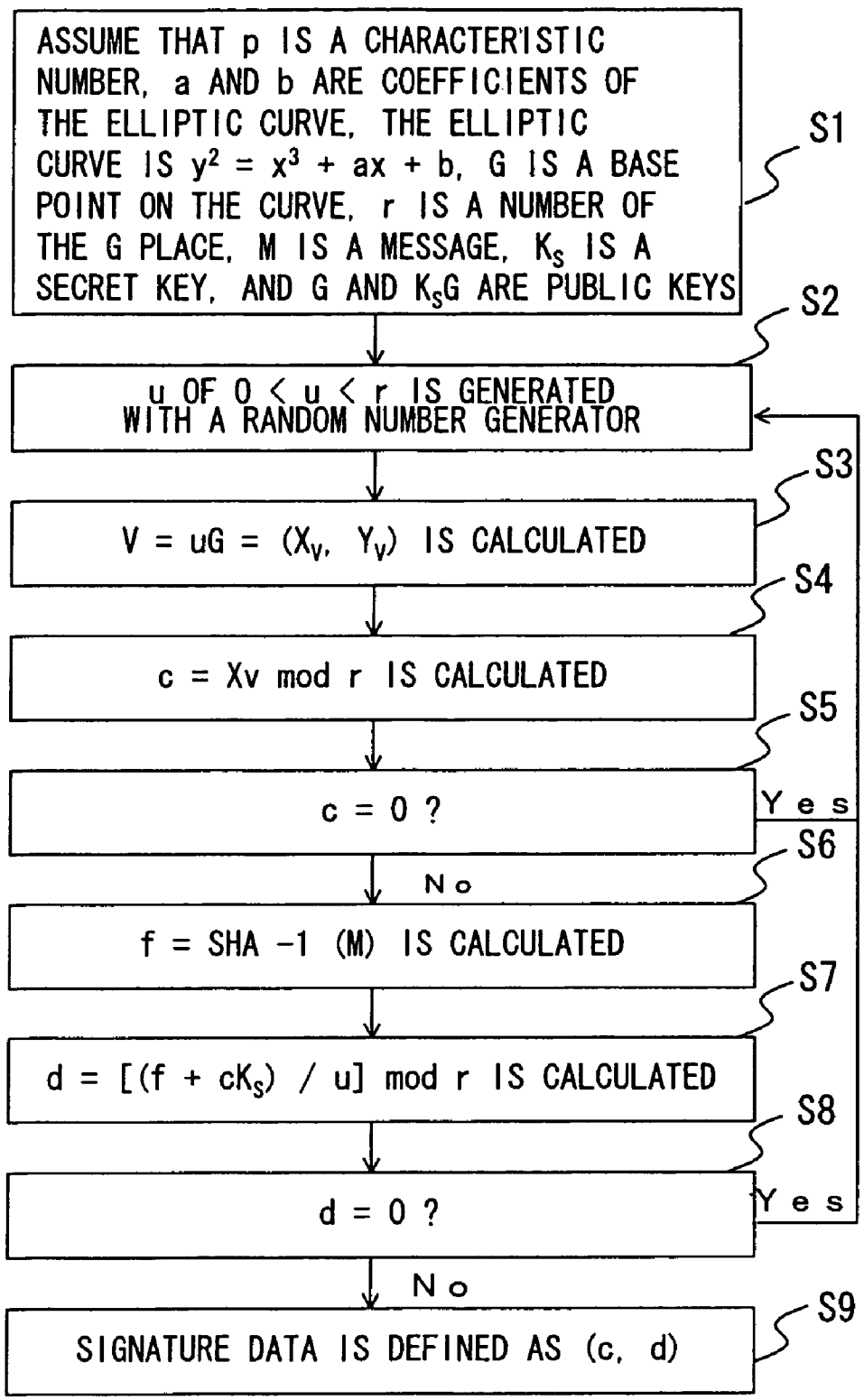
FIG. 10 is a flow chart showing a signature generation procedure.
Figure 52:
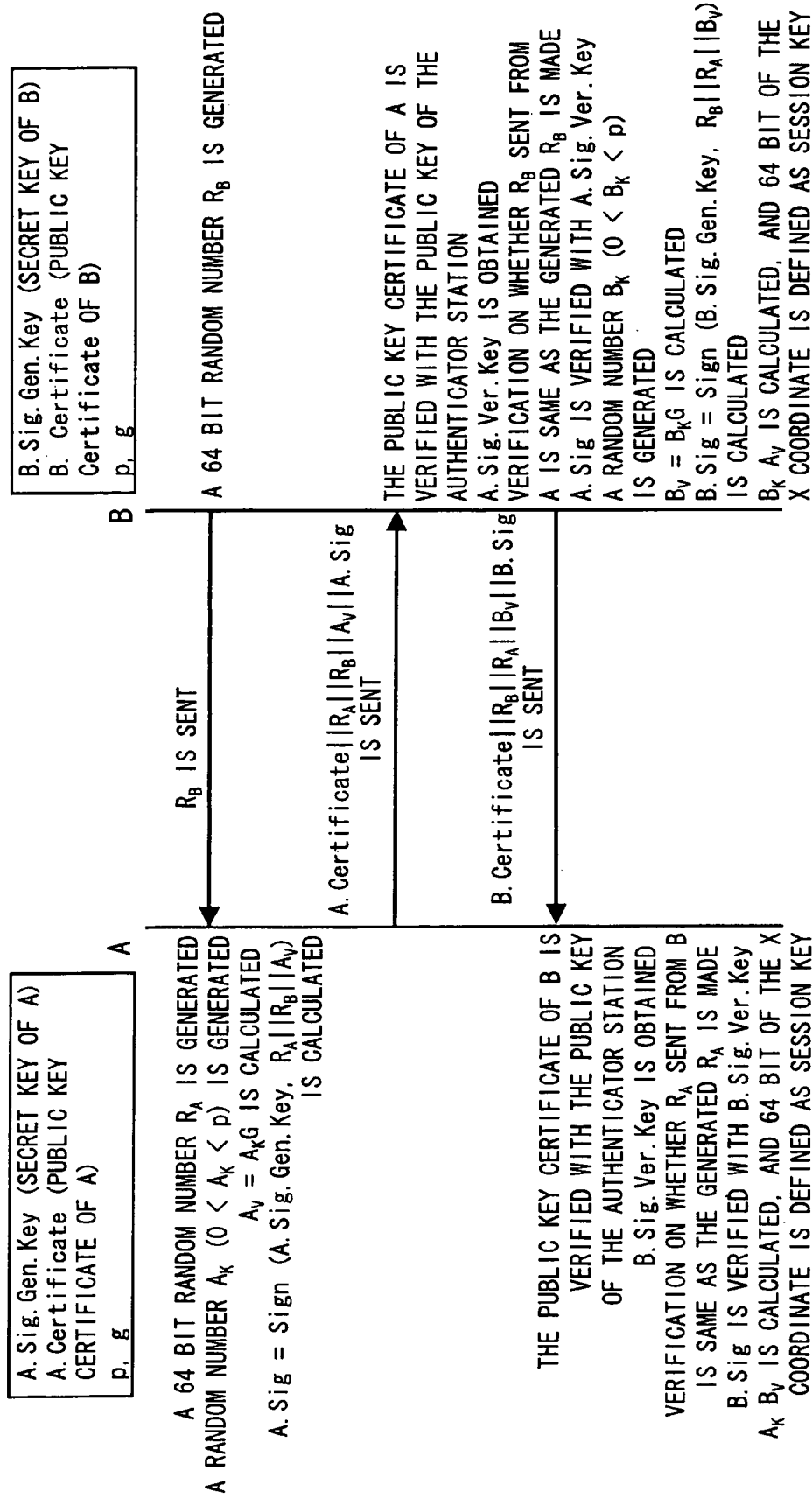
FIG. 52 is a timing chart showing processing of cross authentication using an asymmetrical key encryption technique.

FIG. 52 explains operations of cross authentication between the cross authentication module 95 in the cipher processing portion 65 of the home server 51 and an authentication module (not shown) in the cipher processing portion 73 of the stationary apparatus 52, using an elliptic curve cipher of 160 bit length, which is a public key cipher. In FIG. 52, assuming that A is the cipher processing portion 73 and B is the cipher processing portion 65, the cipher processing portion 65 generates the 64 bit random number $R_B$ and sends the random number to the stationary apparatus 52 via the host controller 62 and the communication portion 61. The stationary apparatus 52, which receives this, newly generates the 64 bit random number $R_A$ and a random number $A_K$ that is smaller than the characteristic number p. And, the cipher processing portion 65 determines a point $A_V$ with a base point G being multiplied by $A_K$, connects $R_A$, $R_B$ and $A_V$ (X and Y coordinates) (64 bits+64 bits+160 bits+160 bits, resulting in 448 bits), and generates, for the data, signature data A.Sig with its own secret key. Furthermore, scalar multiplication of the base point is same as that described for generation of the signature in FIG. 10, and description thereof is thus omitted. Connection of data is as follows, for example. It refers to 32 bit data in which upper 16 bit data is A and lower 16 bit data is B when the 16 bit data A and the 16 bit data B are connected with each other. For generation of the signature, a method same as that described for the generation of the signature in FIG. 10 is used, and description thereof is thus omitted.

Figure 11:
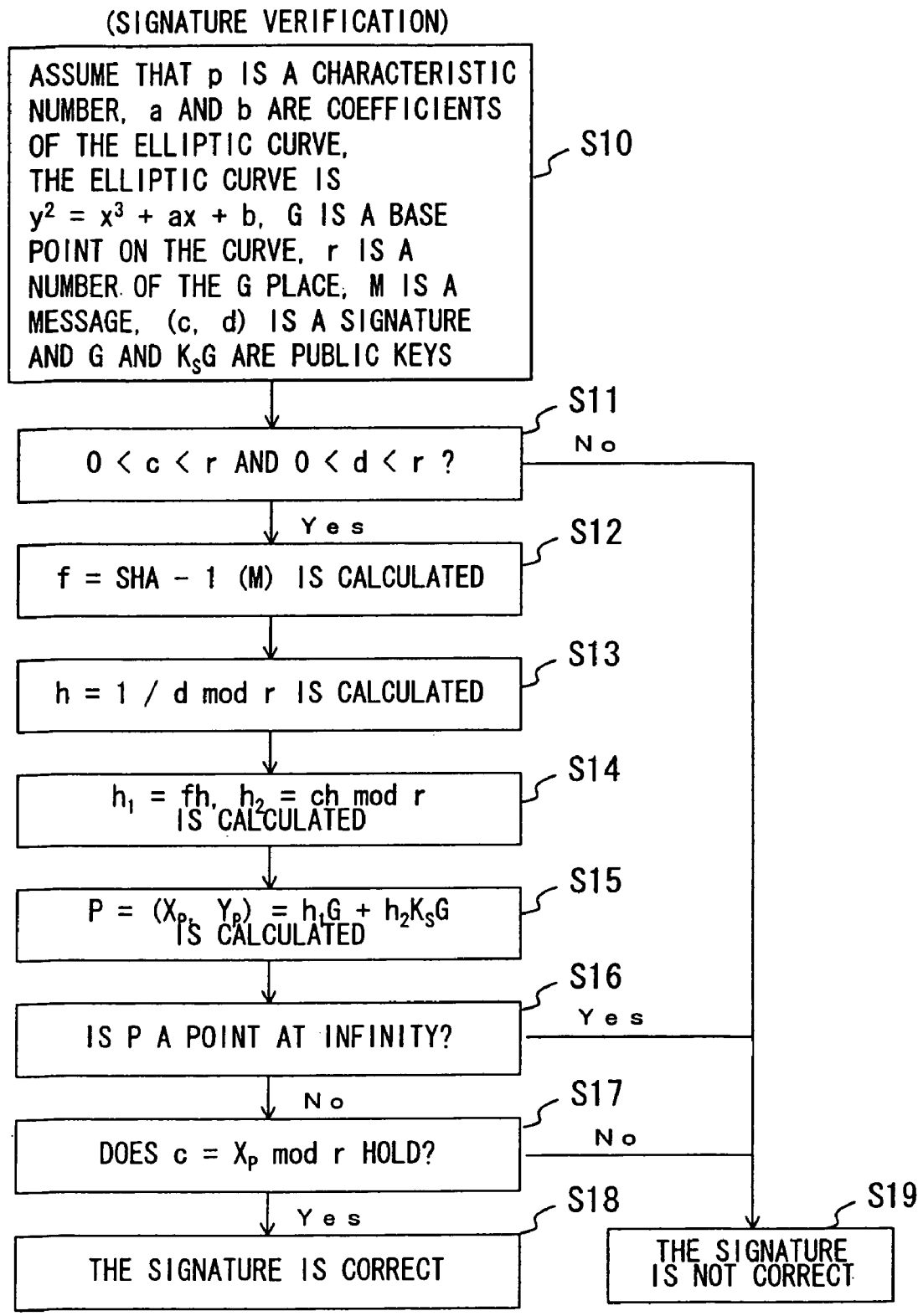
FIG. 11 is a flow chart showing a signature evaluation procedure.

Then, the cipher processing portion 73 passes $R_A$, $R_B$, $A_V$ and signature data A.Sig to the host controller 72, and the host controller 72 adds thereto the public key certificate (stored in the small capacity storing portion 75) for the stationary apparatus 52, and sends the same to the home server 51 via the communicating portion 71. The public key certificate has been described with reference to FIG. 32, and details thereof are thus omitted. The home server 51, which receives this, verifies the signature of the public key certificate of the stationary apparatus 52 at the cipher processing portion 65. For verification of the signature, a method same as that described for the verification of the signature in FIG. 11 is used, and description thereof is thus omitted. Then, whether the random number $R_B$, out of data sent, is same as that sent by the cipher processing portion 65 is examined, and if same, the signature data A.Sig is verified. When the verification is successful, the cipher processing portion 65 authenticates the cipher processing portion 73. Furthermore, for verification, a method same as that described for the verification of the signature in FIG. 11 is used, and description thereof is thus omitted. And, the cipher processing portion 65 generates the random number $B_X$ that is smaller than the characteristic number p, determines a point $B_V$ with the base point G being multiplied by $B_K$, connects $R_B$, $R_A$ and $B_V$ (X and Y coordinates), and generates signature data B. Sig with its own secret key for the data. Finally, the cipher processing portion 65 passes $R_B$, $R_A$, $B_V$ and the signature data B. Sig to the host controller 62, and the host controller 62 adds thereto the public key certificate for the home server 51 (stored in the large capacity storing portion 68) and sends the same to the stationary apparatus 52 via the communicating portion 61.

The stationary apparatus 52, which receives this, verifies the public key certificate of the home server 51 at the cipher processing portion 73. Then, whether the random number $R_A$, out of data sent, is same as that sent by the cipher processing portion 73 is examined, and if same, the signature data B. Sig is verified. When the verification is successful, the cipher processing portion 73 authenticates the cipher processing portion 65.

In the case where both parties succeed in authentication, the cipher processing portion 65 calculates $B_K A_V$ (Although $B_K$ is a random number, calculation of scalar multiplication on the elliptic curve is necessary because $A_V$ is a point on the elliptic curve), the cipher processing portion 73 calculates $A_K B_V$, and the lower 64 bits of X coordinate of these points are used as the session key (temporary key $K_{temp}$) in following communications (in the case where the common key cipher is considered as the common key cipher of 64 bit length). In this connection, for the session key for use in communication, not only the lower 64 bits of the X coordinate, but also the lower 64 bits of the Y coordinate may be used. Furthermore, in secret communication after cross authentication, there may be cases where data is not just encrypted with the temporary key $K_{temp}$, but the signature is added to the encrypted data.

In the case where a fraud or mismatch is found when the signature is verified and the received data is verified, processing is suspended considering that the cross authentication is unsuccessful.

Figure 53:
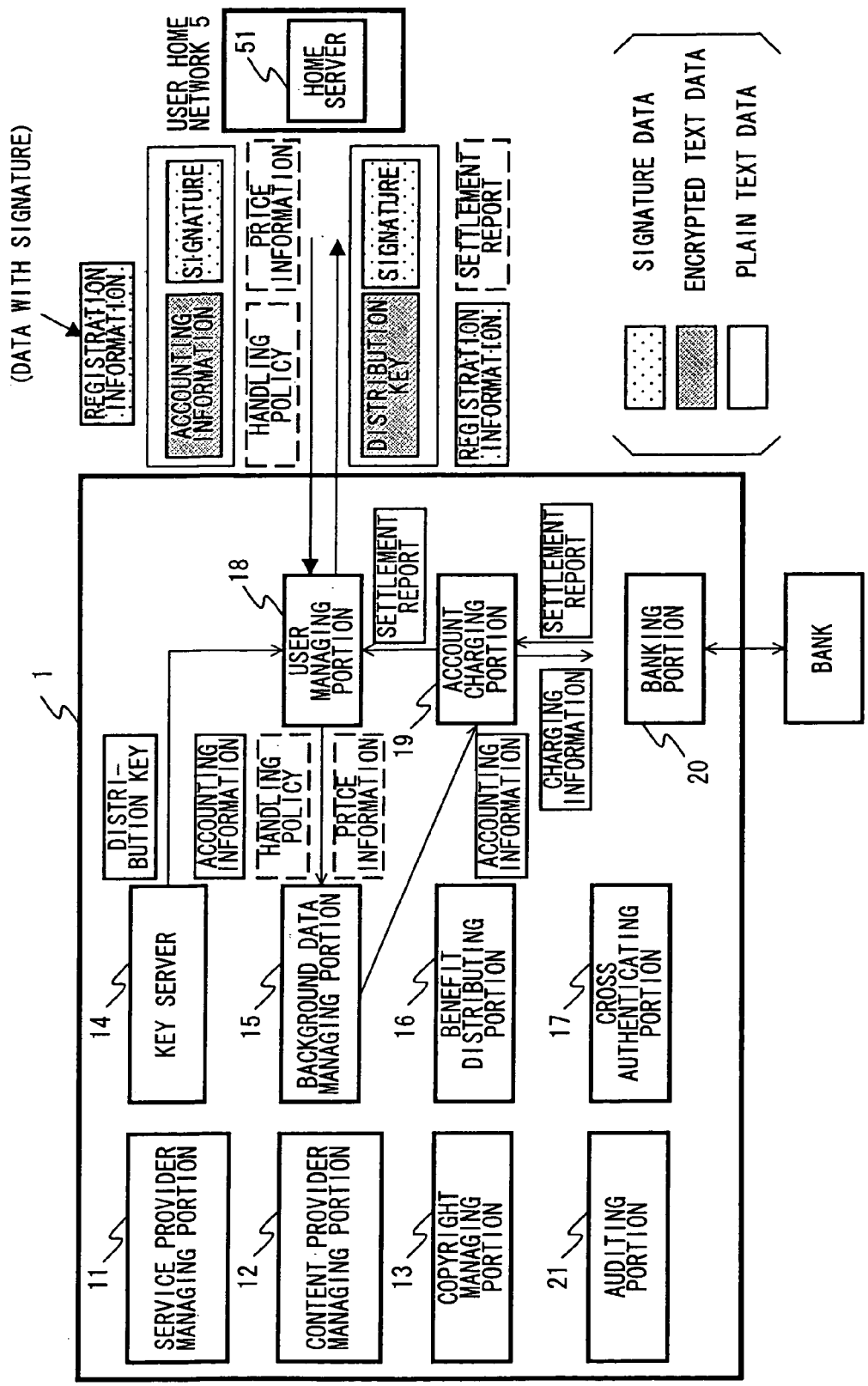
FIG. 53 is a schematic block diagram showing operations of sending accounting information.

FIG. 53 explains operations when a settlement-capable apparatus in the user home network 5 sends accounting information to the electronic distribution service center 1. The settlement-capable apparatus in the user home network 5 retrieves from registration information a target apparatus for which proxy settlement should be performed, performs cross authentication, and encrypts accounting information with the shared temporary key $K_{temp}$ (This key is different each time cross authentication is performed) to has the accounting information sent (At this time, the signature is added to the data). After processing is completed for all apparatuses, cross authentication with the electronic distribution service center 1 is performed, all the accounting information is encrypted with the shared temporary key, signature data is added to them, and they are sent to the electronic distribution service center 1, together with registration information, and the handling policy and price information as required. Furthermore, since information necessary for distribution of money such as the ID of the handling policy and the ID of price information is included in the accounting information which is sent from the user home network 5 to the electronic distribution service center 1, the handling policy and price information with large amounts of information are not necessarily sent. The user managing portion 18 receives this. The user managing portion 18 verifies signature data for the received accounting information, registration information, handling policy and price information. For verification of the signature, a method same as that described for the generation of the signature in FIG. 11 is used, and detailed description thereof is thus omitted. Then, the user managing portion 18 decrypts the accounting information with the temporary key $K_{temp}$ shared at the time of cross authentication, sends the same to the background data managing portion 15 together with the handling policy and price information.

In this connection, in this embodiment, data to be sent after cross authentication is encrypted by the temporary key $K_{temp}$ as necessary. In the case of the content key $K_{co}$ and the distribution key $K_d$, for example, data may be used illegally if the their contents are viewed, and it is thus necessary to perform encryption with the temporary key $K_{temp}$ to prevent viewing from the outside. In contrast to this, in the case of accounting information and license condition information, since data cannot be used illegally even if their contents are viewed, encryption with the temporary key $K_{temp}$ is not necessarily performed, but if the money amount of accounting information is tempered and the usage condition of license condition information is tampered so that it is loosened, parties involved in acceptance of money will suffer a loss. Therefore, accounting information and license condition information are sent with the signature added thereto, thereby preventing tampering. However, the signature may also be added when the content key $K_{co}$ and the distribution key $K_d$ are sent.

And, at a sending end, the signature is generated for data to be sent or for data with the data to be sent encrypted with the temporary key $K_{temp}$, and the data and the signature are sent. At the receiving end, data is obtained by verifying the signature in the case where the sent data is not encrypted with the temporary key $K_{temp}$, or data is obtained by decrypting the data with the temporary key $K_{temp}$ after verifying the signature in the case where the sent data is encrypted with the temporary key $K_{temp}$. In this embodiment, for data that is sent after cross authentication, signature and encryption with the temporary key $K_{temp}$ as necessary may be performed according to the above method.

The user managing portion 18 receives the distribution key $K_d$ from the key server 14, encrypts this with the shared temporary key $K_{temp}$ and adds signature data thereto, creates registration information from the user registration database, and sends the distribution key $K_d$ encrypted with the temporary key $K_{temp}$, the signature data and the registration information to the settlement-capable apparatus in the user home network 5. A method of creating registration information is same as that described with reference to FIG. 8, and detailed description thereof is thus omitted.

When settlement is performed, the account charging portion 19 receives accounting information, the handling policy as necessary and price information from the background data managing portion 15, calculates an amount to be demanded from the user, and sends charging information to the banking portion 20. The banking portion 20 communicates with a bank and the like, and carries out settlement processing. At this time, if there is information of user's accounts payable, such information is sent to the account charging portion 19 and the user managing portion 18 in the form of settlement reports, is incorporated in the user registration database, and is referred to during user registration processing or settlement processing.

The settlement-capable apparatus in the user home network 5, which receives the distribution key $K_d$ encrypted with the temporary key $K_{temp}$, the signature data and the registration information updates stored registration information and examines the registration information, and if it is registered, the apparatus authenticates the signature data, and then decrypts the distribution key $K_d$ with the temporary key $K_{temp}$, updates the distribution key $K_d$ stored in the memory module in the cipher processing portion, and deletes the account information in the memory module. Next, the settlement-capable apparatus retrieves object apparatuses for which proxy settlement should be performed from the registration information, performs cross-authentication for each apparatus found by such retrieval, encrypts the distribution key $K_d$ read from the memory module of the cipher processing portion with the temporary key $K_{temp}$ different for each apparatus found by the retrieval, and adds the signature for each apparatus and sends the same to each apparatus together with the registration information. Processing is ended when all the object apparatuses for which proxy settlement should be performed are finished.

The object apparatus, which receives these data, examines the registration information as in the case of the settlement-capable apparatus, and authenticates the signature data, followed by decrypting the distribution key $K_d$ with the temporary key $K_{temp}$, updating the distribution key $K_d$ in the memory module and deleting the accounting information.

Furthermore, for apparatuses whose registration items of registration information are identified as "registration impossible", update of the distribution key $K_d$ and deletion of account information are not carried out because accounting has not been performed (for contents of registration items, there may be a various kinds of cases such as stop of all processes including use, stop of purchase processing, states of processing normally performed and the like).

Figure 54:
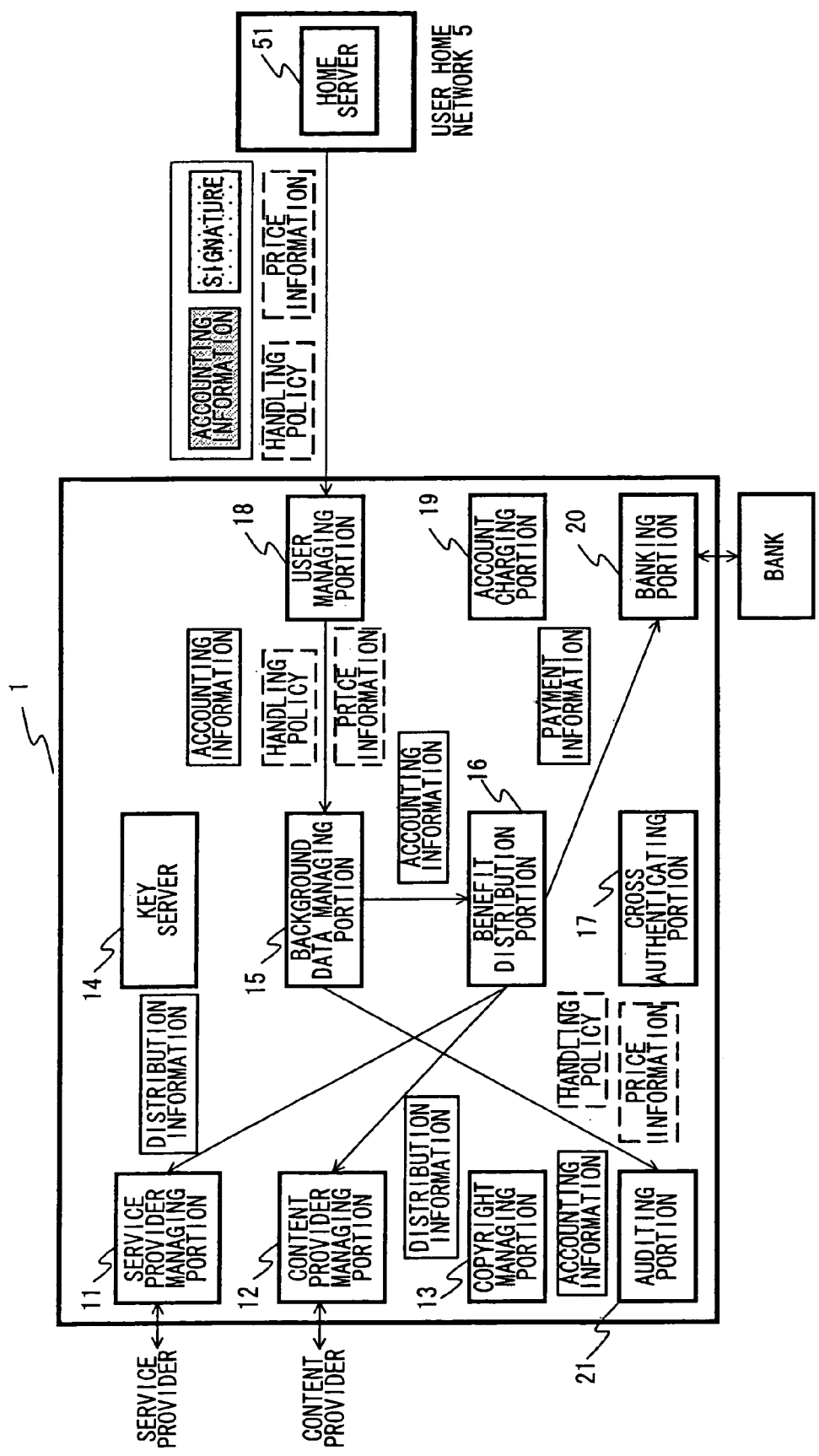
FIG. 54 is a schematic diagram showing benefit distribution processing operations.

FIG. 54 explains operations of benefit distribution processing of the electronic distribution service center 1. The background data managing portion 15 retains and manages the accounting information, and the handling policy and the price information as required, which have been sent from the user managing portion 18. The benefit distributing portion 16 calculates the benefit of each of the content provider 2, the service provider 3 and the electronic distribution service center 1 from the accounting information, and the handling policy and the price information as required, which have been sent from the background data managing portion 15, and sends results thereof to the service provider managing portion 11, the content provider managing portion 12 and the banking portion 20. The banking portion 20 communicates with a bank and the like to perform settlement. The service provider managing portion 11 sends to the service provider 3 the distribution information received from the benefit distribution portion 16. The content provider managing portion 12 sends to the content provider 2 the distribution information received from the benefit distributing portion 16.

The auditing portion 21 receives the accounting information, the handling policy and the price information from the background data managing portion 15, and audits that data is not inconsistent. For example, it audits that the price in the accounting information is consistent with the data of the price information, distribution rates are consistent, and so on, and audits that the handling policy is not inconsistent with the price information. Also, processing by the auditing portion 21 includes processing of auditing consistence of the amount of money added from the user home network 5 with the total amount of money distributed as benefits or the amount of money sent to the service provider 3, and processing of making audit on whether or not IDs of the content provider and service provider that can not exist, and unconceivable earnings, prices and the like are included in the data of the accounting information supplied from the apparatus in the user home network 5.

Figure 55:
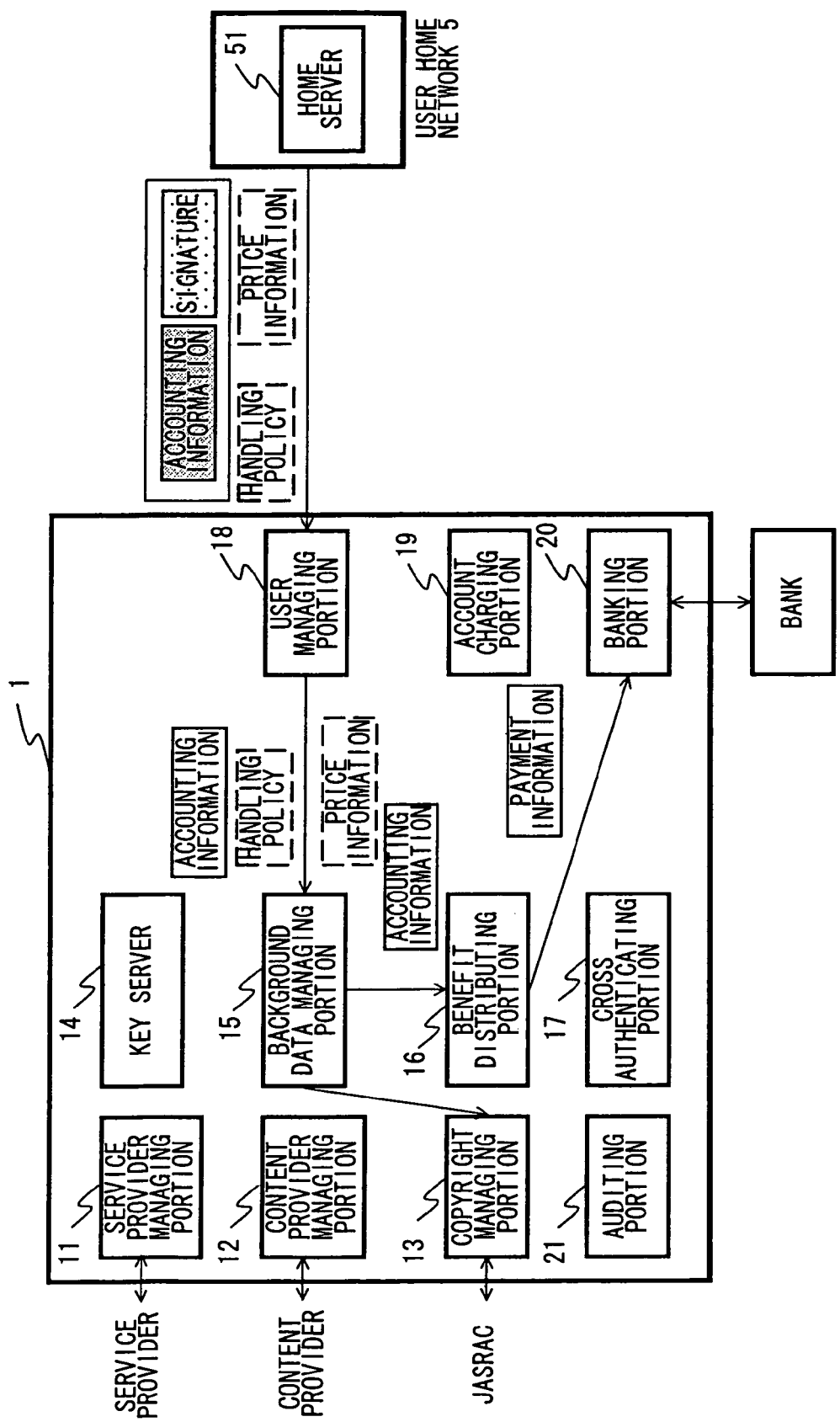
FIG. 55 is a schematic diagram showing operations of sending a content usage record.

FIG. 55 explains operations of processing, of the electronic distribution service center 1, for sending a usage record of contents to JASRAC. The background data managing portion 15 sends accounting information indicating the user's usage record of the contents to the copyright managing portion 13 and the benefit distributing portion 16. The benefit distributing portion 16 calculates from the accounting information the amount of money to be demanded from JASRAC and the payments thereof, and sends payment information to the banking portion 20. The banking portion 20 communicates with a bank and the like to carry out settlement processing. The copyright managing portion 13 sends the user's usage record of the contents to JASRAC.

Figure 56:
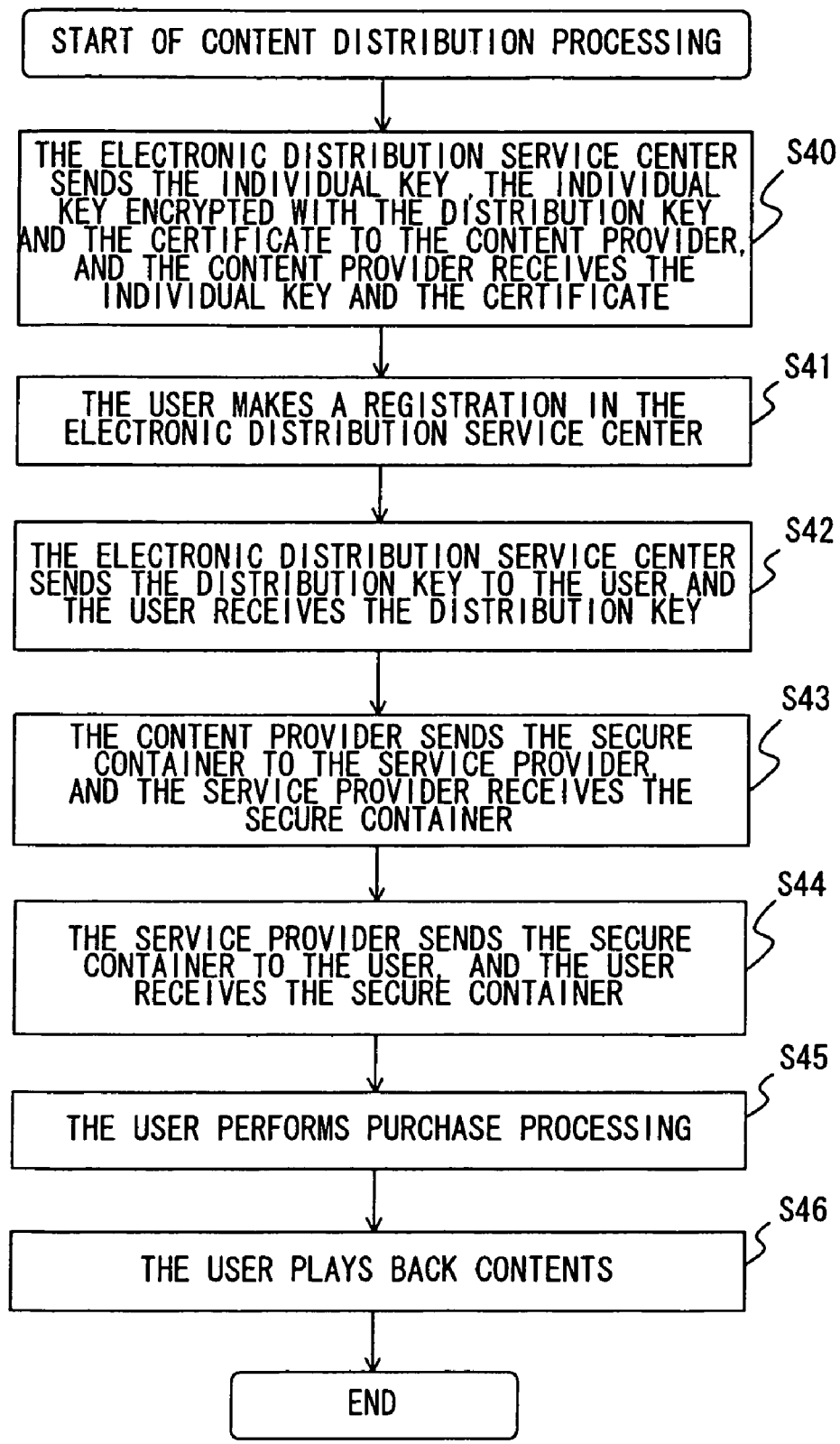
FIG. 56 is a flow chart showing a processing procedure of distributing and playing back contents.

Now, processing of the EMD system will be described. FIG. 56 is a flow chart explaining processing to distribute and play back contents by this system. In Step S40, the content provider managing portion 12 of the electronic distribution service center 1 sends the individual key $K_i$, the individual key $K_i$ encrypted with the distribution key $K_d$, and the public key certificate of the content provider 2 to the content provider 2, and the content provider 2 receives them. Details about that processing will be described later referring to the flow chart of FIG. 57. In Step S41, the user operates the apparatus of the user home network 5 (for example, the home server 51 in FIG. 15), and registers the apparatus of the user home network 5 in the user managing portion 18 of the electronic distribution service center 1. Details about this registration processing will be described later referring to the flow chart of FIG. 59. In step S42, the user managing portion 18 of the electronic distribution service center 1 performs cross authentication with the user home network 5 as described above with reference to FIG. 52, followed by sending the distribution key $K_d$ to the apparatus of the user home network 5. The user home network 5 receives this key. Details about this processing will be described later referring to the flow chart of FIG. 62.

In Step S43, the signature generating portion 38 of the content provider 2 generates the content provider secure container and sends it to the service provider 3. Details about this processing will be described later referring to the flow chart of FIG. 65. In Step S44, the signature generating portion 45 of the service provider 3 generates the service provider secure container and sends it to the user home network 5 via the network 4. Details about this send processing will be described later referring to the flow chart of FIG. 66. In Step S45, the purchase module 94 of the user home network 5 performs purchase processing. Details about the purchase processing will be described later referring to the flow chart of FIG. 67. In Step S46, the user plays back the contents with the apparatus of the user home network 5. Details about the playback processing will be described later referring to the flow chart of FIG. 72.

Figure 57:
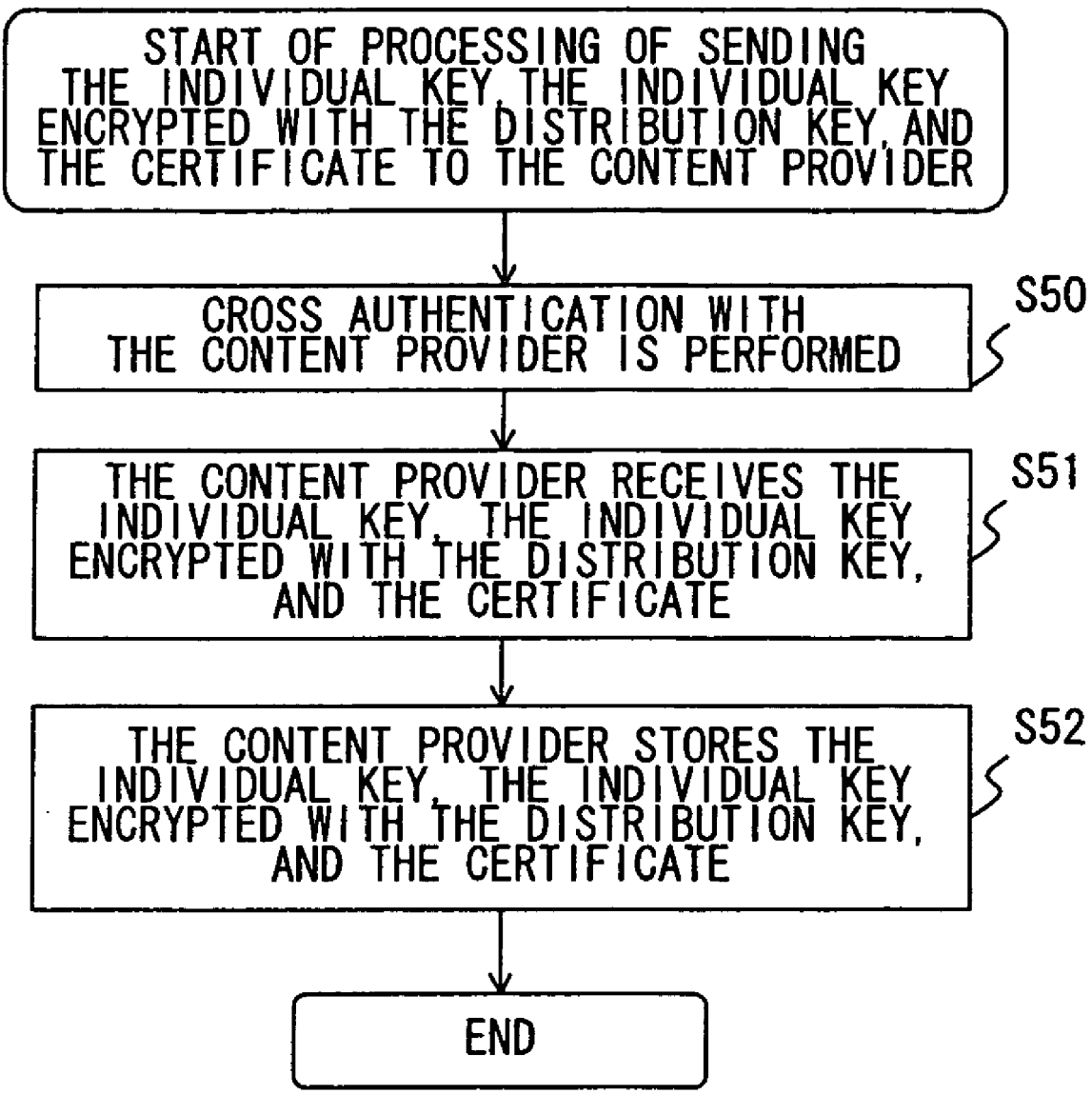
FIG. 57 is a flow chart showing a processing procedure of performing send to the content provider.

FIG. 57 is a flow chart explaining details about processing where the electronic distribution service center 1 sends to the content provider 2 the individual key $K_i$, the individual key $K_i$ encrypted with the distribution key $K_d$ and the public key certificate, and the content provider 2 receives them. In Step S50, the cross authenticating portion 17 of the electronic distribution service center 1 performs cross authentication with the cross authenticating portion 39 of the content provider 2. This cross authentication processing has been described with reference to FIG. 52, and detailed description thereof is thus omitted. When the content provider 2 is identified as a correct provider through the cross authentication processing, the content provider 2 receives the individual key $K_i$, the individual key $K_i$ encrypted with the distribution key $K_d$ and the certificate sent from the content provider managing portion 12 of the electronic distribution service center 1, in Step S51. In Step S52, the content provider 2 stores the received individual key $K_i$ in the tamper resistant memory 40A, and stores the individual key $K_i$ encrypted with the distribution key $K_d$ and the certificate in the memory 40B.

In this way, the content provider 2 receives the individual key $K_i$, the individual key $K_i$ encrypted with the distribution key $K_d$ and the certificate from the electronic distribution service center 1. In a similar way, in the case of performing processing of the flow chart shown in FIG. 56, the service provider 3, in addition to the content provider 2, also receives the individual key $K_i$ (different from the individual key $K_i$ of the content provider 2), the individual key $K_i$ encrypted with the distribution key $K_d$ and the certificate from the electronic distribution service center using processes as in the case of FIG. 57.

Furthermore, the memory 40A retains the individual key $K_i$ that the content provider 2 must retain in secrecy, and thus it is desirably the tamper resistant memory in which data is not easily read out by a third party, but a particular limitation in terms of hardware is not required (For example, it may be a hard disk placed in an entrance-controlled room or a hard disk of a password-controlled personal computer). Also, the memory 40B stores therein only the individual key $K_i$ encrypted with the distribution key $K_d$, and the certificate of the content provider 2, and thus may be a normal memory and the like (not necessarily kept secret). Also, the memories 40A and 40B may be integrated into one memory.

Figure 58:
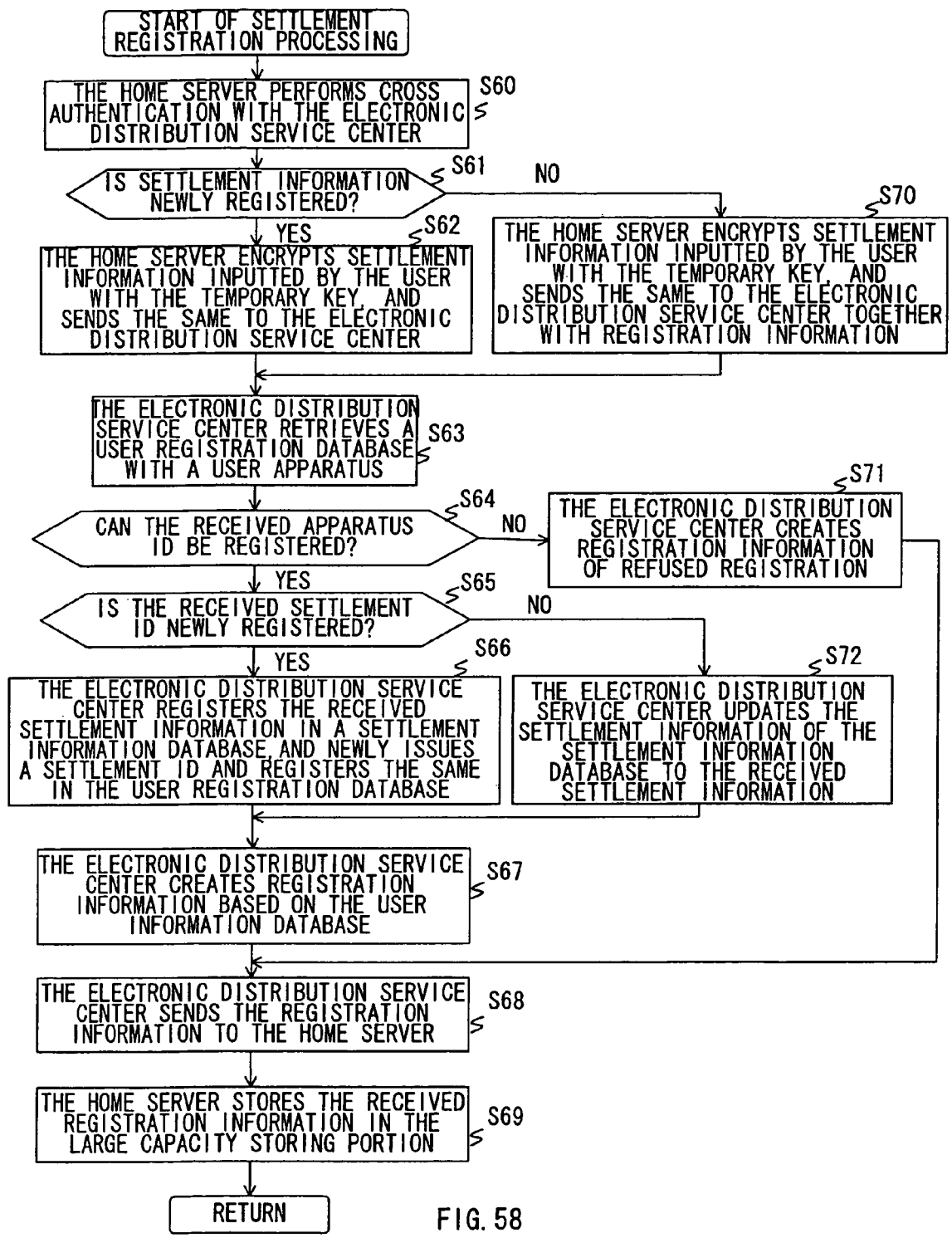
FIG. 58 is a flow chart showing a processing procedure of registering settlement information.

FIG. 58 is a flow chart explaining processing where the home server 51 registers settlement information in the user managing portion 18 of the electronic distribution service center 1. In Step S60, the home server 51 performs cross authentication of the public key certificate stored in the large capacity storing portion 68 with the cross authenticating portion 17 of the electronic distribution service center 1, using the cross authentication module 95 of the cipher processing portion 65. This authentication processing is similar to that described referring to FIG. 52, and description thereof is thus omitted. The certificate which the home server 51 sends to the user managing portion 18 of the electronic distribution service center 1, in Step S60, includes the data shown in FIG. 32 (the public key certificate of the user apparatus).

In Step S61, the home server determines whether or not the registration of personal settlement information (user's credit card number, account number of a settlement entity) is new registration, and proceeds to Step S62 if determining it as new registration. In Step S 62, the user inputs the personal settlement information using the inputting means 63. These data are encrypted by the encryption unit 112 using the temporary key $K_{temp}$, and are sent to the user managing portion 18 of the electronic distribution service center 1 via the communicating portion 61.

In Step S63, the user managing portion 18 of the electronic distribution service center 1 fetches the ID of the apparatus from the received certificate, and retrieves the user registration database shown in FIG. 7 on the basis of this ID of the apparatus. In Step S64, the user managing portion 18 of the electronic distribution service center 1 determines whether or not it is possible to register the apparatus having the received ID, and if determining that it is possible to register the apparatus having the received ID, the user managing portion 18 proceeds to Step S65 to determine whether or not the apparatus having the received ID is that of new registration. In Step S65, if it is determined that the apparatus having the received ID is that of new registration, advancement to Step S66 is made.

In Step S66, the user managing portion 18 of the electronic distribution service center 1 newly issues a settlement ID, decrypts the settlement information encrypted with the temporary key $K_{temp}$, registers the settlement ID and the settlement information in the settlement information database storing the apparatus ID, the settlement ID, the settlement information (account number, credit card number, and the like), the transaction suspension information and so on with the settlement ID and the settlement information being made to correspond to the ID of the apparatus, and registers the settlement ID in the user registration database. In Step 67, the registration information is created based on the data registered in the user registration database. This registration information has been described with reference to FIG. 8, detailed description thereof is thus omitted.

In Step S68, the user managing portion 18 of the electronic distribution service center 1 sends the created registration information to the home server 51. In Step S69, the host controller 62 of the home server 51 stores the received registration information in the large capacity storing portion 68.

In Step S61, if it is determined that the registration of the settlement information is update registration, procedures continue to Step S70, and the user inputs personal settlement information using the inputting means 63. These data are encrypted by the encryption unit 112 using the temporary key $K_{temp}$, and are sent to the user managing portion 18 of the electronic distribution service center 1 via the communicating portion 61, along with the registration information already issued during settlement registration.

In Step S64, if it is determined that it is not possible to register the apparatus having the received ID, advancement to Step S71 is made, and the user managing portion 18 of the electronic distribution service center 1 creates registration information of refused registration, and proceeds to Step S68.

In Step S65, if it is determine that the apparatus having the received ID is not that of new registration, procedures continue to Step S72, and the user managing portion 18 of the electronic distribution service center 1 decrypts the settlement information encrypted with the temporary key and register the information in the settlement information registration database with the information being made to correspond to the ID of the apparatus to update the database, and proceeds to Step S67.

In this way, the home server 51 is registered in the electronic distribution service center 1.

Figure 59:
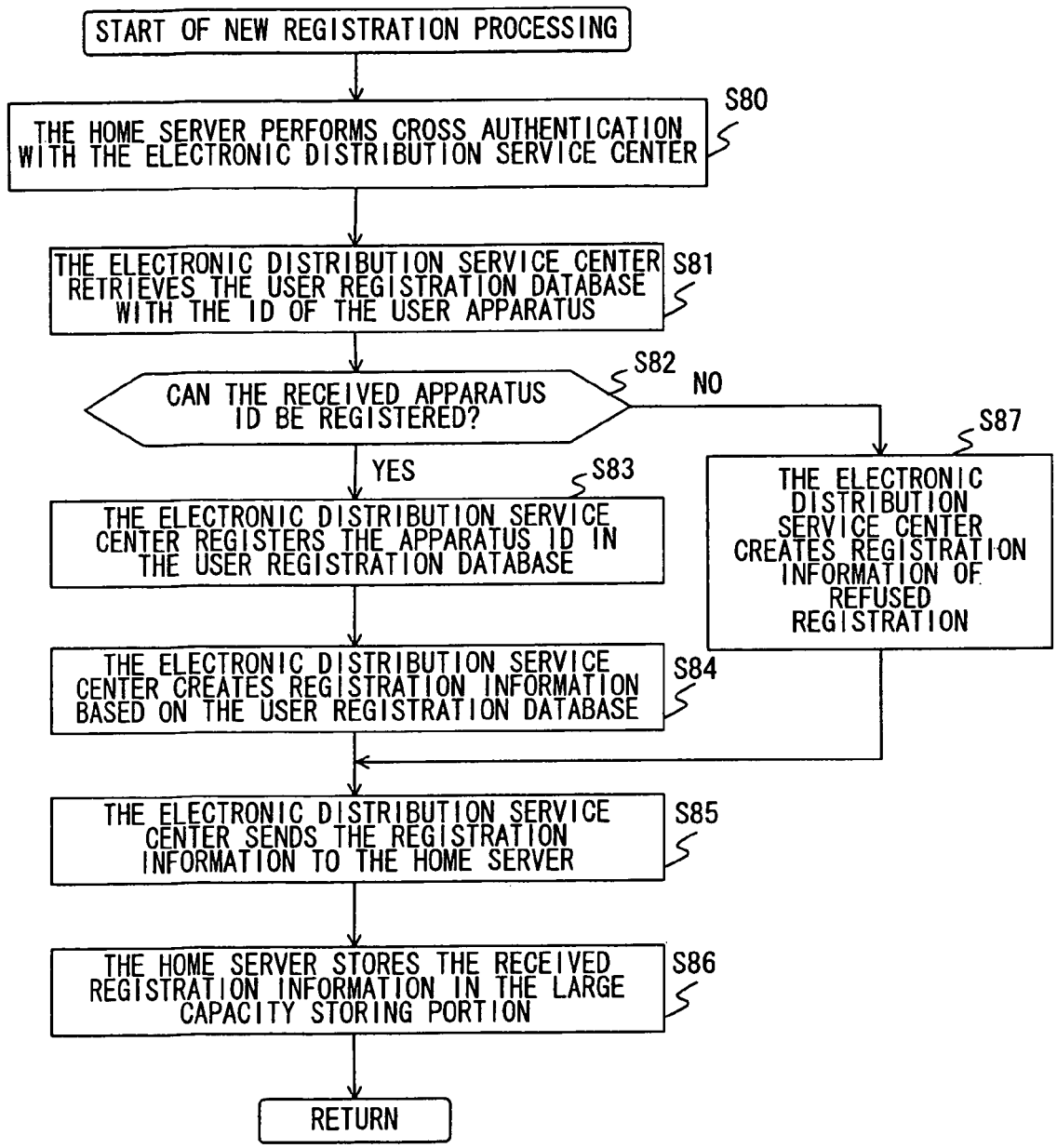
FIG. 59 is a flow chart showing a processing procedure of newly registering an apparatus ID.

FIG. 59 is a flow chart explaining processing of performing new registration of the ID of the apparatus in the registration information. Cross authentication processing in Step S80 is similar to that described with reference to FIG. 52, and description thereof is thus omitted. In Step S81, description is omitted because of the similarity to Step S63 in FIG. 58. Step S82 is similar to Step S64 in FIG. 58, and description thereof is thus omitted. In Step S83, the user managing portion 18 of the electronic distribution service center 1 defines a registration item corresponding to the apparatus ID in the user registration database as "registration", and registers the apparatus ID. In Step S84, the user managing portion 18 of the electronic distribution service center 1 creates registration information as shown in FIG. 8, based on the user registration database. Step S85 is similar to Step S68 in FIG. 58, and description thereof is thus omitted. Step S86 is similar to Step S69 in FIG. 58, and description thereof is thus omitted.

In Step S82, if it is determined that registration of the apparatus having the received ID is not possible, advancement to Step S87 is made, the user managing portion 18 of the electronic distribution service center 1 creates registration information of refused registration and proceeds to Step S85.

In this way, the home server 51 is registered in the electronic distribution service center 1.

Figure 60:
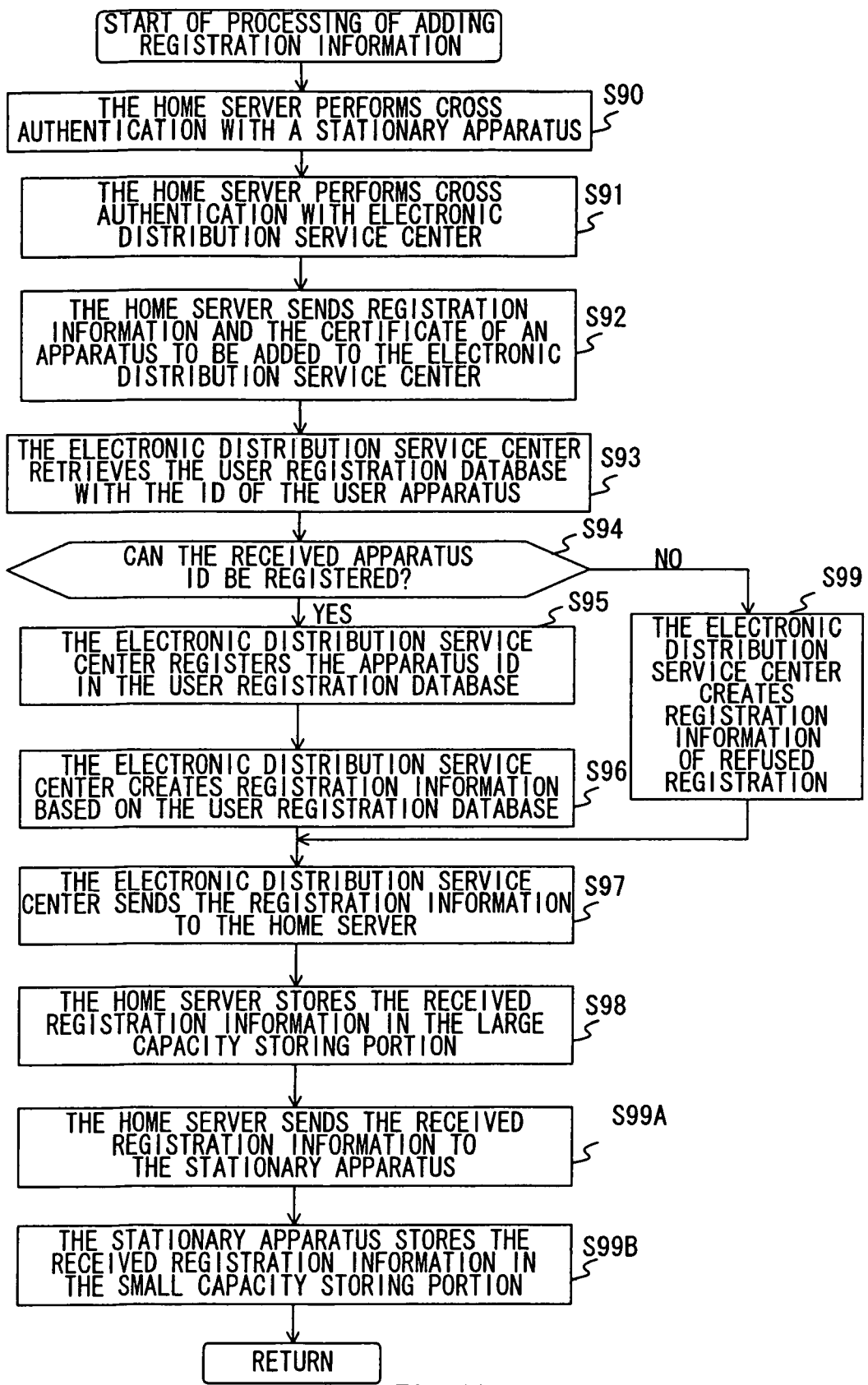
FIG. 60 is a flow chart showing a processing procedure of additionally registering an apparatus.

FIG. 60 is a flow chart explaining processing where another apparatus is additionally registered via an apparatus which has been already registered. Here, a case where the home server 51 has been already registered and the stationary apparatus 52 is registered therein will be explained. In Step S90, the home server 51 performs cross authentication with the stationary apparatus 52. The cross authentication processing is similar to the processing described with reference to FIG. 52, and description thereof is thus omitted. In Step S91, the home server 51 performs cross authentication with the electronic distribution service center 1. In Step S92, the home server 51 sends to the electronic distribution service center 1 the registration information read from the large capacity storing portion 68, and the certificate of the stationary apparatus 52 obtained when performing cross authentication with the stationary apparatus 52 in Step S90. Step S93 is same as step 81 in FIG. 59, and description thereof is thus omitted. Step S94 is same as step 82 in FIG. 59, and description thereof is thus omitted. Step S95 is same as step 83 in FIG. 59, and description thereof is thus omitted. In Step S96, the user managing portion 18 of the electronic distribution service center 1 newly creates registration information with information of the stationary apparatus 52 added to the registration information received from the home server 51. Step S97 is same as Step S85 of FIG. 59, and description thereof is thus omitted. Step S98 is same as Step S86 in FIG. 59, and description thereof is thus omitted.

And, in Step S99A, the home server 51 sends the received registration information to the stationary apparatus 52, and in Step S99B, the stationary apparatus 52 stores the received registration information in the small capacity storing portion 75.

If it is determined that registration of the apparatus having the received ID is not possible in Step S94, advancement to Step S99 is made, and the user managing portion 18 of the electronic distribution service center 1 creates registration information meaning that only the stationary apparatus 52 is refused for registration (Therefore, the home server 51 remains registered), and proceeds to Step S97 (The home server 51 succeeds in cross authentication with the electronic distribution service center 1, which means that registration of the home server 51 is possible).

Thus, the stationary apparatus 52 is registered additionally in the electronic distribution service center 1 through the processing procedure shown in FIG. 60.

Figure 61:
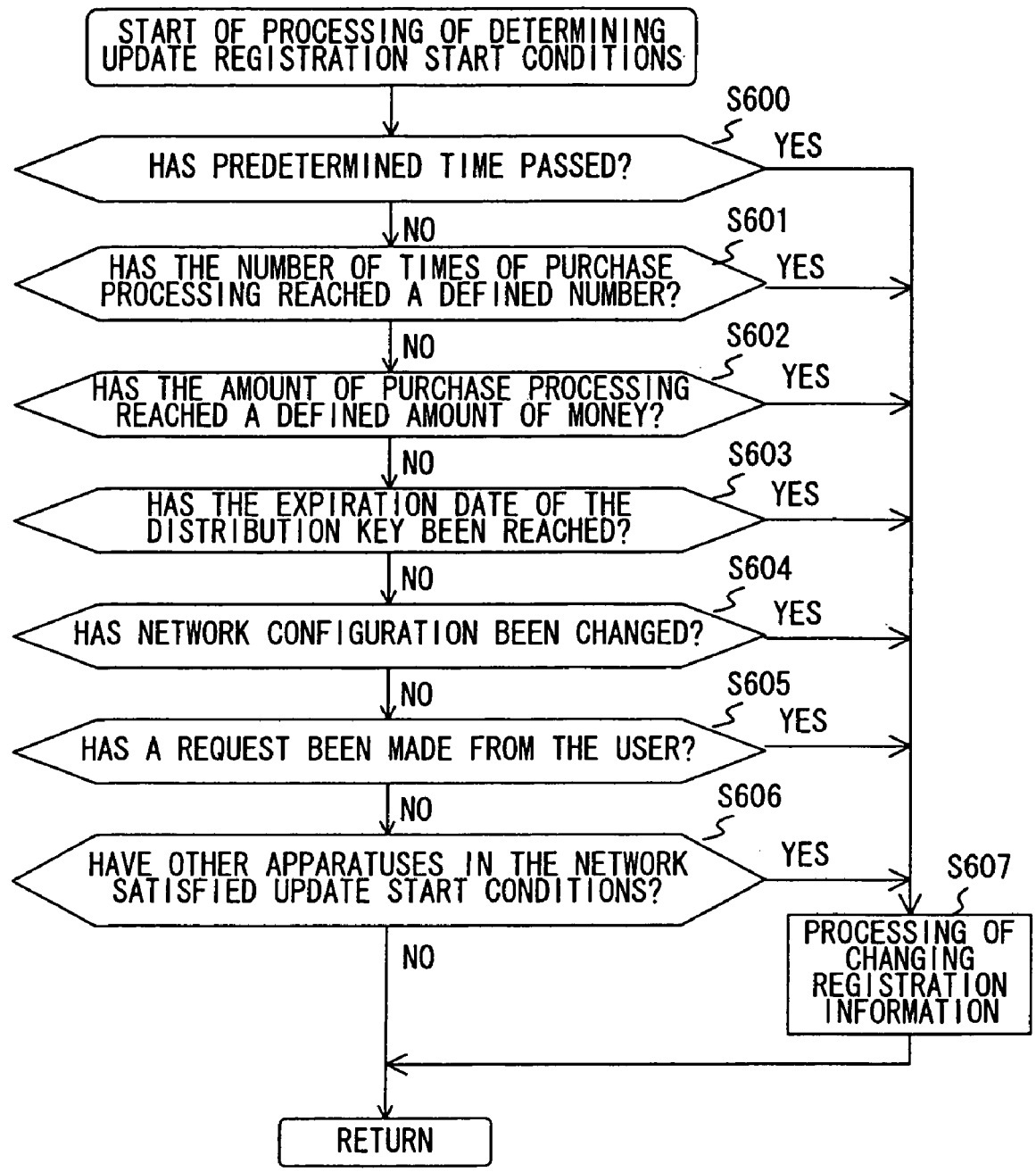
FIG. 61 is a flow chart showing processing of determining an update start condition of registration information.

Now, timing of update of registration (update of registration information) performed by the registered apparatus will be described. FIG. 61 shows a processing procedure to determine based on various kinds of conditions whether or not registration information is updated, and in Step S600, the home server 51 determines whether or not predetermined time has passed since suction of the distribution key $K_d$, registration information or accounting information by a clock (not shown) and a determining portion (not shown). If a positive result is obtained, here, it means that predetermined time has passed since suction of the distribution key $K_d$, registration information or accounting information, and the home server 51 proceeds to Step S607 to carry out processing of updating the registration information. This process will be described later with reference to FIG. 62.

In contrast to this, if a negative result is obtained in Step S 600, it means that predetermined time has not passed since suction of the distribution key $K_d$, registration information or accounting information, namely the update condition of registration information is satisfied in terms of passage of time, and the home server 51 proceeds to Step S601 at this time.

In Step S601, the home server 51 determines whether or not the number of times contents have been purchased has reached a predetermined number. If a positive result is obtained, here, the home server 51 proceeds to Step S607 to carry out registration information update processing, and in contrast to this, if a negative result is obtained, it means that the update condition of registration information is not satisfied in terms of the number of times contents have been purchased, and the home server 51 thus moves to the following Step S602.

In step S602, the home server 51 determines whether or not the amount of money spent for purchasing the contents has reached a predetermined amount. If a positive result is obtained, here, the home server 51 proceeds to Step S607 to carry out registration information update processing, and in contrast to this, if a negative result is obtained in Step S602, it means that the update condition of registration information is not satisfied in terms of the amount of money spent for purchasing the contents, and the home server 51 moves to following Step S603.

In step S603, the home server 51 determines whether or not the expiration date of the distribution key $K_d$ has been reached. As a method for determining whether or not the expiration date of the distribution key $K_d$ has been reached, whether or not the version of the distribution key $K_d$ of the distributed data is consistent with the version of any one of three versions of distribution keys $K_d$ stored in the memory module 92, or whether or not it is older than the version of the latest distribution key $K_d$. If the result of this comparison shows inconsistency, or it is older than the version of the latest distribution key $K_d$, it means that the expiration date of the distribution key $K_d$ in the memory module 92 has been reached, and the home server 51 obtains a positive result in Step S603, and thus proceeds to Step S607 to carry out processing to update registration information. In contrast to this, if a negative result is obtained in Step S603, it means that the update condition of registration information is satisfied in terms of the expiration date of the distribution key $K_d$, and at this time, the home server moves 51 to following Step S604.

In Step S604, the home server 51 determines presence or absence of changed network configuration such as whether or not another apparatus has been newly connected to the home server 51, or whether or not another apparatus that had been connected has been disconnected. If a positive result is obtained, here, it means that the network configuration has been changed, and at this time, the home server 51 proceeds to Step S607 to carry out processing to update registration information. In contrast to this, if a negative result is obtained in Step S604, it means that the update condition of registration information is not satisfied in terms of network configuration, and the home server 51 thus moves to following Step S605.

In Step S605, the home server 51 determines whether or not update of registration information has been requested from the user, and proceeds to Step S607 to carry out processing to update registration information if update of registration information has been requested, and proceeds to Step S606 if update of registration information has not been requested.

In Step S606, the home server 51 performs update determination as in Step S600 to Step S605, in terms of other connected apparatuses, and proceeds to Step S607 to carry out processing to update registration information when a result showing that update should be performed is obtained, and in contrast to this, when a result showing that update should be performed is not obtained, the home server 51 repeats similar processes from Step S600. In this way, the home server 51 can obtain timing for performing processing to update registration information. Furthermore, it is also possible that the home server 51 does not examine the update start condition of other apparatuses, but other apparatuses examine the condition by themselves to make a request to the home server 51 on their own.

Figure 62:
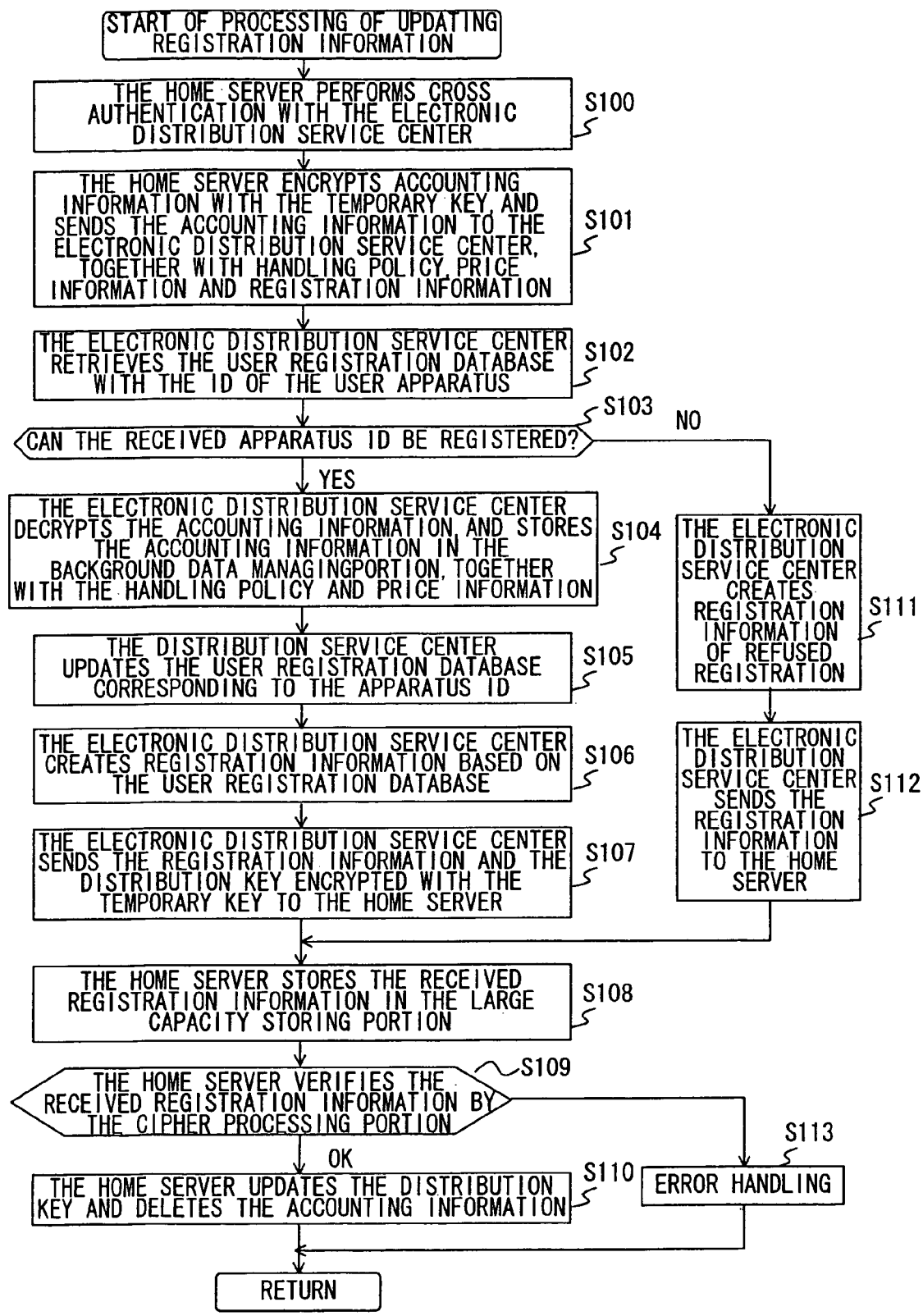
FIG. 62 is a flow chart showing a processing procedure of updating registration information.

FIG. 62 is a flow chart explaining operations in which a registered apparatus performs update of registration (update of registration information), performs settlement processing, and accepts redistribution of the distribution key $K_d$. The cross authentication process in Step S100 is similar to that described with reference to FIG. 52, and description thereof is thus omitted. In Step S101, the home server 51 encrypts the accounting information stored in the memory module 92 with the encryption unit 112 of the cipher processing portion 96 using the temporary key $K_{temp}$, generates the signature with the signature generation unit 114, and adds the signature thereto. And, the encrypted accounting information and its signature, the handling policy, price information and registration information stored in the large capacity storing portion 68 are sent together to the electronic distribution service center 1. Furthermore, at this time, the handling policy and price information are not necessarily sent depending on a model. For there may be cases where the content provider 2 and the service provider 3 send them in advance to the electronic distribution service center 1, or cases where necessary information out of the handling policy and price information is included in the accounting information.

Step S102 is same as Step S81 in FIG. 59, and description thereof is thus omitted. Step S103 is same as Step S82 in FIG. 59, and description thereof is thus omitted. In Step S104, the user managing portion 18 of the electronic distribution service center 1 verifies the signature with the signature verification unit 115, decrypts the received accounting information with the temporary key $K_{temp}$ (In the case where the electronic signature is added to the received data, verification is performed with the signature verification unit 115), and (if it is already received) sends it to the background data managing portion 15 along with the handling policy and accounting information. The background data managing portion 15, which receives this, stores and manages the received data.

In Step S105, the user managing portion 18 of the electronic distribution service center 1 verifies the registration item corresponding to the ID of the apparatus in the user registration database, and updates the data. They are, for example, data such as registration dates (not shown) and accounting states. Step S106 is same as Step S84 in FIG. 59, and description thereof is thus omitted. In Step S107, the user managing portion 18 of the electronic distribution service center 1 encrypts with the temporary key $K_{temp}$ the distribution key $K_d$ supplied from the key server 14, and sends the same to the home server 51 along with the registration information.

In Step S108, the home server 51 stores the received registration information in the large capacity storing portion 68. In Step S109, the home server 51 inputs the received registration information in the cipher processing portion 65, and the cipher processing portion 65 verifies the electronic signature included in the registration information with the signature verification unit 115, and has it checked that the apparatus ID of the home server 51 is registered, and when the verification is successful and it is confirmed that the accounting processing has been completed, advancement to Step S110 is made. In Step S110, the home server 51 inputs the received distribution key $K_d$ in the cipher processing portion 65. The cipher processing portion 65 decrypts the received distribution key $K_d$ with the decryption unit 111 of the encryption/decryption module 96, using the temporary key $K_{temp}$, stores the same in the memory module 92 (updates it), and deletes the accounting information retained in the memory module 92 (This results in completion of settlement).

In Step S103, if it is determined that registration of the apparatus having the ID received is not possible, advancement to Step S111 is made, and the user managing portion 18 of the electronic distribution service center 1 creates registration information of refused registration and proceeds to Step S112. In Step S112, unlike Step S107, only the registration information is sent to the home server 51.

In Step S109, if verification of the signature included in the registration information is unsuccessful, or "registration possible" is not written in the "registration item" included in the registration information (For example, fail in accounting→unable to perform purchase processing, refused registration→stop of functions of the cipher processing portion including playback, etc., a temporary halt of exchanges→stop of purchase for some reason despite success in accounting processing, and the like are conceivable) advancement to Step S113 is made to perform predetermined error handling.

In this way, the home server 51 updates registration information, and sends accounting information to the electronic distribution service center 1, for which it receives the distribution key $K_d$ supplied.

Figure 63:
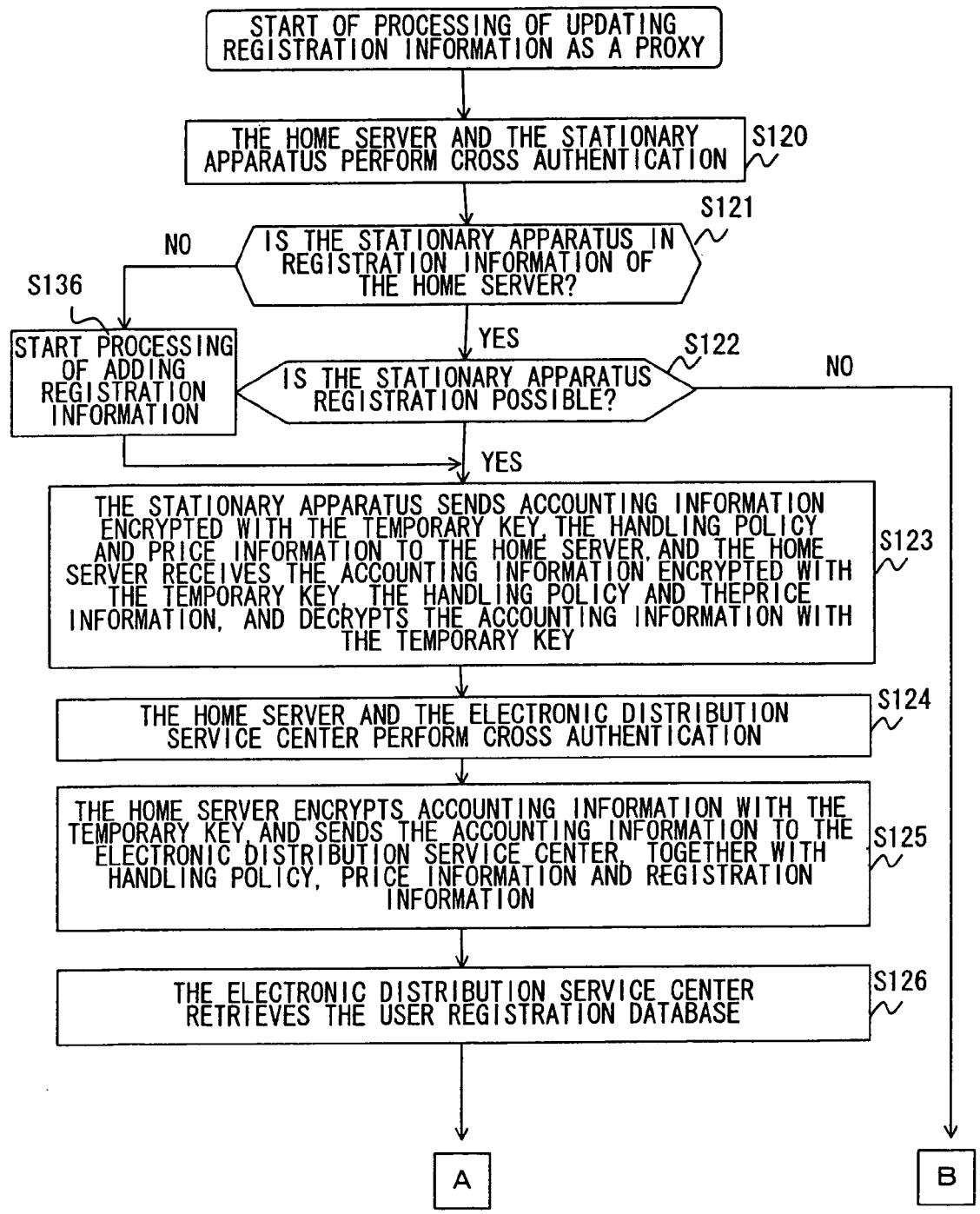
FIG. 63 is a flow chart showing a processing procedure of updating registration information as a proxy by a stationary apparatus.
Figure 64:
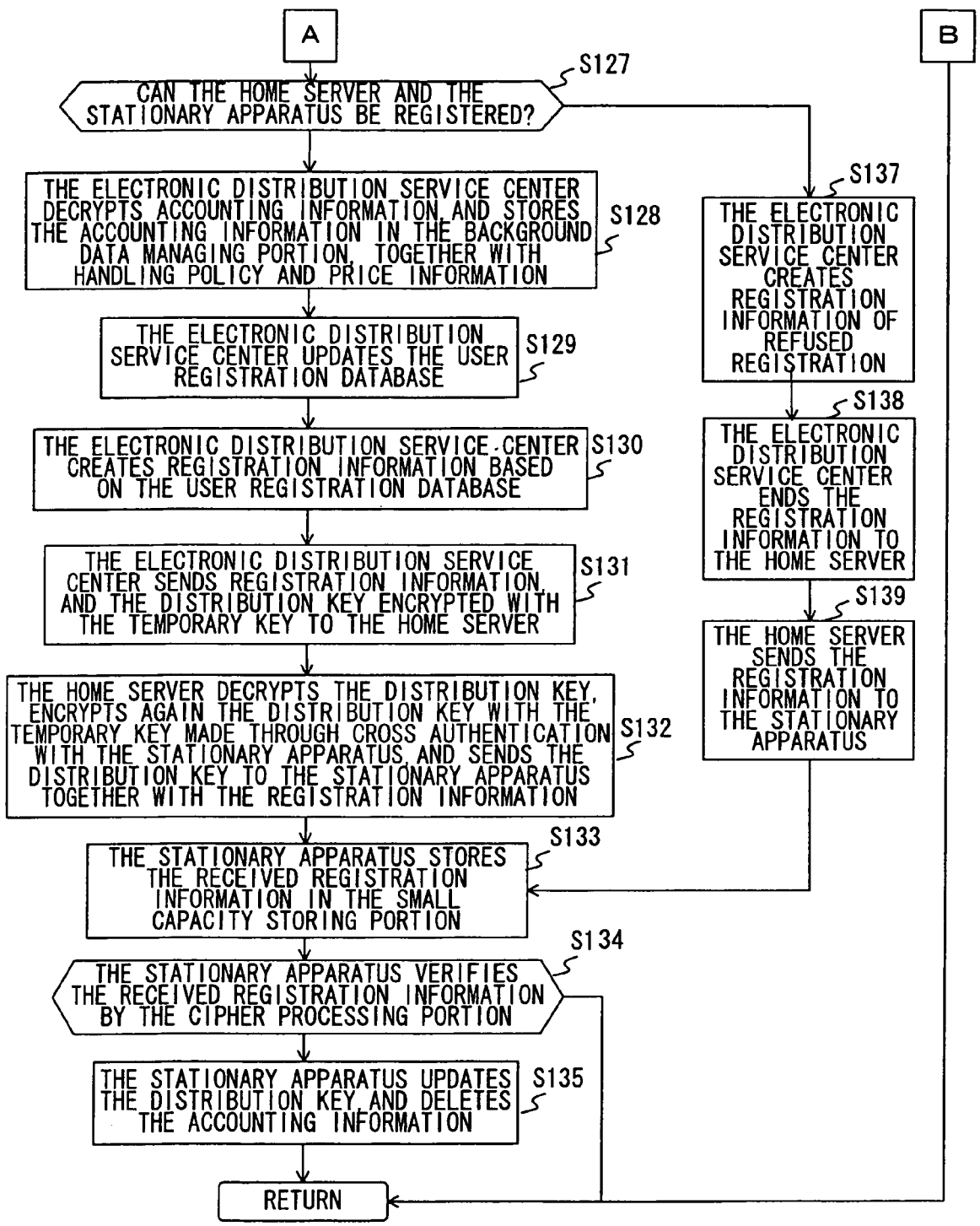
FIG. 64 is a flow chart showing a processing procedure of updating registration information as proxy by the stationary apparatus.

FIG. 63 and FIG. 64 is a flow chart explaining processing where the stationary apparatus 52 performs settlement, update of registration information and update of the distribution key $K_d$ through the home server 51. In Step S120, the cross authentication module 94 of the home server 51 and a cross authentication (not shown) of the stationary apparatus perform cross authentication. A cross authentication process is similar to that described with reference to FIG. 52, and description thereof is thus omitted. Furthermore, as described for cross authentication, the home server 51 and the stationary apparatus 52 exchange certificates with each other, and thus know each other's apparatus ID. In Step S121, the host controller 62 of the home server 51 reads registration information from the large capacity storing portion 68, and has the information examined by the cipher processing portion 65. The cipher processing portion 65, which receives the registration information from the host controller 62, verifies the signature in the registration information, determines whether there is the ID of the stationary apparatus, and proceeds to Step S122 when there is the ID of the stationary apparatus in the registration information.

In Step S122, whether or not the ID of the stationary apparatus 52 is registered in the registration information is determined, and if the ID of the stationary apparatus 52 is registered, advancement to Step S123 is made. In Step S123, the cipher processing portion 73 of the stationary apparatus 52 reads the accounting information stored in the memory module, and encrypts the same with the encryption unit using the temporary key $K_{temp}$. Also, the signature corresponding to the accounting information is generated with the signature generation unit. Generation of the signature has been explained with reference to FIG. 10, and description thereof is thus omitted. The host controller 72, which receives the accounting information encrypted with the temporary key $K_{temp}$ and its signature, reads the handling policy and price information corresponding to the accounting information from the small capacity storing portion 75 as necessary, and sends to the home server 51 the accounting information encrypted with the temporary key $K_{temp}$ and its signature, and the handling policy and price information corresponding to the accounting information, as necessary.

The home server 51, which receives these data, stores the handling policy and price information in the large capacity storing portion 68 if receiving them, and inputs the accounting information encrypted with the temporary key $K_{temp}$ and its signature in the cipher processing portion 65. The cipher processing portion 65, which receives the accounting information encrypted with the temporary key $K_{temp}$ and its signature, verifies the signature for the accounting information encrypted with the temporary key $K_{temp}$, by the signature verification unit 115 of the encryption/decryption module 96. Verification of the signature is same as that described with reference to FIG. 11, detailed description thereof is thus omitted. And, the decryption unit 111 of the encryption/decryption module 96 decrypts the accounting information encrypted with the temporary key $K_{temp}$.

In Step S124, the home server 51 performs cross authentication and shares the temporary key $K_{temp}$ 2 with the cross authenticating portion 17 of the electronic distribution service center 1. In Step S125, the home server 51 encrypts the accounting information sent from the stationary apparatus 52 with the encryption unit 112 of the encryption/decryption module 96, using the temporary key $K_{temp}$ 2. At this time, the accounting information of the home server 51 may also be encrypted together. Also, the signature corresponding to the accounting information encrypted with the temporary key $K_{temp}$ 2 is generated with the signature generation unit 114 of the encryption/decryption module 96. The host controller 62, which receives the accounting information encrypted with the temporary key $K_{temp}$ 2 and its signature, reads the handling policy, price information and registration information corresponding to the accounting information from the large capacity storing portion 68 as necessary, and sends the accounting information encrypted with the temporary key $K_{temp}$ 2 and its signature, and the handling policy, price information and registration information corresponding to the accounting information as necessary to the user managing portion 18 of the electronic distribution service center 1.

In Step S126, the user managing portion 18 of the electronic distribution service center 1 retrieves the user registration database. In Step S127, whether or not the home server 51 and the stationary apparatus 52 are registered to the "registration" items in the registration database as being registration possible is determined, and if it is determined that they are registered, advancement to Step S128 is made. In Step S128, the user managing portion 18 of the electronic distribution service center 1 verifies the signature for the accounting information encrypted with the temporary key $K_{temp}$ 2, and decrypts the accounting information with the temporary key $K_{temp}$ 2. And, the accounting information, and the handling policy and price information if received are sent to the background data managing portion 15. The background data managing portion 15, which receives the accounting information, and the handling policy and price information if received, manages and stores those data.

In Step S129, the user managing portion 18 of the electronic distribution service center 1 updates the user registration database (the accounting data reception date, registration information issuance data, distribution key issuance date and the like not shown in the figure). In Step S130, the user managing portion 18 of the electronic distribution service center 1 creates registration information (a case of FIG. 18, for example). In Step S131, the user managing portion 18 of the electronic distribution service center 1 encrypts with the temporary key $K_{temp}$ 2 the distribution key $K_d$ received from the key server 14 of the electronic distribution service center 1, and generates the signature for the distribution key $K_d$ encrypted with the temporary key $K_{temp}$ 2. And, the registration information, the distribution key $K_d$ encrypted with the temporary key $K_{temp}$ 2, and the signature for the distribution key $K_d$ encrypted with the temporary key $K_{temp}$ 2 are sent to the home server 51.

In Step S132, the home server 51 receives the registration information, the distribution key $K_d$ encrypted with the temporary key $K_{temp}$ 2, and the signature for the distribution key $K_d$ encrypted with the temporary key $K_{temp}$ 2. The host controller 62 of the home server 51 inputs the distribution key $K_d$ encrypted with the temporary key $K_{temp}$ 2, and the signature for the distribution key $K_d$ encrypted with the temporary key $K_{temp}$ 2 in the cipher processing portion 65. In the cipher processing portion 65, the signature verification unit 115 of the encryption/decryption module 96 verifies the signature for the distribution key $K_d$ encrypted with the temporary key $K_{temp}$ 2, and the decryption unit 111 of the encryption/decryption module 96 decrypts the distribution key $K_d$ using the temporary key $K_{temp}$ 2, and the encryption unit 112 of the encryption/decryption module 96 encrypts again the decrypted distribution key $K_d$, using the temporary key $K_{temp}$ shared with the stationary apparatus 52. Finally, the signature generation unit 114 of the encryption/decryption module 96 generates the signature corresponding to the distribution key $K_d$ encrypted with the temporary key $K_{temp}$, and sends the distribution key $K_d$ encrypted with the temporary key $K_{temp}$ and the signature for the distribution key $K_d$ encrypted with the temporary key $K_{temp}$ back to the host controller 62. The host controller, which receives the distribution key $K_d$ encrypted with the temporary key $K_{temp}$ and the signature for the distribution key $K_d$ encrypted with the temporary key $K_{temp}$, sends the same to the stationary apparatus 52 along with the registration information sent from the electronic distribution service center 1.

In Step S133, the host controller 72 of the stationary apparatus 52 overwrites the received registration information and stores it in the small capacity storing portion 75. In Step S134, the cipher processing portion 73 of the stationary apparatus 52 verifies the signature of the received registration information to determine whether or not the item for "registration" of the ID of the stationary apparatus 52 is "registration possible", and if it is "registration possible", advancement to Step S135 is made. In Step S135, the host controller of the stationary apparatus 52 inputs in the cipher processing portion 73 the distribution key $K_d$ encrypted with the temporary key $K_{temp}$ and the signature for the distribution key $K_d$ encrypted with the temporary key $K_{temp}$. The cipher processing portion 73 verifies the signature for the distribution key $K_d$ encrypted with the temporary key $K_{temp}$, decrypts the distribution key $K_d$ using the temporary key $K_{temp}$, updates the distribution key $K_d$ in the memory module of the cipher processing portion 73, and deletes the accounting information (Furthermore, there may be cases where the accounting information is not actually deleted, but a mark of completed settlement is simply added thereto).

In Step S121, if the ID of the stationary apparatus 52 is not included in the registration information, advancement to Step S136 is made, registration information addition processing is started, and advancement to Step S123 is made.

In Step S127, if the ID of the home server 51 or the ID of the stationary apparatus 52 is not "registration possible" for the "registration item" in the user registration database, advancement to Step S137 is made. Step S137 is similar to Step S130, and detailed description thereof is thus omitted. For Step S138, in Step S131, the user managing portion 18 of the electronic distribution service center 1 sends the registration information to the home server 51. In Step S139, the home server 51 sends the registration information to the stationary apparatus 52.

If the "registration" item for the ID of the stationary apparatus 52 in the registration information is not "registration possible" in Step S122, and if the "registration" item for the ID of the stationary apparatus 52 in the registration information is not "registration possible" in Step S134, the processing is ended.

Furthermore, proxy processing according to this system is processing of the stationary apparatus 52 alone, but all the account information of all apparatuses connected to the home server 51 and the home server 51 itself may be collected to perform batch processing. And, update of the registration information and distribution keys $K_d$ of all apparatuses is performed (in this example, the received registration information and distribution key $K_d$ are not checked at all by the home server 51. In the case where processing of the home server 51 itself is also performed in a batch, they should be checked and updated as a matter of course).

Figure 65:
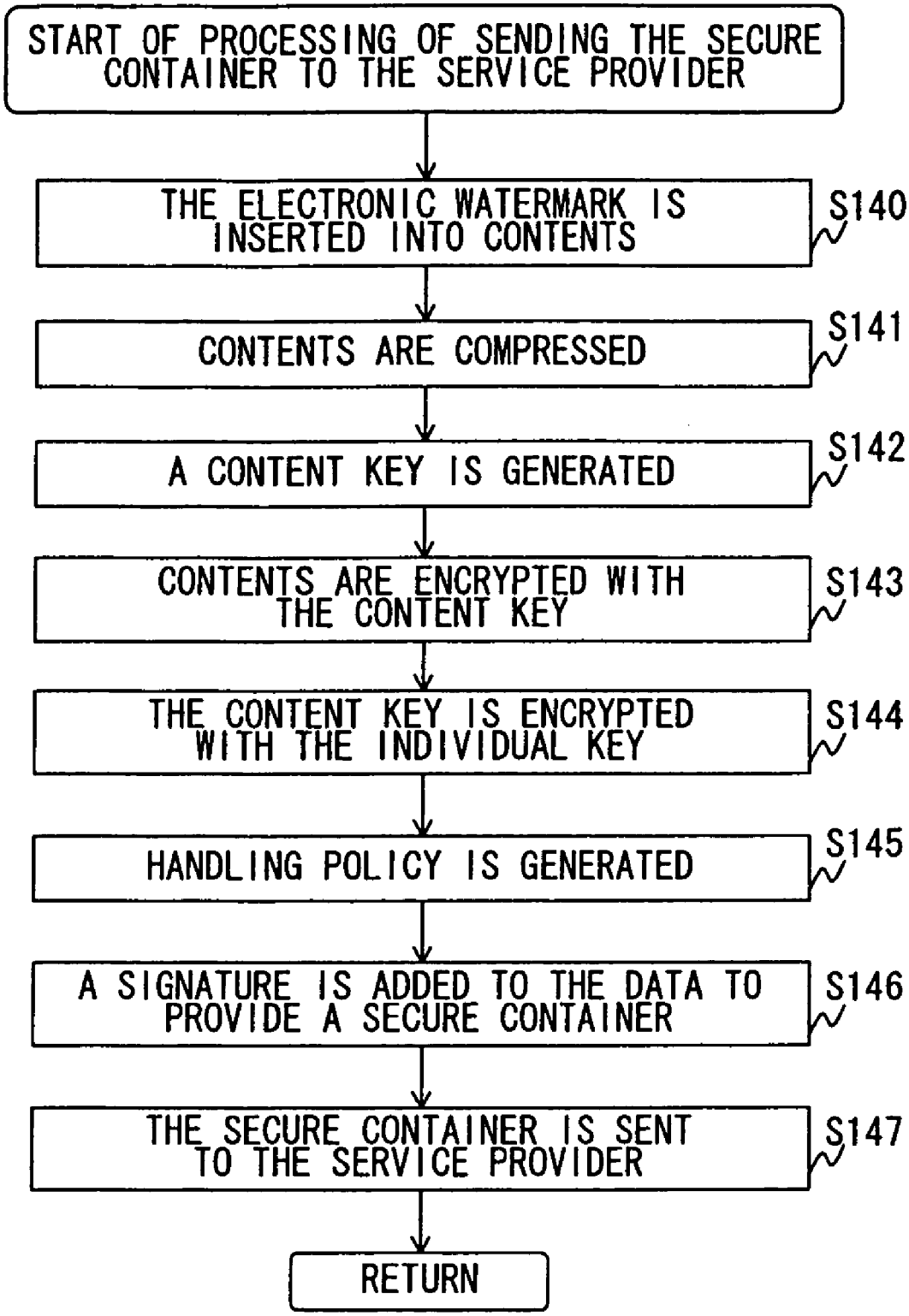
FIG. 65 is a flow chart showing a processing procedure of sending the secure container.

Now, processing where the content provider 2 sends the content provider secure container to the service provider 3, which corresponds to Step S43 in FIG. 56 will be described, using a flow chart of FIG. 65. In Step S140, the electronic watermark adding portion 32 of the content provider 2 inserts predetermined data indicating the content provider 2, for example the content provider ID into the contents read from the content server 31 in the form of an electronic watermark, and supplies the same to the compressing portion 33. In Step S141, the compressing portion 33 of the content provider 2 compresses the contents with the electronic watermark inserted therein with a predetermined system such as ATRAC, and supplies the same to the content encrypting portion 34. In Step S142, the content key generating portion 35 has a key for use as the content key $K_{co}$ generated, and supplies the key to the content encrypting portion 34 and the content key encrypting portion 36. In Step S143, the content encrypting portion 34 of the content provider 2 encrypts the compressed contents with the electronic watermark inserted therein, with a predetermined system such as DES, using the content key $K_{co}$.

In Step S144, the content key encrypting portion 36 encrypts the contents $K_{co}$ with the individual key $K_i$ supplied from the electronic distribution service center 1, through the process of Step S40 in FIG. 56, using a predetermined method such as DES. In Step S145, the handling policy generating portion 37 defines the handling policy of the contents, and generates the handling policy as shown in FIG. 33 or FIG. 34. In Step S146, the signature generating portion 38 of the content provider 2 generates the signature for the encrypted contents, the encrypted content key $K_{co}$, the encrypted individual key $K_i$, and the handling policy supplied from the handling policy generating portion 37. Generation of the signature is similar to that described referring to FIG. 10 and description thereof is thus omitted herein. In Step S147, the content provider 2 sends to the service provider 3 the encrypted contents and the signature thereof, the encrypted content key $K_{co}$ and the signature thereof, the encrypted individual key $K_i$ and the signature thereof, the handling policy and the signature thereof (Hereinafter, these four data with signatures are referred to as the content provider secure container), and the certificate of the content provider 2 received in advance from the authenticator station, using a sending portion not shown in the figure.

As described above, the content provider 2 sends the content provider secure container to the service provider 3.

Figure 66:
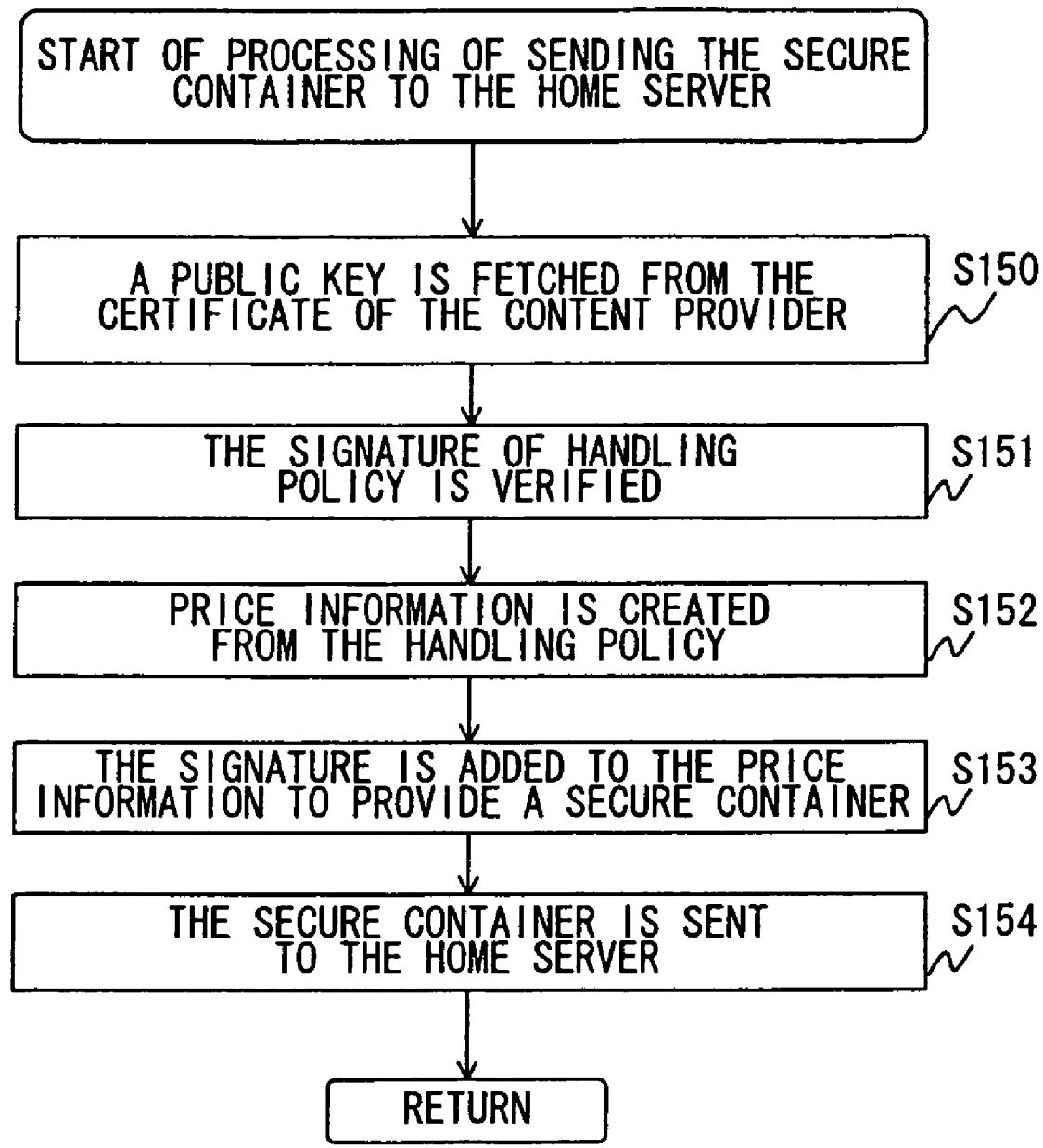
FIG. 66 is a flow chart showing a processing procedure of sending the secure container.

Now, processing where the service provider 3 sends the service provider secure container to the home server 51, which corresponds to Step S44 of FIG. 56 will be described, using a flow chart of FIG. 66. Furthermore, explanation will be presented, assuming that the service provider 3 stores in advance the data sent from the content provider 2 in the content server 41. In Step S150, the certificate verifying portion 42 of the service provider 3 reads the signature of the certificate of the content provider 2 from the content server 41, and verifies the signature in the certificate. Verification of the signature is similar to that described referring to FIG. 11, and detailed description thereof is thus omitted. If the certificate is not tampered, the public key $K_{pcp}$ of the content provider 2 is fetched.

In Step S151, the signature verifying portion 43 of the service provider 3 verifies the signature of the content provider secure container sent from the sending portion of the content provider 2, with the public key $K_{pcp}$ of the content provider 2 (There may be cases where only the signature of the handling policy is verified). If the verification of the signature is not successful and tampering is found, processing is ended. Furthermore, the method of verification of the signature is similar to that described referring to FIG. 11, and detailed description thereof is thus omitted.

In the case where the content provider secure container is not tampered, the pricing portion 44 of the service provider 3 creates price information as described with reference to FIG. 37 and FIG. 38 based on the handling policy, in Step S152. In Step S153, the signature generating portion 45 of the service provider 3 generates the signature for the price information, and creates the service provider secure container with content provider secure container, the price information and the signature of the price information being combined together.

In Step S154, the sending portion (not shown) of the service provider 3 sends the certificate of the service provider 3, the certificate of the content provider 2, and the service provider secure container to the communicating portion 61 of the home server 51.

In this way, the service provider 3 sends the service provider secure container to the home server 51.

Detailed purchase processing of the home server 51 after reception of the correct service provider secure container, which corresponds to Step S45 of FIG. 56, will be described using a flow chart of FIG. 67. In Step S161, the home server 51 performs registration information update processing described above with respect to FIG. 61 and FIG. 62, and then in Step S162, the host controller 62 of the home server 51 inputs the registration information read from the large capacity storing portion 68 of the home server 51 in the cipher processing portion 65 of the home server 51. The cipher processing portion 65, which receives the registration information, verifies the signature of the registration information with the signature verification unit 115 of the encryption/decryption module 96, and then determines whether the item of "purchase processing" for the ID of the home server 51 is "purchase possible", and examines whether the item of registration is "registration possible", and proceeds to Step S163 if they are "purchase possible" and "registration possible". Furthermore, signature verification and examination for "purchase possible" and "registration possible" may also be performed with the registration information checking module 93. In Step S163, the host controller 62 of the home server 51 inputs the public key certificate of the content provider 2 read from the large capacity storing portion 68 of the home server 51 in the cipher processing portion 65 of the home server 51.

The cipher processing portion, which receives the public key certificate of the content provider 2, verifies the signature of the certificate of the content provider 2 with the signature verification unit 115 of the encryption/decryption module 96, followed by fetching the public key of the content provider 2 from the public key certificate. In the case where it is confirmed that no tampering has been made as a result of verification, advancement to Step S164 is made. In Step S164, the host controller 62 of the home server 51 inputs the contents read from the large capacity storing portion 68 of the home server 51 in the cipher processing portion 65 of the home server 51. The cipher processing portion 65, which receives the contents, verifies the signature of the contents with the signature verification unit 115 of the encryption/decryption module 96, and then proceeds to step S165 if it is confirmed that no tampering has been made. In Step S165, the host controller 62 of the home server 51 inputs the content key $K_{co}$ read from the large capacity storing portion 68 of the home server 51 in the cipher processing portion 65 of the home server 51.

The cipher processing portion 65, which receives the content key $K_{co}$, verifies the signature of the content key $K_{co}$ with the signature verification unit 115 of the encryption/decryption module 96, and then proceeds to Step S166 if it is confirmed that no tampering has been made. In Step S166, the host controller 62 of the home server 51 inputs the individual key $K_i$ read from the large capacity storing portion 68 of the home server 51 in the cipher processing portion 65 of the home server 51. The cipher processing portion 65, which receives the individual key $K_i$, verifies the signature of the individual key $K_i$ with the signature verification unit 115 of the encryption/decryption module 96, and the proceeds to Step S167 if it is confirmed that no tampering has been made.

In Step S167, the host controller 62 of the home server 51 inputs the handling policy read from the large capacity storing portion 68 of the home server 51 in the cipher processing portion 65 of the home server 51. The cipher processing portion 65, which receives the handling policy, verifies the signature of the handling policy with the signature verification unit 115 of the encryption/decryption module 96, and then proceeds to Step S168 if it is confirmed that no tampering has been made. In Step S168, the host controller 62 of the home server 51 inputs the public key certificate of the service provider 3 read from the large capacity storing portion 68 of the home server 51 in the cipher processing portion 65 of the home server 51.

The cipher processing portion 65, which receives the public key certificate of the service provider 3, verifies the signature of the certificate of the service provider 3 with the signature verification unit 115 of the encryption/decryption module 96, followed by fetching the public key of the service provider 3 from the public key certificate. If it is confirmed that no tampering has been made as a result of the verification of the signature, advancement to Step S169 is made. In Step S169, the host controller 62 of the home server 51 inputs the price information read from the large capacity storing portion 68 of the home server 51 in the cipher processing portion 65 of the home server 51. The cipher processing portion 65, which receives the price information, verifies the signature of the price information with the signature verification unit 115 of the encryption/decryption module 96, and then proceeds to Step S170 if it is confirmed that no tampering has been made.

In Step S170, the host controller 62 of the home server 51 displays information of purchasable contents (for example, purchasable usage patterns and prices) using the displaying means 64, and the user selects purchase items using the inputting means 63. A signal inputted from the inputting means 63 is sent to the host controller 62 of the home server 51, and the host controller 62 generates a purchase command based on the signal, and inputs the purchase command in the cipher processing portion 65 of the home server 51. Furthermore, these input processing may be performed when purchase processing is started. The cipher processing portion 65, which receives this, generates accounting information and license condition information from the handling policy inputted in Step S167 and the price information inputted in Step S169. The accounting information has been described with reference to FIG. 42, and description thereof is thus omitted. The license condition information has been described with reference to FIG. 41, and description thereof is thus omitted.

In Step S171, the controlling portion 91 of the cipher processing portion 65 stores the accounting information generated in Step S170 in the memory module 92. In Step S172, the controlling portion 91 of the cipher processing portion 65 sends the license condition information generated in Step S170 to the external memory controlling portion 97 of the cipher processing portion 65. The external memory controlling portion 97, which receives the license condition information makes a tamper check for the external memory 67, followed by writing the license condition information in the external memory 67. The tamper check at the time of writing it will be described later, using FIG. 69. In Step S173, the controlling portion 91 of the cipher processing portion 65 decrypts the individual key $K_i$ inputted in Step S166, with the decryption unit 111 of the encryption/decryption module 96, using the distribution key $K_d$ supplied from the memory module 92. Then, the controlling portion 91 of the cipher processing portion 65 decrypts the content key $K_{co}$ inputted in Step S165, with decryption unit 111 of the encryption/decryption module 96, using the individual key $K_i$ just decrypted. Finally, the controlling portion 91 of the cipher processing portion 65 encrypts the content key $K_{co}$ with the encryption unit 112 of the encryption/decryption module 96, using the save key $K_{save}$ supplied from the memory module 92. In Step S174, the content key $K_{co}$ encrypted with the save key $K_{save}$ is stored in the external memory 67 by way of the external memory controlling portion 97 of the cipher processing portion 65.

If the home server 51 is determined as an apparatus incapable of performing purchase processing in Step S162, or if it is determined in Step S163 that the signature of the public key certificate of the content provider 2 is incorrect, or if it is determined in Step S164 that the signature of the contents encrypted with the content key $K_{co}$ is incorrect, or if it is determined in Step S165 that the signature of the content key $K_{co}$ encrypted with the individual key $K_i$ is incorrect, or if it is determined in Step S166 that the signature of the individual key $K_i$ encrypted with the distribution key $K_d$ is incorrect, or if it is determined in Step S167 that the signature of the handling policy is incorrect, or if it is determined in Step S168 that the signature of the certificate of the service provider 3 is incorrect, or if it is determined in Step S169 that the signature of price information is incorrect, the home server 51 proceeds to Step S176 to deal with errors. In the connection, processings in Step S165 and Step S166 may be integrated to one so as to verify one signature for content key $K_{co}$ and individual key $K_i$.

As described above, the home server 51 stores accounting information in the memory module 92, and decrypts the content key $K_{co}$ with the individual key $K_i$, followed by encrypting the content key $K_{co}$ with the save key $K_{save}$, and having the same stored in the external memory 67.

With similar processing, the stationary apparatus 52 also stores accounting information in the memory module of the cipher processing portion 73, decrypts the content key $K_{co}$ with the individual key $K_i$, encrypts the content key $K_{co}$ with the save key $K_{save}$ 2 (different from the key of the home server 51), and has the same stored in the external memory 79.

Figure 68:
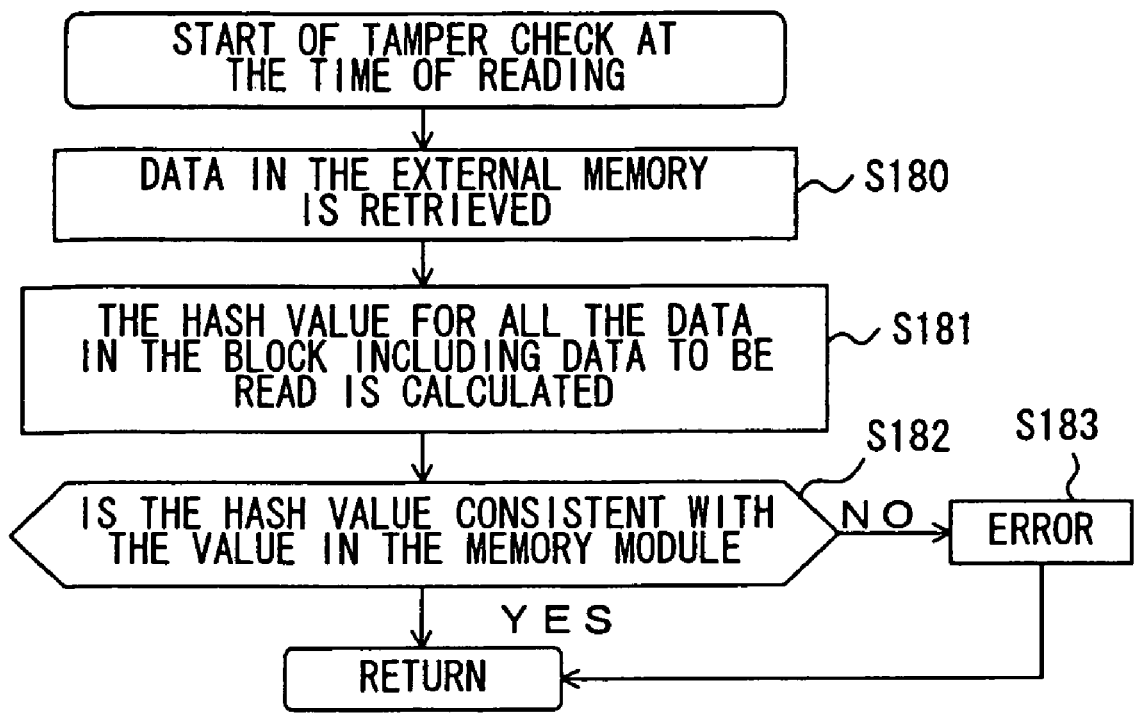
FIG. 68 is a flow chart showing a processing procedure of checking tampering when data is read out.

FIG. 68 is a flow chart explaining a method of checking for a tamper, which the external memory controlling portion 97 of the cipher processing portion 65 performs when reading data from the external memory 67. In step S180 of FIG. 68, the external memory controlling portion 97 of the cipher processing portion 65 retrieves a place of data to be read from the external memory 67 (for example, the first data in the first block of FIG. 16). In Step S181, the external memory controlling portion 97 of the cipher processing portion 65 calculates the hash value for all the data in the same block including data due to be read in the external memory 67 (the hash value for the entire first block of FIG. 16). At this time, data other than the data due to be read (for example, content key 1 and license condition information 1) are discarded after they are used for calculation of the hash value. In step S182, the hash value calculated in Step S181 is compared with the hash value ($ICV_1$) stored in the memory module 92 of the cipher processing portion 65. If they match each other, data read in Step S181 is sent to the controlling portion 91 via the external memory controlling portion 97, and if they do not match each other, the external memory controlling portion 97 proceeds to Step S183, and prohibits following read and write, considering that the memory block has been tampered (considering it as a failed block). For example, when the external memory is considered as a flash memory of 4 MB, it is assumed that this memory is divided into 64 blocks. Therefore, in the memory module are stored 64 of hash values. When data is read out, first a place where data exists is retrieved and the hash value for all data including such data is calculated. A tamper check is made based on whether or not this hash value matches the hash value corresponding the block in the memory module (See FIG. 16).

In this way, the external memory controlling portion 97 of the cipher processing portion 65 makes a tamper check for the external memory and reads data.

Figure 69:
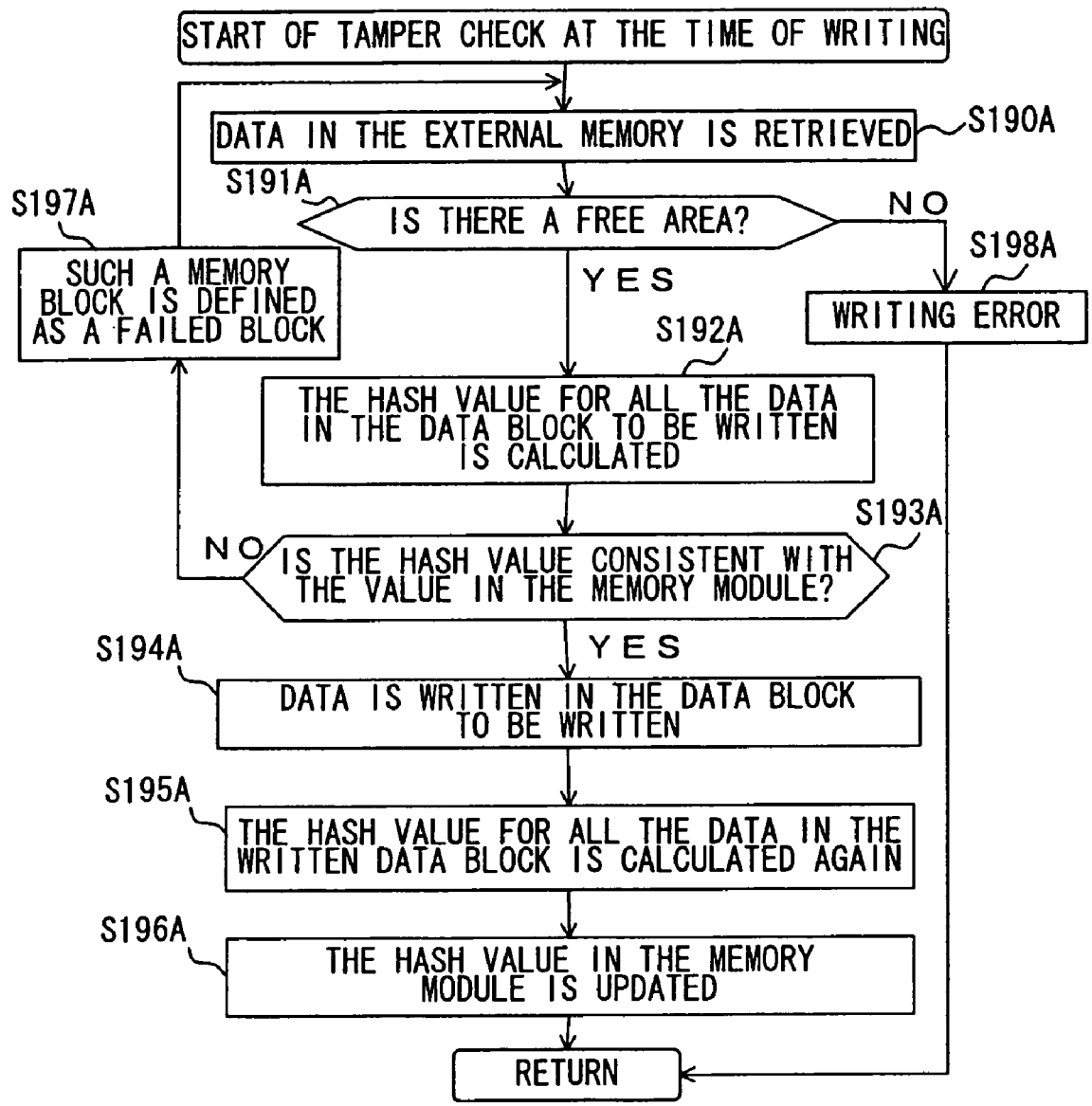
FIG. 69 is a flow chart showing a processing procedure of checking for a tamper when data is written.

FIG. 69 is a flow chart explaining a method of checking for tamper, which is performed by the external memory controlling portion 97 of the cipher processing portion 65 when data is written in the external memory 67. In Step S190A of FIG. 69, the external memory controlling portion 97 of the cipher processing portion 65 retrieves a place where data can be written in the external memory 67. In Step S191A, the external memory controlling portion 97 of the cipher processing portion 65 determines whether or not there is a free area in the external memory 67, and then proceeds to Step S192A if determining that there is a free area. In Step S192A, the external memory controlling portion 97 of the cipher processing portion 65 calculates the hash value for all the data in a data block due to be written. In Step S193A, the hash value calculated in Step S192A is compared with the hash value stored in the memory module 92 of the cipher processing portion 65, and if they match each other, then advancement to Step S194A is made. In Step S194A, data is written in an area projected for write operations. In Step S195A, the external memory controlling portion 97 of the cipher processing portion 65 calculates again the hash value for all the data in the data block that has been written. In Step S196A, the controlling portion 91 updates the hash value in the memory module 92 of the cipher processing portion 65 to the hash value calculated in Step S195A.

If the calculated hash value is different from the hash value in the memory module 92 in Step S193A, the controlling portion 91 defines the memory block as a failed block (for example, changes the hash value to a value indicating a failed block) and proceeds to Step S190A.

In Step S191A, if it is determined that there is no free area in the external memory 67, then advancement to Step S198A is made, and in Step S198A, the external memory controlling portion 97 sends back a write error to the controlling portion 91 and ends processing.

Figure 70:
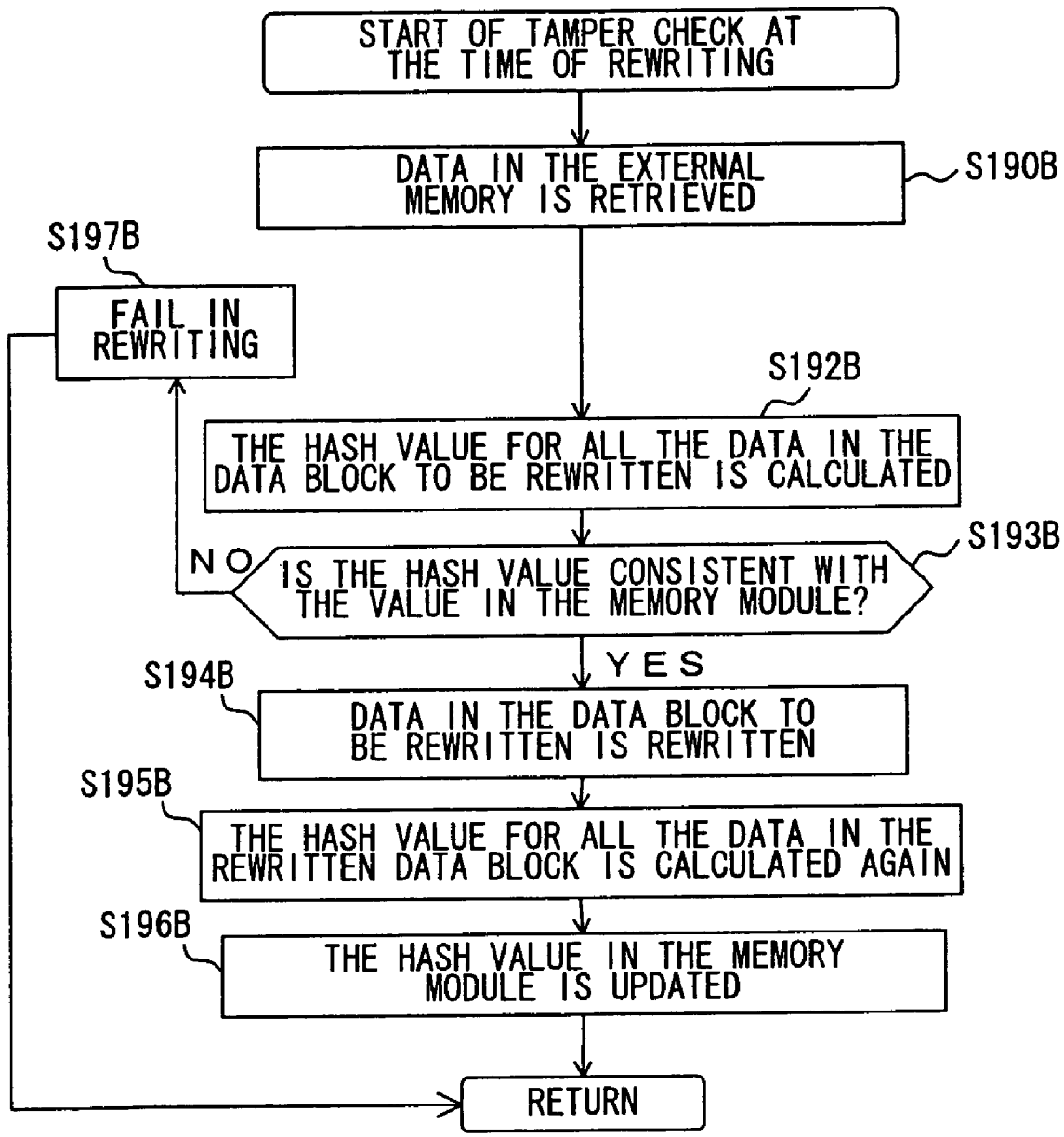
FIG. 70 is a flow chart showing a processing procedure of checking for a tamper when data is rewritten.

For a method for rewriting (updating) in the external memory 67 of the external memory controlling portion 97, as shown in FIG. 70, the external memory controlling portion 97 of the cipher processing portion 65 retrieves a place for rewriting data in the external memory in Step S190B. In Step S192B, the external memory controlling portion 97 of the cipher processing portion 65 calculates the hash value for all the data in a data block due to be rewritten. In step S193B, the hash value calculated in Step S192B is compared with the hash value stored in the memory module 92 of the cipher processing portion 65, and if they match each other, then advancement to Step S194B is made. In Step S194B, data in an area projected for rewriting operations are rewritten. In Step S195B, the external memory controlling portion 97 of the cipher processing portion 65 calculates again the hash value for all the data in the data block that has been written. In Step S196B, the controlling portion 91 updates the hash value in the memory module 92 of the cipher processing portion 65 to the hash value calculated in Step S195B.

If the calculated hash value is different from the hash value in the memory module 92 in Step S193B, the controlling portion 91 defines the memory block as a failed block (for example, changes the hash value to a value indicating a failed block) and determines that rewrite has been failed.

Figure 71:
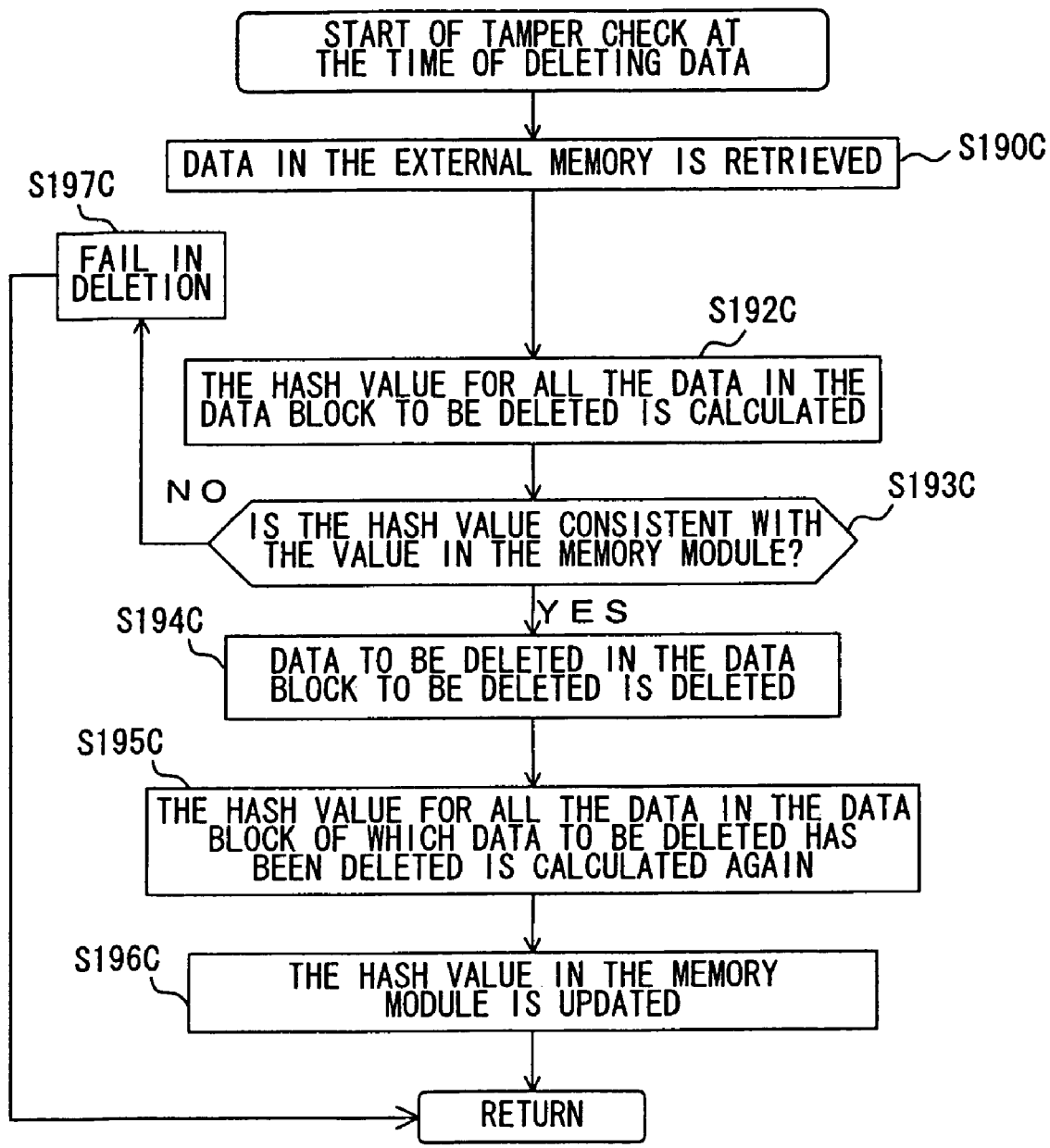
FIG. 71 is a flow chart showing a processing procedure of checking for tamper when data is deleted.

A method for deleting data in the external memory 79 will be described, using FIG. 71. In Step S190C, the external memory controlling portion of the cipher processing portion 73 retrieves a location where the data in external memory 79 is to be deleted. In Step S 192C, the external memory controlling portion of the cipher processing portion 73 calculates the hash value for all the data in a data block projected for deletion of data. In Step S193C, the hash value calculated in Step S192C is compared with the hash value stored in the memory module (not shown) of the cipher processing portion 73, and if they match each other, then advancement to Step S194C is made. In Step S194C, data due to be deleted in an area projected for deletion is deleted. In Step S195C, the external memory controlling portion of the cipher processing portion 73 calculates again the hash value for all the data in the data block where the data due to be deleted is deleted. In Step S196C, the cipher processing portion 73 updates the hash value in the memory module to the hash value calculated in Step S195C.

In Step S193C, if the calculated hash value is different from the hash value in the memory module, the cipher processing portion 73 defines the memory block as a failed block (for example, changes the hash value to a value indicating a failed block), and determines that deletion has been failed.

Figure 72:
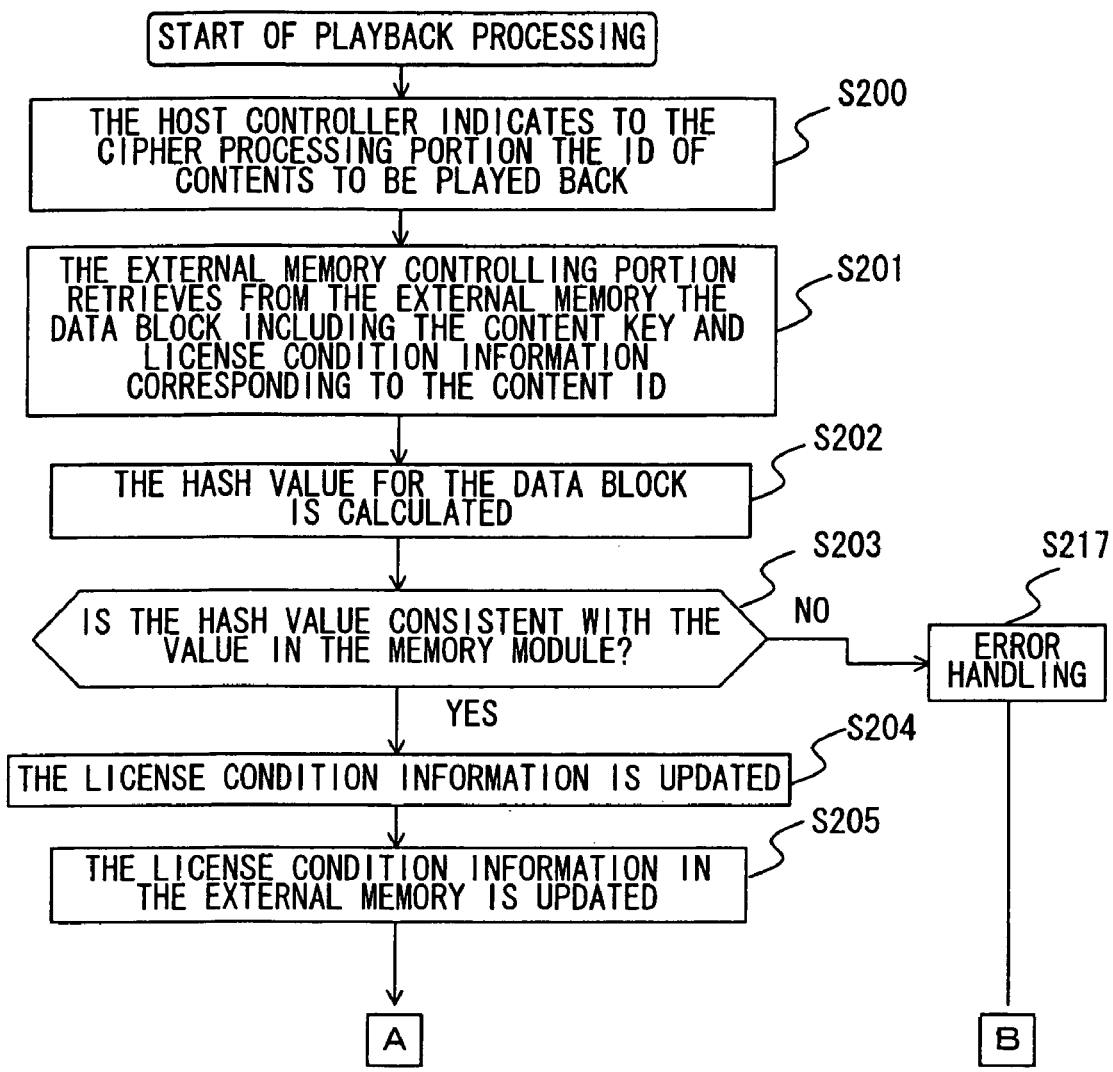
FIG. 72 is a flow chart showing a processing procedure of playing back contents by the home server.
Figure 73:
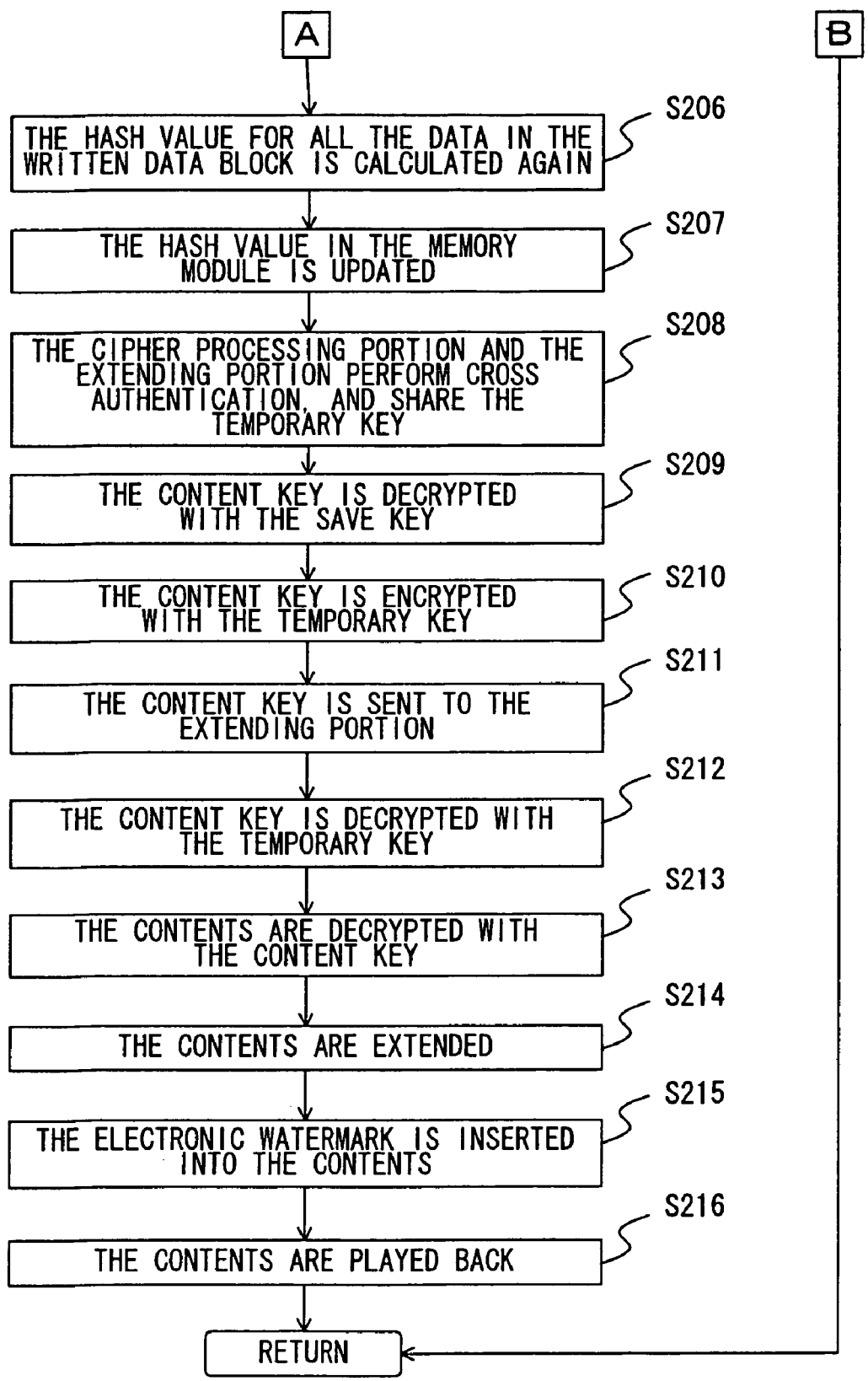
FIG. 73 is a flow chart showing a processing procedure of playing back contents by the home server.

Detailed description of processing where the home server 51 plays back the contents, which corresponds to Step S46 of FIG. 56, will be presented, using flow charts of FIG. 72 and FIG. 73. In step S200, the host controller 62 of the home server 51 inputs the ID corresponding to the contents of which playback is instructed from the inputting means 63 of the home server 51 in the cipher processing portion 65 of the home server 51. In Step S201, the controlling portion 91 of the cipher processing portion 65, which receives the content ID to be played back, sends the content ID to the external memory controlling portion 97 of the cipher processing portion 65, and has the content key $K_{co}$ corresponding to the content ID and license condition information retrieved. At this time, it confirms that the license condition information is a right capable of being regenerated. In Step S202, the external memory controlling portion 97 of the cipher processing portion 65 calculates the hash value of the data block including the content key $K_{co}$ and the license condition information, and sends the hash value to the controlling portion 91 of the cipher processing portion 65. In Step S203, the controlling portion 91 of the cipher processing portion 65 determines whether or not the hash value stored in the memory module 92 of the cipher processing portion 65 matches the hash value received in Step S202, and then proceeds to Step S204 if they match each other.

In Step S204, the controlling portion 91 of the cipher processing portion 65 updates the license condition information as necessary. For example, if usage right in the license condition information is represented by a coupon ticket, it is a process to subtract the number of counts of the coupon ticket, and so on. Thus, purchased right and the like requiring no update do not need to be updated, and in that case, a jump to Step S208 is made (not shown). In Step S205, the external controlling portion 97 rewrites and updates in the external memory 67 the updated license condition information sent from the controlling portion 91. In Step S206, the external memory controlling portion 97 calculates the hash value for all the data in the rewritten data block, and sends the hash value to the controlling portion 91 of the cipher processing portion 65. In Step S207, the controlling portion 91 of the cipher processing portion 65 rewrites the hash value stored in the memory module 92 of the cipher processing portion 65 to the hash value calculated in Step S206.

In Step S208, the cipher processing portion 65 and the extending portion 66 perform cross authentication, and share the temporary key $K_{temp}$ The cross authentication is same as that described using FIG. 51, and detailed description thereof is thus omitted. In Step S209, the decryption unit 111 of the encryption/decryption module 96 decrypts the content key $K_{co}$ read from the external memory 97, with the save key $K_{save}$ supplied from the memory module 92. In Step S210, the encryption unit 112 of the encryption/decryption module 96 encrypts again the content key $K_{co}$ with the temporary key $K_{temp}$ just shared with the extending portion 66. In Step S211, the controlling portion 91 of the cipher processing portion 65 sends the content key $K_{co}$ encrypted with the temporary key $K_{temp}$ to the extending portion 66 via the host controller 62.

In Step S212, the key decryption module 102 of the extending portion 66 decrypts the content key $K_c$ with the temporary key $K_{temp}$ supplied from the cross authentication module 101. In Step S213, the host controller 62 reads the contents from the large capacity storing portion 68, and supplies the contents to the extending portion 66. The decryption module 103 of the extending portion 66, which receives the contents, decrypts the contents using the content key $K_{co}$ supplied from the key decryption module 102. In Step S214, the extending module 104 of the extending portion 66 extends the contents with a predetermined system, for example a system such as ATRAC. In Step S215, the electronic watermark addition module 105 inserts data indicated from the cipher processing portion 65 into the contents in the form of an electronic watermark (Data passed from the cipher processing portion to the extending portion include not only the content key $K_{co}$ but also playback conditions (analog output, digital output, output with copy controlling signals (SCMS)), the ID of the apparatus that has purchased content usage right, and so on. Data to be inserted is the ID of the apparatus that has purchased the content usage right (that is, the apparatus ID in the license condition information, and the like). In Step S216, the extending portion 66 plays back music via a speaker not shown in the figure.

In this way, the home server 51 plays back the contents.

Figure 74:
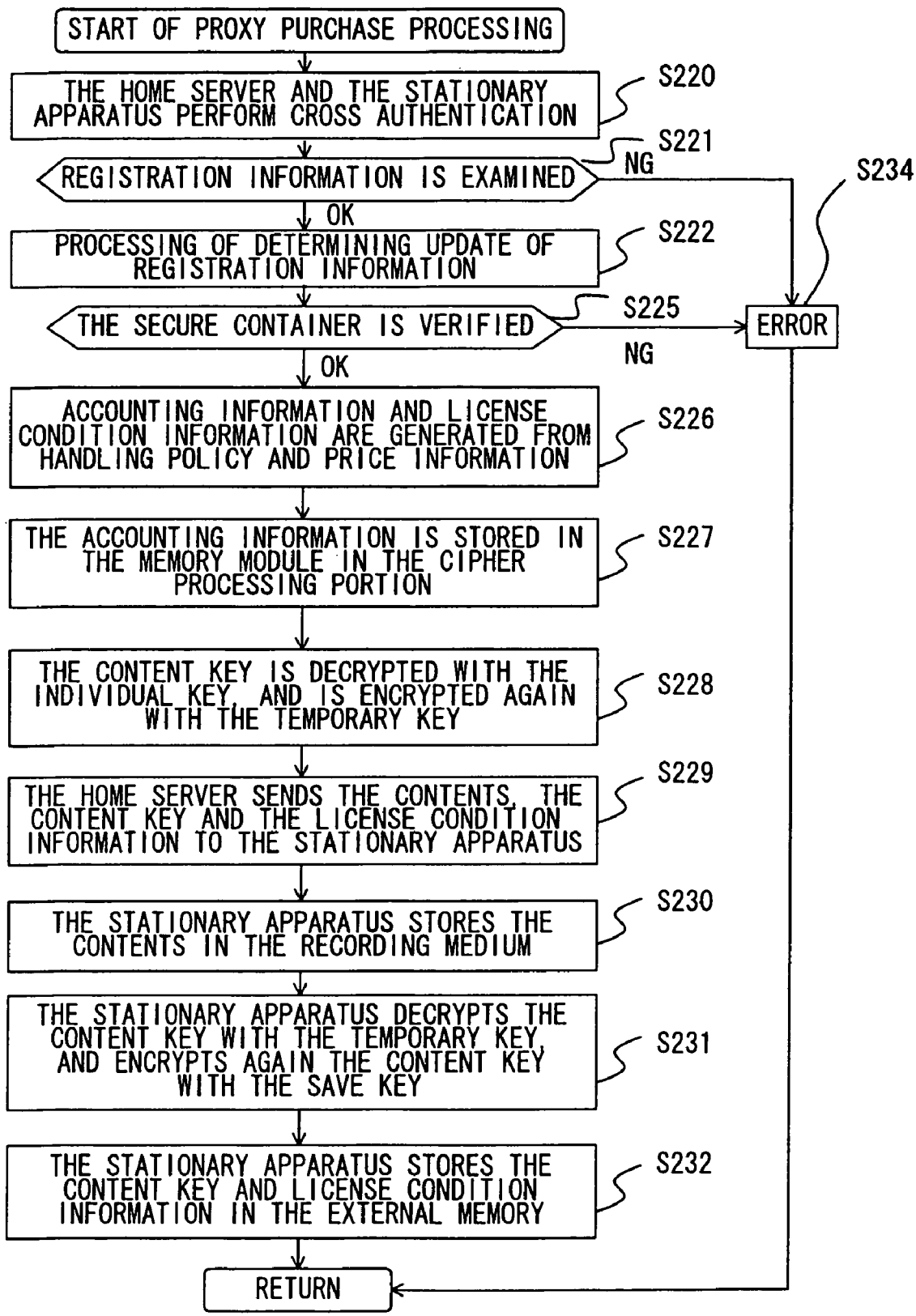
FIG. 74 is a flow chart showing a processing procedure of purchasing content usage right as a proxy by the home server.

FIG. 74 is a flow chart explaining a detailed process in which the home server 51 purchases content usage right as a proxy for the stationary apparatus 52. In step S220, the home server 51 and the stationary apparatus 52 perform cross authentication. Cross authentication processing is similar to that described with reference to FIG. 52, and description thereof is thus omitted. In Step S221, the host controller 62 of the home server 51 makes the cipher processing portion 65 of the home server 51 examine the registration information read from the large capacity storing portion 68 of the home server 51. The cipher processing portion 65, which receives the registration information from the host controller 62, makes the signature authentication unit 115 of the encryption/decryption module 96 authenticate the signature added to the registration information, with the public key of the electronic distribution service center 1 supplied from the memory module 92 of the cipher processing portion 65. After success in authentication of the signature, the controlling portion 91 of the cipher processing portion 65 determines whether the ID of the stationary apparatus is registered in the registration information and the items of "registration" and "purchase" are "registration possible" and "purchase possible", and then proceeds to Step S222 if it is "registration possible" (Furthermore, the registration information is also examined at the stationary apparatus 52, and it is determined that the home server 51 is "registration possible"). Step S225 to Step S227 are similar to processes of Step S 160 to Step S171 of FIG. 67, and description thereof is thus omitted.

In Step S228, the controlling portion 91 of the cipher processing portion 65 decrypts the individual key $K_i$ encrypted with the distribution key $K_d$ inputted in Step S225, with the encryption unit 111 of the encryption/decryption module 96, using the distribution key $K_d$ supplied from the memory module 92. Then, the controlling portion 91 of the cipher processing portion 65 decrypts the content key $K_{co}$ encrypted with the individual key $K_i$ inputted in Step S225, with the decryption unit 111 of the encryption/decryption module 96, using the individual key $K_i$. And, the controlling portion 91 of the cipher processing portion 65 encrypts again the content key $K_{co}$ with the encryption unit 112 of the encryption/decryption module 96, using the temporary key $K_{temp}$ shared with the stationary apparatus 52 during cross authentication in Step S220. In step S229, the controlling portion 91 of the cipher processing portion 65 generates the signature for the content key $K_{co}$ encrypted with the temporary key $K_{temp}$ and the license condition information generated in Step S226, using the signature generation unit 114 of the encryption/decryption module 96, and sends the signature to the host controller 62. The host controller 62 of the home server 51, which receives the content key $K_{co}$ encrypted with the temporary key $K_{temp}$, the license condition information and their signatures, reads the contents encrypted with the content key $K_{co}$ (Including signatures. Same in the following) from the large capacity storing portion 68, and sends the content key $K_{co}$ encrypted with the temporary key $K_{temp}$, the license condition information, their signatures and the contents encrypted with the content key $K_{co}$ to the stationary apparatus 52.

In Step S230, the stationary apparatus 52, which receives the content key $K_{co}$ encrypted with the temporary key $K_{temp}$, the license condition information, their signatures and the contents encrypted with the content key $K_{co}$, verifies the signature, followed by outputting the contents encrypted with the content key $K_{co}$ to the recording and playing portion 76 of the stationary apparatus 52. The recording and playing portion 76 of the stationary apparatus 52, which receives the contents encrypted with the content key $K_{co}$, stores the contents encrypted with the content key $K_{co}$ in the recording medium 80.

In Step S231, the cipher processing portion 73 of the stationary apparatus 52 decrypts the content key $K_{co}$ encrypted with the temporary key $K_{temp}$, with the decryption unit of the encryption/decryption module, using the temporary key $K_{temp}$ shared with the home server 51 during cross authentication in Step S220. And, the controlling portion of the cipher processing portion 73 encrypts again the content key $K_{co}$ with the encryption unit of the encryption/decryption module, using the save key $K_{save}$ 2 supplied from the memory module of the cipher processing portion 73.

In Step S232, the cipher processing portion 73 of the stationary apparatus 52 sends the content key $K_{co}$ encrypted with the save key $K_{save}$ 2 and the license condition information received in Step S230 to the external memory controlling portion of the cipher processing portion 73, and has the same stored in the external memory 79. Processing where the external memory controlling portion writes data in the external memory has been already described with reference to FIG. 69, detailed description thereof is thus omitted.

In this way, the home server 51 purchases content usage right, the accounting information is stored at the home server 51 side, and the usage right is delivered to the stationary apparatus 52.

Figure 75:
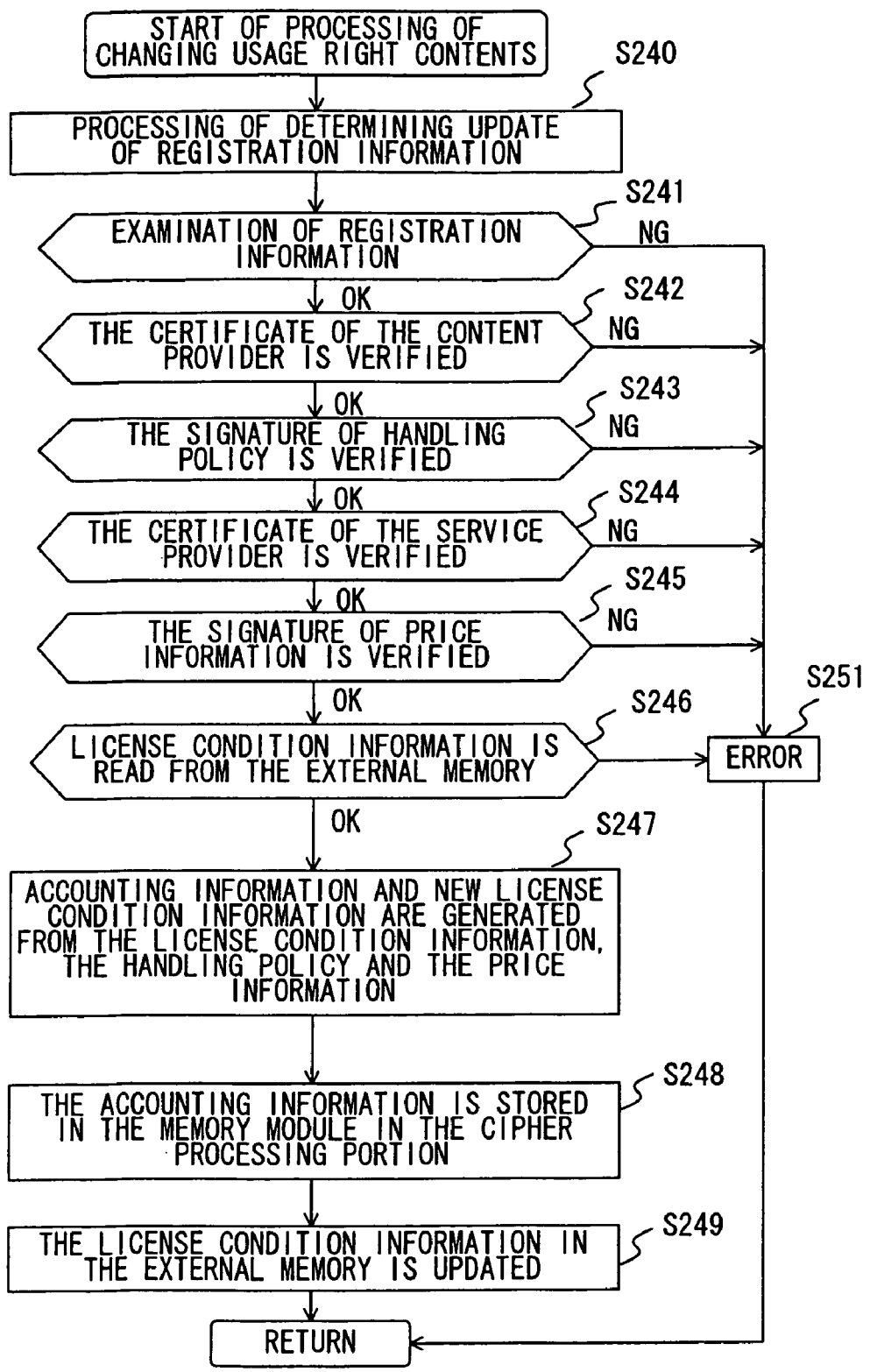
FIG. 75 is a flow chart showing a processing procedure of changing contents of a user who has completed purchase.

FIG. 75 is a flow chart showing processing where the home server 51 changes the content usage right that has been already purchased to another usage pattern and purchases it. Step S240 to Step S245 of FIG. 75 are processes similar to those described with reference to FIG. 67, and description thereof is thus omitted. In Step S246, the cipher processing portion 65 of the home server 51 makes the external memory controlling portion 97 of the cipher processing portion 65 read out the license condition information of the contents of which usage right is changed. Read-out of data from the external memory 67 has been described referring to FIG. 68, and detailed description thereof is thus omitted. In the case where the license condition information can be normally read out in Step S246, advancement to Step S247 is made.

In Step S247, the host controller 62 of the home server 51 displays information of contents of which usage right content can be changed (for example, usage patterns and prices of which usage right content can be changed) using the displaying means 64, and user selects usage right contents update condition using the inputting means 63. A signal inputted from the inputting means 63 is sent to the host controller 62 of the home server 51, and the host controller 62 generates a usage right contents changing demand based on the signal and inputs the usage right contents changing demand in the cipher processing portion 65 of the home server 51. The cipher processing portion 65, which receives this, generates accounting information and new license condition information from the handling policy received in Step S243, the price information received in Step S245 and the license condition information read out in Step S247.

Figure 67:
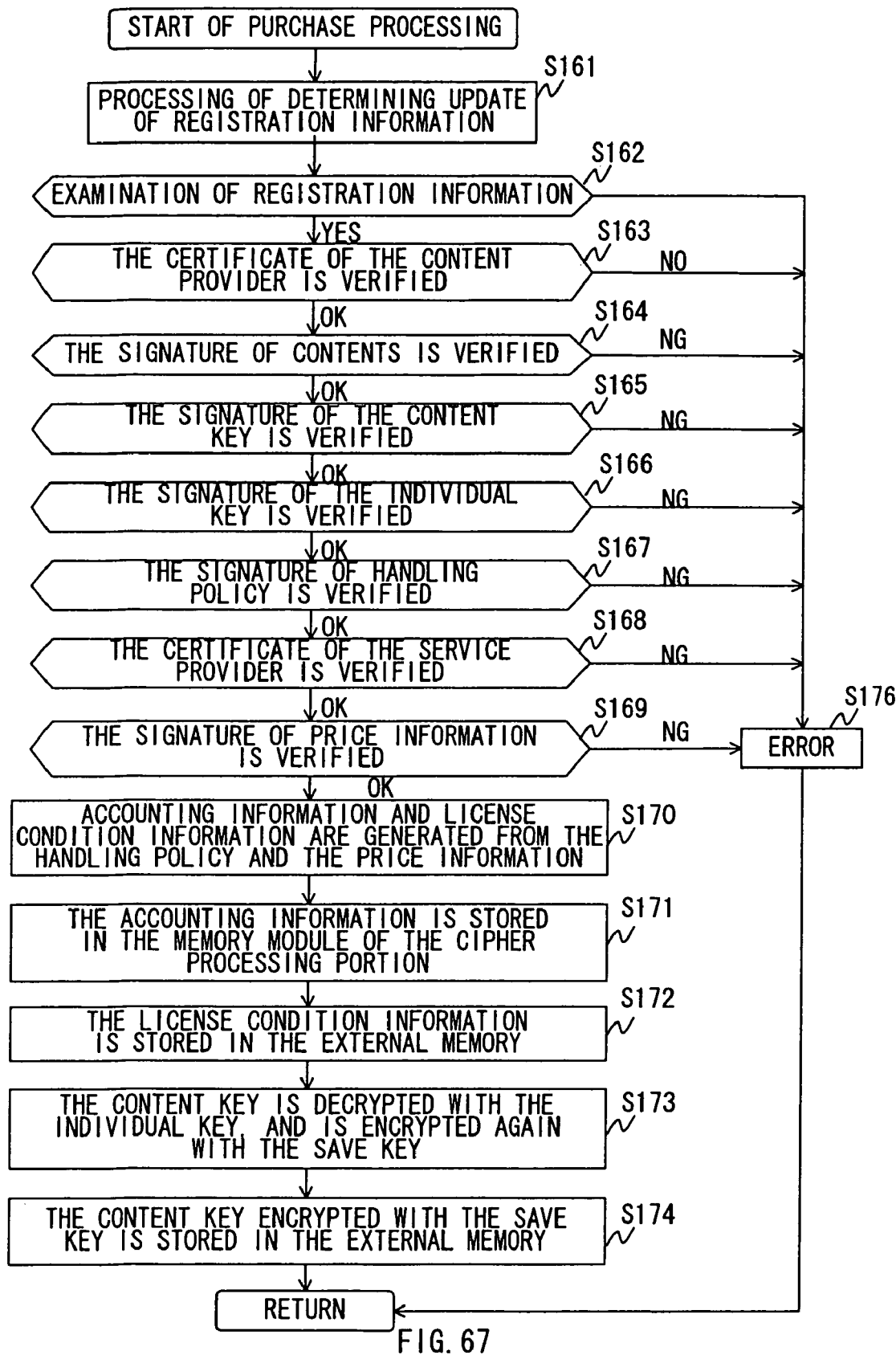
FIG. 67 is a flow chart showing a processing procedure of purchasing a home server.

Step S248 is similar to Step S171 of FIG. 67, and detailed description thereof is thus omitted. In Step S249, the controlling portion 91 of the cipher processing portion 65 outputs the license condition information generated in Step S247 to the external memory controlling portion 97 of the cipher processing portion 65. The external memory controlling portion 97 rewrites and updates in the external memory 67 the received license condition information. A method for rewriting (updating) in the external memory 67 of the external memory controlling portion 97 has been described with reference to FIG. 70, and detailed description thereof is thus omitted.

In Step S246, if license condition information corresponding to the content ID added to the right contents changing command is not found in the external memory 67, or if a tamper is found in the memory block of the external memory in which the license condition information is stored (already described referring to FIG. 68), advancement to Step S251 is made, and predetermined error processing is performed.

In this way, the home server 51 may purchase new right using the right that has been already purchased, and the handling-policy and price information to change usage right contents.

FIG. 76 and FIG. 77 show specific examples of the rule component of the handling policy and price information. In FIG. 76, the handling policy is constituted by a rule number added as a reference number for each usage right, a usage right content number indicating the usage right contents, its parameter, a minimum selling price and the rate of benefits of the content provider, and in this handling policy are described five rules, for example. For the rule 1, since the right item is of usage right content number 1, it is understood from FIG. 44 that the right is playback right and right with no limit on time and the number of times. Also, it is understood that there is no particular description in the parameter item. The minimum-selling price is ¥350. The earnings of the content provider 2 are 30% of the price. For the rule 2, since the right item is of usage right content number 2, it is understood from FIG. 44 that the right is playback right and right with limit on time and no limit on the number of times. Also, it is understood from the parameter item that the period limited for use is one hour. The minimum-selling price is ¥100, and the earnings of the content provider 2 is 30% of the price. For the rule 3, since the right item is of usage right content number 6, it is understood from FIG. 44 that the right is replication right (with no copy control signal), and right with no limit on time and with limit on the number of times. Also, it is understood from the parameter item that the number of times limited for use is one. The minimum-selling price is ¥30, and the earnings of the content provider 2 are 30% of the price.

For the rule 4, since the right item is of usage right content number 13, it is understood from FIG. 44 that the right is change of usage contents. It is understood from the parameter item that changeable rule numbers are from #2 (playback right, with limit on time and no limit on the number of times) to #1 (playback right with no limit on time and the number of times). The minimum-selling price is ¥200, and the earnings of the content provider 2 are 20% of the price. The minimum-selling price presented is lower that that of the rule 1 because it is intended that the right already purchased is taken as a trade-in and repurchased, and the earnings of the content provider 2, which are presented, are lower than those of the rule 1 for the purpose of increasing the earnings of the electronic distribution service center 1 that is involved in practical works (Because the content provider 2 has no works when the right contents are changed).

For the rule 5, since the right item is of usage right content number 14, it is understood from FIG. 44 that the right is redistribution. It is understood from the parameter item that the redistribution enabling condition is that the apparatus having the rule number #1 (playback right with no limit on time and the number of times) purchases and redistributes the rule number 1 (playback right with no limit on time and the number of times). The minimum-selling price is ¥250, and the earnings of the content provider 2 are 20% of the price. The minimum-selling price presented is lower than that of the rule 1 because the apparatus having right already purchased intends to repurchase the right for the same contents, and the earnings of the content provider 2, which are presented, are lower than those of the rule 1 for the purpose of increasing the earnings of the electronic distribution service center 1 that is involved in practical works (Because the content provider 2 has no works during redistribution).

In FIG. 77, price information is constituted by a rule number added as a reference number for each usage right, a parameter and price information, and in this price information are also described five rules. The rule 1 is price information for the rule #1 of the handling policy, and shows that the price is ¥500 and the earnings of the service provider 3 are 30% when the usage right content number #1 is purchased. Thus, of ¥500 paid by the user, the content provider 2 will take ¥150, the service provider 3 ¥150, and the electronic distribution service center 1 ¥200. The rules 2 to 5 are in a similar way, and detailed description thereof is thus omitted.

Furthermore, in the rules 4 and 5, the earnings of the service provider 3 are smaller than those of the rule 1 because the user apparatus perform distribution operations of the service provider 2 as a proxy, and collection of paid money is performed by the electronic distribution service center 1.

Also, in this example, rule numbers are consecutive numbers from #1 to #5, but the numbers are not necessarily consecutive. The creator defines a usage right number and a parameter for each rule number and arranges those extracted therefrom, which does not result in consecutive numbers in general.

FIG. 78 shows a specific example in the case of performing change of right contents described with reference to FIG. 75. The handling policy is constituted by a rule number added as a reference number for each usage right, a usage content number indicating the usage right contents, its parameter, a minimum-selling price and the rate of benefits of the content provider, the price information is constituted by a rule number added as a reference number for each usage right, a parameter and a price information and the license condition information is constituted by a rule number added as a reference number for each usage right, a usage right content number indicating the usage right content and its parameter. The home server 51 has already purchased playback right of rule number #2, right with limit on time, the rule number #2 is described in the license condition information indicating the right contents, and usage possible time is remaining thirty minutes, indicating that total two hours's purchase has been made up to the present time. If a change from right with limit on time to right no limit on time is to be made, now, it is understood, from the rule 3 of the handling policy, the rule 3 of the price information and the license condition information, that a change to playback right with no limit on time and the number of times can be made with ¥200, and the license condition information changes to the role number #1, playback right of the usage right content number, with no limit on time and the number of times (The parameter in the case of usage right content number #1 will be described later. Also, as for this example, right with limit on time is once purchased, and then its right contents are changed, resulting in lower costs compared to cases where playback right with no limit on time and the number of times is directly purchased. Therefore, it is advisable to see total usage time to give a discount).

Figure 79:
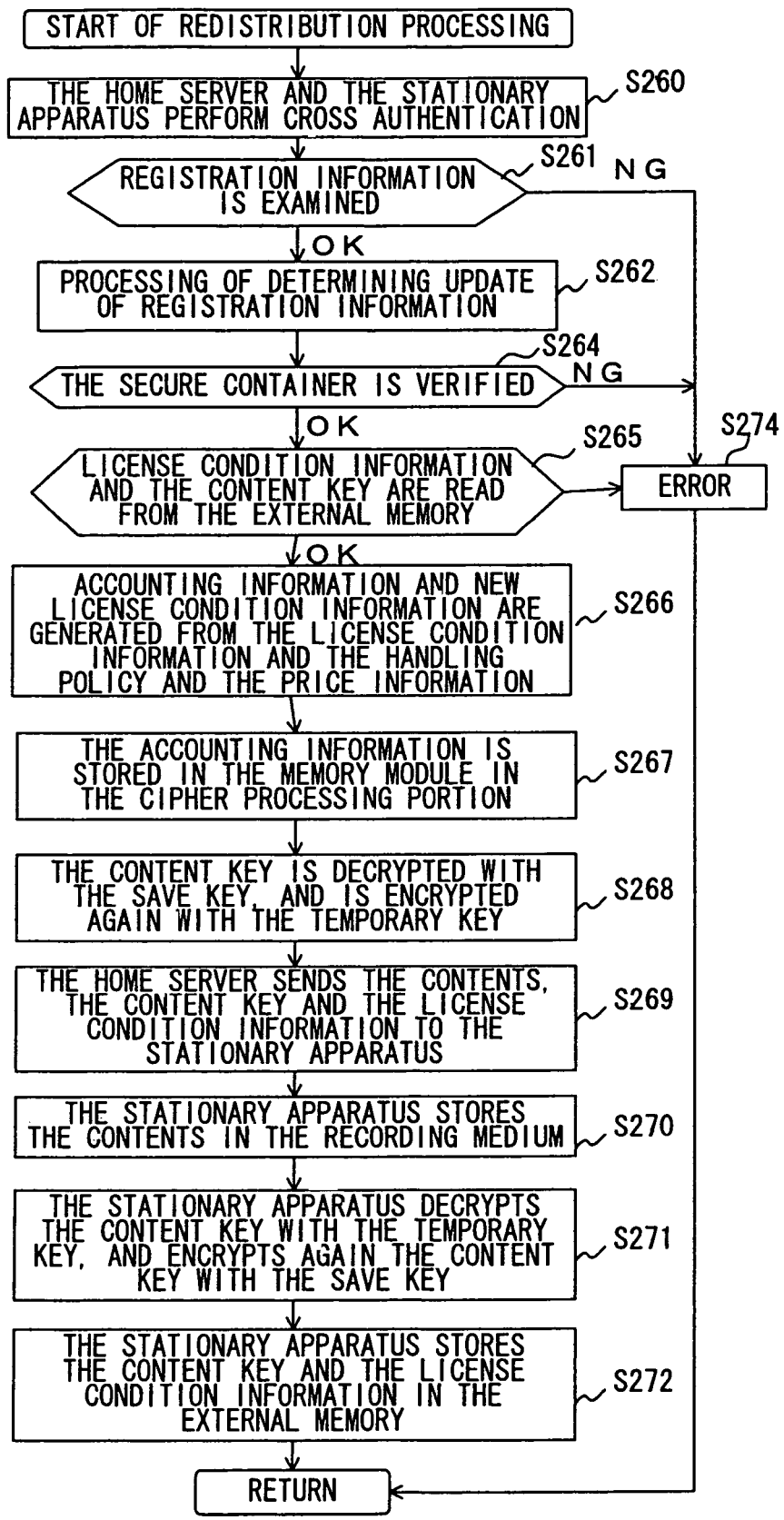
FIG. 79 is a flow chart showing a processing procedure of redistributing content usage right.

FIG. 79 is a flow chart explaining a detailed process in which home server 51 purchases content usage right for the stationary apparatus 52, and redistributes the usage right. Step S260 to Step S264 are similar to Step S220 to Step S225 of FIG. 74, and detailed description thereof is thus omitted. In Step S265, the cipher processing portion 65 of the home server 51 makes the external memory controlling portion 97 of the cipher processing portion 65 read from the external memory 67 the license condition information corresponding to the contents to be redistributed and the content key $K_{co}$ encrypted with the save key $K_{save}$. A method of reading from the external memory 67 by the external controlling portion 97 has been described with reference to FIG. 68, and detailed description thereof is thus omitted. If the reading is successful, advancement to Step S266 is made.

In Step S266, the host controller 62 of the home server 51 displays information of re-distributable contents (for example, usage patterns and prices of re-distributable contents), using the displaying means 64, and the user selects redistribution conditions using the inputting means 63. Furthermore, this selection processing may be performed in advance when the redistribution processing is started. A signal inputted from the inputting means 63 is sent to the host controller 62 of the home server 51, and the host controller 62 generates a redistribution command based on the signal and inputs the redistribution command in the cipher processing portion 65 of the home server 51. The cipher processing portion 65, which receives this, generates accounting information and new license condition information from the handling policy and the price information received in Step S264 and the license condition information read out in Step S265.

Step S267 is similar to Step S171 of FIG. 67, and detailed description thereof is thus omitted. In Step S268, the controlling portion 91 of the cipher processing portion 65 decrypts the content key $K_{co}$ encrypted with the save key $K_{save}$ read out in Step S265, with the decryption unit 111 of the encryption/decryption module 96, using the save key $K_{save}$ supplied from the memory module 92. And, the controlling portion 91 of the cipher processing portion 65 encrypts again the content key $K_{co}$ with the encryption unit 112 of the encryption/decryption module 96, using the temporary key $K_{temp}$ shared with the stationary apparatus 52 during cross authentication in Step S260. Finally, the signature generation unit 114 of the encryption/decryption module 96 generates the signature corresponding to the new license condition information generated in Step S266, and sends the signature to the controlling portion 91 of the cipher processing portion 65.

Processes of Step S269 to Step S272 are similar to those of Step S229 to Step S232, and detailed description thereof is thus omitted.

In this way, the home server 51 can perform redistribution of the contents, by creating new license condition information from the usage right (license condition information) retained on its own and the handling policy and price information, and sending the new license condition information to the stationary apparatus 52 together with the content key $K_{co}$ and the contents retained on its own.

Figure 80:
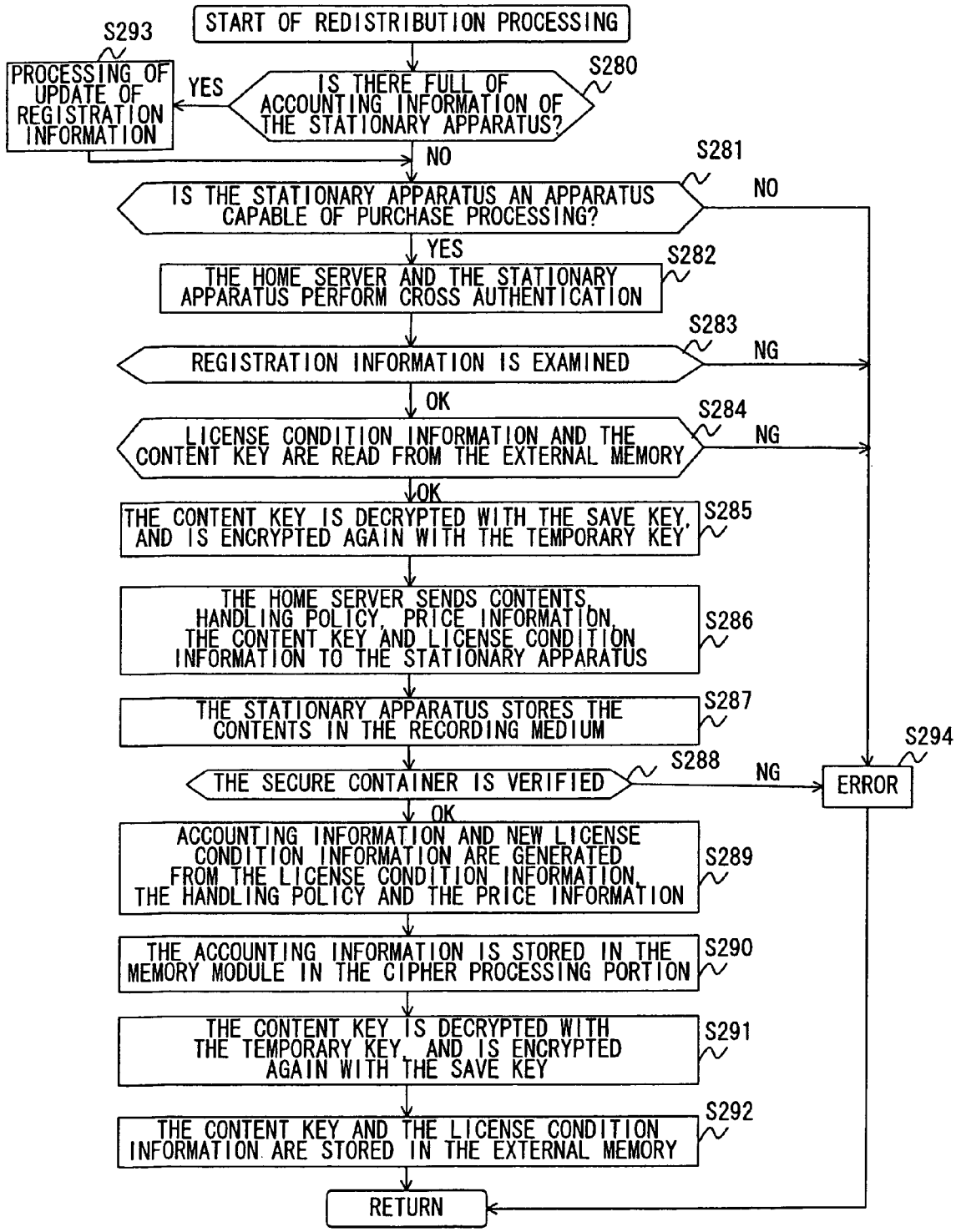
FIG. 80 is a flow chart showing a processing procedure of purchasing content usage right by the stationary apparatus.

FIG. 80 is a flow chart explaining a detailed process in which the home server 51 sends license condition information and the content key $K_{co}$ for the stationary apparatus 52 to purchase content usage right by the stationary apparatus 52. In step S280, the cipher processing portion 73 of the stationary apparatus 52 determines whether or not a total charge for the accounting information stored in the memory module of the cipher processing portion 73 has reached an upper limit, and if the upper limit has not been reached, then advancement to Step S281 is made (Furthermore, determination by limit on the number of accounting instances is also possible instead of determination by upper limit on a total charge).

In Step S281, the host controller 72 of the stationary apparatus 52 inputs in the cipher processing portion 73 the registration information read from the small capacity storing portion 75 of the stationary apparatus 52. The cipher processing portion 73, which receives the registration information, verifies the signature of the registration information with the signature verification unit of the encryption/decryption module (not shown), followed by determining whether the item of "purchase processing" for the ID of the stationary apparatus 52 is "purchase possible", and then proceeds to Step S282 if it is "purchase possible".

Step S282 is similar to Step S220 of FIG. 74, and detailed description thereof is thus omitted. Step S283 is similar to Step S221 of FIG. 74, and detailed description thereof is thus omitted (The home server 51 determines whether or not the stationary apparatus 52 is registered, and the stationary apparatus 52 determines whether or not the home server 51 is registered). Step S284 is similar to Step S265 of FIG. 79, and detailed description thereof is thus omitted. Step S285 is similar to Step S268 of FIG. 79, and detailed description thereof is thus omitted. In step S286, the controlling portion 91 of the cipher processing portion 65 generates the signature for the content key $K_{co}$ encrypted with the temporary key $K_{temp}$ and the license condition information read out in Step S284, using the signature generation unit 114 of the encryption/decryption module 96, and sends the signature to the host controller 62. The host controller 62 of the home server 51, which receives the content key $K_{co}$ encrypted with the temporary key $K_{temp}$, the license condition information and signatures thereof, reads the contents encrypted with the content key $K_{co}$, and the handling policy and the signature thereof, and price information and the signature thereof as necessary from the large capacity storing portion 68, and sends to the stationary apparatus 52 the content key $K_{co}$ encrypted with the temporary key $K_{temp}$, the license condition information, signatures thereof, the contents encrypted with the content key $K_{co}$, the handling policy and the signature thereof, and the price information and the signature thereof.

Step S287 is similar to Step S230 of FIG. 74, and detailed description thereof is thus omitted. Step S288 is similar to Step S225 of FIG. 74, and detailed description thereof is thus omitted. Step S288 is similar to Step 225 of FIG. 74, and detailed description thereof is thus omitted. In Step S289, the host controller 72 of the stationary apparatus 52 displays information of re-distributable contents (for example, usage patterns and prices of re-distributable contents), using the displaying means 78, and the user selects redistribution conditions using the inputting means 77. Furthermore, this selection processing may be performed in advance when the redistribution processing is started. A signal inputted from the inputting means 77 is sent to the host controller 72 of the stationary apparatus 52, and the host controller 72 generates a redistribution command based on the signal and inputs the redistribution command in the cipher processing portion 73 of the stationary apparatus 52. The cipher processing portion 73, which receives this, generates accounting information and new license condition information from the handling policy, price information and the license condition information read out in Step S286.

In Step S290, the cipher processing portion 73 of the stationary apparatus 52 stores the accounting information generated in Step S289 in the memory module (not shown) of the cipher processing portion 73. In step S291, the cipher processing portion 73 of the stationary apparatus 52 decrypts the content key $K_{co}$ encrypted with the temporary key $K_{temp}$ received in Step S286, with the decryption unit (not shown) of the cipher processing portion 73, using the temporary key $K_{temp}$ shared in Step S282. And, the cipher processing portion 73 of the stationary apparatus 52 encrypts the content key $K_{co}$ with the encryption unit (not shown) of the cipher processing portion 73, using the save key $K_{save}$ 2 supplied from the memory module (not shown) of the cipher processing portion 73.

In Step S292, the cipher processing portion 73 of the stationary apparatus 52 sends the license condition information generated in Step S289 and the content key $K_{co}$ encrypted with the save key $K_{save}$ 2, generated in Step S291, to external memory controlling portion (not shown) of the cipher processing portion 73. The external memory controlling portion, which receives license condition information and the content key $K_{co}$ encrypted with the save key $K_{save}$ 2, writes in the external memory 79 the license condition information and the content key $K_{co}$ encrypted with the save key $K_{save}$ 2. A tamper check when write is performed has been described using FIG. 69, and detailed description thereof is thus omitted.

In this way, the stationary apparatus 52 receives from the home server 51 the usage right (license condition information), the handling policy, price information, the content key $K_{co}$ and the contents which are retained by the home server 51, and creates new license condition information, thereby being able to receive redistribution of the contents.

Figure 81:
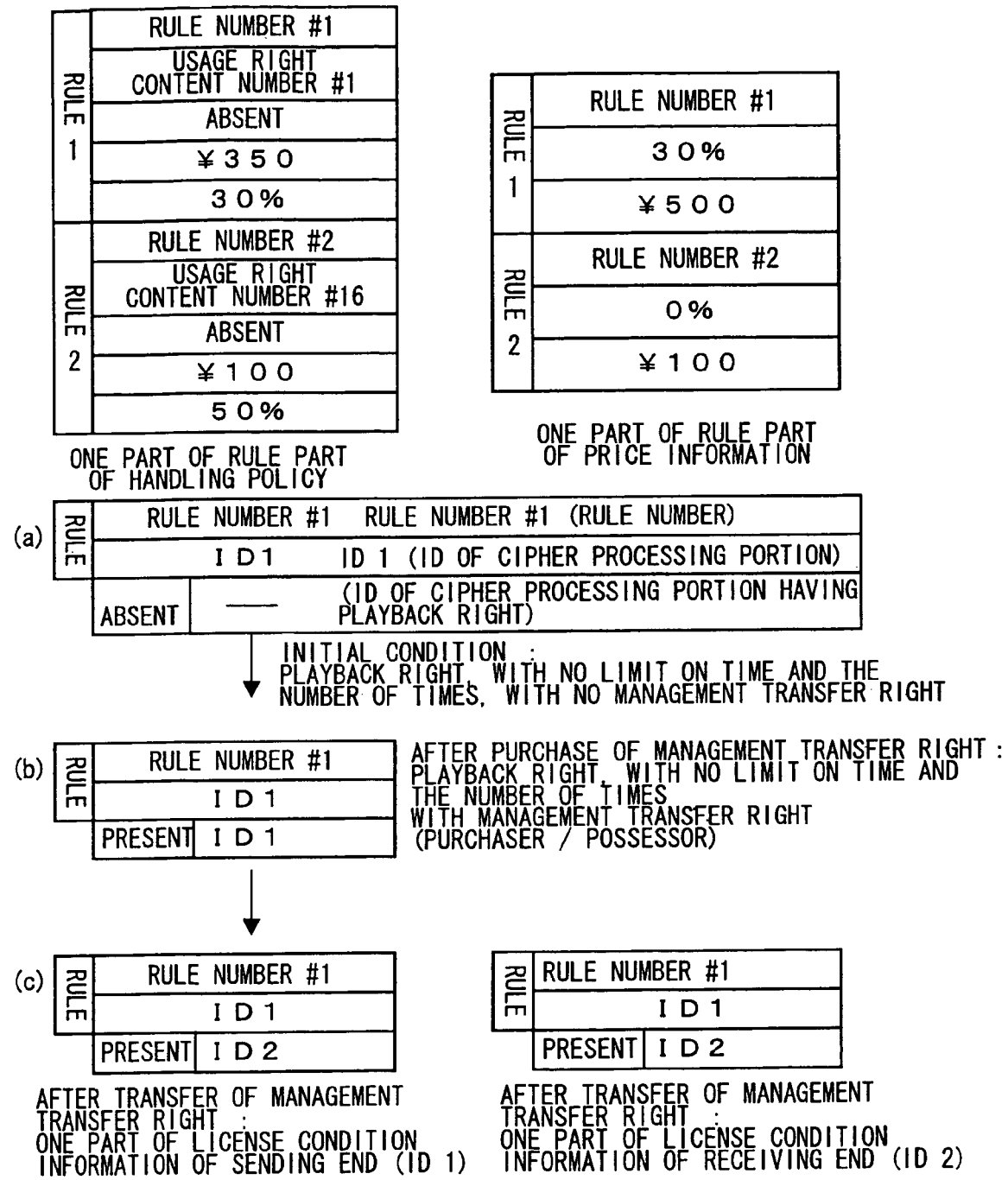
FIG. 81 is a schematic diagram showing transition of rule part of license condition information.

FIG. 81 explains management transfer right. Management transfer is an operation by which playback right can be transferred from an apparatus 1 to an apparatus 2, and the transfer is same as a usual transfer in that right is transferred from the apparatus 1 to the apparatus 2, but is different from a usual transfer in that the apparatus 2 cannot retransfer the received playback right (The apparatus 1, after transfer of playback right, cannot retransfer the playback light, as in the case of a usual transfer). The apparatus 2, which receives the playback right through management transfer, can give the playback right back to the apparatus 1, and after it is given back, the apparatus 1 can transfer the playback right again, but the apparatus 2 is still unable to do so. For achieving those, purchasers of management transfer right and current owners of management transfer right are managed with license condition information (Although it is assumed here that management transfer is possible only when having the usage right content number #1, it may be extended for the usage right content number #2).

In FIG. 81, the rule 1 of the handling policy has been described with reference to FIG. 78, detailed description thereof is thus omitted. For the rule 2, since the right item is of usage right content number 16, it is understood from FIG. 44 that the right is management transfer right. Also, it is understood that there is no particular description in the parameter item. The minimum-selling price is ¥100, and the earnings of the content provider 2 are 50% of the price. The earnings of the content provider 2 presented are higher that those of the rule 1, because the service provider 3 does not carry out practical works at all, and thus its earnings are added to the earnings of the content provider 2.

In FIG. 81, the rule 1 of price information has been described with reference to FIG. 78, and detailed description thereof is thus omitted. The rule 2 is price information for the rule #2 of the handling policy, and shows that the price is ¥100 and the earnings of the service provider 3 is 0% when the usage right content number #16 is purchased. Thus, of ¥100 paid by the user, the content provider 2 will take ¥50, the service provider 3 ¥0, and the electronic distribution service center 1 ¥50.

In FIG. 81, the user first purchases the rule number #1 (playback right, with no limit on time and the number of times). However, the user does not have management transfer right at this time (state of (a) of FIG. 81). Then, the user purchases management transfer right (Because these operations occur instantly, it seems as if the user purchased them together). For the rule number of license condition information, the ID of the cipher processing portion representing a purchaser (herein after referred to as a purchaser) is ID 1 (for example, the ID of the home server 51), and the ID of the cipher processing portion possessing playback right (hereinafter, referred to as a possessor) is ID 2 (state of (b) of FIG. 81). When this is transferred to the stationary apparatus 52 by performing management transfer, for the rule component of the license condition information possessed by the home server 51, the purchaser is still ID 1, but the possessor changes to ID 2. Also, the rule component of the license condition information possessed by the stationary apparatus 52 receiving playback right through management transfer, in which the purchaser is ID 1 and the possessor is ID 2, is same as the case of the license condition information of the home server 51.

Figure 82:
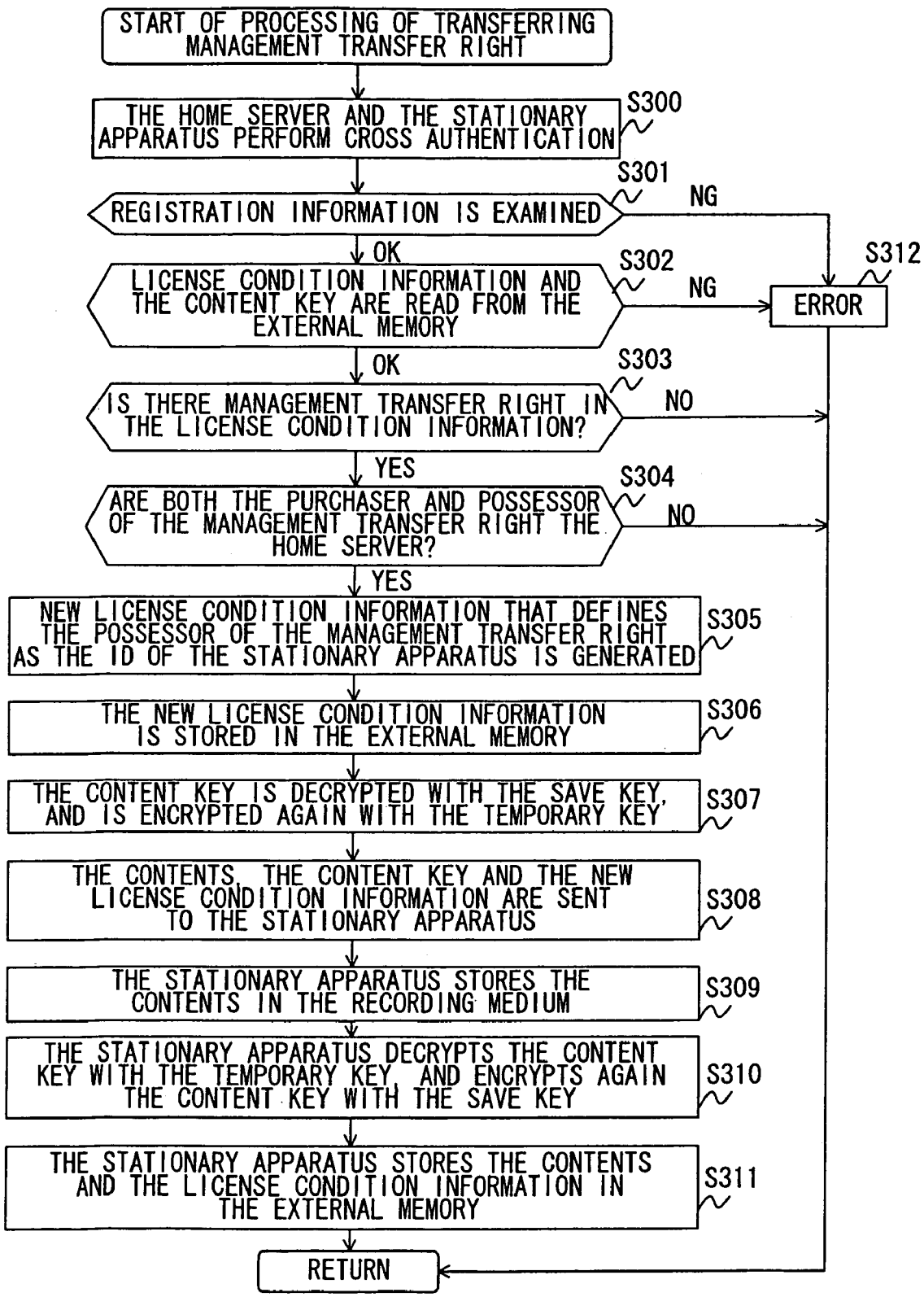
FIG. 82 is a flow chart showing a processing procedure of transferring management transfer right.

FIG. 82 is a flow chart explaining detailed transfer processing of management transfer right. In FIG. 82, Step S300 is similar to Step S220 in FIG. 74, and detailed description thereof is thus omitted. Also, Step S301 is similar to Step S221 in FIG. 74, and detailed description thereof is thus omitted. Step S302 is similar to Step S246 in FIG. 75, and detailed description thereof is thus omitted. In Step S303, the cipher processing portion 65 of the home server 51 examines the rule component of the read license condition information, and determines whether the usage right is playback right with no limit on time and the number of times and with management transfer right. If it is determined that there is management transfer right, advancement to Step S304 is made.

In Step S304, the controlling portion 91 of the cipher processing portion 65 determines whether both the purchaser and the possessor of the management transfer right are the ID of the home server 51. If it is determined that the purchaser and the possessor of the management transfer right are the ID of the home server 51, advancement to Step S305 is made. In Step S305, the controlling portion 91 of the cipher processing portion 65 rewrites the possessor of the management transfer right of license condition information to the ID of the stationary apparatus 52. In Step S306, the controlling portion 91 of the cipher processing portion 65 outputs the license condition information rewritten in Step S305 to the external memory controlling portion 97 of the cipher processing portion 65. The external memory controlling portion 97 of the cipher processing portion 65, which receives the license condition information, overwrites the license condition information and stores it in the external memory 67. A method for rewriting and storing data in the external memory 67 has been described with reference to FIG. 70, and detailed description thereof is thus omitted. Step S307 to Step S311 are similar to Step S268 to Step S272 of FIG. 79, and detailed description thereof is thus omitted.

If management transfer right is not included in the license condition information in Step S303, and if the purchaser or the possessor of management transfer right is not the home server 51 in Step S304, processing is suspended.

In this way, the right to play back the contents can be transferred from the home server 51 to the stationary apparatus 52.

Figure 83:
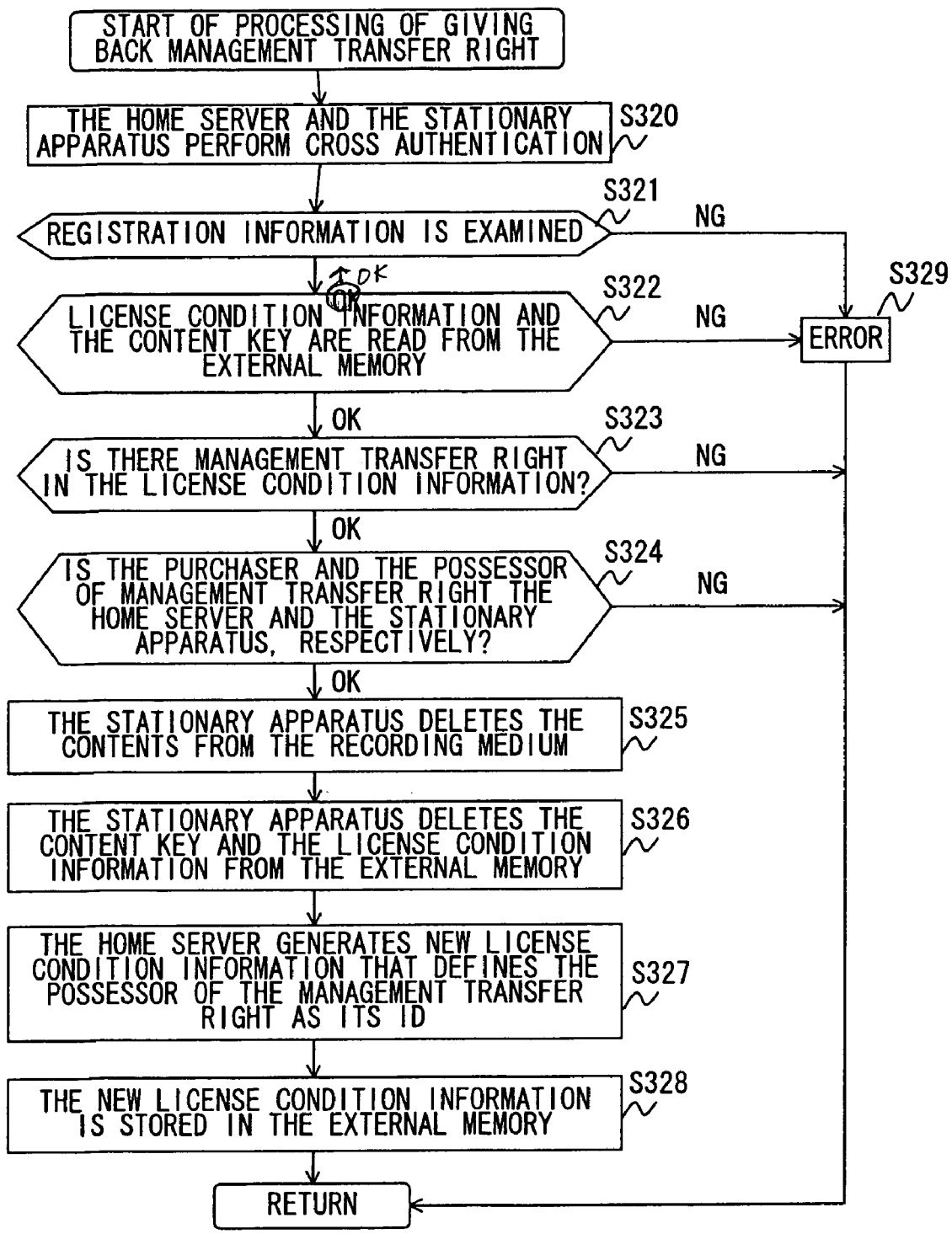
FIG. 83 is a flow chart showing a processing procedure of giving back management transfer right.

FIG. 83 is a flow chart explaining processing where management transfer right is given back to the home server 51 that is a purchaser of the management transfer right from the stationary apparatus 52 currently possessing the management transfer right. In FIG. 83, Step S320 is similar to Step S220 in FIG. 74, and detailed description thereof is thus omitted. Step S321 is similar to Step S221 in FIG. 74, and detailed description thereof is thus omitted, but it is assumed that the home server 51 and the stationary apparatus 52 mutually check that each other's ID is registered. If it is determined that they are registered, advancement to Step S322 is made. Step S322 is similar to Step S246 in FIG. 75, and detailed description thereof is thus omitted, but it is assumed that the home server 51 and the stationary apparatus 52 mutually read the data of the same content ID. If data can be read from the external memory correctly, advancement to Step S323 is made. Step S323 is similar to Step S303 in FIG. 82, and detailed description thereof is thus omitted, but it is assumed that the home server 51 and the stationary 52 mutually determine whether they have management transfer right. If it is determined that they have management transfer right, advancement to Step S324 is made.

In Step S324, the cipher processing portion 65 of the home server 51 determines whether the purchaser of management transfer right is the ID of the home server 51 and the possessor is the ID of the stationary apparatus 52. If it is determined that the purchaser of management transfer right is the ID of the home server 51 and the possessor is the ID of the stationary apparatus 52, advancement to Step S325 is made. In a similar way, the cipher processing portion 73 of the stationary apparatus 52 determines whether the purchaser of management transfer right is the ID of the home server 51 and the possessor is the ID of the stationary apparatus 52. If it is determined that the purchaser of management transfer right is the ID of the home server 51 and the possessor is the ID of the stationary apparatus 52, advancement to Step S325 is made.

In Step S325, the recording and playing portion 76 of the stationary apparatus 52 deletes the contents from a recording medium 80 (However, since only encrypted data remains, it is not necessary to delete the contents forcibly). In Step S326, the cipher processing portion 73 of the stationary apparatus 52 makes the external memory controlling portion (not shown) of the cipher processing portion 73 delete the content key $K_{co}$ encrypted with the save key $K_{save}$ 2 stored in the external memory 79 and the license condition information. A method of deletion in the external memory 79 has been described with reference to FIG. 71, and detailed description thereof is thus omitted.

In Step S327, the controlling portion 91 of the cipher processing portion 65 generates license condition information with the possessor of management transfer right of license condition information rewritten to the ID of the home server 51. In Step S328, the controlling portion 91 of the cipher processing portion 65 outputs the license condition information generated in Step S327 to the external memory controlling portion 97 of the cipher processing portion 65. The external memory controlling portion 97 of the cipher processing portion 65, which receives the license condition information, overwrites the license condition information and stores it in the external memory 67. A method of rewriting the license condition information and storing it in the external memory 67 has been described with reference to FIG. 70, and detailed description thereof is thus omitted.

If registration information is tampered, and each other's apparatus ID is not registered in the home server 51 or the stationary apparatus 52 in Step S321, and if the content key or license condition information for predetermined contents is not found, and the memory block including them are tampered in the home server 51 or the stationary apparatus 52 in Step S322, advancement to Step S329 is made to perform error handling.

If there is no management transfer right in the license condition information in the home server 51 or the stationary apparatus 52 in Step S323, and if the purchaser is not the home server 51 and the possessor is not stationary apparatus 52, processing is suspended.

In this way, the right to play back the contents can be given back to the home server 51 from the stationary apparatus 52.

Furthermore, only a single contents, content key $K_{co}$ and so on are described, but there exist two or more as required.

Also, in this example, the content provider 2 and the service provider 3 are addressed separately, but they may be integrated into one. Furthermore, the system of the content provider 2 may directly be applied to the service provider 3.
(2) Encryption Processing by Use of the Individual Key The content provider 2 encrypts the contents with the content key created on its own as described in terms of FIG. 9. Also, the content provider 2 receives the individual key specific to the content provider and the individual key encrypted with the distribution key from the electronic distribution service center 1, and encrypts the content key with the individual key. Thus, the content provider 2 supplies the contents encrypted with the content key, the content key encrypted with the individual key, and the individual key encrypted with the distribution key to the user home network 5 via the service provider 3.

At the user home network 5, the individual key specific to the content provider 2 is decrypted using the distribution key received from the electronic distribution service center 1. In this way, the user home network 5 can decrypt the content key encrypted with the individual key specific to the content provider and supplied from the content provider 2. The user home network 5 that obtains the content key can decrypt the contents with the content key.

Here, while the individual key is specific for each content server, there is only one kind of distribution key. Thus, the user home network 5 can decrypt the individual key from each content provider if having one kind of distribution key. Therefore, the user home network 5 does not need to have the individual key specific for each content provider, and can purchase contents of all content providers only by having the distribution key.

Also, each content provider cannot decrypt the individual key specific to another content provider (encrypted with the distribution key) because it has no distribution key. In this way, piracy of the contents among content providers can be prevented.

Now, in order to make clear the configuration of the embodiment described above and each means of the invention described in Claims, a corresponding embodiment (one example, however) is added in the parenthesis following each means to describe the characteristics of the present invention as follows. Of course, however, this description does not mean that each means is limited to what is described.

Figure 84:
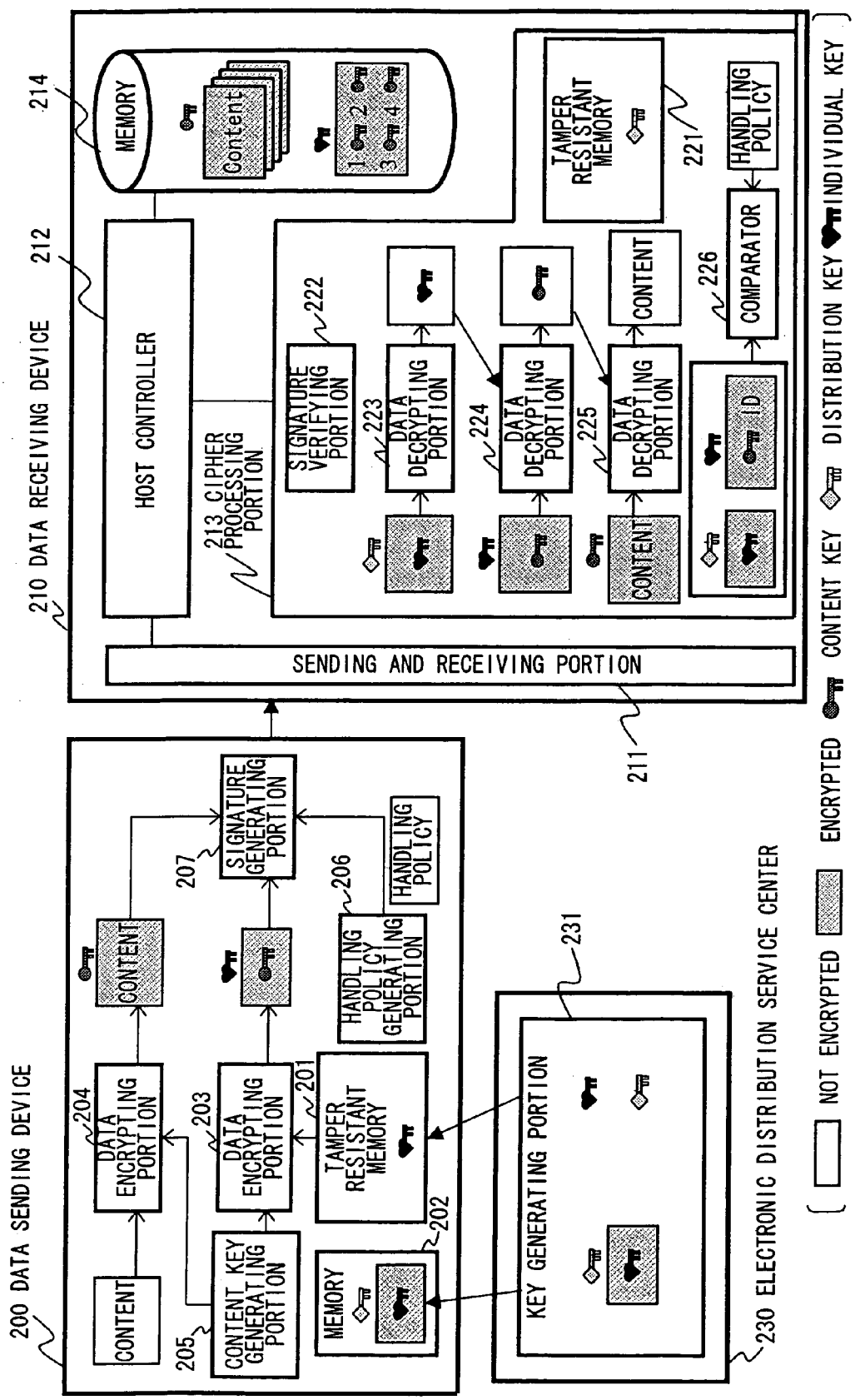
FIG. 84 is a block diagram showing an information sending system according to the present invention.

That is, an information sending system of the present invention comprises a memory for storing individual keys (for example, a tamper resistant memory in FIG. 84), possessed by contents supplier or contents seller sending information of contents and the like (for example, contents sending device 200 in FIG. 84), means for encrypting the content key $K_{co}$ with the individual key $K_i$ (for example, a data encrypting portion 203 in FIG. 84), means for generating the handling policy in which usage conditions of the content key $K_{co}$, and so on are described (for example, a handling policy generating portion 206 in FIG. 84), means for generating digital signatures for various kinds of data (for example, a signature generating portion 207 in FIG. 84), means for verifying signature data generated for various kinds of data possessed by the user (for example, content receiving device 210 in FIG. 84) purchasing the contents (for example, a signature verifying portion 222 in FIG. 84), means for comparing the ID indicating a generator of the content key $K_{co}$ with the ID of a generator of the handling policy (for example, a comparator 226 in FIG. 84) and means for storing the distribution key (for example, a tamper resistant memory 221 in FIG. 84).

Figure 85:
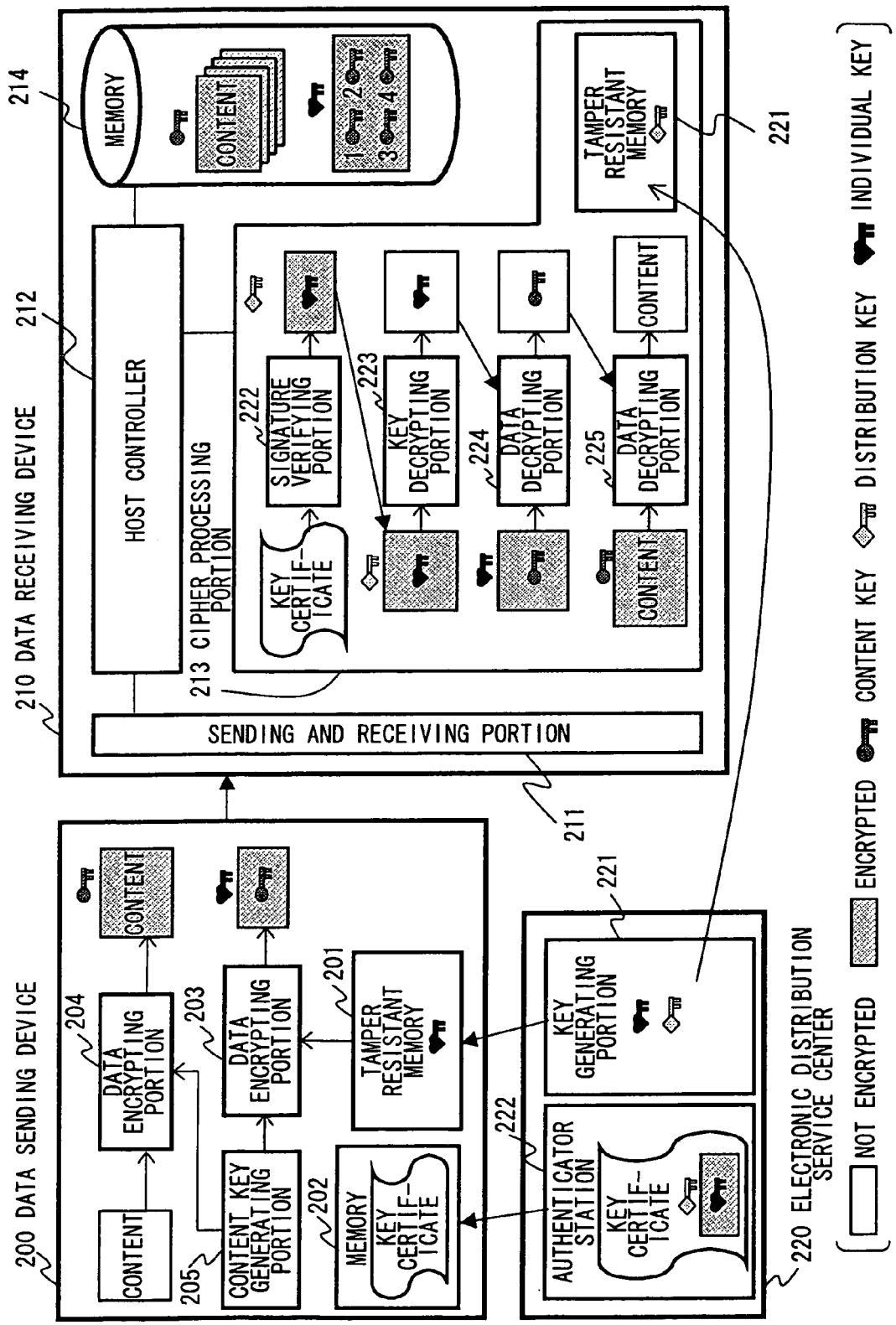
FIG. 85 is a block diagram showing the information sending system according to the present invention.

Also, the information sending system of the present invention comprises a memory for storing individual keys (for example, the tamper resistant memory 201 in FIG. 85), possessed by the content supplier or the content seller sending information of contents and the like (for example, the content sending device in FIG. 85), a memory for storing key certificates (for example, a memory 202 in FIG. 85), means for encrypting the content key $K_{co}$ with the individual key $K_i$ (for example, the data encrypting portion 203 in FIG. 85), means for verifying signature data generated for various kinds of data possessed by the user (for example, the content receiving device 210 in FIG. 85) purchasing the contents (for example, the signature verifying portion 222 in FIG. 85), and means for storing the distribution key (for example, the tamper resistant memory 221 in FIG. 85).

(3) Remote Playback Process

A remote playback process in which a playback command is received by a apparatus that does not retain the playback right of the contents (for example, the stationary apparatus 52) from a apparatus that retains the contents (for example, the home server 51), and the contents are played back.

Figure 86:
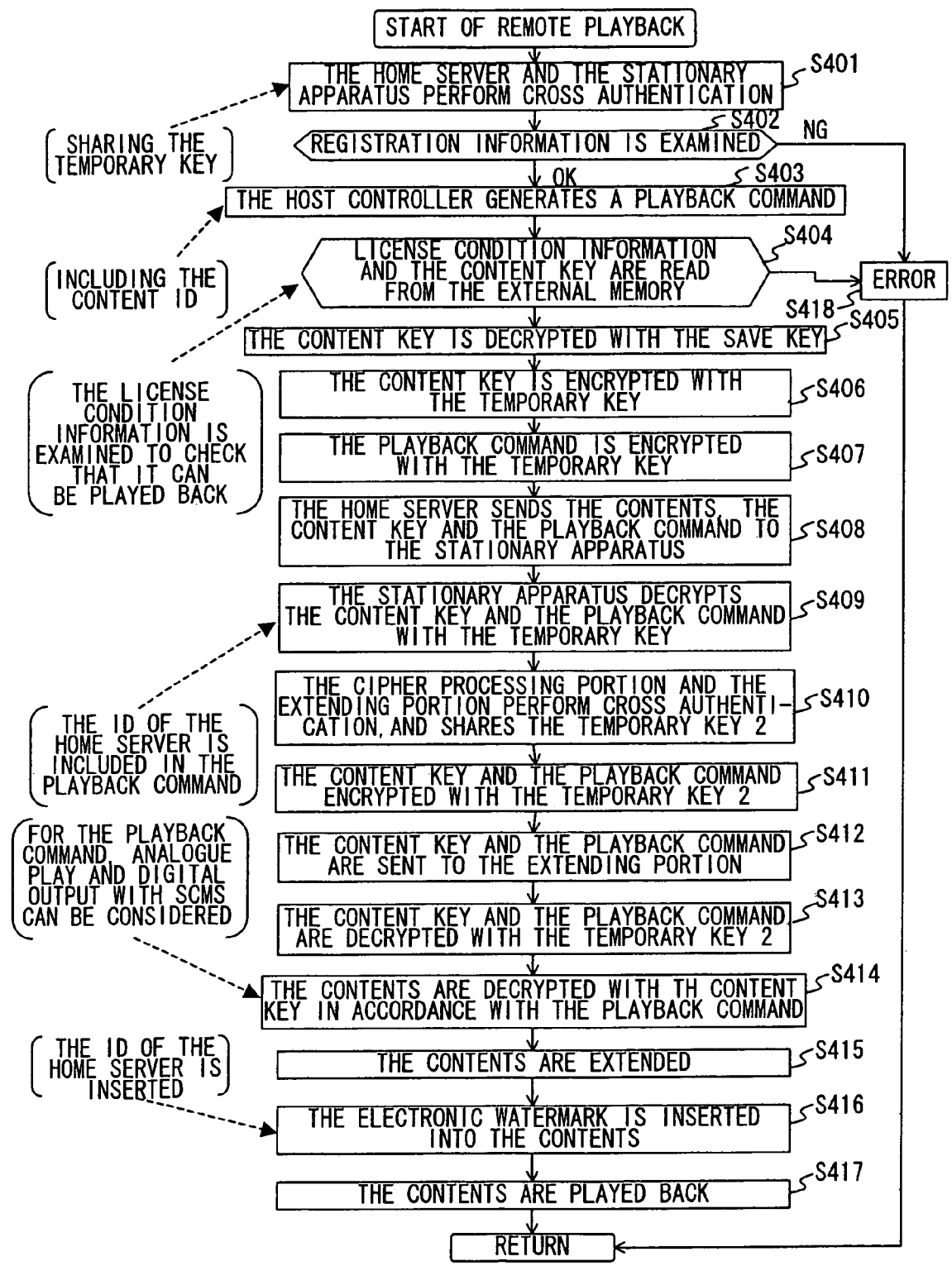
FIG. 86 is a flow chart showing a remote playback processing procedure.

FIG. 86 shows a remote playback process procedure, and first the content ID of the contents to be subjected to remote playback through input operations by the user is inputted in the host controller 62, and then in Step S401, the home server 51 and the stationary apparatus 52 perform cross authentication. The cross authentication process is similar to that described with reference to FIG. 52, and description thereof is thus omitted. In Step S402, the host controller 62 of the home server 51 makes the cipher processing portion 65 of the home server 51 examine the registration information read from the large capacity storing portion 68 of the home server 51. The cipher processing portion 65, which receives the registration information from the host controller 62, makes the signature authentication unit 115 of the encryption/decryption module 96 authenticate the signature added to the registration information with the public key of the authenticator station 22 supplied from the memory module 92 of the cipher processing portion 65. After the verification of the signature is successful, whether the item of "registration" is "registration possible", and if it is determined that the item is "registration possible", then advancement to Step S403 is made. Furthermore, the stationary apparatus 52 also examines the registration information, and determines that the home server 51 is "registration possible".

In Step S403, the host controller 62 generates a playback command including the content ID of the contents to be subjected to remote playback, and in following Step S404, the cipher processing portion 65 of the home server 51 makes the external memory controlling portion 97 of the cipher processing portion 65 read the license condition information corresponding to the contents to be subjected to remote playback and the content key $K_{co}$ encrypted with the save key $K_{save}$ from the external memory 67. A method for reading data from the external memory 67 by the external memory controlling portion 97 is same as that described with reference to FIG. 68, and detailed description thereof is thus omitted. If they are read successfully, advancement to Step S405 is made.

In Step S405, the decryption unit 111 of the encryption/decryption module 96 decrypts the content key $K_{co}$ read from the external memory 67, with the save key $K_{save}$ supplied from the memory module 92. In Step S406, the encryption unit 112 of the encryption/decryption module 96 encrypts the content key $K_{co}$ with the temporary key $K_{temp}$, followed by encrypting the playback command with temporary key $K_{temp}$ in step S407.

In following Step S408, the home server 51 reads the contents to be subjected to remote playback (encrypted with the content key $K_{co}$) from the large capacity storing portion 68, sends this to the stationary apparatus 52 together with the content key and the playback command encrypted with the temporary key $K_{temp}$ in Step S406 and Step S407 described above.

In Step S409, the stationary apparatus 52 decrypts with the temporary key $K_{temp}$ the content key $K_{co}$ and the playback command received from the home server 51, and in Step S410, the cipher processing portion 73 and the extending portion 74 perform cross authentication and share the temporary key $K_{temp}$ 2. And in Step S411, the cipher processing portion 73 encrypts the content key $K_{co}$ and the playback command with the temporary key $K_{temp}$ 2 shared with the extending portion 74 in aforesaid Step S410. In Step S412, the cipher processing portion 73 sends the content key $K_{co}$ and the playback command encrypted with temporary key $K_{temp}$ 2 to the extending portion 74, and in Step S413, the extending portion 74 decrypts the content key $K_{co}$ and the playback command with the temporary key $K_{temp}$ 2.

In Step S414, the extending portion 74 decrypts the contents received from the home server 51 in aforesaid Step S408, with content key $K_{co}$ decrypted in aforesaid Step S413, in accordance with the playback command decrypted in aforesaid Step S413. And in Step S415, the extending portion 74 extends the decrypted contents by a predetermined system, for example a system such as ATRAC. In Step S 416, the host controller 72 inserts the data indicated from the cipher processing portion 73 into the contents in the form of the electronic watermark. In this connection, the data that are passed from the cipher processing portion 73 to the extending portion 74 include not only the content key $K_{co}$ and the playback command, but also playback conditions (analogue output, digital output and output with copy control signals (SCMS)) and the ID of the apparatus that has purchased content usage right. The data to be inserted is the ID of the apparatus that has purchased the content usage right, namely the apparatus ID in license condition information, and so force. In Step S417, the extending portion 74 plays back music through a speaker (not shown).

In the configuration described above, the home server 51 sends the contents, the playback command of the contents and the content key $K_{co}$ to the stationary apparatus 52, whereby the stationary apparatus 52 retaining no content playback right can play back the contents using the playback command and the content key $K_{co}$ Thus, according to the aforesaid configuration, a plurality of apparatuses (such as stationary apparatuses) connected to an apparatus retaining the contents (an apparatus having content playback right) can play back the contents.

(4) Booking Purchase Processing

Booking purchase processing in which the key of the contents is converted in advance before the expiration date of the distribution key is reached and booking purchase of the contents is performed will be described. In Step S451 for the booking purchase processing procedure shown in FIG. 87, the home server 51 performs registration information update determination processing and proceeds to Step S452. Registration information update determination processing is same as that described with reference to FIG. 61 and FIG. 62, and detailed description thereof is thus omitted. In the booking purchase processing, however, determination of registration information update timing on the basis of the number of units purchased and the purchase amount of money described with reference to Step S601 and S602 of FIG. 61 is not necessarily performed.

In Step S452, the host controller 62 of the home server 51 inputs the registration information read from the large capacity storing portion 68 of the home server 51 in the cipher processing portion 65 of the home server 51. The cipher processing portion 65, which receives the registration information, verifies the signature of the registration information with the signature verification unit 115 of the encryption/decryption module 96, followed by determining whether or not the items of "purchase processing" and "registration" for the ID of the home server 51 are "purchase possible" and "registration possible", and then proceeds to Step S453 if they are "purchase possible" and "registration possible". In Step S453, the host controller 62 of the home server 51 inputs the public key certificate of the content provider 2 read from the large capacity storing portion 68 of the home server 51 in the cipher processing portion 65 of the home server 51. The cipher processing portion 65, which receives the public key certificate of the content provider 2, verifies the signature of the public key certificate of the content provider 2 with the signature verification unit 115 of the encryption/decryption module 96, followed by fetching the public key of the content provider 2 from the public key certificate. As a result of the verification of the signature, if it is confirmed that no tamper has been made, the host controller 62 proceeds to Step S454.

In Step S454, the host controller 62 of the home server 51 inputs the content key $K_{co}$ read from the large capacity storing portion 68 of the home server 51 in the cipher processing portion 65 of the home server 51. The cipher processing portion 65, which receives the content key $K_{co}$, verifies the signature of the content key $K_{co}$ with the signature verification unit 115 of the encryption/decryption module 96, and if it is confirmed that no tamper has been made, then advancement to Step S455 is made.

In Step S455, the host controller 62 of the home server 51 inputs the individual key $K_i$ read from the large capacity storing portion 68 of the home server 51 in the cipher processing portion 65 of the home server 51. The cipher processing portion 65, which receives the individual key $K_i$, verifies the signature of the individual key $K_i$ with the signature verification unit 115 of the encryption/decryption module 96, and if it is confirmed that no tamper has been made, then advancement to Step S456 is made.

Here, if one signature is added for all of the content key $K_{co}$ encrypted with the individual key $K_i$ and the individual key $K_i$ encrypted with the distribution key $K_d$, Step S454 and Step S455 may be merged together.

In Step S456, the controlling portion 91 of the cipher processing portion 65 decrypts the individual key $K_i$ inputted in Step S455, with the decryption unit 111 of the encryption/decryption module 96, using the distribution key $K_d$ supplied from the memory module 92. Then, the controlling portion 91 of the cipher processing portion 65 decrypts the content key $K_{co}$ inputted in Step S454, with decryption unit 111 of the encryption/decryption module 96, using the individual key $K_i$ just decrypted. Finally, the controlling portion 91 of the cipher processing portion 65 encrypts the content key $K_{co}$ with the encryption unit 112 of the encryption/decryption module 96, using the save key $K_{save}$ supplied from the memory module 92.

In Step S457, the content key $K_{co}$ encrypted with the save key $K_{save}$ is stored in the external memory 67 by way of the external memory controlling portion 97 of the cipher processing portion 65.

Also, if it is determined in Step S452 that the home server 51 is an apparatus incapable of performing purchase processing, if it is determined in Step S453 that the signature of the public key certificate of the content provider 2 is incorrect, or if it is determined in Step S454 that the signature of the content key $K_{co}$ encrypted with the individual key $K_i$ is incorrect, or if it is determined in Step S455 that the signature of the individual key $K_i$ encrypted with the distribution key $K_d$ is incorrect, the home server 51 proceeds to Step S458 to perform error handling.

As described above, the home server 51 decrypts the content key $K_{co}$ with the individual key $K_i$, followed by encrypting again the content key $K_{co}$ with the save key $K_{save}$ and having the content key $K_{co}$ stored in the external memory 67. Since this booking purchase processing does not involve actual purchase of the contents, out of purchase processing described above in terms of FIG. 67, processing as to accounting information in registration information update determination processing of Step S161, processing as to purchased contents corresponding to Step S164, processing as to the handling policy corresponding to Step S167, processing as to verification of the public key of the service provider corresponding to Step S168, processing as to verification of the signature of the price information corresponding to Step S169, and processing of storing accounting information and license condition information corresponding to Step S170 to Step S172 are not necessarily performed.

Figure 87:
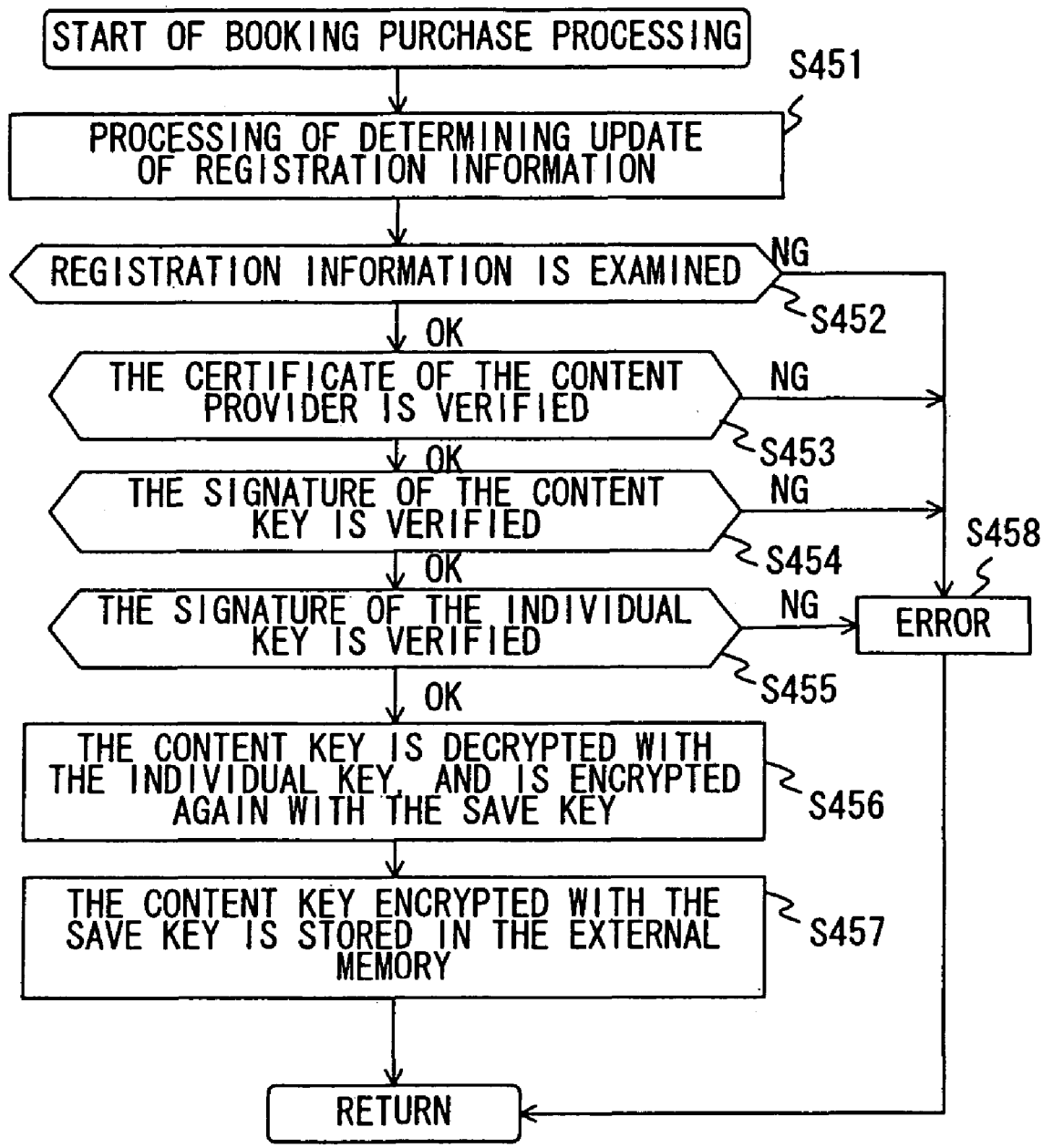
FIG. 87 is a flow chart showing a booking purchase processing procedure.

In this connection, in the case of the booking purchase processing of FIG. 87, the home server 51 does not create license condition information, but it is also possible to create license condition information and define its usage right content number (namely, right item) as a state of not possessing right, such as an initial value (for example, nonexistence #0).

In this way, in the booking purchase processing, the home server 51 stores the content key $K_{co}$ in the external memory 67 before the expiration date of the distribution key $K_d$ is reached, thereby making it possible perform purchase regardless of the expiration date of the distribution key $K_d$ in terms of contents encrypted with the stored content key $K_{co}$.

Figure 88:
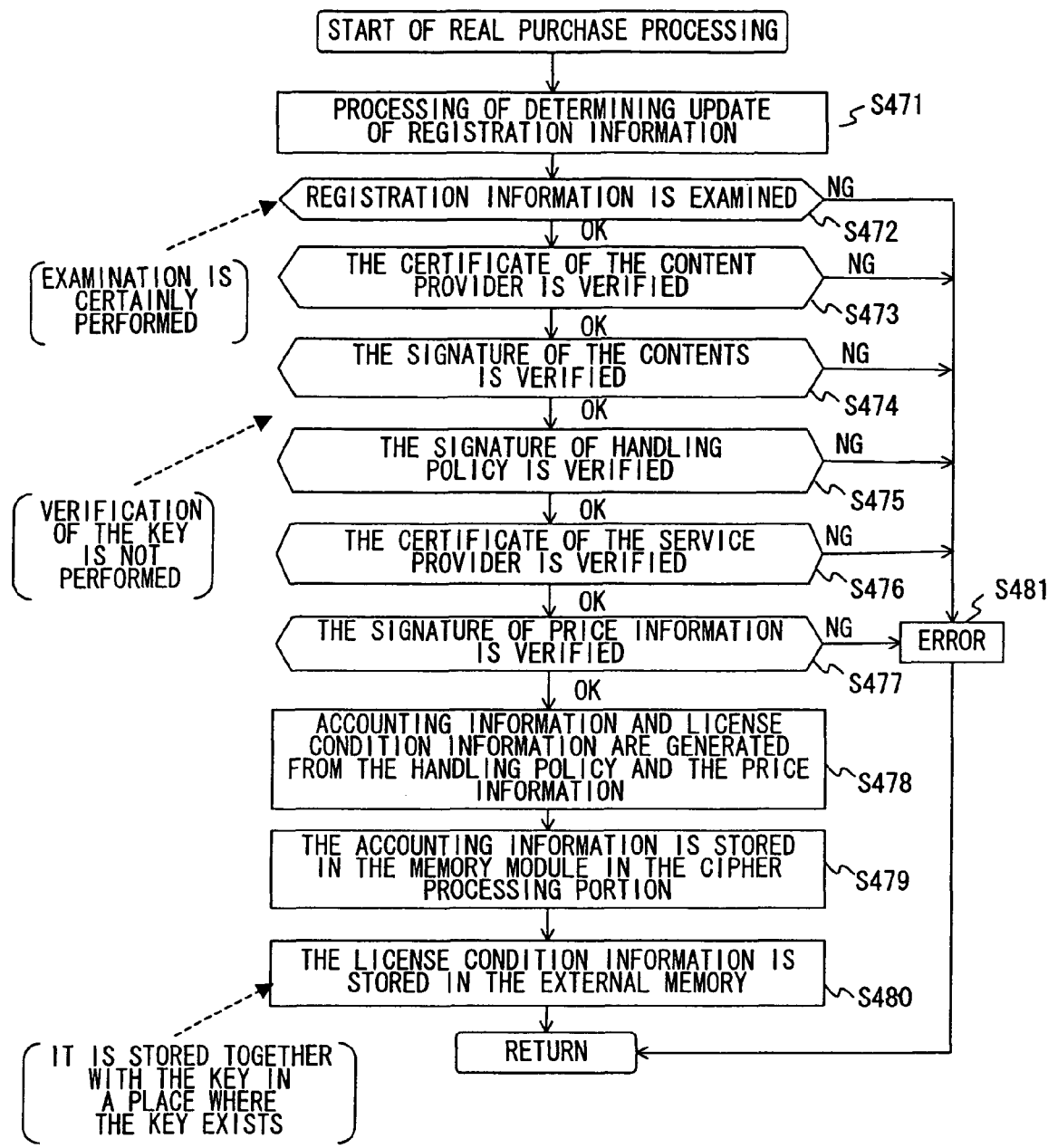
FIG. 88 is a flow chart showing a real purchase processing procedure after booking purchase.

Now, processing of real purchase of the contents for which the booking of purchase has been made by storing the content key $K_{co}$ in the external memory 67 at the home server 51 will be described. In Step S471 of the real purchase processing procedure shown in FIG. 88, the home server 51 performs registration information update determination processing and proceeds to Step S472. Registration information update determination processing is same as that described with reference to FIG. 61 and FIG. 62, and detailed description thereof is thus omitted. However, in this purchase processing, determination of registration information update timing on the basis of the distribution key $K_d$ described with Step S603 of FIG. 61 does not need to be performed.

In Step S472, the host controller 62 of the home server 51 inputs the registration information read from the large capacity storing portion 68 of the home server 51 in the cipher processing portion 65 of the home server 51. The cipher processing portion 65, which receives the registration information, verifies the signature of the registration information with the signature verification unit 115 of the encryption/decryption module 96, followed by determining whether the items of "purchase processing" and "registration" for the ID of the home server 51 are "purchase possible" and "registration possible", and if they are "purchase possible" and "registration possible", then advancement to Step S473 is made.

In Step S473, the host controller 62 of the home server 51 inputs the public key certificate of the content provider 2, read form the large capacity storing portion 68 of the home server 51, in the cipher processing portion 65 of the home server 51. The cipher processing portion 65, which receives the public key certificate of the content provider 2, verifies the signature of the public key certificate of the content provider 2 with the signature verification unit 115 of the encryption/decryption module 96, followed by fetching the public key of the content provider 2 from the public key certificate. As a result of the verification, if it is confirmed that no tamper has been made, advancement to Step S474 is made.

In Step S474, the host controller 62 of the home server 51 inputs the contents read from the large capacity storing portion 68 of the home server 51 in the cipher processing portion 65 of the home server 51. The cipher processing portion 65, which receives the contents, verifies the signature of the contents with the signature verification unit 115 of the encryption/decryption module 96, and if it is confirmed that no tamper has been made, then advancement to Step S475 is made.

In Step S475, the host controller 62 of the home server 51 inputs the handling policy read from the large capacity storing portion 68 of the home server 51 in the cipher processing portion 65 of the home server 51. The cipher processing portion 65, which receives the handling policy, verifies the signature of the handling policy with the signature verification unit 115 of the encryption/decryption module 96, and if it is confirmed that no tamper has been made, then advancement to Step S476 is made. In Step S476, the host controller 62 of the home server 51 inputs the public key certificate of the service provider 3 read from the large capacity storing portion 68 of the home server 51 in the cipher processing portion 65 of the home server 51. The cipher processing portion 65, which receives the public key certificate of the service provider 3, verifies the signature of the public key certificate of the service provider 3 with the signature verification unit 115 of the encryption/decryption module 96, followed by fetching the public key of the service provider 3 from the public key certificate. As a result of the verification, if it is confirmed that no tamper has been made, the advancement to Step S477 is made.

In Step S477, the host controller 62 of the home server 51 inputs the price information read from the large capacity storing portion 68 of the home server 51 in the cipher processing portion 65 of the home server 51. The cipher processing portion 65, which receives the price information, verifies the signature of the price information with the signature verification unit 115 of the encryption/decryption module 96, and if it is confirmed that no tamper has been made, the advancement to Step S478 is made.

In Step S478, the host controller 62 of the home server 51 displays information of purchasable contents (for example, purchasable usage patterns and prices) using the displaying means 64, and the user selects a purchase item using the inputting means 63. Furthermore, processing of selecting a purchase item may also be performed prior to real purchase processing. A signal inputted from the inputting means 63 is sent to the host controller 62 of the home server 51, and the host controller 62 generates a purchase command based on the signal, and inputs the purchase command in the cipher processing portion 65 of the home server 51. The cipher processing portion 65, which receives this, generates accounting information and license condition information from the handling policy inputted in Step S475 and the price information inputted in Step S477. Accounting information is same as that described with reference to FIG. 42, and detailed description thereof is thus omitted.

In Step S479, the controlling portion 91 of the cipher processing portion 65 stores in the memory module 92 the accounting information generated in Step S478. And in Step S480, the controlling portion 91 of the cipher processing portion 65 sends the license condition information generated in Step S478 to the external memory controlling portion 97 of the cipher processing portion 65. The external memory controlling portion 97, which receives the license condition information, makes a tamper check for the external memory 67, followed by writing the license condition information in the external memory 67. A tamper check when the license condition information is written is same as that described above with reference to FIG. 69, and detailed description thereof is thus omitted (Furthermore, in the case where license condition information with no right is already written, the license condition information is rewritten and updated by means of rewrite processing described with reference to FIG. 70).

In this connection, if it is determined in Step S472 that the home server 51 is an apparatus incapable of performing purchase processing, and that the home server 51 is not registered, or if it is determined in Step S473 that the signature of the public key certificate of the content provider 2 is incorrect, or if it is determined in Step S474 that the signature of the contents encrypted with the content key $K_{co}$ is incorrect, or if it is determined in Step S475 that the signature of the handling policy is incorrect, or it is determined in Step S476 that the signature of the public key certificate of the service provider 3 is incorrect, or if it is determined in Step S477 that the signature of the price information is incorrect, the home server 51 proceeds to Step S481 to perform error handling.

As described above, the home server 51 stores in the memory module 92 the accounting information in terms of the content selected for purchase by the user, and stores the license condition information in the external memory 67, thereby ending real purchasing processing of the contents. In this real purchase processing, verification of the signature of the content key $K_{co}$ (Step S454) and verification of the signature of the individual key $K_i$ (Step S455) that have been already performed in the booking purchase processing described above with reference to FIG. 87, and processing of lock switching of the content key $K_{co}$ (Step S456) are not performed.

In the configuration described above, the home server 51 stores the content key $K_{co}$ in the external memory 67 through booking purchase processing before the distribution key $K_d$ is updated, whereby the content key $K_{co}$ is already stored in the external memory 67 even though the distribution key $K_d$ required when the content key $K_{co}$ is decrypted is updated, thus making it possible to purchase the contents after the expiration date of the distribution key $K_d$ is reached.

(5) Proxy Purchase Processing

Proxy purchase processing in which the contents are exchanged between apparatuses different from each other in registration information (Registration List), namely apparatuses different from each other in groups will be described. In this proxy purchase processing, in terms of cases where the contents are exchanged between the home server 51 and portable devices and the like, which are non-group apparatuses as opposed to the home server 51, for example, the case where the home server 51 performs accounting and the case where the non-group apparatus performs accounting will be described, respectively. In this case, description will be presented, considering the above described stationary apparatus 52 as a non-group apparatus.

Figure 89:
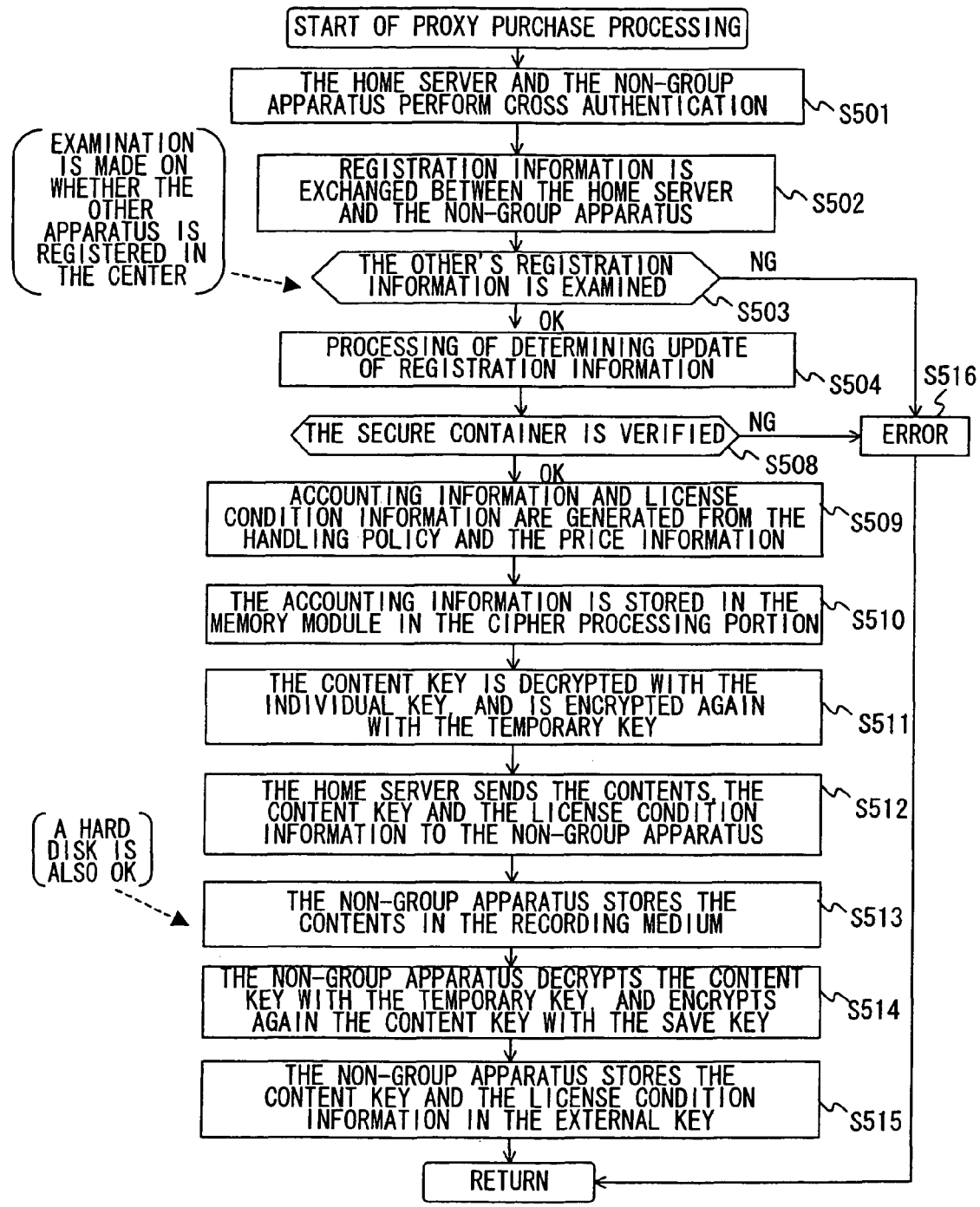
FIG. 89 is a flow chart showing a proxy purchase processing procedure when the home server performs accounting.

FIG. 89 shows a processing procedure where the home server 51 passes the contents to the non-group apparatus and the home server 51 performs accounting, and in Step S501, the home server 51 and the non-group apparatus perform cross authentication. The cross authentication is similar to that described with reference to FIG. 52, and description thereof is thus omitted. In Step S502, the home server 51 and the non-group apparatus mutually exchange the registration information with each other, and then examine the registration information of the other in Step S503.

That is, the home server 51 makes the cipher processing portion 65 examine the registration information received from the non-group apparatus. The cipher processing portion 65, which receives the registration information from the non-group apparatus, makes the signature verification unit 115 of the encryption/decryption module 96 verify the signature added to the registration information with the public key supplied from the memory module 92 of the cipher processing portion 65. After the verification of the signature is successful, the controlling portion 91 of the cipher processing portion 65 determines whether or not the ID of the non-group apparatus is registered in the registration information and the items of "purchase processing" and "registration" are "purchase possible" and "registration possible". Also, in a similar way, the non-group apparatus which receives the registration information of the home server 51 determines whether or not the ID of the home server 51 is registered in the registration information of the home server 51 and the item of "registration" is "registration possible". And, when it is mutually confirmed that each other's apparatus is registered, the home server 51 proceeds to Step S504.

Step S504 to Step S510 are processes similar to those of Step S161 to Step S171, and detailed description thereof is thus omitted.

In Step S 511, the controlling portion 91 of the cipher processing portion 65 decrypts the individual key $K_i$ encrypted with the distribution key $K_d$ inputted in Step S508, with the decryption unit 111 of the encryption/decryption module 96, using the distribution key $K_d$ supplied from the memory module 92. Then, the controlling portion 91 of the cipher processing portion 65 decrypts the content key $K_{co}$ encrypted with the individual key $K_i$ inputted in Step S508, with the decryption unit 111 of the encryption/decryption module 96, using the individual key $K_i$ just decrypted. And, the controlling portion 91 of the cipher processing portion 65 encrypts again the content key $K_{co}$ with the encryption unit 112 of the encryption/decryption module 96, using the temporary key $K_{temp}$ shared with the non-group apparatus during cross authentication in Step S501. In Step S512, the controlling portion 91 of the cipher processing portion 65 generates the signature for the content key $K_{co}$ encrypted with the temporary key $K_{temp}$ and the license condition information generated in Step S509, using the signature generation unit 114 of the encryption/decryption module 96, and sends the signature to the host controller 62. The host controller 62 of the home server 51, which receives the content key $K_{co}$ encrypted with the temporary key $K_{temp}$, the license condition information and their signatures, reads the contents encrypted with the content key $K_{co}$ from the large capacity storing portion 68, and sends the content key $K_{co}$ encrypted with the temporary key $K_{temp}$, the license condition information, their signatures and the contents encrypted with the content key $K_{co}$ to the non-group apparatus.

In Step S513, the non-group apparatus, which receives the content key $K_{co}$ encrypted with the temporary key $K_{temp}$, the license condition information, their signatures and the contents encrypted with the content key $K_{co}$, outputs the contents encrypted with the content key $K_{co}$ to the recording and playing portion 76 of the non-group apparatus. The recording and playing portion 76 of the non-group apparatus, which receives the contents encrypted with the content key $K_{co}$, stores in the recording medium 80 the contents encrypted with the content key $K_{co}$.

In Step S514, the cipher processing portion 73 of the non-group apparatus verifies the signature received from the home server 51 in Step S512, and decrypts the content key $K_{co}$ encrypted with the temporary key $K_{temp}$, with the decryption unit of the encryption/decryption module, using the temporary key $K_{temp}$ shared with the home server 51 during cross authentication in Step S501. And, the controlling portion of the cipher processing portion 73 encrypts again the content key $K_{co}$ with the encryption unit of the encryption/decryption module, using the save key $K_{save}$ 2 supplied from the memory module of the cipher processing portion 73.

In Step S515, the cipher processing portion 73 of the non-group apparatus sends the content key $K_{co}$ encrypted with the save key $K_{save}$ 2 and the license condition information received in Step S513 to the external memory controlling portion of the cipher processing portion 73, and has them stored in the external memory 79. Processing where the external memory controlling portion writes data in the external memory has been described with reference to FIG. 69, and detailed description thereof is thus omitted.

In this way, the home server 51 purchases content usage right, accounting information is stored by the home server 51, and the usage right is passed to the non-group apparatus. By this, the home server 51 pays for the content usage right passed to the non-group apparatus.

Figure 90:
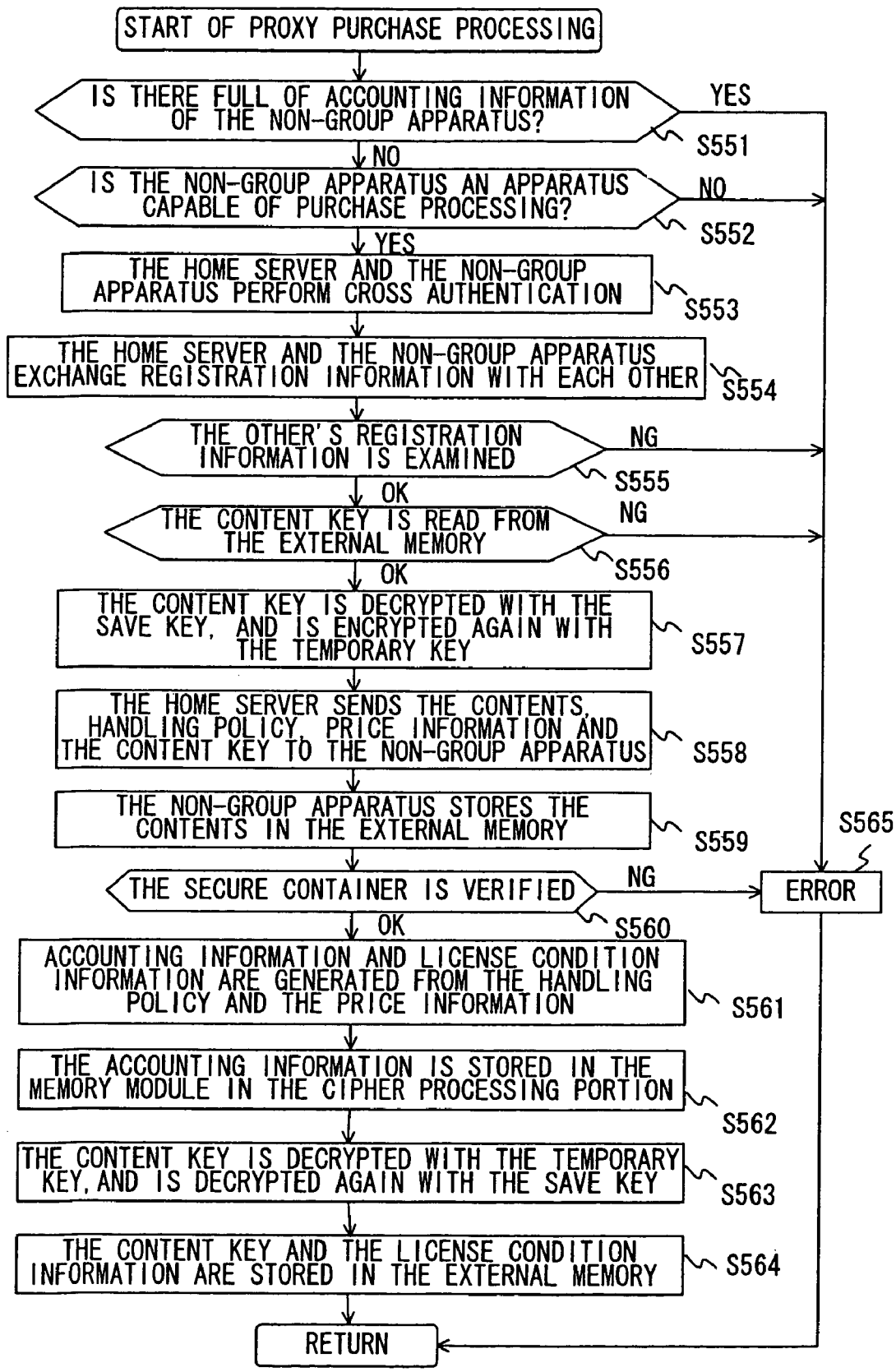
FIG. 90 is a flow chart showing a proxy purchase processing procedure when non-group apparatus performs accounting.

Then, FIG. 90 shows a processing procedure where the home server 51 passes the contents to the non-group apparatus, and the non-group apparatus performs accounting, and in Step S551, the non-group apparatus determines whether or not a total charge in the accounting information stored in the cipher processing portion 73 (FIG. 15) has reached an upper limit, and if the upper limit has not been reached, then advancement to Step S552 is made (Furthermore, determination by an upper limit on the number of accounting instances is also possible instead of determination by the upper limit on the total charge).

In Step S552, the host controller 72 of the non-group apparatus inputs the registration information read from the external memory 79 in the cipher processing portion 73. The cipher processing portion 73, which receives the registration information, verifies the signature of the registration information with the signature verification unit of the encryption/decryption module provided therein, followed by determining whether the item of "purchase processing" for the ID of the non-group apparatus (stationary apparatus 52) is "purchase possible", and if it is "purchase possible", then advancement to Step S553 is made.

In Step S553, the home server 51 and the non-group apparatus perform cross authentication. The cross authentication is similar to the process described with reference to FIG. 52, and description thereof is thus omitted. In Step S554, the home server 51 and the non-group apparatus exchange registration information with each other, and in following Step S553, they mutually examine each other's registration information.

That is, the home server 51 makes the cipher processing portion 65 examine the registration information received from the non-group apparatus. The cipher processing portion 65, which receives the registration information from the non-group apparatus, makes the signature verification unit 115 of the encryption/decryption module 96 verify the signature added to the registration information with the public key supplied from the memory module 92 of the cipher processing portion 65. After the verification of the signature is successful, the controlling portion 91 of the cipher processing portion 65 determines whether or not the ID of the non-group apparatus is registered in the registration information and the item of "registration" is "registration possible". Also, in a similar way, the non-group apparatus which receives the registration information of the home server 51 determines whether or not the ID of the home server 51 is registered in the registration information of the home server 51 and the item of "registration" is "registration possible". Furthermore, the non-group apparatus also performs similar processing. And, when it is mutually shown that the ID of the other apparatus is registered, the home server 51 proceeds to Step S556.

In Step S556, the controlling portion 91 of the home server 51 reads the purchased content key from the external memory 67 through the external memory controlling portion 97, and in following step S557, the home server 51 decrypts the content key $K_{co}$ with the save key $K_{save}$ and encrypts again the content key $K_{co}$ with the temporary key $K_{temp}$, and generates their signatures.

In Step S558, the home server 51 sends to the non-group apparatus the content key Q encrypted with the save key $K_{save}$ generated in S557, and the contents, the handling policy and the price information read from the large capacity storing portion 68. In Step S559, the non-group apparatus stores in the recording medium contents received from the home server 51.

In Step S560, the non-group apparatus (stationary apparatus 52) verifies the signature of the handling policy, price information and the like, and then in Step S561, the host controller 72 of the non-group apparatus displays information of purchasable contents (for example, purchasable usage patterns and prices) using the displaying means 78, and the user selects purchase items using the inputting means 77. Furthermore, the selection processing may be performed prior to proxy purchase processing. A signal inputted from the inputting means 77 is sent to the host controller 72, and the host controller 72 generates a purchase command based on the signal, and inputs the purchase command in the cipher processing portion 73. The cipher processing portion 73, which receives this, generates accounting information and license condition information from the handling policy and the price information inputted in Step S560. The accounting information has been described with reference to FIG. 42, and detailed description thereof is thus omitted. The license condition information has been described with reference to FIG. 41, and detailed description thereof is thus omitted.

In Step S562, the cipher processing portion 73 stores the accounting information generated in Step S561 in the memory module in the cipher processing portion 73. In Step S563, the cipher processing portion 73 verifies the signature of the content key encrypted in Step S557 and decrypts the content key with the temporary key $K_{temp}$, and then encrypts again the content key with the save key $K_{save}$ 2. And in Step S564, the content key $K_{co}$ encrypted with the save key $K_{save}$ 2 is stored in the external memory 79 from the cipher processing portion 73.

In this way, the home server 51 passes the content usage right already purchased to the non-group apparatus, and the non-group apparatus stores the accounting information, whereby the non-group apparatus pays for the content usage right passed from the home server 51 outside the group.

In the configuration described above, as described with reference to Step S502 and Step S554, registration information is mutually exchanged between apparatuses different from each other in registration information (Registration List), whereby the contents possessed by one apparatus can be passed to the other apparatus after it is confirmed that they are registered apparatuses, as described above in terms of aforesaid Step S502 to Step S554. Thus, according to the aforesaid configuration, contents can be exchanged between apparatuses different from each other in groups.

Furthermore, in the above described embodiment, the signature of the contents is verified during purchase processing, but there may be cases where it is omitted because much time is required for processing. Also, there may be cases where in the handling policy or price information is included description about whether or not verification is needed, and operations are performed in accordance therewith.

(6) Another Configuration of the Electronic Music Distribution System

Figure 91:
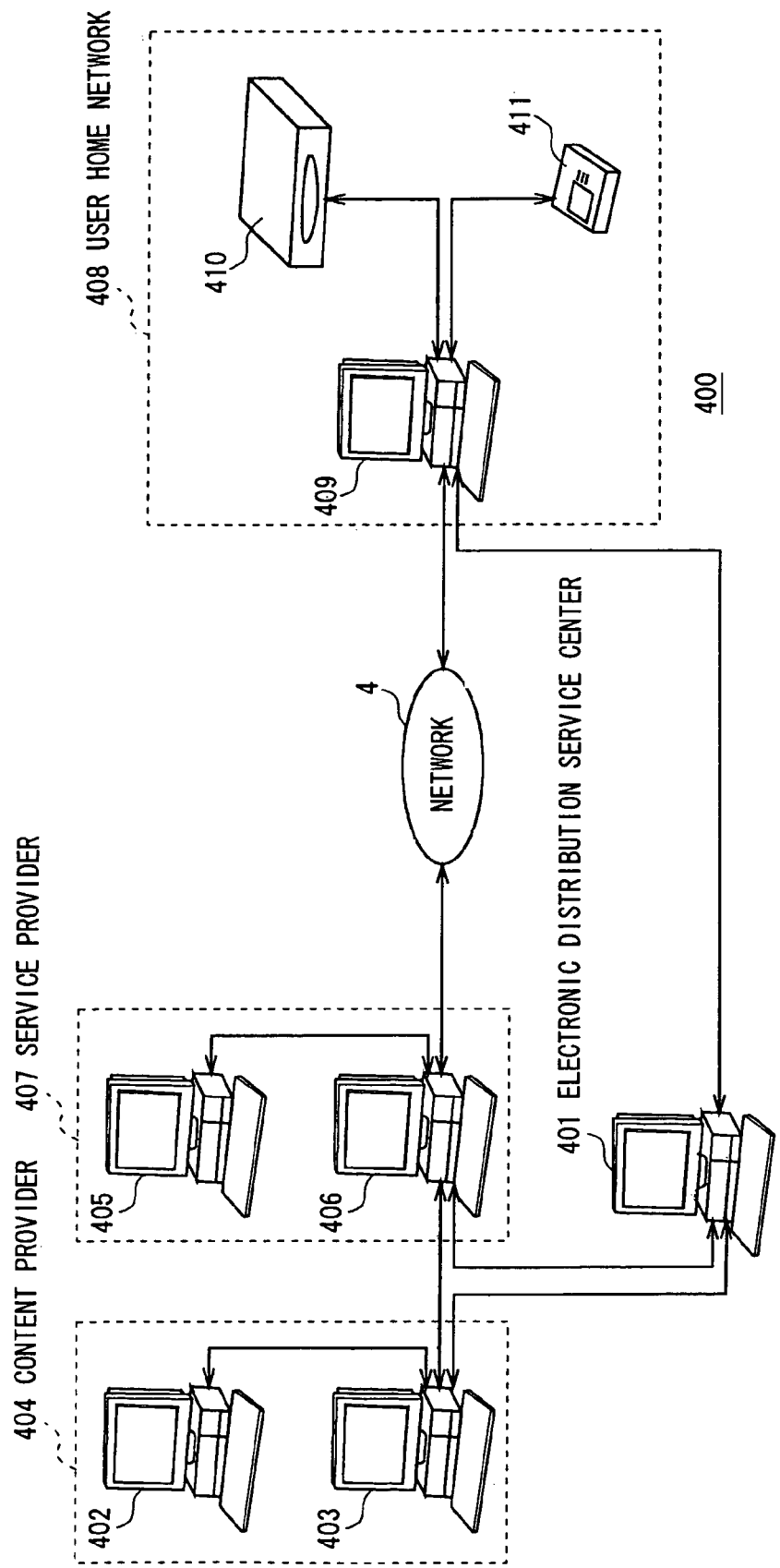
FIG. 91 is a block diagram showing another configuration of the electronic music distribution system.

FIG. 91 explains another configuration of an electronic music distribution system 400. In such an electronic music distribution system 400, to an electronic distribution service center 401 of personal computer configuration are connected personal computers 403 and 406 for signal processing (hereinafter referred to as signal processing personal computers), of content provider 404 consisting of two personal computers 402 and 403 for content servers and for signal processing and of a service provider 407 consisting of two personal computers 405 and 406 for content servers and for signal processing, likewise.

Also, to the signal processing personal computer 406 of the service provider 407 is connected the signal processing personal computer 403 of the content provider 404, and is connected a home server 409 of personal computer configuration provided in a user home network 408 via the network 4.

And, the user home network 408 has a configuration in which a stationary apparatus 410 such as a stationary-type recording and playing apparatus and a portable device 411 such as a portable recording and playing device and a portable communication terminal (a portable information device, a cellular phone and the like) are connected to the home server 409.

Figure 92:
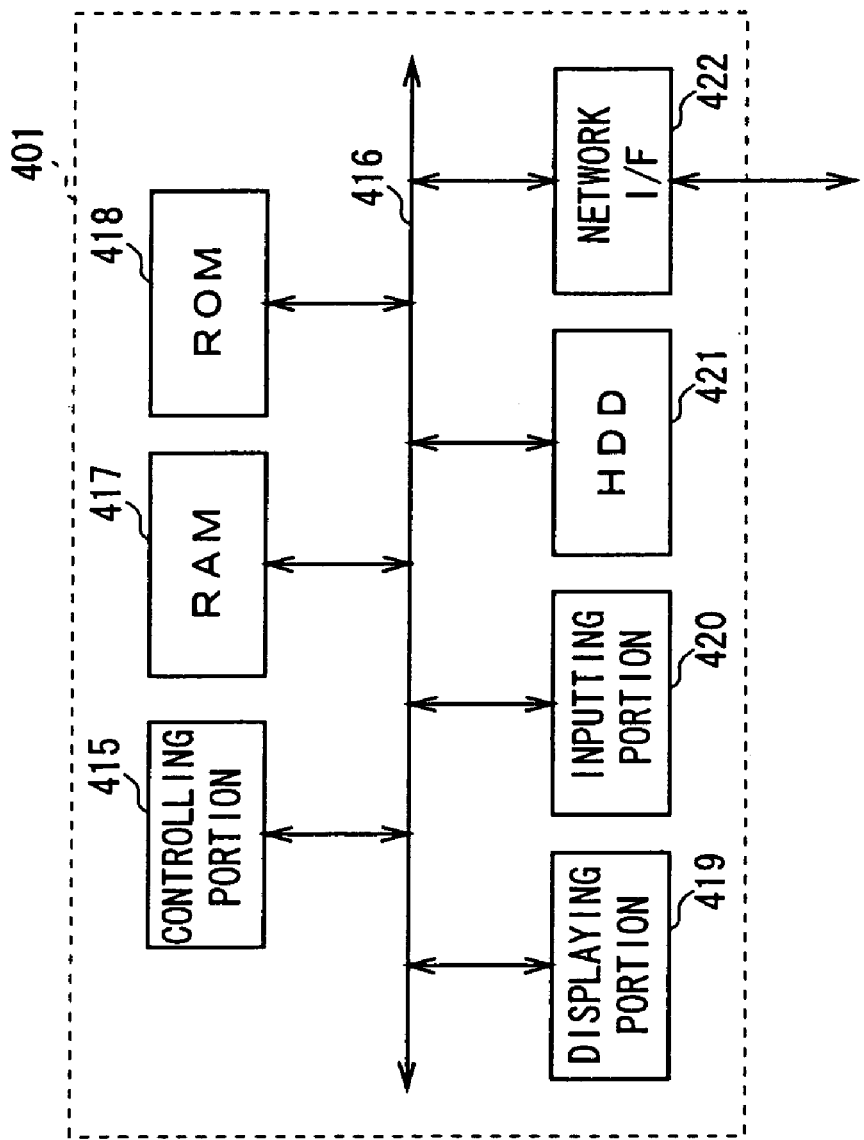
FIG. 92 is a block diagram showing a configuration of the electronic distribution service center constituted by a personal computer.

As shown in FIG. 92, the electronic distribution service center 401 has a configuration in which a RAM (Random Access Memory) 417, a ROM (Read Only Memory) 418, a displaying portion 419, an inputting portion 420, a hard disk drive (HDD: Hard Disk Drive) 421, and a network interface 422 are connected to a controlling portion 415 such as a CPU (Central Processing Unit) via a bus 416.

In this case, by reading out various kinds of programs stored in advance in the RPM 418 to develop them on the RAM 417, the controlling portion 415 can perform processing as in the case of the service provider managing portion 11, the content provider managing portion 12, the copyright managing portion 13, the key server 14, the background data managing portion 15, the benefit distribution portion 16, the cross authenticating portion 17, the user managing portion 18, the account charging portion 19, the banking portion 20 and the auditing portion 21 of the electronic distribution service center 1 as described above with reference to FIG. 2, in accordance with various kinds of these programs.

Also, the controlling portion 415 retains and manages various kinds of these information by recording keys used for the whole system (such as the distribution key $K_d$ and individual key $K_i$), and various kinds of information such as accounting information, price information, the handling policy and the user registration database in a hard disk of the hard disk drive 421.

Furthermore, the controlling portion 415 can communicate via the network interface 422 with the content provider 404, the service provider 407, the user home network 408, the JASRAC and the like, and by this, the controlling portion 415 can exchange the distribution key $K_d$ and the individual key $K_i$ encrypted with the distribution key $K_d$, and various kinds of information such as accounting information, price information, the handling policy, registration information and utilization records of contents with the content provider 404, the service provider 407, the user home network 408, JASRAC and the like.

In this way, the electronic distribution service center 401 of personal computer configuration can achieve functions similar to those of the electronic distribution service center 1 described above with reference to FIG. 2 in accordance with various kinds of programs.

In this connection, in the electronic distribution service center 401, use of the inputting portion 420 and the displaying portion 419 may be prevented and thus the inputting portion 420 and the displaying portion 419 are not provided, but the inputting portion 420 and the displaying portion 419 may be used for confirming various kinds of information recorded in the hard disk drive 421 and so on.

Also, in the electronic distribution service center 401, various kinds of programs may be recorded in advance in the hard disk of the hard disk drive 421 in place of the ROM 418.

Figure 93:
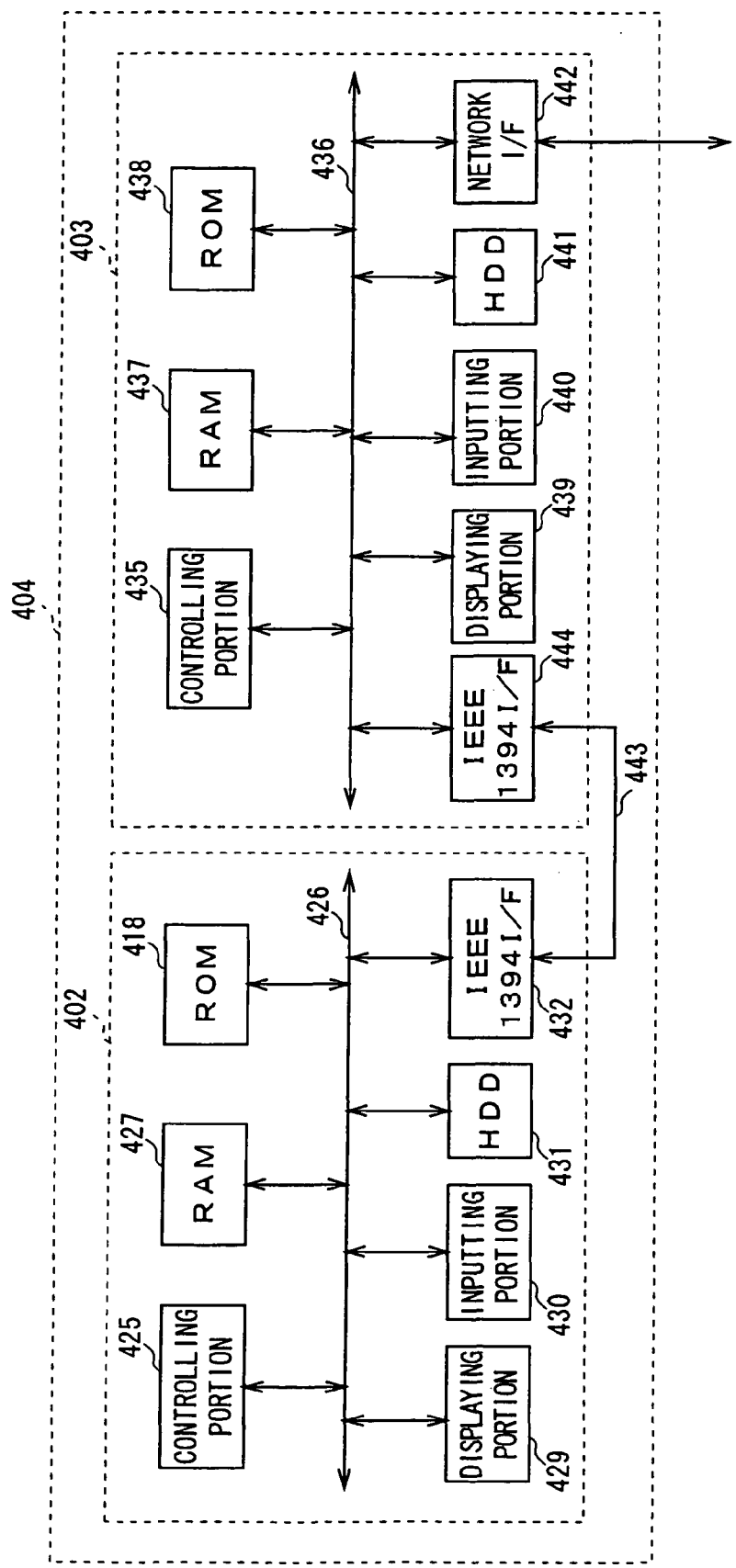
FIG. 93 is a block diagram showing a configuration of the content provider constituted by the personal computer.

FIG. 93 is a block diagram showing a configuration of the content provider 404, and the personal computer 402 for content servers (hereinafter referred to as personal computer for servers) has a configuration in which a RAM 427, a ROM 428, a displaying portion 429, an inputting portion 430, a hard disk drive 431 storing in the hard disk the contents to be supplied to the user, and an IEEE (Institute of Electrical and Electronics Engineers) 1394 interface 432 are connected to a controlling portion 425 such as a CPU via a bus 426.

Also, in the content provider 404, the signal processing personal computer 403 has a configuration in which a RAM 437, a ROM 438, a displaying portion 439, an inputting portion 440, a hard disk drive 441, a network interface 442 for connection to the electronic distribution service center 401 and the service provider 407, and an IEEE 1394 interface 444 that is connected via the IEEE 1394 interface 432 and an IEEE 1394 cable 443 of the personal computer 402 for servers are connected to a controlling portion 435 such as a CPU via a bus 436.

In this case, the controlling portion 425 of the personal computer 402 for servers operates according to a predetermined program stored in advance in the ROM 428 by reading out the program and developing the program on the RAM 427, and when a read-of-contents instruction is sent via the IEEE 1394 cable 443 from the controlling portion 435 of the signal processing personal computer 403, the controlling portion 425 captures the read instruction via the IEEE 1394 interface 432, reads the contents from the hard disk of the hard disk drive 431 based on the captured read-of-contents instruction, and sends the read contents to the signal processing personal computer 403 from the IEEE 1394 interface 432 via the IEEE 1394 cable 443.

In this connection, in the personal computer 402 for servers, use of the inputting portion 430 and the displaying portion 429 may be prevented and thus the inputting portion 430 and the displaying portion 429 are not provided, but the inputting portion 430 and the displaying portion 429 may be used when the contents recorded in the hard disk drive 431 is confirmed or contents are newly stored in the hard disk drive 431, and contents are deleted and so on.

Also, in the personal computer 402 for servers, programs may be recorded in advance in the hard disk of the hard disk drive 431 in place of the ROM 428.

On the other hand, in the content provider 404, the controlling portion 435 of the signal processing personal computer 403 records the individual key $K_i$, the individual key $K_i$ encrypted with the distribution key $K_d$, and the public key certificate of the content provider 404 in the hard disk of the hard disk drive 439, thereby retaining and managing the individual key $K_i$, the individual key $K_i$ encrypted with the distribution key $K_d$, and the public key certificate of the content provider 404.

And, by reading out various kinds of predetermined programs stored in advance in the ROM 438 to develop them on the RAM 437, the controlling portion 435 can perform processing as in the case of the electronic watermark adding portion 32, the compressing portion 33, the content encrypting portion 34, the content key generating portion 35, the content key encrypting portion 36, the handling policy generating portion 37, the signature generating portion 38 and the cross authenticating portion 39 as described above with reference to FIG. 9, in accordance with various kinds of these programs.

By this, the signal processing personal computer 403 can exchange the distribution key $K_d$, the individual key $K_i$ encrypted with the distribution key $K_d$, the handling policy and the content provider secure container with the electronic distribution service center 401 and the service provider 407 via the network interface 442.

In this way, the content provider 404 of personal computer configuration can achieve functions similar to those of the content provider 2 described above with reference to FIG. 9, in accordance with various kinds of programs.

In this connection, in the signal processing personal computer 403, use of the inputting portion 440 and the displaying portion 439 may be prevented and thus the inputting portion 440 and the displaying portion 439 are not provided, but the inputting portion 440 and the displaying portion 439 may be used for confirming the individual key $K_i$, the individual key encrypted with the distribution key $K_d$ and the public key certificate of the content provider 404 recorded in the hard disk drive 441, and so on.

Also, in the signal processing personal computer 403, various kinds of programs may be recorded in advance in the hard disk of the hard disk drive 441 in place of the ROM 438. Furthermore, in the signal processing personal computer 403, resistance to tamper may be imparted to the RAM 437 to retain the individual key $K_i$.

Furthermore, in the content provider 404, the signal processing personal computer 403 and the personal computer 402 for servers are connected via the IEEE 1394 cable 443, but the signal processing personal computer 403 and the personal computer 402 for servers may be cable-connected via the USB (Universal Serial Bus) cable, the RS-232C cable and the like, or wirelessly connected via predetermined wireless communicating means.

Figure 94:
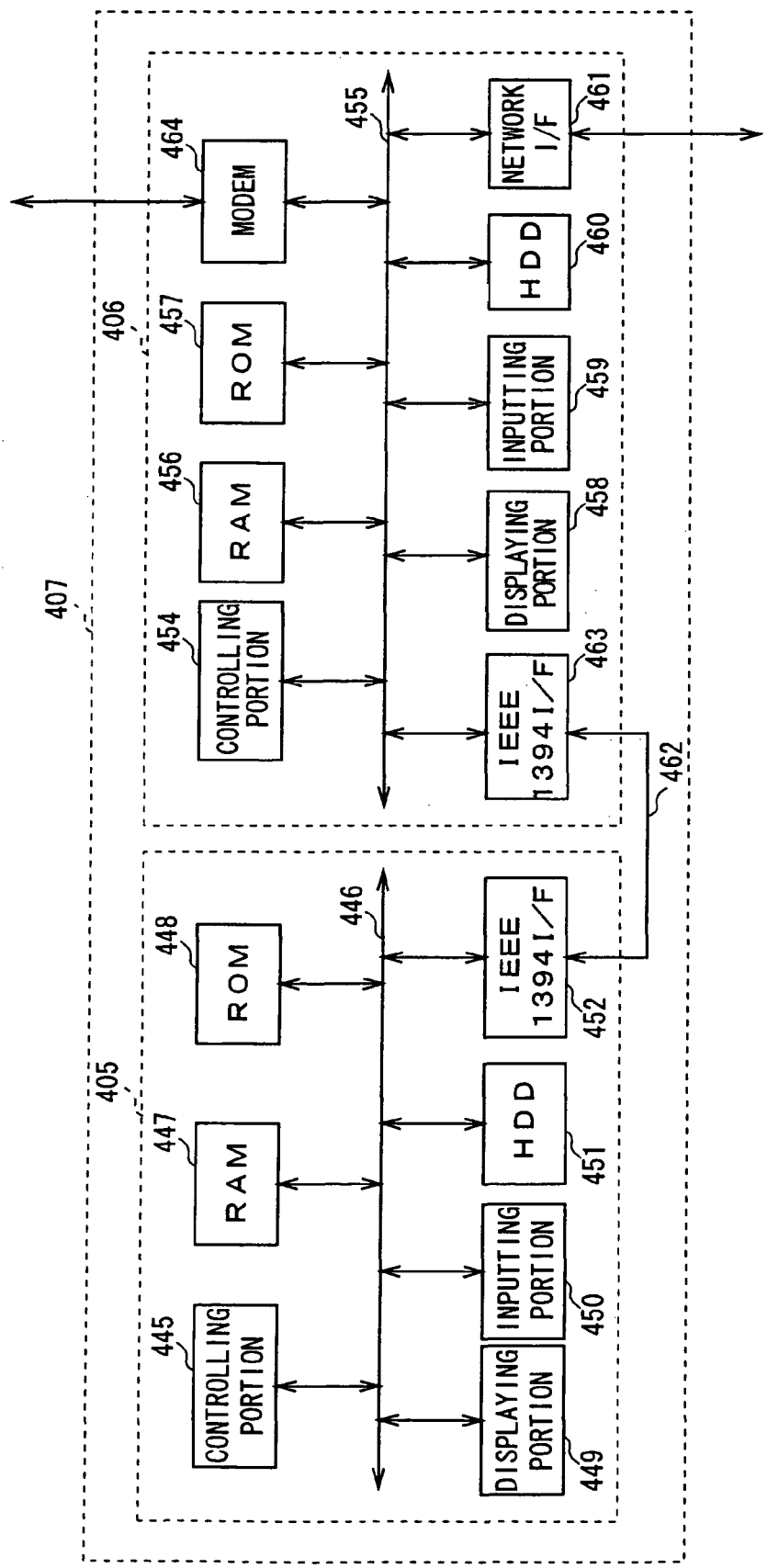
FIG. 94 is a block diagram showing a configuration of the service provider constituted by the personal computer.

FIG. 94 is a block diagram showing a configuration of the service provider 407, and the personal computer 405 for servers has a configuration in which a RAM 447, a ROM 448, a displaying portion 449, an inputting portion 450, a hard disk drive 451 storing in the hard disc the content provider secure container and the public key certificate of the content provider 404, and an IEEE 1394 interface 452 are connected to a controlling portion 445 such as the CPU via a bus 446.

Also, in the service provider 407, the signal processing personal computer 406 has a configuration in which a RAM 456, a ROM 457, a displaying portion 458, an inputting portion 449, a hard disk drive 460, a network interface 461 for connection to the electronic distribution service center 401 and the content provider 404, an IEEE 1394 interface 463 that is connected to the IEEE 1394 interface 452 of the personal computer 405 for servers via an IEEE 1394 cable 462, and a modem 464 for connection to the user home network 408 via the network 4 are connected to a controlling portion 454 such as the CPU via a bus 455.

In this case, the controlling portion 445 of the personal computer 405 for servers operates in accordance with a predetermined program by reading out the program stored in advance in the ROM 448 to develop the program on the RAM 447, and when the content provider secure container and the public key certificate of the content provider 404 together with a write instruction to write them are given from the controlling portion 454 of the signal processing personal computer 406 via the IEEE 1394 cable 462, the controlling portion 445 captures them via the IEEE 1394 interface 452 and writes the content provider secure container and the public key certificate of the content provider 404 in the hard disk of the hard disk drive 451 based on the captured write instruction, and when a read instruction to read the content provider secure container and the public key certificate of the content provider 404 is given from the controlling portion 454 of the signal processing personal computer 406 via the IEEE 1394 cable 462, the controlling portion 445 captures the read instruction via the IEEE 1394 interface 452, reads the content provider secure container and the public key certificate of the content provider 404 from the hard disk of the hard disk drive 451 based on the captured read instruction, and sends the read content provider secure container and public key certificate of the content provider 404 to the signal processing personal computer 406 from the IEEE 1394 interface 452 via the IEEE 1394 cable 462.

In this connection, in the personal computer 405 for servers, use of the inputting portion 450 and the displaying portion 449 may be usually prevented, and thus the inputting portion 450 and the displaying portion 449 are not provided, but the inputting portion 450 and the displaying portion 449 may be used for confirming the content provider secure container, the public key certificate of the content provider 404 and the like recorded in the hard disk drive 451, and so on.

Also, in the personal computer 405 for servers, programs may be recorded in advance in the hard disk of the hard disk drive 451 in place of the ROM 448.

On the other hand, in the service provider 407, the controlling portion 454 of the signal processing personal computer 406 records the public key certificate of the service provider 407 in the hard disk of the hard disk drive 460, and imparts tamper resistance to the RAM 456 to retain and manage the secret key of the service provider 407.

And, by reading out various kinds of predetermined programs stored in advance in the ROM 457 to develop them on the RAM 456, the controlling portion 454 can perform processing as in the case of the certificate verifying portion 42, the signature verifying portion 43, the pricing portion 44, the signature generating portion 45 and the cross authenticating portion 46 of the service provider 3 described above with reference to FIG. 14, in accordance with various kinds of these programs.

By this, the signal processing personal computer 406 can exchange price information, the content provider secure container and the like with the electronic distribution service center 401 and the content provider 407 via the network interface 442, and can send the service provider secure container to the user home network 408 via the modem 464.

In this way, the service provider 407 of personal computer configuration can achieve functions similar to those of the service provider 3 described above with reference to FIG. 14 in accordance with various kinds of programs.

In this connection, in the signal processing personal computer 406, use of the inputting portion 459 and the displaying portion 458 may be usually prevented, and thus the inputting portion 459 and the displaying portion 458 are not provided, but the inputting portion 459 and the displaying portion 458 may be used for confirming the public key certificate of the service provider 407 and the like recorded in the hard disk drive 460.

Also, in the signal processing personal computer 406, various kinds of programs may be recorded in advance in the hard disk of the hard disk drive 460 in place of the ROM 457.

Furthermore, in the service provider 407, the signal processing personal computer 406 and the personal computer 405 for servers are connected via the IEEE 1394 cable 462, but the signal processing personal computer 406 and the personal computer 405 for servers may be cable-connected via a predetermined signal cable such as the USB cable and the RS-232C cable, or wirelessly connected via predetermined wireless communicating means.

Figure 95:
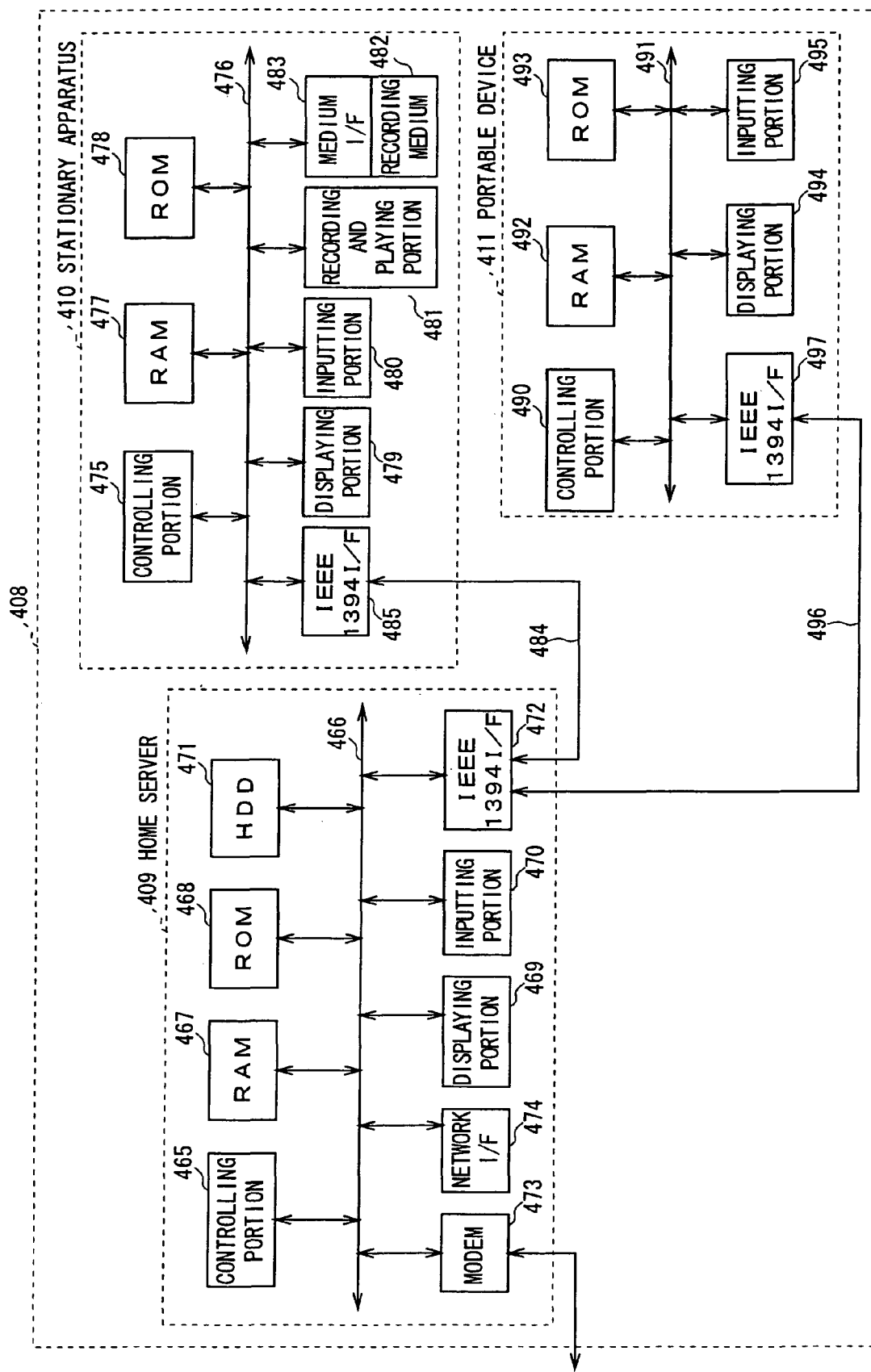
FIG. 95 is a block diagram showing a configuration of the user home network using the personal computer.
Figure 96:
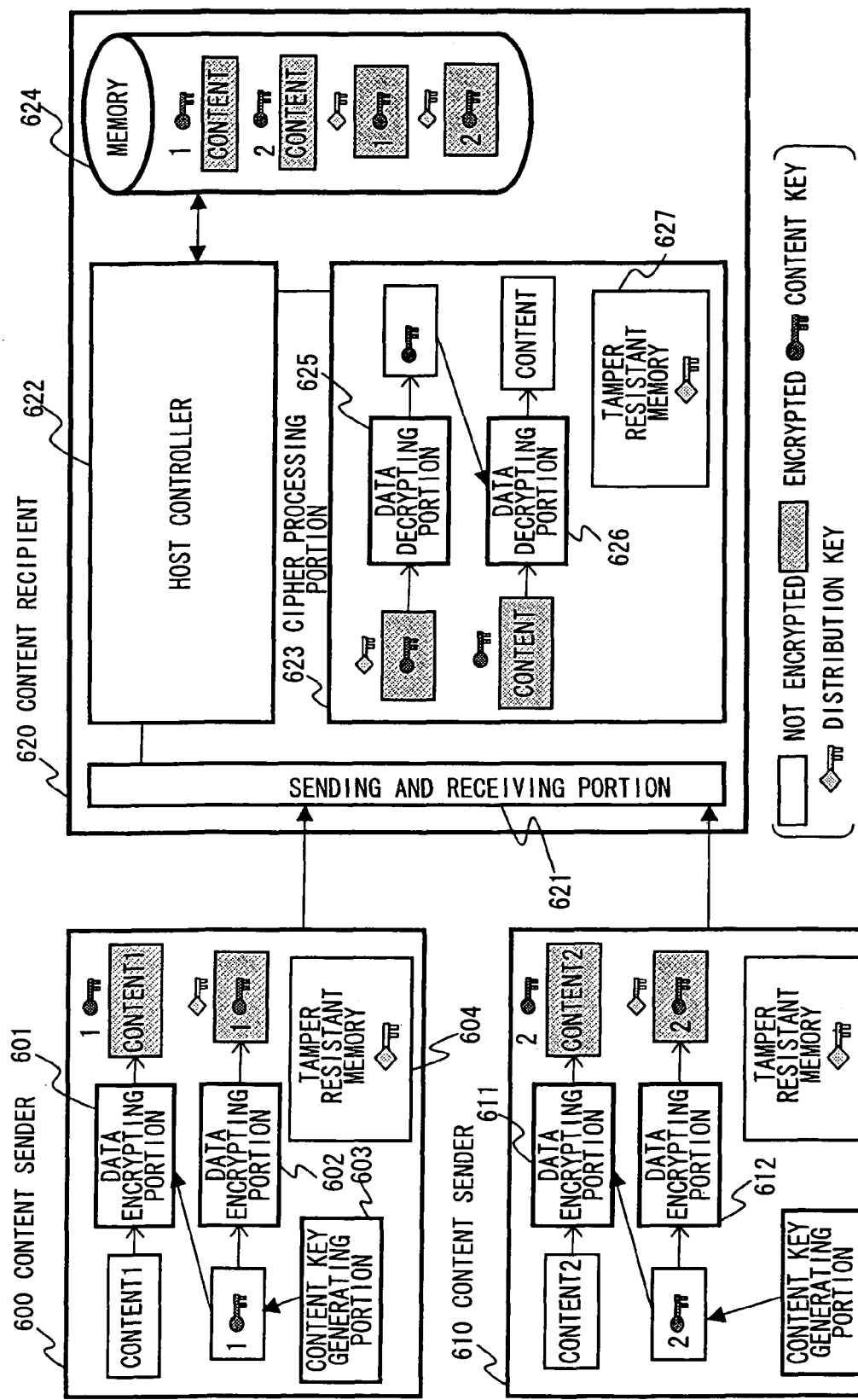
FIG. 96 is a block diagram showing a conventional example.

FIG. 95 is a block diagram showing a configuration of the user home network, and the home server 409 of personal computer configuration has a configuration in which a RAM 467, a ROM 468, a displaying portion 469, an inputting portion 470, a hard disk drive 471, an IEEE 1394 interface 472, a modem 473 for connection to the service provider 407 via the network 4, and a network interface 474 for connection to the electronic distribution service center 401 are connected to a controlling portion 465 such as the CPU via a bus 466.

Also, in the user home network 408, the stationary apparatus 410 has a configuration in which a RAM 477, a ROM 478, a displaying portion 479, an inputting portion 480, a recording and playing portion 481, a media interface 483 for a recording medium 482, and an IEEE 1394 interface 485 that is connected to the IEEE 1394 interface 472 of the home server via an IEEE 1394 cable 484 are connected to a controlling portion 475 such as the CPU via a bus 476.

Furthermore, in the user home network 408, the portable device 411 has a configuration in which a RAM 492, a ROM 493, a displaying portion 494, an inputting portion 495, and an IEEE 1394 interface 497 that is connected to the IEEE 1394 interface 472 of the home server via an IEEE 1394 cable 496 are connected to a controlling portion 490 such as the CPU via a bus 491.

In this case, by reading out various kinds of programs stored in advance in the ROM 468 to develop them on the RAM 467, the controlling portion 465 of the home server 409 can perform processing as in the case of host controller 62, the cipher processing portion 65 and the extending portion 66 of the home server 51 described above with reference to FIG. 15, in accordance with various kinds of these programs.

Also, the displaying portion 469 of the home server 409 has functions similar to those of the displaying portion 64 of the home server 51 described above with reference to FIG. 15, and the inputting portion 470 of the home server 409 has functions similar to those of the inputting portion 63 of the home server 51 described above with reference to FIG. 15. Furthermore, the hard disk drive 471 of the home server 409 has functions similar to those of the large capacity storing portion 68 of the home server 51 described above with reference to FIG. 15, the modem 473, the network interface 474 and the IEEE 1394 interface 472 have functions similar to those of the communicating portion 61 of the home server 51 described above with reference to FIG. 15, and the RAM 467 of the home server 409 has functions similar to those of the external memory 67 of the home server 51 described above with reference to FIG. 15.

Thus, the home server 409 of personal computer configuration can achieve functions similar to those of the home server 51 described above with reference to FIG. 15 in accordance with various kinds of programs.

In this connection, in the home server 409, various kinds of programs may be recorded in advance in the hard disk of the hard disk drive 471 in place of ROM 468, and the hard disk drive 471 may be made to function as in the case of the external memory 67 described above with reference to FIG. 15. Also, in the home server 409, the modem 473 and the network interface 474 may be integrated into one interface such as a modem, depending on patterns of communication with the service provider 407 and the electronic distribution service center 401. Furthermore, in the home server 409, the stationary apparatus 410 and the portable device 411 may be cable-connected via a predetermined signal cable such as the USB cable and the RS-232C cable, or wirelessly connected via predetermined wireless communicating means.

On the other hand, in the user home network 408, by reading out various kinds of programs stored in advance in the ROM 478 to develop them on the RAM 477, the controlling portion 475 of the stationary apparatus 410 can perform processing as in the case of the host controller 72, the cipher processing portion 73 and the extending portion 74 of the stationary apparatus 52 described above with reference to FIG. 15, in accordance with various kinds of these programs.

Also, the displaying portion 479 of the stationary apparatus 410 has functions similar to those of the displaying portion 78 of the stationary apparatus 52 described above with reference to FIG. 15, the inputting portion 480 has functions similar to those of the inputting portion 77 of the stationary apparatus 52 described above with reference to FIG. 15, and the IEEE 1394 interface 485 has functions similar to those of the communicating portion 71 of the stationary apparatus 52 described above with reference to FIG. 15. Furthermore, the recording and playing portion 481 of the stationary apparatus 410 has functions similar to those of the recording and playing portion 76 of the stationary apparatus 52 described above with reference to FIG. 15, the recording medium 482 has functions similar to those of the recording medium 80 of the stationary apparatus 52 described above with reference to FIG. 15, and the RAM 477 of the stationary apparatus 410 has functions similar to those of the external memory 79 and the small capacity storing portion 75 of the stationary apparatus 52 described above with reference to FIG. 15.

Thus, the stationary apparatus 410 of the user home network 408 can achieve functions similar to those of the stationary apparatus 52 of the user home network 5 described above in FIG. 15, in accordance with various kinds of programs.

In this connection, in the stationary apparatus 410, a hard disk drive may newly provided to record in advance various kinds of programs in the hard disk of the hard disk drive in place of the ROM 478, and the hard disk drive may be made to function as in the case of the external memory 79 and the small capacity storing portion 75 of the stationary apparatus 52 described above with reference to FIG. 15. Also, in the stationary apparatus 410, if the recording medium 482 is of semiconductor memory configuration, functions of the recording and playing portion 481 may be achieved on the controlling portion 475 in accordance with a predetermined program.

In the user home network 408, by reading out various kinds of programs stored in advance in the ROM 493 to develop them on the RAM 492, the controlling portion 490 of the portable device 411 can perform processing as in the case of the host controller 82, the cipher processing portion 83 and the extending portion 84 of the portable device 53 described above with reference to FIG. 15, in accordance with various kinds of these programs.

Also, the RAM 492 of the portable device 411 has functions similar to those of the external memory 85 of the portable device 53 described above with reference to FIG. 15, and the IEEE 1394 interface 497 has functions similar to those of the communicating portion 81 of the portable device 53 described above with reference to FIG. 15. Furthermore, in this portable device 411, the displaying portion 494 and the inputting portion 495 may be used during playback of the contents.

Thus, the portable device 411 of the user home network 408 can achieve functions similar to those of the portable device 53 of the user home network 5 described above with reference to FIG. 15, in accordance with various kinds of programs.

In this connection, in the portable device 411, a detachable medium may be provided for the recording and playing of the contents.

For the electronic music distribution system 400, in the aforesaid configuration, the electronic distribution service center 401, the content provider 404, the service provider 407 and the home server 409 of the user home network 408 are of personal computer configuration, respectively.

Thus, in the electronic music distribution system 400, the electronic service center 401, the content provider 404, the service provider 407 and the home server 409 do not need to be newly produced in hardware configuration for distribution of the contents, and various kinds of programs are only installed in an existing personal computer, whereby a system can be easily constructed using such a personal computer.

According to the above described configuration, the electronic music distribution system 400 is constructed using the electronic distribution service center 401 of the personal computer configuration, the content provider 404, the service provider 407 and the home server 409, whereby an existing personal computer can be easily set as the electronic distribution service center 401, the content provider 404, the service provider 407 and the home server 409, thus making it possible to ease and simplify system construction.

Furthermore, for the electronic music distribution system 400, cases where the electronic distribution service center 401, the content provider 404, the service provider 407, the home server 409, the stationary apparatus 410 and the portable device 411 are made to operate in accordance with various kinds of programs stored in advance in the ROMs 418, 428, 438, 448, 457, 468, 478 and 493 have been described, but a program storing medium in which various kinds of programs are stored may be installed in the electronic distribution service center 401, the content provider 404, the service provider 407, the home server 409, the stationary apparatus 410 and the portable device 411, thereby operating respectively the electronic distribution service center 401, the content provider 404, the service provider 407, the home server 409, the stationary apparatus 410 and the portable device 411, in accordance with various kinds of programs stored in the program storing medium, and various kinds of programs transferred from the program storing medium to the hard disk and the like.

In this connection, the program storing medium used for operating the electronic distribution service center 401, the content provider 404, the service provider 407, the home server 409, the stationary apparatus 410 and the portable device 411 may be achieved with not only a package medium such as a CD-ROM (Compact Disc-Read Only Memory) but also a semiconductor memory, a magnetic disk and the like in which programs are temporarily or permanently stored. Also, for means for storing programs in these program storing media, cable and wireless communication media such as local area networks, the Internet and digital satellite broadcasts may be used, and programs may be stored through various kinds of communication interfaces such as routers and modems.

INDUSTRIAL APPLICABILITY

The present invention may be used for information sending devices such as providers providing contents such as music, images and game programs, and information receiving devices such as personal computers and cellular phones receiving the provided contents, and further network systems constructed of these information sending devices and information receiving devices.

EXPLANATION OF REFERENCE NUMERALS 1, 401 . . . electronic distribution service Center, 2, 404 . . . content provider, 3, 407 . . . service provider, 4 . . . network, 5, 408 . . . user home network, 10, 400 . . . electronic music distribution system, 11 . . . service provider managing portion, 12 . . . content provider managing portion, 13 . . . copyright managing portion, 14 . . . key server, 15 background data managing portion, 16 . . . benefit distributing portion, 17 . . . cross authenticating portion, 18 . . . user managing portion, 19 . . . account charging portion, 20 . . . banking portion, 21 . . . auditing portion, 22 . . . authenticator station, 23 . . . content server, 24 . . . content authoring portion, 31 . . . content server, 32 . . . electronic water adding portion 34 . . . content encrypting portion, 35 . . . content key generating portion 36 . . . content key encrypting portion, 37 . . . handling policy generating portion, 38 . . . signature generating portion, 39 . . . cross authenticating portion, 41 . . . content server, 42 . . . certificate verifying portion, 43 . . . signature, verifying portion, 44 . . . pricing portion, 45 . . . signature generating portion, 46 . . . cross authenticating portion, 409 . . . home server, 52, 410 . . . stationary apparatus, 53, 411 . . . portable device 62, 72, 82 . . . host controller, 56, 73, 83 . . . cipher processing portion, 66, 74, 84 . . . extending portion, 67, 79, 85 . . . external memory, 120 . . . electronic distribution only recording medium, 402, 405 . . . personal computer for servers, 403, 406 . . . signal processing personal computer

The invention claimed is:

1. An information distribution system comprising an electronic distribution center, an information sending device, and an information receiving device:

the electronic distribution service center comprising:
means for sending a first distribution key and a second distribution key to the information receiving device, the first distribution key being necessary to decrypt encrypted content during a first time period and the second distribution key being necessary to decrypt the encrypted content during a second time period;

means for encrypting a first individual key with the first distribution key and a second individual key with the second distribution key, the first individual key and the second individual key being specific to the information sending device; and means for sending the first individual key encrypted with the first distribution key and the second individual key encrypted with the second distribution key to the information sending device;

the information sending device comprising:

means for receiving the first individual key encrypted with the first distribution key and the second individual key encrypted with the second distribution key;

means for generating the encrypted content by encrypting content with a content key;

means for encrypting the content key with the first individual key or the second individual key; and means for sending, when it is the first time period, the encrypted content, the content key encrypted with the first individual key, and the first individual key encrypted with the first distribution key and sending, when it is the second time period, the encrypted content, the content key encrypted with the second individual key, and the second individual key encrypted with the second distribution key; and the information receiving device comprising:

receiving means for receiving the first distribution key, the second distribution key, the encrypted content, the content key encrypted with the first individual key or the second individual key, and the first individual key encrypted with the first distribution key or the second individual key encrypted with the second distribution key; and decrypting means for using the first distribution key to decrypt the first individual key encrypted with the first distribution key or the second distribution key to decrypt the second individual key encrypted with the second distribution key to the information receiving device, using the first individual key or the second individual key to decrypt the content key and using the content key to decrypt the encrypted content.

2. An information distribution method comprising:

sending a first distribution key and a second distribution key to an information receiving device, the first distribution key being necessary to decrypt an encrypted content during a first time period and the second distribution key being necessary to decrypt the encrypted content during a second time period;

sending a first individual key encrypted with the first distribution key or a second individual key encrypted with the second distribution key to an information sending device;

generating, by the information sending device, the encrypted content by encrypting content with a content key;

encrypting the content key with the first individual key or the second individual key, wherein the first individual key and the second individual key are specific to the information sending device;

sending, by the information sending device, when it is a first time period, the encrypted content, the content key encrypted with the first individual key, and the first individual key encrypted with the first distribution key and sending, when it is a second time period, the encrypted content, the content key encrypted with the second individual key, and the second individual key encrypted with the second distribution key;

receiving, at the information receiving device, the first distribution key, the second distribution key, the encrypted content, a content key encrypted with the first individual key during the first time period or the content key encrypted with the second individual key during the second time period, and the first individual key encrypted with the first distribution key during the first time period or the second individual key encrypted with the first distribution key during the second time period;

decrypting the first individual key encrypted with the first distribution key using the first distribution key or the second individual key encrypted with the second distribution key using the second distribution key;

decrypting the content key encrypted with the first individual key or the second individual key; and decrypting the encrypted content with the content key.

3. An information sending device comprising:

means for receiving a first individual key encrypted with a first distribution key and a second individual key encrypted with a second distribution key from an outside source, wherein the first distribution key and the second distribution key are sent to an information receiving device;

means for generating the encrypted content by encrypting content with a content key;

means for encrypting the content key with the first individual key or the second individual key, wherein the first individual key and the second individual key are specific to the information sending device; and means for sending to the information receiving device the encrypted content, the content key encrypted with the first individual key, and the encrypted first individual key during a first time period and sending to the information receiving device the encrypted content, the content key encrypted with the second individual key, and the encrypted second individual key during a second time period;

wherein:

the encrypted first individual key is decrypted using the first distribution key during the first time period, the encrypted second individual key is decrypted using the second distribution key during the second time period, the encrypted content key is decrypted using the first individual key or the second individual key, and the encrypted content is decrypted using the content key.

4. The information sending device according to claim 3, further comprising means for receiving the first individual key and the second individual key from the outside source.

5. The information sending device according to claim 4, wherein the second individual key and the second individual key encrypted with the second distribution key are received before the second time period.

6. An information sending method comprising:

receiving a first individual key encrypted with a first distribution key and a second individual key encrypted with a second distribution key from an outside source, wherein the first distribution key and the second distribution key are sent to an information receiving device;

generating the encrypted content by encrypting content with a content key;

encrypting the content key with the first individual key or the second individual key, wherein the first individual key and the second individual key are specific to the information sending device; and sending to the information receiving device the encrypted content, the content key encrypted with the first individual key, and the encrypted first individual key during a first time period and sending to the information receiving device the encrypted content, the content key encrypted with the second individual key, and the encrypted second individual key during a second time period;

wherein:
   the encrypted first individual key is decrypted using the first distribution key during the first time period,
   the encrypted second individual key is decrypted using the second distribution key during the second time period,
   the encrypted content key is decrypted using the first individual key or the second individual key, and
   the encrypted content is decrypted using the content key.

7. The information sending method according to claim 6, further comprising receiving the first individual key and the second individual key from the outside source.

8. The information sending method according to claim 7, further comprising receiving the second individual key encrypted with the second distribution key and the second individual key before the second time period begins.

9. A non-transitory program-storing medium storing a program for causing a processor to perform an information sending method, the method comprising:

receiving a first individual key encrypted with a first distribution key and a second individual key encrypted with a second distribution key from an outside source, wherein the first distribution key and the second distribution key are sent to an information receiving device;

generating the encrypted content by encrypting content with a content key;

encrypting the content key with the first individual key or the second individual key, wherein the first individual key and the second individual key are specific to the information sending device; and sending to the information receiving device the encrypted content, the content key encrypted with the first individual key, and the encrypted first individual key during a first time period and sending to the information receiving device the encrypted content, the content key encrypted with the second individual key, and the encrypted second individual key during a second time period;

wherein:
   the encrypted first individual key is decrypted using the first distribution key during the first time period,
   the encrypted second individual key is decrypted using the second distribution key during the second time period,
   the encrypted content key is decrypted using the first individual key or the second individual key, and
   the encrypted content is decrypted using the content key.

10. The non-transitory program-storing medium according to claim 9, the method further comprising receiving the first individual key and the second individual key from the outside source.

11. The non-transitory program-storing medium according to claim 10, wherein the first individual key and the second individual key are received before the second time period.

* * * * *